(12) United States Patent
Akhtar et al.

(10) Patent No.: US 6,769,000 B1
(45) Date of Patent: Jul. 27, 2004

(54) UNIFIED DIRECTORY SERVICES ARCHITECTURE FOR AN IP MOBILITY ARCHITECTURE FRAMEWORK

(75) Inventors: Haseeb Akhtar, Garland, TX (US);
Emad A. Qaddoura, Plano, TX (US);
Russell C. Coffin, Plano, TX (US);
Liem Q. Le, Richardson, TX (US);
Zemin Zhu, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 799 days.

(21) Appl. No.: 09/656,850

(22) Filed: Sep. 7, 2000

Related U.S. Application Data

(60) Provisional application No. 60/192,411, filed on Mar. 27, 2000, provisional application No. 60/152,916, filed on Sep. 8, 1999, provisional application No. 60/156,669, filed on Sep. 29, 1999, provisional application No. 60/157,289, filed on Oct. 1, 1999, and provisional application No. 60/157,449, filed on Oct. 4, 1999.

(51) Int. Cl.[7] .............................................. G06F 17/30
(52) U.S. Cl. ............................ 707/103 R; 707/103 Y
(58) Field of Search ........................... 707/2, 101, 201, 707/200; 370/331, 340; 455/422.1, 426.1, 428, 432.1, 435.1, 436, 560

(56) References Cited

U.S. PATENT DOCUMENTS

| | | | |
|---|---|---|---|
| 5,901,352 A | * | 5/1999 | St-Pierre et al. .......... 455/426.1 |
| 6,065,016 A | * | 5/2000 | Stuntebeck et al. ......... 707/200 |
| 6,160,804 A | * | 12/2000 | Ahmed et al. ............... 370/349 |
| 6,256,300 B1 | * | 7/2001 | Ahmed et al. ............... 370/331 |

FOREIGN PATENT DOCUMENTS

| | | | |
|---|---|---|---|
| EP | 1 017 208 A2 A3 | 7/2000 | ........... H04L/29/12 |
| WO | WO 98/32301 | 7/1998 | ............ H04Q/7/22 |
| WO | WO 98/45982 | 10/1998 | ............ H04L/9/32 |
| WO | WO 99/12329 | 3/1999 | ............ H04M/7/00 |
| WO | WO 99/18515 | 4/1999 | ......... G06F/15/177 |
| WO | WO 99/38303 | 4/1999 | ........... H04L/29/06 |

OTHER PUBLICATIONS

Richard D. Verjinski, Phase, A Portable Host Access System Environment, CH2681, 1989 IEEE.

* cited by examiner

Primary Examiner—Diane D. Mizrahi
Assistant Examiner—Apu Mofiz
(74) Attorney, Agent, or Firm—Carr LLP

(57) ABSTRACT

A communications architecture for enabling IP-based mobile communications includes a Local Service Function (LSF) component configured to serve as an IP-based serving area network for a set of x-Access Networks, and a Network Service Function (NSF) component configured to serve as an IP-based home network by managing a MN's subscription and associated profile so that the MN is authorized to use the resources of the LSF. An x-Access Network (xAN) is interconnected to the LSF and NSF for providing heterogeneous Layer 2 access for MNs irrespective of access technology.

13 Claims, 105 Drawing Sheets

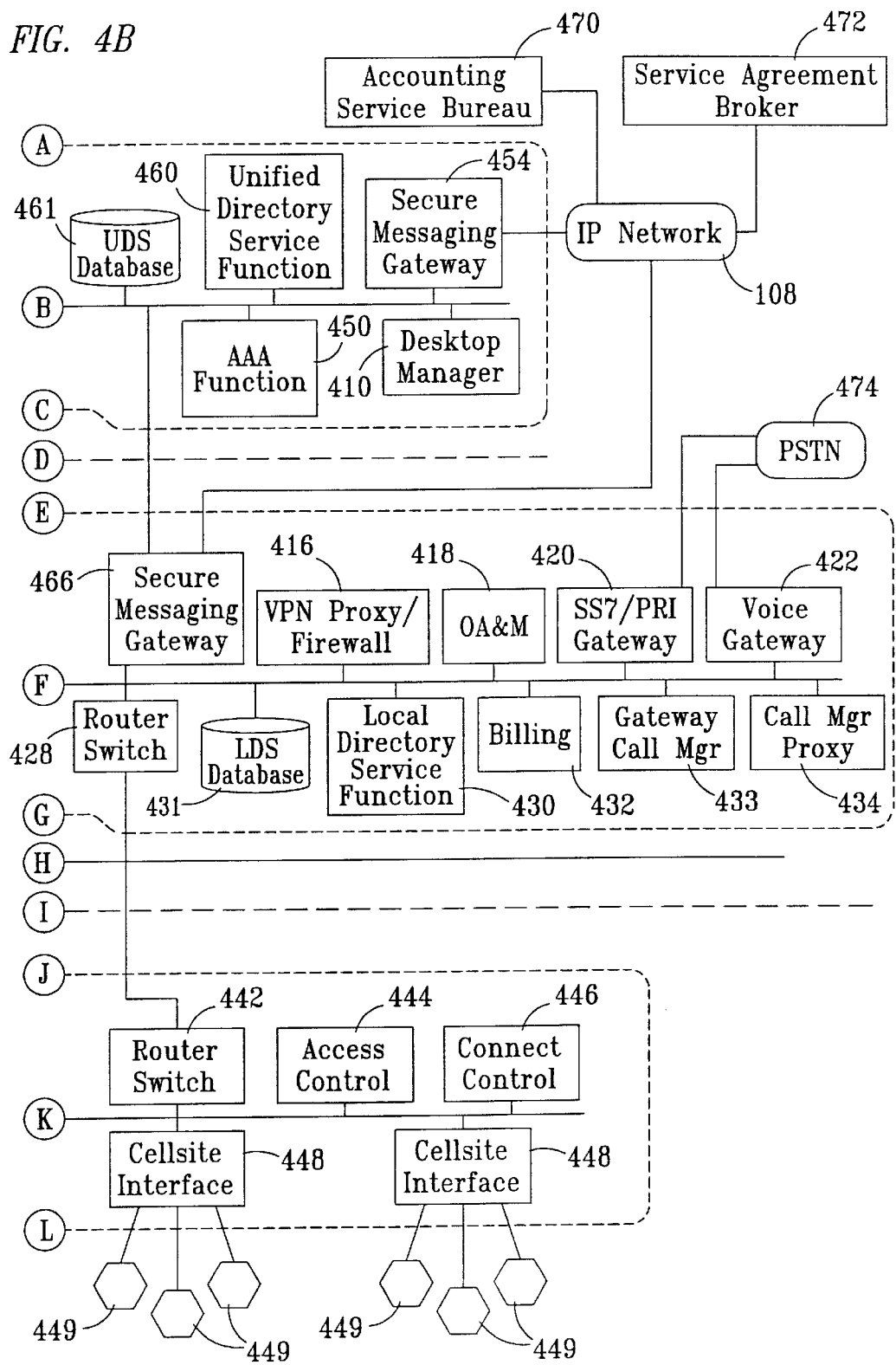

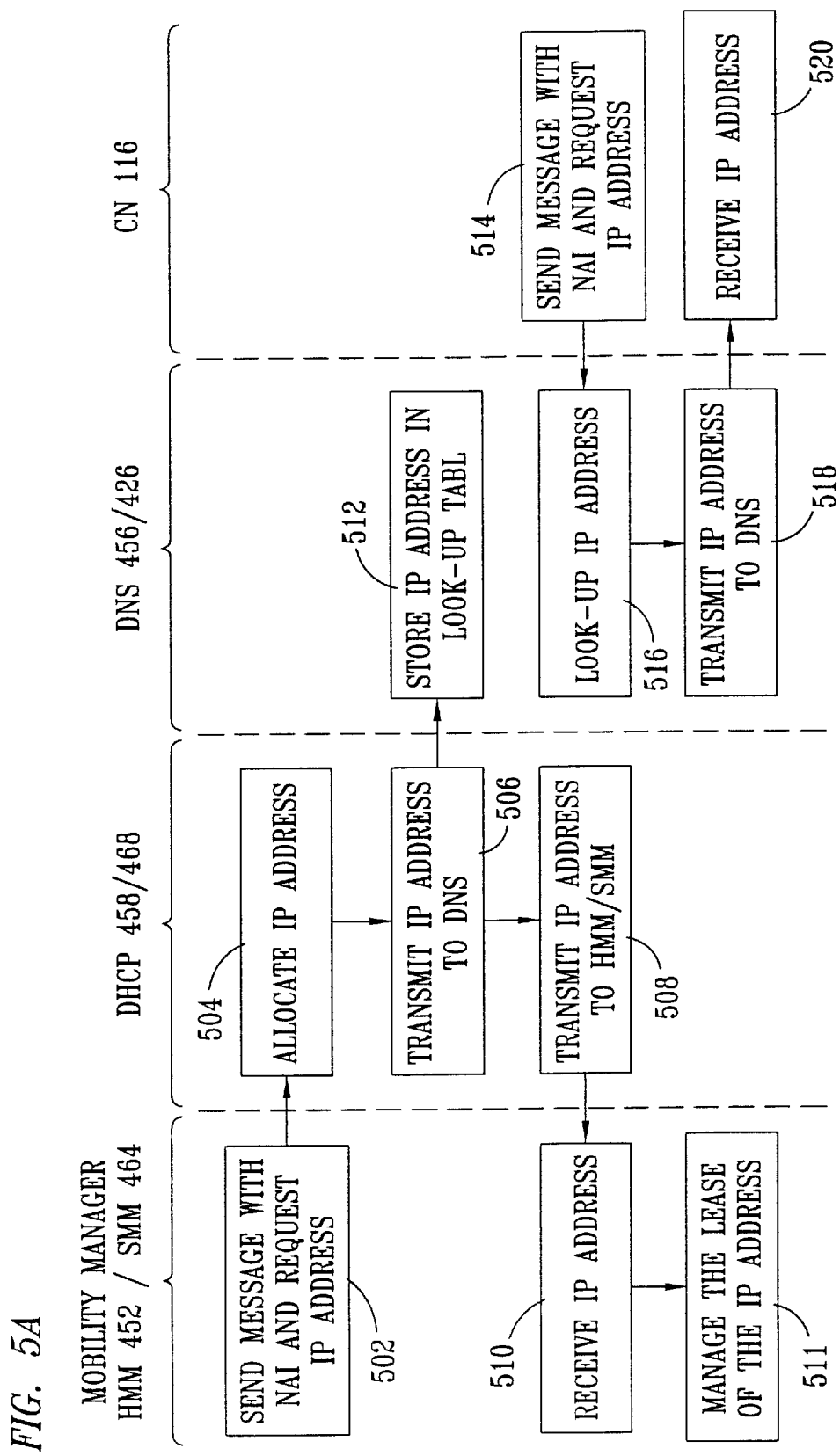

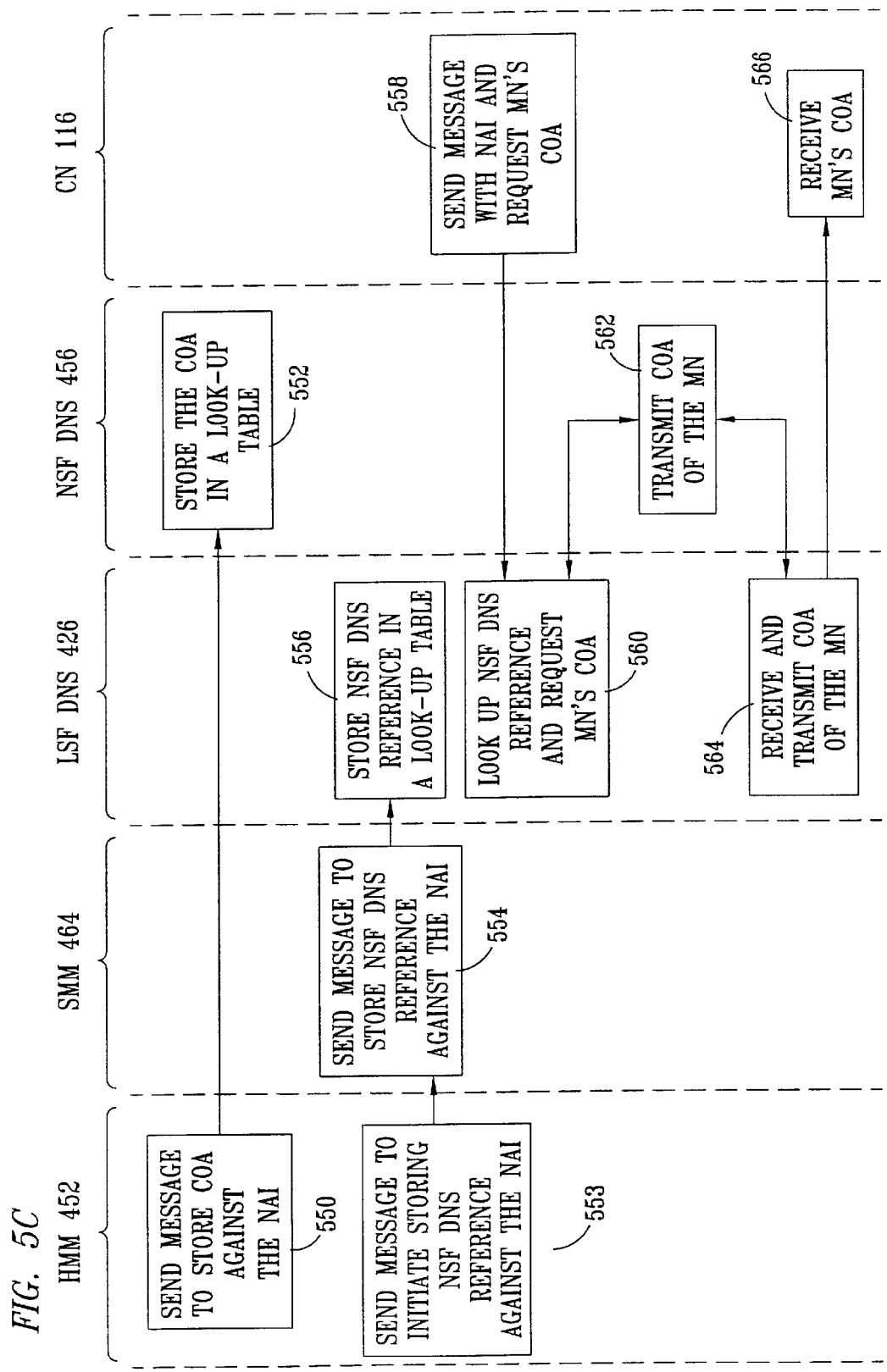

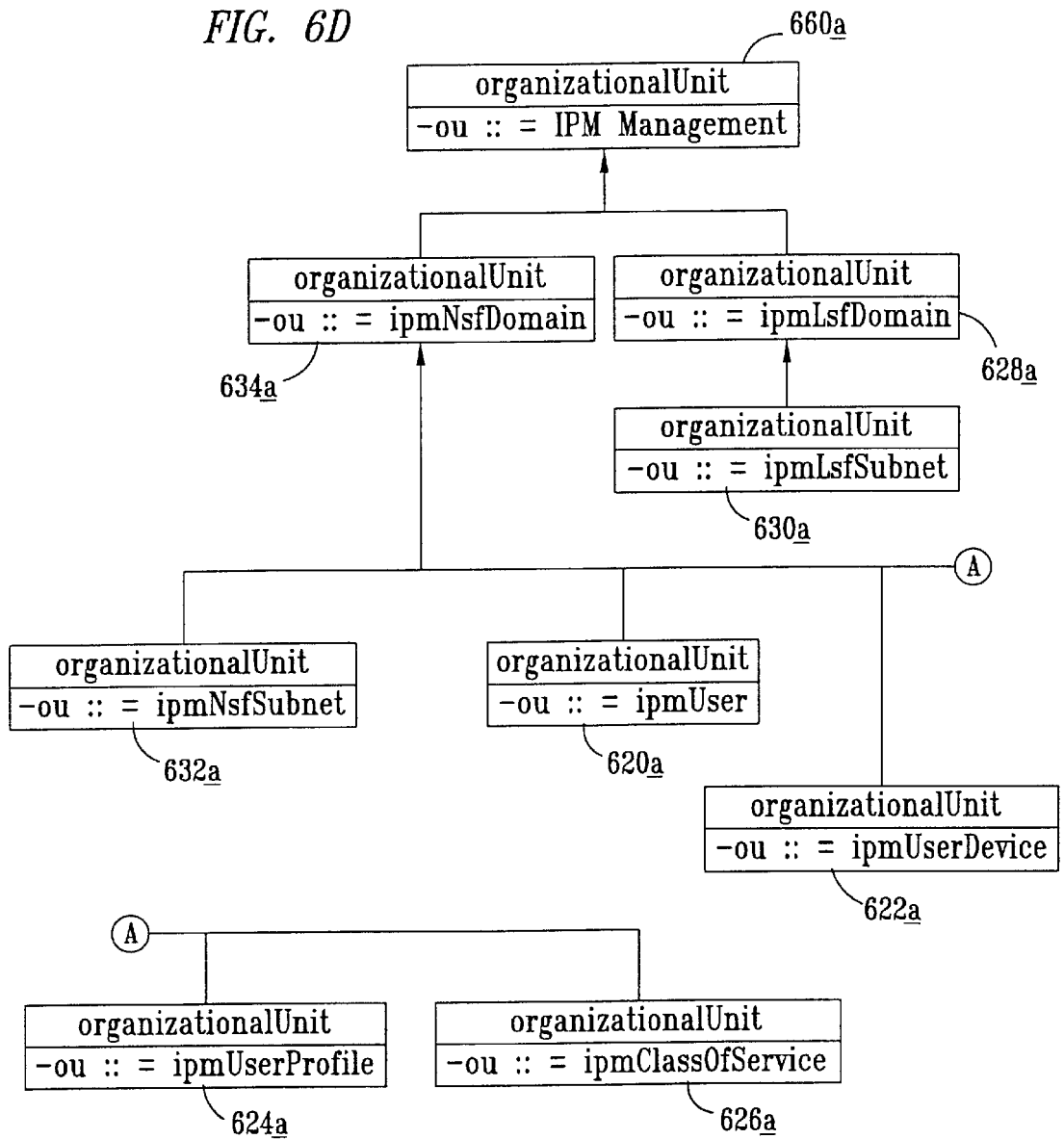

FIG. 6E(a)

| Name | Type | MatchingRule | Multi-Valued | Purpose | Example |
|---|---|---|---|---|---|
| userName | Directory String | CaseIgnoreString | No | The name of the User (subscriber) | johndoe |
| MobileNodeAddress | Directory String | CaseIgnoreString | No | Mobile Node's home IP address | 100.150.128.1 |
| IsAddressPermanent | Boolean | CaseIgnoreString | No | Flag signifying whether the Mobile Node's home IP address was permanently provisioned or allocated (e.g. by DHCP) | FALSE |
| IsRegistered | Boolean | CaseIgnoreString | No | Flag signifying whether the Mobile Node is presently registered | TRUE |
| currentLsfNai | Directory String | CaseIgnoreString | No | NAI of the LSF at which the Mobile Node is registered | smm1@southwesternbell.com |
| currentAniNai | Directory String | Integer | No | 4 byte code identifying the Mobile Node's routing area (i.e. as is GPRS routing area) | 95 |

(P)

| | | | | |
|---|---|---|---|---|
| currentCareOfAddress | Certificate | CaseIgnoreString | No | IP Care of Address for the roaming Mobile Node | 240.240.10.66 |
| ipmAccountNumber | Directory String | CaseIgnoreString | No | User's account number assigned by the IPM security center | 12345678 |
| ipmCertificate | Certificate | CaseIgnoreString | No | User's Certificate generated by IPM Security Center | |
| userPIN | Directory String | CaseIgnoreString | No | User PIN number. It is an integer selected by the user to secure the access to his account | 123decx456 |
| ipmUserProfileRef | DN | DN | Yes | The reference for the user profile objectclass | DN: "uid=JohnJoe, ou=ipmUserProfile, ou=ipm Management, o=nortelnetworks" |
| ipmClassOfServiceRef | DN | DN | Yes | The reference for the user class of service objectclass | DN: "uid=JohnJoe, ou=ipmClassOfService, iu=ipm Management, o=nortelnetworks" |

| | | | | | |
|---|---|---|---|---|---|
| ipmUserDeviceRef | DN | DN | Yes | The reference for the user device objectclass | DN: "uid=JohnJoe, ou=ipmUserDevice, ou=ipm Management, o=nortelnetworks" |
| UpdateDDNSWithCOA | Directory String | DN | No | Update the DNS with the COA | TRUE |
| IPMServiceEnabled | Boolean | CaseIgnoreString | No | Flag signifying whether the IPM service is enabled | FALSE |
| Key Inherited attributes: | | | | | |
| objectclass | | CaseIgnoreString | Yes | Schema objectclass that define mandatory and optional attributes | ipmUser |
| cn | | CaseIgnoreString | Yes | Common Name is the same as the naiUser for the phase I prototype | johndoe@nortelnetworks.com |
| sn | | CaseIgnoreString | No | Surname (i.e. last name) | Doe |
| c | | CaseIgnoreString | No | ISO 3166 County Code, optional | US |

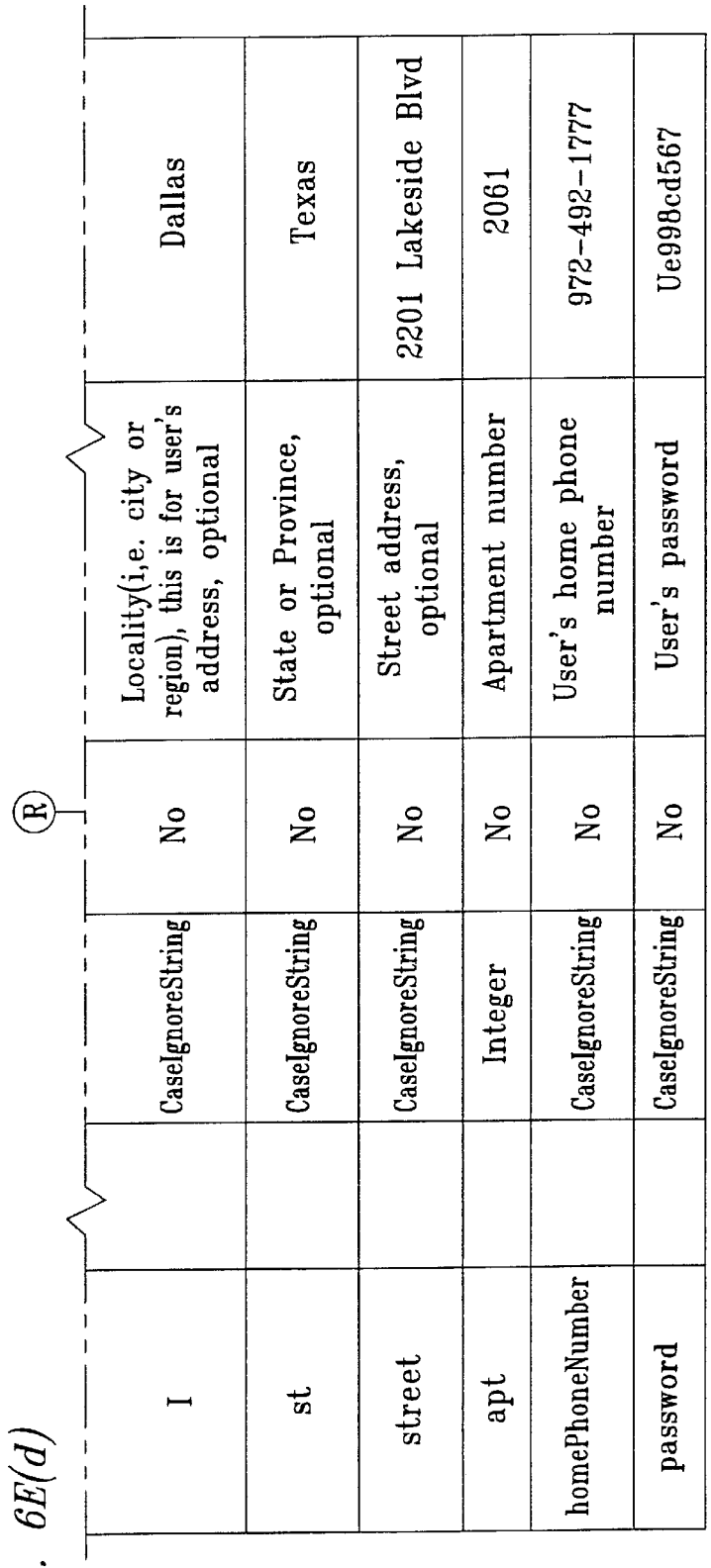

FIG. 6E(d)

| | | | | |
|---|---|---|---|---|
| l | CaseIgnoreString | No | Locality(i.e. city or region), this is for user's address, optional | Dallas |
| st | CaseIgnoreString | No | State or Province, optional | Texas |
| street | CaseIgnoreString | No | Street address, optional | 2201 Lakeside Blvd |
| apt | Integer | No | Apartment number | 2061 |
| homePhoneNumber | CaseIgnoreString | No | User's home phone number | 972-492-1777 |
| password | CaseIgnoreString | No | User's password | Ue998cd567 |

| Name | Type | MatchingRule | Multi-Valued | Purpose | Example |
|---|---|---|---|---|---|
| cn | Directory String | CaseIgnoreString | No | Common name for the ipmUserDevice | johndoe@nortelnetworks.com |
| description | Directory String | CaseIgnoreString | No | The description list the device vendor, device model, the device version... | e.g.(Qualcomm QCP-2700) |
| deviceType | Directory String | CaseIgnoreString | No | There are two device types, devices used by a mobile subscriber to access the network and devices that are logically the user, e.g. mobile routers | e.g.(notebook, mobile) |

| Name | Type | MatchingRule | Multi-Valued | Purpose | Example |
|---|---|---|---|---|---|
| cn | Directory String | CaseIgnoreString | No | The common name for the ipmUserProfile objectclass | bob@nortelworks.com |
| description | Directory String | CaseIgnoreString | No | List all the information about the ipmUserProfile objectclass | e.g.(home, office) |
| ipmUserDeviceRef | DN | CaseIgnoreString | No | The reference for ipmUserDevice | DN: "uid=JohnJoe, ou=ipmUserDevice, ou=ipm Management, o=nortelnetworks" |
| ipmClassOfServiceRef | DN | CaseIgnoreString | No | The reference for ipmClassOfService | DN: "uid=JohnJoe, ou=ipmClassOfService, ou=ipm Management, o=nortelnetworks" |

FIG. 6H

| Name | Type | MatchingRule | Multi-Valued | Purpose | Example |
|---|---|---|---|---|---|
| cn | Directory String | CaseIgnoreString | No | The common name for the ipmClassOfService | bob@nortelworks.com |
| description | Directory String | CaseIgnoreString | No | | e.g.(gold) |
| ipmLsfDomainRef | DN | DN | Yes | The reference for ipmLsfDomain | DN: "cn=ipmLsfDomain, ou=ipm Management, o=nortelnetworks" |

FIG. 6I

| Name | Type | MatchingRule | Multi-Valued | Purpose | Example |
|---|---|---|---|---|---|
| domainRealm | Directory String | CaseIgnoreString | No | Realm component of the IETF Network Access Identifier for the home network | John.Doe@ISPabe.com |
| ipmNsfSubnetRef | DN | DN | Yes | The reference of the NSFsubnet | DN: "cn=ipmNsfSubnet, ou=ipm Management, o=nortelnetworks" |

FIG. 6J

| Name | Type | MatchingRule | Multi-Valued | Purpose | Example |
|---|---|---|---|---|---|
| cn | Directory String | CaseIgnoreString | No | The common name for the ipmClassOfService | ip10@nortelworks.com |
| description | Directory String | CaseIgnoreString | No | The description for the ipmLsfSubnet | |
| subnetMask | Directory String | CaseIgnoreString | No | 32 bit value help the devices understand the limits or boundaries of the network and subnet | 255.255.255.0 |
| subnetAddress | Directory String | CaseIgnoreString | No | The IP address of the LSFsubnet | 47.456.70.80 |

FIG. 6K

| Name | Type | MatchingRule | Multi-Valued | Purpose | Example |
|---|---|---|---|---|---|
| cn | Directory String | CaseIgnoreString | No | The common name for the ipmClassOfService | ip10@nortelworks.com |
| description | Directory String | CaseIgnoreString | No | The description for the ipmNsfSubnet | |
| subnetMask | Directory String | CaseIgnoreString | No | 32 bit value help the devices understand the limits or boundaries of the network and subnet | 255.255.255.0 |
| subnetAddress | Directory String | CaseIgnoreString | No | The IP address of the NSFsubnet | 47.456.70.80 |

FIG. 6L

| Name | Type | MatchingRule | Multi-Valued | Purpose | Example |
|---|---|---|---|---|---|
| domainRealm | Directory String | CaseIgnoreString | No | Realm component of the IETF Network Access Identifier for the home network | John.Doe@ISPabc.com |
| ipmLsfSubnetRef | DN | DN | Yes | The reference of the LSFsubnet | DN: "cn=ipmLsfSubnet, ou=ipm Management, o-nortelnetworks" |

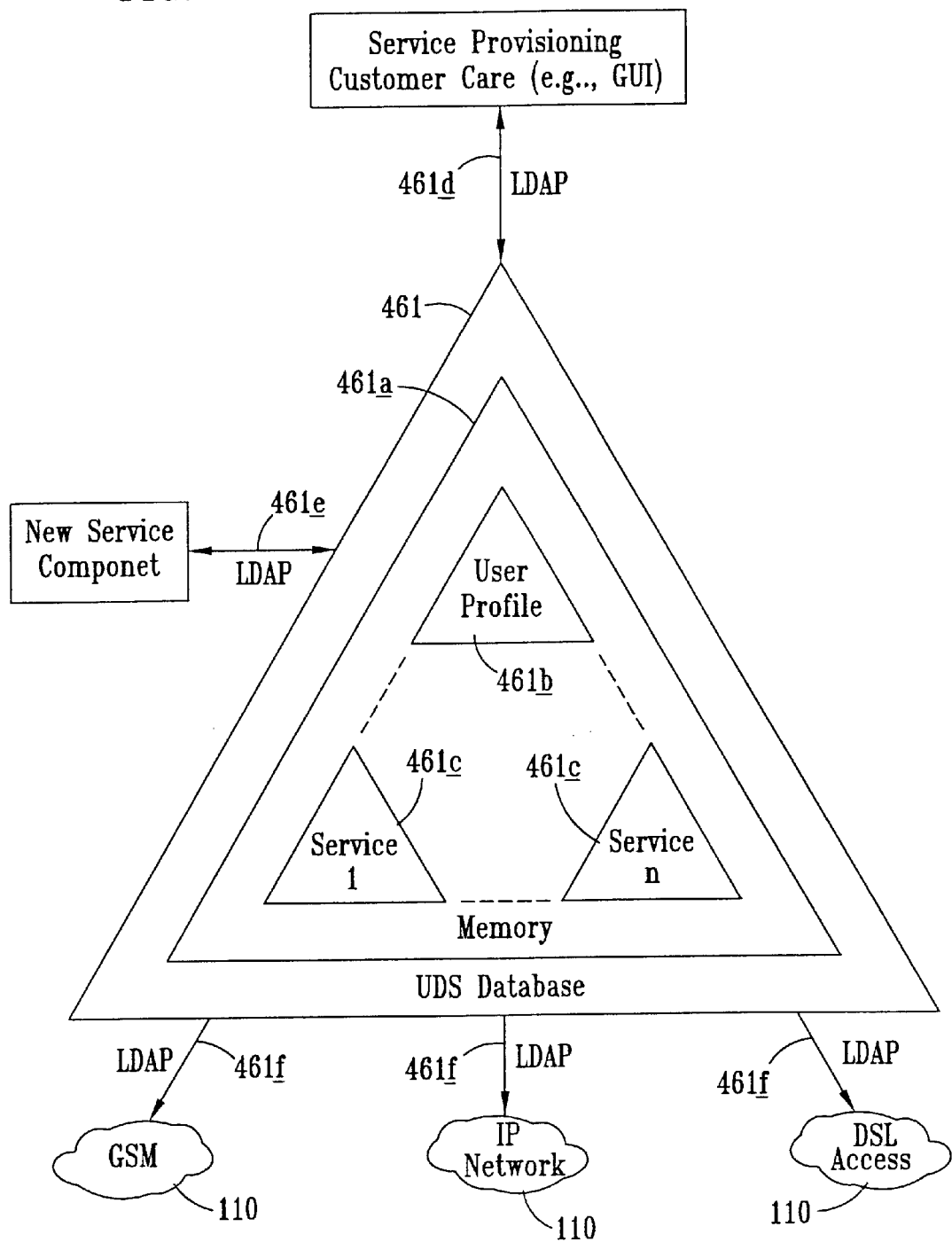

Fig. 20C

| Byte | 0 | 1 | 2 | 3 |
|---|---|---|---|---|
| Off-set | 0 1 2 3 4 5 6 7 | 8 9 0 1 2 3 4 5 | 6 7 8 9 0 1 2 3 | 4 5 6 7 8 9 0 1 |
| 0 | Type | Length (n/4+1) | Data...... | |
| : | Data...... | | | |
| n | Data...... | | | |

Fig. 20D

| Byte | 0 | 1 | 2 | 3 |
|---|---|---|---|---|
| Off-set | 0 1 2 3 4 5 6 7 | 8 9 0 1 2 3 4 5 | 6 7 8 9 0 1 2 3 | 4 5 6 7 8 9 0 1 |
| 0 | Type = 9 | Length (n-2) | Digital Signature...... | |
| : | ...... | | | Digital Signature...... |
| n | ...... | | | ......Digital Signature |

Fig. 20E

| Byte | 0 | 1 | 2 | 3 |
|---|---|---|---|---|
| Off-set | 0 1 2 3 4 5 6 7 | 8 9 0 1 2 3 4 5 | 6 7 8 9 0 1 2 3 | 4 5 6 7 8 9 0 1 |
| 0 | Type = 10 | Length (n-2) | Reserved | |
| .. | <User NAI 1+ User IP Address 1+ Service Definition for User>++ <User NAI 2+ User IP Address 2+ Service Definition for User>++ ............................. | | | |
| n | ............<User NAI n+ User IP Address n+ Service Definition for User> | | | |

Fig. 20F

| Byte | 0 | 1 | 2 | 3 |
|---|---|---|---|---|
| Off-set | 0 1 2 3 4 5 6 7 | 8 9 0 1 2 3 4 5 | 6 7 8 9 0 1 2 3 | 4 5 6 7 8 9 0 1 |
| 0 | Type = 11 | Length (n-2) | <CN 1 IP Address> + <CN 2 IP Address>+.............. | |
| .. | ................................. | | | |
| n | ............<CN n IP Address> | | | |

FIG. 20G

| Byte | 0 | 1 | 2 | 3 |
|---|---|---|---|---|
| Off-set | 0 1 2 3 4 5 6 7 | 8 9 0 1 2 3 4 5 | 6 7 8 9 0 1 2 3 4 5 | 6 7 8 9 0 1 |
| 0 | Type = 12 | Length (n-2) | LSF NAI...... | |
| : | ............ | ............ | ............ | ............ |
| n | ............ | ............ | ............ | ......LSF NAI |

FIG. 20H

| Byte | 0 | 1 | 2 | 3 |
|---|---|---|---|---|
| Off-set | 0 1 2 3 4 5 6 7 | 8 9 0 1 2 3 4 5 | 6 7 8 9 0 1 2 3 4 5 | 6 7 8 9 0 1 |
| 0 | Type = 13 | Length | MN L2 Address........ | |
| : | ............ | ............ | ............ | ............ |
| n | ............ | ............ | ............ | ...MN L2 Address |

FIG. 20I

| Byte | 0 | | | | | | | | 1 | | | | | | | | | 2 | | | | | | | | | 3 | | | | | | |
|---|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type = 14 | | | | | | | | Length | | | | | | | | NAI..... | | | | | | | | | | | | | | | |
| : | ..... | | | | | | | | | | | | | | | | | | | | | | | | | | | | | | | |
| n | ..........NAI | | | | | | | | | | | | | | | | | | | | | | | | | | | | | | | |

FIG. 20J

| Byte | 0 | | | | | | | | 1 | | | | | | | | | 2 | | | | | | | | | 3 | | | | | | |
|---|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type = 15 | | | | | | | | Length (n+4) | | | | | | | | Routing Area NAI........ | | | | | | | | | | | | | | | |
| : | ..... | | | | | | | | | | | | | | | | | | | | | | | | | | | | | | | |
| n | ..........Routing Area NAI | | | | | | | | | | | | | | | | | | | | | | | | | | | | | | | |

FIG. 20K

| Byte | 0 | 1 | 2 | 3 |
|---|---|---|---|---|
| Off-set | 0 1 2 3 4 5 6 7 | 8 9 0 1 2 3 4 5 | 6 7 8 9 0 1 2 3 | 4 5 6 7 8 9 0 1 |
| 0 | Type = 16 | Length (n-2) | <Protocol Name 1> + | <Protocol Name 2>+.......... |
| : | ............ | ............ | ............ | ............ |
| n | ............ | ............ | ............ | <Protocol Name n> |

FIG. 20L

| Byte | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type = 01 | | | | | | | | S | B | D | M | G | V | Rsv | | Lifetime | | | | | | | | | | | | | | | |
| 4 | Home Address |||||||||||||||||||||||||||||||||
| 8 | Home Agent |||||||||||||||||||||||||||||||||
| 12 | Care-of Address |||||||||||||||||||||||||||||||||
| 16 | Identification |||||||||||||||||||||||||||||||||
| 20 | |||||||||||||||||||||||||||||||||
| 24+ | Extensions ...... |||||||||||||||||||||||||||||||||

FIG. 20M

| Byte | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type = 03 | | | | | | | | Code | | | | | | | | Lifetime | | | | | | | | | | | | | | | |
| 4 | Home Address | | | | | | | | | | | | | | | | | | | | | | | | | | | | | | | |
| 8 | Home Agent | | | | | | | | | | | | | | | | | | | | | | | | | | | | | | | |
| 12 | Identification | | | | | | | | | | | | | | | | | | | | | | | | | | | | | | | |
| 16 | | | | | | | | | | | | | | | | | | | | | | | | | | | | | | | | |
| 20+ | Extensions ...... | | | | | | | | | | | | | | | | | | | | | | | | | | | | | | | |

FIG. 20N

| Byte | 0 | | | | | | | | | 1 | | | | | | | | | 2 | | | | | | | | | 3 | | | | |
|---|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type = 30 | | | | | | | | S | B | D | M | G | V | Rsv | | Lifetime | | | | | | | | | | | | | | | |
| 4 | Home Address | | | | | | | | | | | | | | | | | | | | | | | | | | | | | | | |
| 8 | Home Agent | | | | | | | | | | | | | | | | | | | | | | | | | | | | | | | |
| 12 | Care-of Address | | | | | | | | | | | | | | | | | | | | | | | | | | | | | | | |
| 16 | Identification | | | | | | | | | | | | | | | | | | | | | | | | | | | | | | | |
| 20 | | | | | | | | | | | | | | | | | | | | | | | | | | | | | | | | |
| 24+ | Extensions ...... | | | | | | | | | | | | | | | | | | | | | | | | | | | | | | | |

FIG. 200

| Byte Off-set | 0 | 1 | 2 | 3 |
|---|---|---|---|---|
| | 0 1 2 3 4 5 6 7 | 8 9 0 1 2 3 4 5 | 6 7 8 9 0 1 2 3 4 5 | 6 7 8 9 0 1 |
| 0 | Type = 31 | S B D M G V Rsv | Lifetime | |
| 4 | Home Address | | | |
| 8 | Home Agent | | | |
| 12 | Care-of Address | | | |
| 16 | Identification | | | |
| 20 | | | | |
| 24+ | Extensions ...... | | | |

FIG. 20P

| Byte | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type | | | | | | | | Length (n/4+1) | | | | | | | | Data........ | | | | | | | | | | | | | | | |
| .. | Data........ | | | | | | | | | | | | | | | | | | | | | | | | | | | | | | | |
| n | Data........ | | | | | | | | | | | | | | | | | | | | | | | | | | | | | | | |

FIG. 20Q

| Byte | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type = 40 | | | | | | | | Length | | | | | | | | Reserved | | | | | | | | | | | | | | | |
| 4+ | Extensions ...... | | | | | | | | | | | | | | | | | | | | | | | | | | | | | | | |

FIG. 20R

| Byte | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type = 41 | | | | | | | | Length | | | | | | | | Reserved | | | | | | | | | | | | | | | |
| 4+ | Extensions ...... | | | | | | | | | | | | | | | | | | | | | | | | | | | | | | | |

FIG. 20S

| Byte | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type = 40 | | | | | | | | Length | | | | | | | | Reserved | | | | | | | | | | | | | | | |
| 4 | User IP Address | | | | | | | | | | | | | | | | | | | | | | | | | | | | | | | |
| 8+ | Extensions ...... | | | | | | | | | | | | | | | | | | | | | | | | | | | | | | | |

FIG. 20T

| Byte   | 0               | 1                       | 2                       | 3               |
|--------|-----------------|-------------------------|-------------------------|-----------------|
| Off-set| 0 1 2 3 4 5 6 7 | 8 9 0 1 2 3 4 5         | 6 7 8 9 0 1 2 3         | 4 5 6 7 8 9 0 1 |
| 0      | Type = 42       | Length                  | Reserved                |                 |
| 4      | User IP Address |                         |                         |                 |

FIG. 20U

| Byte   | 0               | 1                       | 2                       | 3               |
|--------|-----------------|-------------------------|-------------------------|-----------------|
| Off-set| 0 1 2 3 4 5 6 7 | 8 9 0 1 2 3 4 5         | 6 7 8 9 0 1 2 3         | 4 5 6 7 8 9 0 1 |
| 0      | Type = 43       | Length                  | Result Code             | Reserved        |
| 4      | User IP Address |                         |                         |                 |

FIG. 20V

| Byte   | 0               | 1                       | 2                       | 3               |
|--------|-----------------|-------------------------|-------------------------|-----------------|
| Off-set| 0 1 2 3 4 5 6 7 | 8 9 0 1 2 3 4 5         | 6 7 8 9 0 1 2 3         | 4 5 6 7 8 9 0 1 |
| 0      | Type = 44       | Length                  | Reserved                |                 |
| 4      | User IP Address |                         |                         |                 |

FIG. 20W

| Byte | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type = 45 | | | | | | | | Length | | | | | | | | Reserved | | | | | | | | | | | | | | | |
| 4 | User IP Address | | | | | | | | | | | | | | | | | | | | | | | | | | | | | | | |

FIG. 20X

| Byte | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type = 46 | | | | | | | | Length | | | | | | | | Reserved | | | | | | | | | | | | | | | |
| 4+ | Extensions ..... | | | | | | | | | | | | | | | | | | | | | | | | | | | | | | | |

*FIG. 20Y*

| Byte | 0 | 1 | 2 | 3 |
|---|---|---|---|---|
| Off-set | 0 1 2 3 4 5 6 7 | 8 9 0 1 2 3 4 5 | 6 7 8 9 0 1 2 3 | 4 5 6 7 8 9 0 1 |
| 0 | Type = 47 | Length | Reserved | |
| 4 | User NAI ||||

*FIG. 20Z*

| Byte | 0 | 1 | 2 | 3 |
|---|---|---|---|---|
| Off-set | 0 1 2 3 4 5 6 7 | 8 9 0 1 2 3 4 5 | 6 7 8 9 0 1 2 3 | 4 5 6 7 8 9 0 1 |
| 0 | Type = 48 | Length | Reserved | |
| 4 | User's IP Address at the old LSF ||||
| 8 | User's IP Address at the new LSF ||||
| 12 | User's COA at the new LSF ||||

FIG. 20AA

| Byte | 0 | | | | | | | | 1 | | | | | | | | | 2 | | | | | | | | | 3 | | | | | | |
|---|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type = 49 | | | | | | | | Length | | | | | | | | Reserved | | | | | | | | | | | | | | | |
| 4 | User IP Address at the old LSF | | | | | | | | | | | | | | | | | | | | | | | | | | | | | | | |

FIG. 20AB

| Byte | 0 | | | | | | | | 1 | | | | | | | | | 2 | | | | | | | | | 3 | | | | | | |
|---|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type = 50 | | | | | | | | Length | | | | | | | | Reserved | | | | | | | | | | | | | | | |
| 4+ | Extensions ...... | | | | | | | | | | | | | | | | | | | | | | | | | | | | | | | |

FIG. 20AC

| Byte | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type = 51 ||||||||  Length |||||||| Reserved ||||||||||||||||
| 4+ | Extensions ................................................||||||||||||||||||||||||||||||||

FIG. 20AD

| Byte | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type = 30 ||||||||  Length |||||||| Reserved ||||||||||||||||
| 4 | Access Request ||||||||||||||||||||||||||||||||

FIG. 20AE

| Byte | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type = 31 | | | | | | | | Length | | | | | | | | Reserved | | | | | | | | | | | | | | | |
| 4 | Access Accept/Reject | | | | | | | | | | | | | | | | | | | | | | | | | | | | | | | |

*FIG. 20AF*

| Byte | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type = 32 | | | | | | | | S | B | D | M | G | V | Rsv | | Lifetime | | | | | | | | | | | | | | | |
| 4 | Home Address | | | | | | | | | | | | | | | | | | | | | | | | | | | | | | | |
| 8 | Home Agent | | | | | | | | | | | | | | | | | | | | | | | | | | | | | | | |
| 12 | Care-of Address | | | | | | | | | | | | | | | | | | | | | | | | | | | | | | | |
| 16 | Identification | | | | | | | | | | | | | | | | | | | | | | | | | | | | | | | |
| 20 | | | | | | | | | | | | | | | | | | | | | | | | | | | | | | | | |
| 24+ | Extensions ...... | | | | | | | | | | | | | | | | | | | | | | | | | | | | | | | |

FIG. 20AG

| Byte | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Off-set | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 0 | Type = 33 ||||||||S|B|D|M|G|V|Rsv|| Lifetime ||||||||||||||||
| 4 | Home Address |||||||||||||||||||||||||||||||
| 8 | Home Agent |||||||||||||||||||||||||||||||
| 12 | Identification |||||||||||||||||||||||||||||||
| 16 | |||||||||||||||||||||||||||||||
| 20+ | Extensions<br>...... |||||||||||||||||||||||||||||||

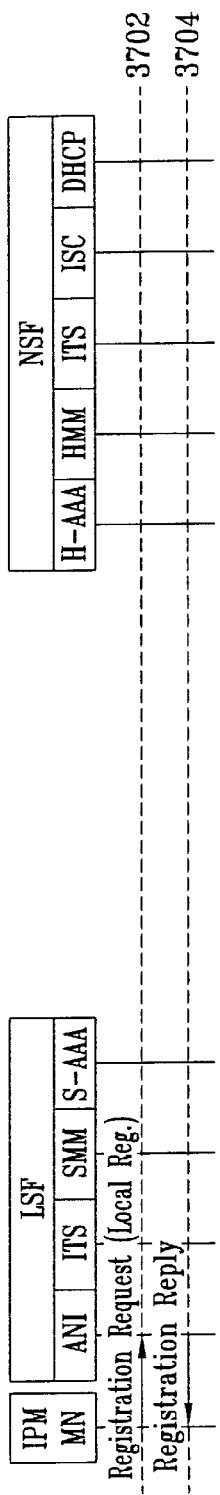
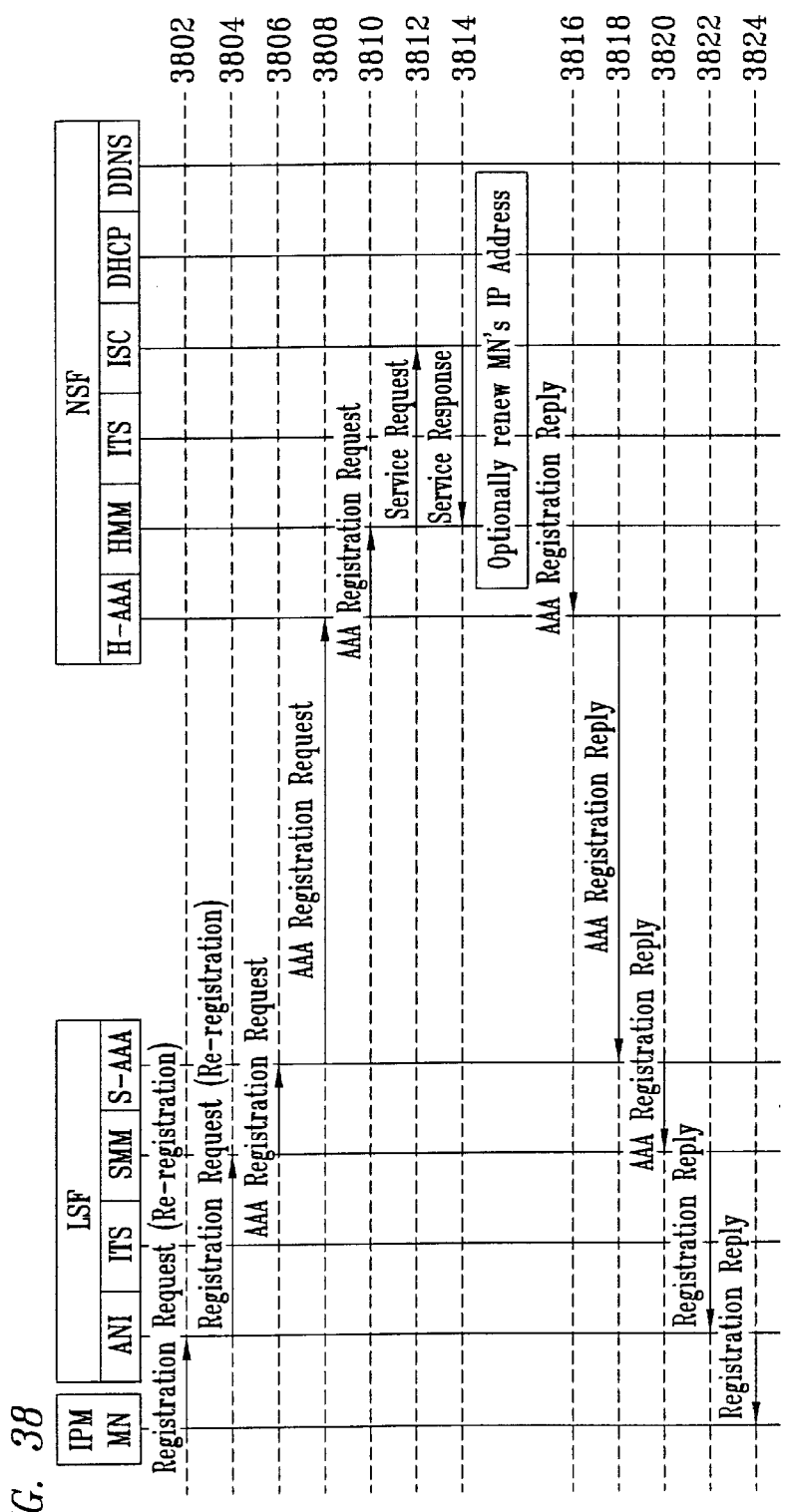
FIG. 37
FIG. 38

UNIFIED DIRECTORY SERVICES ARCHITECTURE FOR AN IP MOBILITY ARCHITECTURE FRAMEWORK

CLAIM OF PRIORITY

This application claims priority from U.S. Provisional Patent Application No. 60/152,916, now abandoned entitled "IP MOBILITY ARCHITECTURE FRAMEWORK" filed on behalf of Haseeb Akhtar, et al, on Sep. 8, 1999.

This application also claims priority from U.S. Provisional Patent Application No. 60/157,449, now abandoned entitled "KEY EXCHANGE FOR NETWORK ARCHITECTURE (KENA)" filed on behalf of Mohamed Khalil, et al, on Oct. 4, 1999.

This application also claims priority from U.S. Provisional Patent Application No. 60/156,669, now abandoned entitled "ROUTING MECHANISM FOR AAA PROTOCOL" filed on behalf of Haseeb Akhtar, et al, on Sep. 29, 1999.

This application also claims priority from U.S. Provisional Patent Application No. 60/157,289, now abandoned entitled "NETWORK ACCESS ARBITRATOR" filed on behalf of Donald Wurch, et al, on Oct. 1, 1999.

This application also claims priority from U.S. Provisional Patent Application No. 60/192,411, now abandoned entitled "USER SUPPORT FOR MULTIPLE DEVICES" filed on behalf of Khalil, et al, on Mar. 27, 2000.

TECHNICAL FIELD

The invention relates generally to communications and, more particularly, to a communications architecture that provides for mobile communications based on an Internet Protocol.

BACKGROUND

The advent of lightweight portable computers and hand-held devices, the spread of wireless networks and services, and the popularity of the Internet combine to make mobile computing a key requirement for future networks. However, the heterogeneous nature of today's wireline networks (e.g., dial-up, xDSL, cable), wireless networks (e.g., GSM, CDMA, TDMA), and enterprise networks (e.g., LAN, WAN) significantly limits the scope of mobility between these heterogeneous networks.

What is needed is a mobility architecture framework by which the various types of networks and access thereto may converge into a unified homogeneous network that will carry multiple types of traffic and permit access to the network irrespective of the MN's location and the type of access media used to access the network.

SUMMARY

The present invention, accordingly, provides a communications architecture for enabling IP-based mobile communications. The architecture includes at least one Local Service Function (LSF) component configured to serve as an IP-based serving area network for a set of x-Access Networks (xAN), and at least one Network Service Function (NSF) component configured to serve as an IP-based home network by managing an MN's subscription and associated profile so that the MN is authorized to use the resources of the LSF. At least one xAN is interconnected to the LSF and NSF for providing heterogeneous Layer 2 access for MNs irrespective of access technology.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4A and 4B depict the architectural components of LSFs and NSFs embodying features of the present invention;

FIG. 5A is a flow which depicts the operation of the DDNS;

FIGS. 5B, 5C and 5D are flows which depicts the alternate embodiments of storing MN's COA in the DNS;

FIG. 6D depicts a preferred Directory Information Tree (DIT) which shows how sub-directories are organized in the UDS and LDS for storing the object classes shown in FIGS. 6A. 6B, and 6C;

FIGS. 6E, 6F, 6G, 6H, 6I, 6J, 6K, and 6L are tables which exemplify attributes preferably associated with the object classes shown in FIGS. 6A, 6B, 6C, and 6D;

FIG. 6M is a schematic diagram exemplifying a UDS database and its interfaces with other components;

FIG. 20C shows a preferred general format for a general MIP extension;

FIG. 20D shows the message format of an Authentication Information Extension;

FIG. 20E shows the message format of a Call Information Extension;

FIG. 20F shows the message format of a CN List Extension;

FIG. 20G shows the message format of an LSF NAI Extension;

FIG. 20H shows the message format of an MN's L2 address extension;

FIG. 20I shows an NAI extension;

FIG. 20J shows an IPM Routing Area Extension;

FIG. 20K shows a Terminal Information Extension;

FIG. 20L shows the message format of a Registration Request message;

FIG. 20M shows the message format for a Registration Reply message;

FIG. 20N shows the message format for a Prepare for System Change message;

FIG. 20O shows the message format for a System Change message;

FIG. 20P shows a preferred general format for an IPM message;

FIG. 20Q shows the message format for an Activate Packet Service message;

FIG. 20R shows the message format for an Activate Packet Service Ack message;

FIG. 20S shows a message format for an Add L2 IP Association message;

FIG. 20T shows the format for a Buffer Data message;

FIG. 20U shows the format for a Buffer Data Ack message;

FIG. 20V shows the format for a Cleanup message;

FIG. 20W shows the format for a Cleanup Ack, which is sent in reply to the Cleanup message;

FIG. 20X shows the format for a Correspondent Node List message;

FIG. 20Y shows the format for a Correspondent Node List Ack message;

FIG. 20Z shows the format for a Forward Data message;

FIG. 20AA shows the format for a Forward Data Ack;

FIG. 20AB shows the format for a Handoff Required message;

FIG. 20AC shows the format for a Handoff Required Ack;

FIG. 20AD shows the format for an Access Request extension;

FIG. 20AE shows the format for an Access Accept/Reject extension;

FIG. 20AF shows the format for a Simple IPM Registration Request message;

FIG. 20AG shows the format for a Simple IP Registration Reply message;

FIG. 37 is an event sequence diagram showing the flow of events when an IPM MN registers from a Mobile IP (MIP) FA;

FIG. 38 is an event sequence diagram showing the flow of events when an MIP MN registers from an IPM LSF;

DETAILED DESCRIPTION

Figure 1:
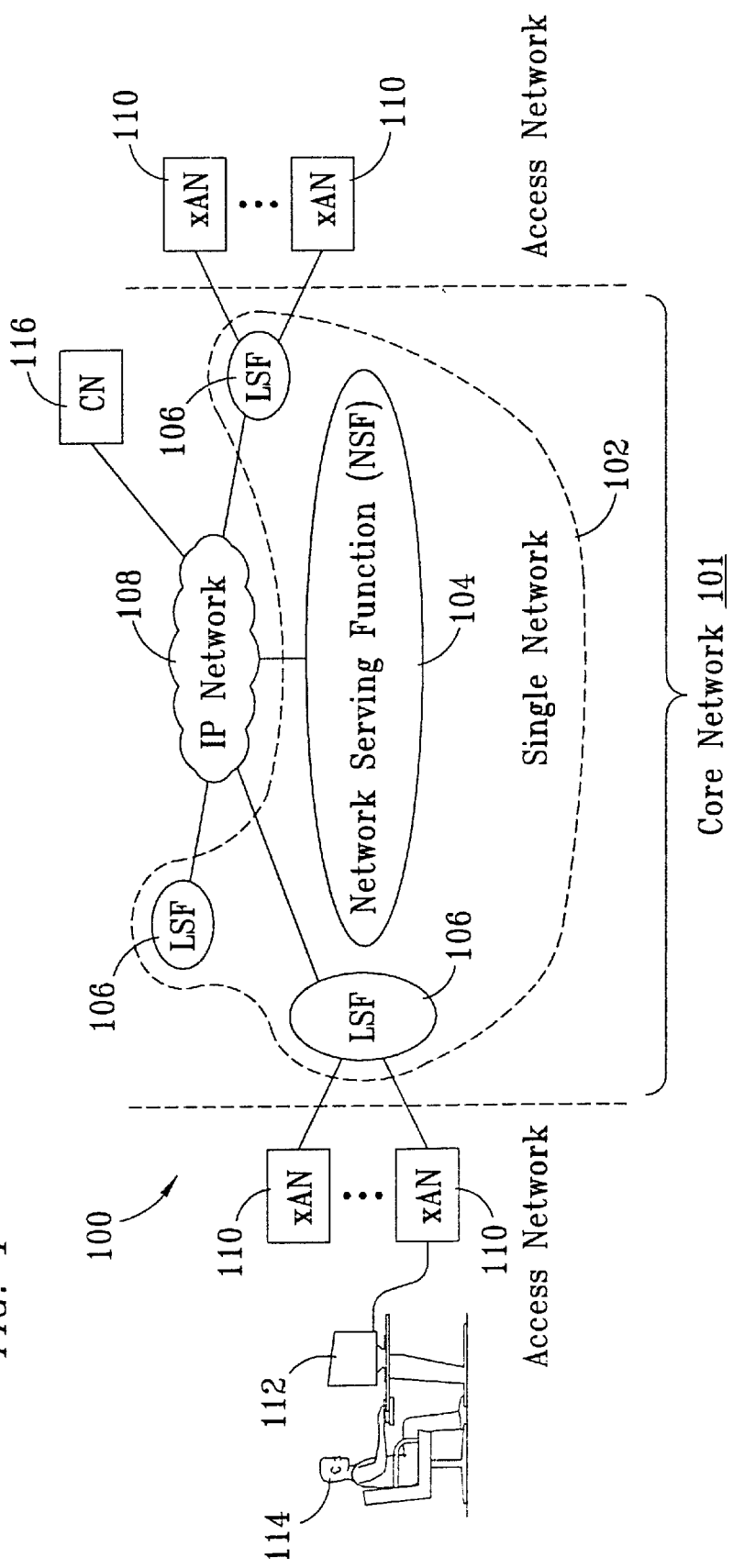
FIG. 1 is a schematic drawing which depicts a representative high-level view of a network embodying features of the present invention.

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning telecommunication networks, the InterWorking of networks with legacy networks such as the PSTN, and the like, have been omitted inasmuch as such details are not necessary to obtain a complete understanding of the present invention and are within the skills of persons of ordinary skill in the relevant art.

It is noted that RFC documents referenced herein are available from the IETF, including the IEFT Internet web page located at http://www.ietf.org: All references to Layer 2 (L2) and Layer 3 (L3) are made in accordance with the Open System Interconnetion (OSI) Reference Model defined by the Internation Stantdard Organization (ISO) and as commonly known by the persons of ordinary skills in the relevant art.

It is further noted that, unless indicated otherwise, all functions described herein are performed by a processor such as computer or electronic data processor in accordance with code such as computer program code or software or Integrated Circuits that are coded to perform certain functions.

1. Acronyms, Definitions, and Parameters 1.1 Acronyms

In the interest of conciseness, various components are referred to herein by the following acronyms:

AAA Authentication, Authorization, and Accounting
ANI Access Network Interface
BCCH Broadcast Control Channel
CA Certificate Authority
C/GOS Class/Grade of Service
CN Correspondent Node
COA Care Of Address (RFC 2002)
COPS Common Open Policy Service
DAP Directory Access Protocol
DHCP Dynamic Host Configuration Protocol
DHCS Dynamic Host Configuration Services
DDNS Dynamic Domain Name Services
DNS Domain Name Server
ESP Encapsulating Security Payload
FA Foreign Agent
GSM Global System for Mobile Communications
HCDM Home Control and Data Manager
HLR Home Location Register
HMM Home Mobility Manager
IETF Internet Engineering Task Force
IP Internet Protocol
IPM IP Mobility
IPSec IP Security
ISAKMP Internet Security Associations and Key Management Protocol
ISC IPM Security Center
ITS IPM Tunnel Service
ITU International Telecommunications Union
LAN Local Area Network
L2 Layer 2
L2TP Layer 2 Tunneling Protocol
LDAP Lightweight Directory Access Protocol
LSF Local Service Function
MIP Mobile IP
MN Mobile Node (also referred to as a mobile station or a mobile user)
NAC North American Cellular
NAI Network Access Identifier
NAT Network Address Translator
NG Next Generation NSF Network Service Function
PSTN Public Switched Telephone Network
QoS Quality of Service
RAN Radio Access Network
SA Security Association
SCDM Serving Control and Data Manager
SLA Service Level Agreement
SMG Security Messaging Gateway
SMM Serving Mobility Manager
SOHO Small Office Home Office
TCP Transmission Control Protocol
UDS Unified Directory Service
VLR Visitor Location Register
WAN Wide Area Network
xAN x(any type) of Access Network 1.2 Definitions In the interest of conciseness, various components are referred to herein by the following defined terms:

An "Access Network Inteface" ANI is the logical entity that indicates the existence of an SMM to the mobile user. ANI preferably also implements mechanisms to implement the response to a solicitation and supports handoffs between itself and another ANI within the context very flexible. The ANI may reside in the context of the same LSF or reside ouitside the LSF in an access network.

A "Home Mobility Manager" "HMM" is the logical entity that manages and tracks a users state in the NSF by implementing the IPM protocol state machine. The HMM updates the user's current point of attachment into the UDS and interfaces with the ISC to validate a user's security requirements. The HMM interfaces with the ANI and ITS at the home domain such that a subscriber may be serviced at home. The HMM supports both IPM clients as well as pure MIP (per RFC2002) clients.

A "home network" for a user is defined herein as a network, such as an LSF, an NSF, or a combination thereof, owned by a common administrative domain, with which a user has subscribed his services. A home network thus owns the user's subscription, and is responsible for authenticating and registering its users.

"Devices" include a mobile node, a mobile station, a cell phone, a Person Digital Assistant (PDA), a personal computer (including a laptop computer), and the like. Devices are preferably addressed by IPv4/IPv6 addresses. Local device addresses (e.g. IEEE MAC, MIN, IMSI) preferably are specific to an access network, and are transparent to IPM. Device may support their own L2 access protocols.

"IPM Tunnel Service" (ITS) provides basic IP-in-IP tunneling and de-tunneling functions that are required to support mobility, as discussed in RFC 2003. It also provides gratuitous ARP and proxy ARP functions as needed by the SMM and HMM for mobility management so that IP packets may be routed to an appropriate COA of the MN.

"Location updating" tracks the location of a device, and of a user also when the user is using the device. Location updating also updates the network databases as a user moves with the device so that the network is able to route information to the user. The location updates may be done automatically based on policies defined by a service provider (such as America Online, AOL), e.g. on initial registration, and the like.

"Mobile Node" (MN) and refers to a mobile station, a cell phone, a device, a personal digital assistant (PDA), a personal computer (including a laptop computer), and the like. The MN preferably includes an IP mobility client with dual mode behavior which interpret IP Mobility as well as IETF Mobile IP messaging (as per RFC 2002). The MN preferably supports signaling and dataflow arbitration between multiple access interfaces and implements an IPM state machine. The MN preferably maintains Security Associations (SA) with a home network as identified by the user's NAI or permanent IP address (if in a Mobile IP serving domain). In the case of a user's NAI, the IPM client may support dynamic allocation of IP address either at the home network or at the visited network. An MN node may also support handoffs between LSFs. MNs are also provided with IP stacks and all service application are data oriented to accommodate and end-to-end IP packet data.

"Mobility" refers to user location tracking, handoff, and routing management functions to deliver data to the user, and generally includes personal mobility, device mobility, and service mobility.

"Mobility enabled IP centric networks" refers to networks that use IP addressing and routing protocols in concert with a mobility protocol to deliver multimedia traffic to roaming users. The term "users" includes "subscribers".

"Registration" binds a user (or a user's persona) to one or more devices.

"Routing management" refers to the ability to deliver datagrams from a host on a network to a roaming user's MN.

A "Secure Messaging Gateway" (SMG) supports IETF AAA requirements and routes all IPM messages between an LSF and NSF. The SMG also provides a secure tunnel for signaling message between an NSF and LSF.

A "Serving Mobility Manager" (SMM) preferably tracks the user state and protocol state of a user in an LSF. From a signaling perspective, the SMM supports user authentication, security, and billing functions. The SMM directs enforcement of the tunnel endpoints and provides support for dynamic configuration mechanisms. The SMM supports both IPM clients as well as pure MIP (per RFC 2002) clients.

An "xAN" denotes any type of access network, including both wireless (e.g., RAN and GSM), wireline access networks (e.g., PSTN, IP Network, and DSL) and IEEE 802 LANs such as IEEE 802.3 Eithernet LAN and 802.11 Wireless LAN.

2. IPM Architecture Framework

The IPM Architecture of the present invention is discussed below in terms of functional components, interfaces, and messaging required to provide mobility.

2.1 Mobility Enabled Network Reference Model(s)

Referring to FIG. 1 of the drawings, the reference numeral 100 generally designates an IPM Architecture embodying features of the present invention. The IPM Architecture 100 includes a single network 102 shown in dashed outline, which is owned and administered by a single service provider. The single network 102 includes a Network Service Function (NSF) 104 and at least one Local Service Function (LSF) 106, interconnected together using conventional means, such as wires or wireless Radio Frequency (RF) interfaces or the like. One or more x-Access Networks (xAN) 110 are connected to respective LSFs 106, and one or more Mobile Nodes (MNs) 112 are connected to respective xANs 110. Also shown are a user 114 interfacing with an MN 112, and a Correspondent Node (CN, discussed further below) 116 connected to the IP network, though the CN 116 may alternatively be connected to other points in the IPM Architecture 100, such as at an xAN 110.

Each LSF 106 constitutes a serving area network for a group of xANs 110, and is owned by the network operator and is delimited by geographical parameters. Each LSF 106 may also support multiple xANs 110 where each xAN 110 is associated with a different technology, e.g. one xAN may be associated with an NAC wireless access network, another xAN may be associated with a GSM wireless access network, and yet another xAN may be associated with an Ethernet enterprise network. Each LSF 106 is configured for receiving messages from an MN 112 via a respective xAN 110 and forwarding such message to a suitable NSF 104 or the IP Network 108. The LSF 106 also provides a mobility manager (discussed further below) for user mobility across the xANs 110 that it serves. Each LSF 106 also routes data to the MN 112 via the IP address that the MN 112 is currently using. Each LSF 106 also supports access to multiple NSFs 104 from the same MN 112.

The NSF 104 constitutes a home network that owns the subscription associated with the MN 112. The NSF 104 is a user subscription "defined" entity. In the context of the IPM Architecture 100, the NSF 104 is the home network and "owns" the MN user's subscription and associated profile. The NSF 104 also supports a "unified" directory (discussed below) for user profiles and policies independent of the type of xAN 110. The NSF 104 also provides mobility to users 114 on a larger scale. The user can roam into any LSF 106 and the handling of the mobility is achieved by the NSF 104. A Home Mobility Manager entity (HMM, discussed below) in the NSF 104 is responsible for maintaining the current location of the MN 112 of the user 114. The NSF 104 also provides routing information to anyone requesting establishment of communications with the MN 112. The NSF 104 may also provide the Authentication and Authorization functions (discussed below) for MNs 112 that consider the NSF 104 to be their home network.

The xAN 110 denotes any type of access (e.g., wireless or wireline) technology. In the context of the IPM Architecture 100, the xAN 110 preferably provides access network resource management, physical connectivity to the MN 112, and local MN mobility within the xAN 110.

The IP Network 108 provides a routing backbone for delivering packets between network elements. The IP network 108 may be the public Internet or a closed network that can access the public Internet.

A service provider's network may logically be composed of a single NSF 104 with multiple LSFs 106 to which it provides home network functionality. Such LSFs 106 may be physically (i.e., geographically) located anywhere. MNs 112 that are homed in the NSF 104 can roam in any of the LSFs 106 that are associated with this NSF and be considered to be in their home network.

Figure 2:
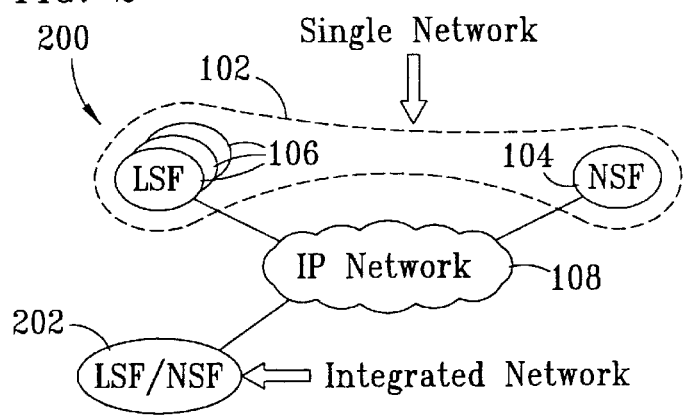
FIG. 2 depicts a distributed and an integrated local service function (LSF) and network service function (NSF) embodying features of the present invention.

FIG. 2 illustrates a network 200 similar to the IPM Architecture 100 described above with respect to FIG. 1, comprising the single network 102 interconnected with the IP network 108, and further comprising an integrated network 202 interconnected via the IP network 108 to the single network 102. The integrated network 202 performs the functions of both the NSF and the LSF, thereby providing both access and home network functions to a group of MNs 110.

2.1.1 Home Networks and Visited Networks

As defined above, and from a user's perspective, a Home Network is the network, e.g., an ISP, that owns a user's subscription. The home network is, furthermore, responsible for authenticating and registering a user.

When a user roams into and accesses a network that is not part of his/her home network, the user is said to be roaming into a visited network.

The network that the user is currently using is referred to herein as a serving network. The serving network may be either the home network or a visited network.

Figure 3:
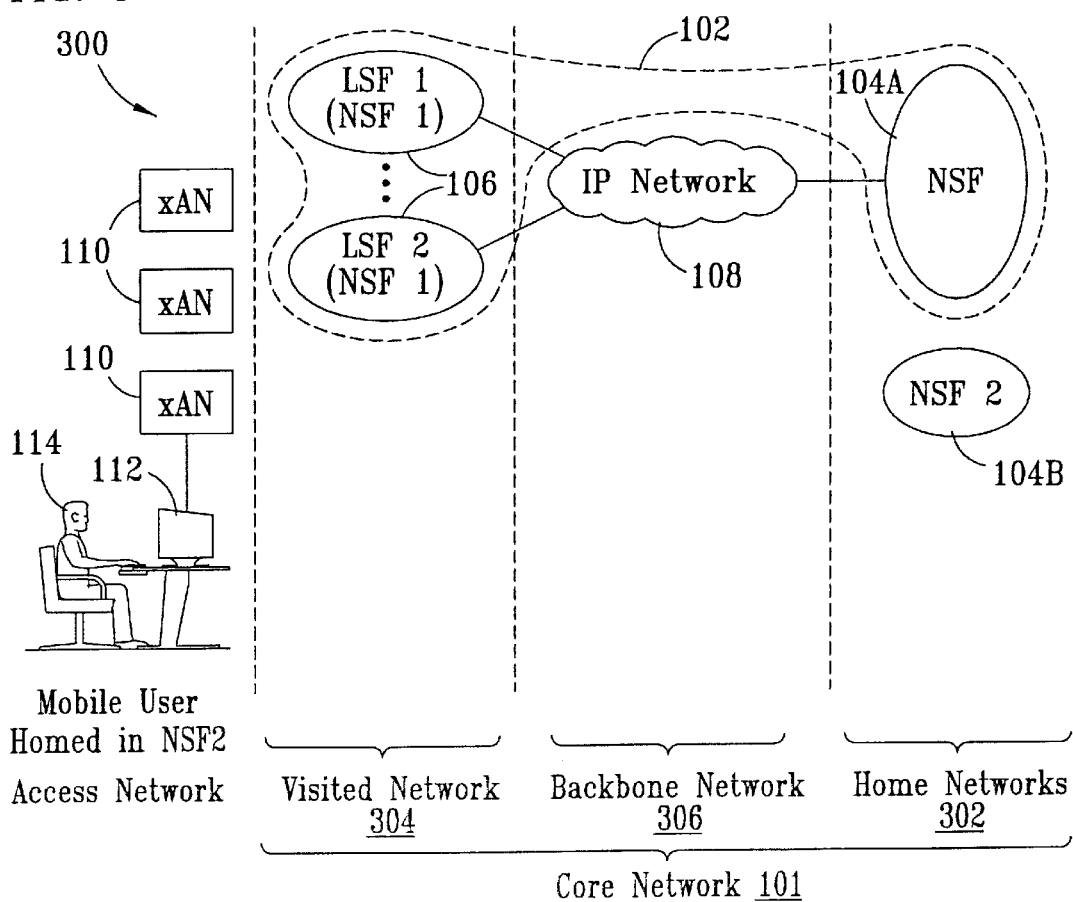
FIG. 3 shows a home network view and a visited network view of a network embodying features of the present invention.

FIG. 3 depicts a IPM Architecture 300 similar to the IPM Architecture 100 (FIG. 1) which more clearly distinguishes the foregoing differences between a home network and a visited network. Accordingly, in the network 300, the NSF 104A and an NSF 104B constitute a home network 302, one or more LSFs 106 constitute a visited network 304, and the IP network 108 interconnecting the NSFs 104A and 104B to the LSFs 106 constitutes a backbone network 306. The user 114's home NSF is the NSF 104B, and a service level agreement (SLA) is established between the NSFs 104A and 104B, thereby permitting the user 112 with his/her MN 112 to roam in the network of NSF 104A. When roaming in the NSF 104A, via an xAN 110 and an LSF 106, the NSF 104A is considered in FIG. 3 to be a visited network since the user 114 is not homed in NSF 104A. The NSF 104A in FIG. 3 is also referred to as a "serving network" since it provides network access to the roaming user.

2.1.2 NSF and LSF Components

Figure 4A:
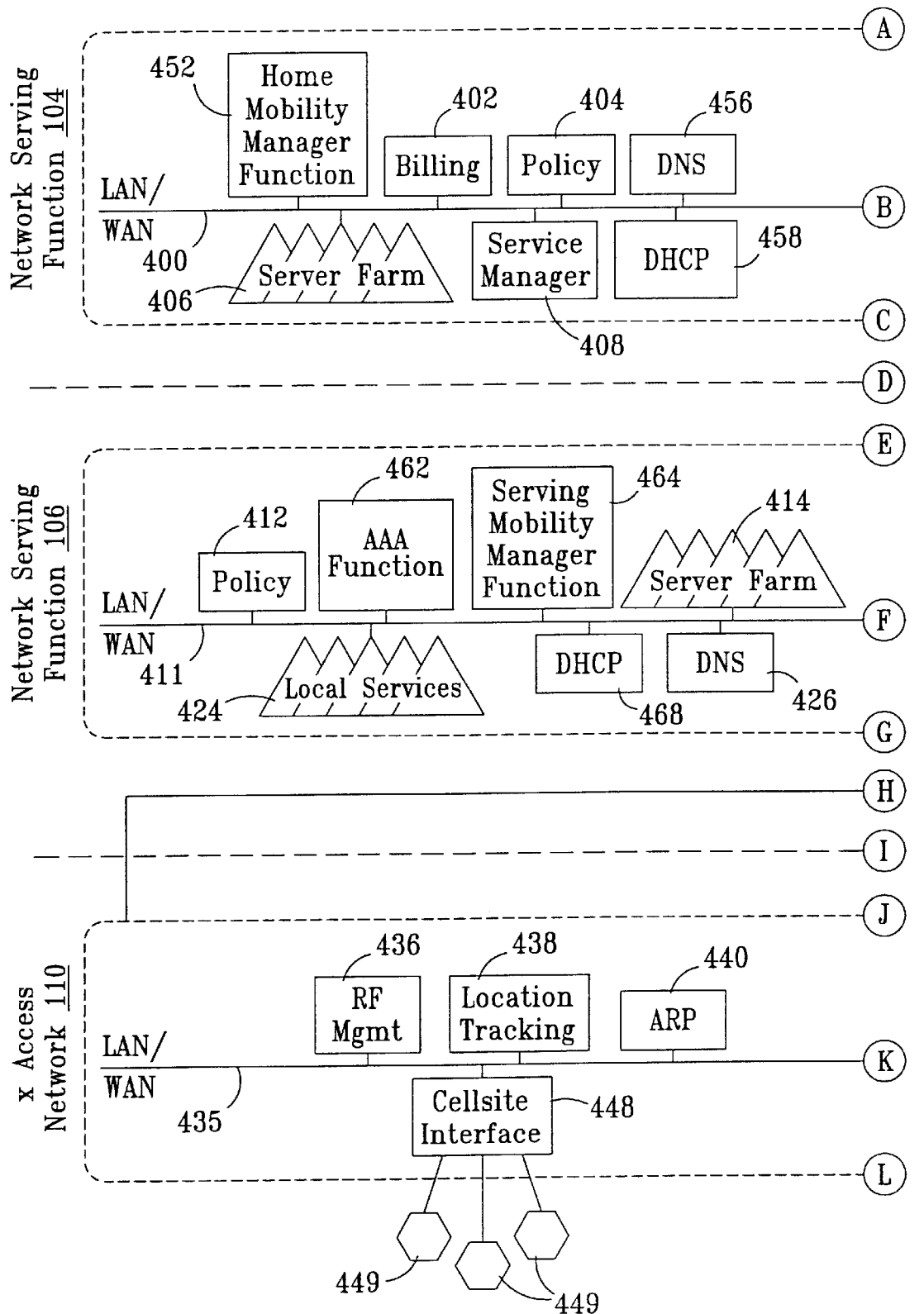

FIGS. 4A and 4B depict a high-level overview of the architectural mobility components, discussed below, preferably included within an NSF, LSF, and xAN, represented herein by the NSF 104, the LSF 106, and the xAN 110, respectively, in accordance with the present invention. A number of such mobility components are used to support at least two types of xAN applications, namely, LAN and WAN applications, for each NSF 104, LSF 106, and xAN 110.

As shown in FIGS. 4A and 4B, the NSF 104 includes a bus 400 for interconnecting LAN and WAN mobility components that constitute the NSF 104. LAN components interconnected to the bus 400 within the NSF 104 include a billing component 402 and a policy component 404. WAN components interconnected to the bus 400 within the NSF 104 include a server farm 406, a service management component 408, and a desktop management component 410. The components 402, 404, 406, 408, 410 are considered to be well-known in the art and will, therefore, not be discussed in further detail herein, except insofar as necessary to describe the present invention. The NSF 104 further includes a Secure Messaging Gateway (SMG) 454, discussed further below, through which the NSF 104 is connected to the IP Network 108 and, through the IP Network 108, to an Accounting Service Bureau 470 and to a Service Agreement Broker 472. The bureau 470 and broker 472 are considered to be well-known in the art and, therefore, will not be discussed in further detail herein, except insofar as relevant to the description of the present invention.

As further shown in FIGS. 4A and 4B, the LSF 106 includes a bus 411 for interconnecting LAN and WAN mobility components that constitute the LSF 106. LAN components interconnected to the bus 411 within the LSF 106 include a policy component 412, a server farm 414, a VPN Proxy firewall 416, an OA&M component 418, an SS7/PTI gateway 420, and a voice gateway 422. WAN components interconnected to the bus 411 within the LSF 106 include a local services component 424, a DDNS 426, a router switch 428, a billing component 432, a gateway call manager 433, and a call manager proxy 434 for providing. The components 412, 414, 416, 418, 420, 422, 424, 426, 428, 432, 433, and 434 are considered to be well-known in the art and will, therefore, not be discussed in further detail herein, except insofar as necessary to describe the present invention. The LSF 104 further includes an SMG 466, discussed further below, through which the LSF 106 is connected to the bus 400 of the NSF 104 and to the IP Network 108 and, through the IP Network 108, to the Accounting Service Bureau 470 and to the Service Agreement Broker 472. The LSF 106 is further connected via the SS7/PRI Gateway 420 and the Voice Gateway 422 to the Public Switched Telephone Network (PSTN) 474.

As still further shown in FIGS. 4A and 4B, the xAN 110 includes a bus 435 for interconnecting LAN and WAN mobility components that constitute the xAN 110. LAN components interconnected to the bus 435 within the xAN 110 include an RF Management component 436, a Location Tracking component 438, an ARP component 440, a router switch 442, an Access Control component 444, and a Connect Control component 446. WAN components interconnected to the bus 435 within the xAN 110 include a one or more Cellsite Interfaces 448 which interface with cellsites 449, such as MNs 112. The components 436, 438, 440, 442, 444, 446, and 448 are considered to be well-known in the art and will, therefore, not be discussed in further detail herein, except insofar as necessary to describe the present invention. The xAN 110 is connected to the LSF 106 via Router Switches 428 and 442.

2.1.2.1 NSF Components

As shown in FIG. 4B, the NSF 104 also includes an AAA function 450 configured for distributing requests for authentication, authorization, and the like, for MNs 112 that are homed in their network using suitable servers dedicated to those tasks. Specifically, with reference to FIG. 4E, the AAA function 450 includes an AAA routing function 450a, an authentication function 450b, an authorization function 450c, an accounting function 450d, and a security function 450e interconnected via a bus 450f, which is connected to the bus 400. The AAA function 450 and the functions contained therein are considered to be well-known in the art and, therefore, will not be discussed in further detail herein, except insofar as necessary to describe the present invention.

Figure 4C:
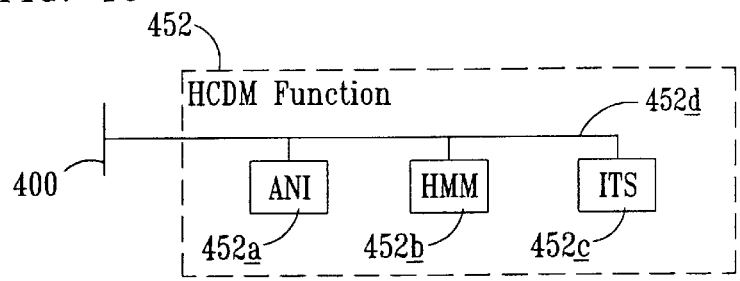
FIGS. 4C and 4D show the components of HCDM and SCDM functions, respectively.

The NSF 104 further includes a Home Mobility Manager (HMM) function 452 which constitutes the mobility component in the NSF. As shown in FIG. 4C, the HMM function 452 includes an Access Network Interface (ANI) 452a, an HMM 452b, and an IPM Tunneling Service (ITS) 452c interconnected via a bus 452d, which is connected to the bus 400. The HMM function 452 interfaces to the AAA function 450 in the NSF 104. The AAA function 450 preferably includes mobility extensions that are used to exchange mobility related control messages with the LSFs 106. Communications between an LSF 106 Serving Mobility Manager (SMM, discussed further below) and the HMM function 452 are effected by configuring multiple AAA functions 450 to serve as peer-to-peer components. The HMM function 452 is preferably configured for maintaining current location information regarding the movement of MNs 112 within different LSFs 106, assigning an IP address to a user's MN 112, forwarding datagrams to MNs 112 if policies are suitably set, binding users to MN's (e.g., devices), binding MNs to IP COAs, and sending COA updates to Correspondent Nodes (CNs) that the user is currently communicating with. CNs include any user nodes, whether mobile or fixed, that are connected to the IPM Architecture.

A Secure Messaging Gateway (SMG) 454 is provided for protecting the NSF 104 from the public IP network 108. Policies are defined for the SMG 454 to filter incoming and outgoing traffic.

As discussed further below, the NSF 104 also utilizes a DNS 456 (including a dynamic DNS function), a DHCP 458, and a Unified Directory Service (UDS) subsystem 460 for providing IP address management, mobility management, and policy management. Services are provided to users by application servers, such as the Server Farm 406, the Server Management component 408, and the Desktop Management component 410 on the NSF 104, and the Server Farm 414 and Local Services 424 on the LSF 106.

2.1.2.2 LSF Components

As discussed above, the LSF 106 provides access to the NSF 104 for a group of xANs 110. The LSF 106 preferably also provides local mobility management, i.e. management of the mobility of MNs 112 within the xAN. 110, and across xANs and LSF boundaries that it serves, as discussed further below.

As depicted in FIG. 4B, the LSF 106 preferably includes a local AAA function 462 that supports Authentication, Authorization, Accounting (AAA), and mobility functions by routing messages to appropriate AAA function 450 that resides on the NSF 104. Specifically, with reference to FIG. 4F, the AAA function 462 includes an AAA routing function 462a, an authentication function 462b, an authorization function 462c, an accounting function 462d, and a security function 462e interconnected via a bus 462d, which is connected to the bus 411. The AAA function 462 and the functions contained therein are considered to be well-known in the art and, therefore, will not be discussed in further detail herein, except insofar as necessary to describe the present invention.

When a user 114 accesses an LSF 106, the local AAA function 462 contacts the user's home NSF AAA function 450. An AAA routing function 450a (FIG. 4E) within the home AAA function 450 forwards requests to an appropriate function, e.g., authentication requests are forwarded to an authentication function 450b (FIG. 4E), and mobility requests are forwarded to the HMM function 452. The LSF local AAA function 462 and the NSF AAA function 450 communicate over a secure link to transmit AAA data.

Figure 4D:
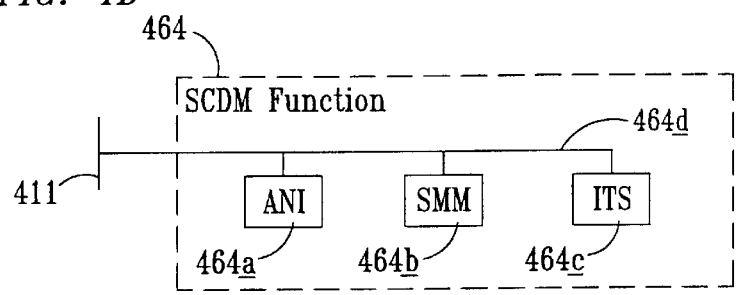

The LSF 106 includes a Serving Mobility Manager (SMM) function 464 that handles mobility management for MNs 112 as they roam between different xANs 110 that are served by the LSF 106. As shown in FIG. 4D, the SCDM 464 includes an Access Network Interface (ANI) 464a, an SMM 464b, and an IPM Tunneling Service (ITS) 464c interconnected via a bus 464d, which is connected to the bus 411. The point of connection between the MNs 112 and the NSF 104 may remain the same from an NSF perspective. The LSF 106 may hide the actual access network point of attachment of the MN 112 from the NSF 104. This is achieved using a set of ANIs between the LSF 106 and the xANs 110, as described further below with respect to FIG. 14. The LSF 106 also supports access to multiple different NSFs 104 from the same MN 112. Each NSF 104 access is associated with a different Network Access Identifier (NAI, discussed below) since the subscriptions owned by a an NSF 104 are unique across NSFs.

The SCDM 464 interfaces with the xAN 110 from an access network perspective and to an HCDM 452, discussed above, from a core network perspective. The SCDM 464 is preferably configured for registering users, managing handoffs between xANs and LSFs, providing care-of addresses (COA, defined in RFC 2002) for tunnel datagrams to the user's MN 112, user location tracking, and providing an interface to networks that support Mobile IP.

The LSF 106 is protected and secured from the Internet by a Secure Messaging Gateway (SMG) 466. All inbound and outbound data must flow through the SMG 466. Policies are defined in the LSF 106 that protect the LSF 106 resources from the MNs 112.

The LSF 106 includes Dynamic Host Configuration Protocol (DHCP) 468 for providing MN 112 home addresses. Local directory servers, discussed below, may be used to store policies related to the LSF 106, user MN location, and the like. These components may be available locally in the LSF or may be located centrally elsewhere in the network and serve a set of LSFs 106. The LSF 106 may also include the DNS 426 with the Dynamic DNS function (discussed below).

It is noted that the NSF 104 and LSF 106 may be integrated together to form the integrated network 202 (FIG. 2) and, when so integrated, only require one of each of the foregoing components to perform the appropriate roles based on their association with an MN 112.

2.1.2.3 Dynamic Host Configuration Service (DHCS) and Dynamic Domain Name Services (DDNS)

Figure 5:
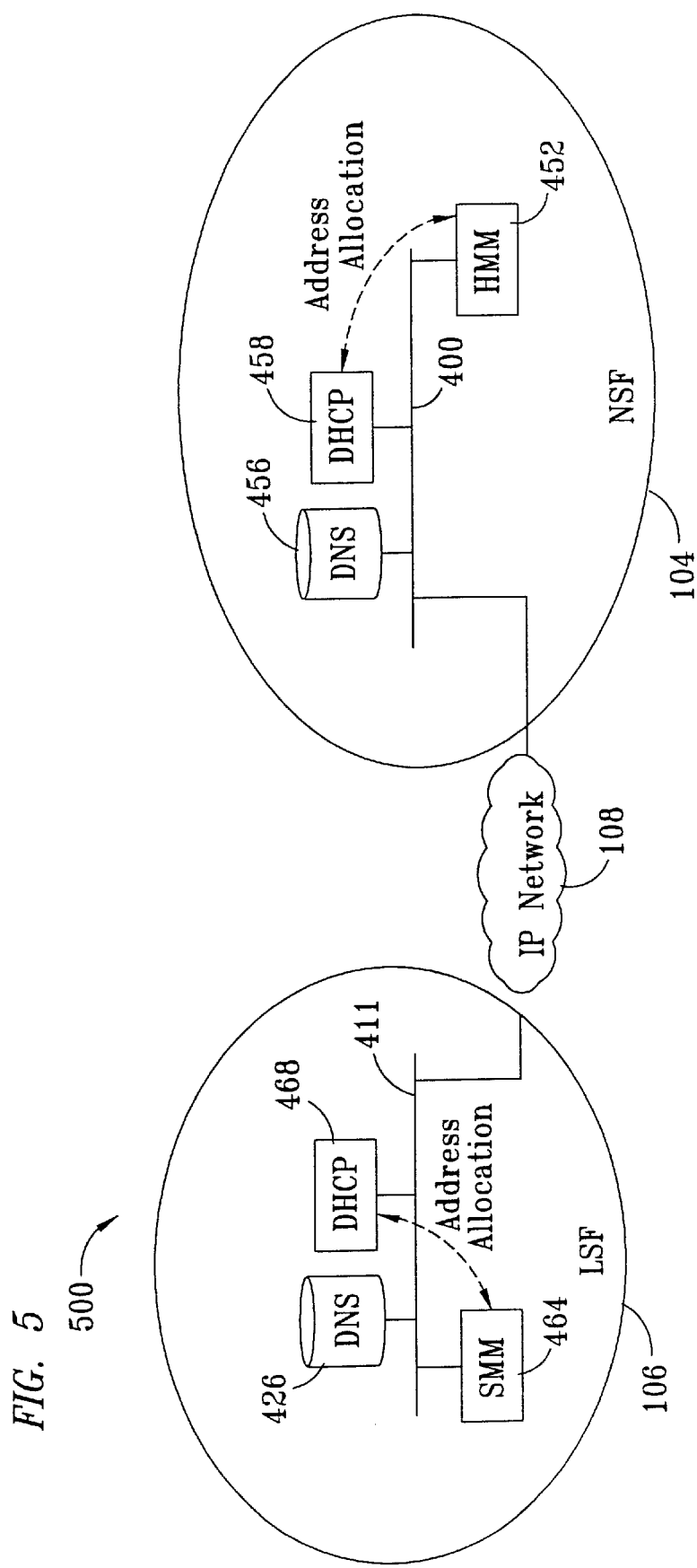
FIG. 5 show DDNS and DHCP functions embodying features of the present invention.

FIG. 5 is a schematic diagram showing a portion of the IPM architecture framework 500 as providing DHCP servers 458 and 468 for allocating network resources. DHCS enables devices to automatically obtain configuration parameters they need to participate in Intranet and Internet communications. Because any CN requires a unique IP address and an appropriate subnet mask, a DHCP is used to effectively automate the task of coordinating and assigning IP address information. The DHCP server 458 interacts with the DNS servers 456 and 468 in coordination with the HMM 456 and SMM 464, respectively, to update the current IP address assigned to an MN 112.

While the DHCP servers 458 and 468 both use DHCP and reside in the NSF 104 and the LSF 106, respectively, the DHCP servers have different functions. In the NSF 104, the DHCP server 458 may be used to assign temporary IP addresses to roaming MNs 112 that do not have pre-configured IP addresses, or that request IP addresses. In the LSF 106, the DHCP server 468 may be used to assign co-located COAs, in addition to MN 112 home address, to the MN 112 that accesses the serving network, such as LSF 106.

The DHCP servers 458 and 468 may also use DHCP to configure the MN 112 with other parameters such as identification of the NTP server, the NNTP server, and the like.

FIG. 5 also shows a portion of the IPM Architecture 400 providing a DDNS function using the DNS components 456 and 426 which support the HCDM 452 and SCDM 464, respectively. At the LSF 106 and at the NSF 104, the DDNS is a protocol used to update the DNS 426 and 456 respetviely with the MN's IP address allocated by DHCP 468 and 458.

FIG. 5A is a flow which depicts the operation of the DDNS. Accordingly, when an MN 112 registers with an LSF 106, in step 502 the HMM/SMM send a message to the DHCP 458 or 468 (which DHCP is only accessible by the HMM/SMM) requesting the IP Address of an attached NAI. In step 504, the DHCP allocates the IP address of the NAI and, in step 506, transmits the IP address (which may be public or private IP address) to the DNS in accordance with DDNS protocol. In step 508, the DHCP transmits the IP address to the requesting HMM/SMM and, in step 510, the HMM/SMM receives the IP Address. In step 511, the HMM/SMM thus proxies the address management on behalf of the MN and renews the lease time of the address of each IPM re-registration. At de-registration of the MN 112, the IP Address is released, as described in step 511.

In step 512, the DNS stores the IP Address. In step 514, a CN sends a message to the DNS requesting the IP address of the NAI. In step 516, the DNS looks up the IP address and, in step 518, transmits the IP address to the requesting IP Address to the requesting CN. In step 520, the CN receives the IP Address.

If the user 112 of the MN 114 is roaming, then the DDNS protocol is used to update the DNS 426 and/or DNS 456 with the COA of the MN 114. The HMM 452B interacts with the DNS server 456 to keep the MN's COA current.

DNS servers 426 similar to the DNS server 456 may reside in the LSF 106 and SMM 464 will update the DNS server 456 with the COA of the MN 112 during the initial Registration of the user 114 with the MN 112.

The DNS server 456 at the LSF 106 may also have a reference (in its look-up table against the user 114's NAI) to the DNS server 426 at the NSF 104. In that case, any DNS query initiated against the user 114's NAI at the LSF 106 is redirected to the DNS server 426 at the NSF 104. The DNS server 426 at the NSF 104 then provides the COA of the MN 112.

The DNS server 426 at the NSF 104 may have a reference (in its look-up table against the user 114's NAI) to the DNS server 456 at the LSF 106. In that case, any DNS query initiated against the user 114's NAI at the NSF 104 is redirected to the DNS server 456 at the LSF 106. The DNS server 456 at the LSF 106 then provides the COA of the MN 112.

Figure 5B:
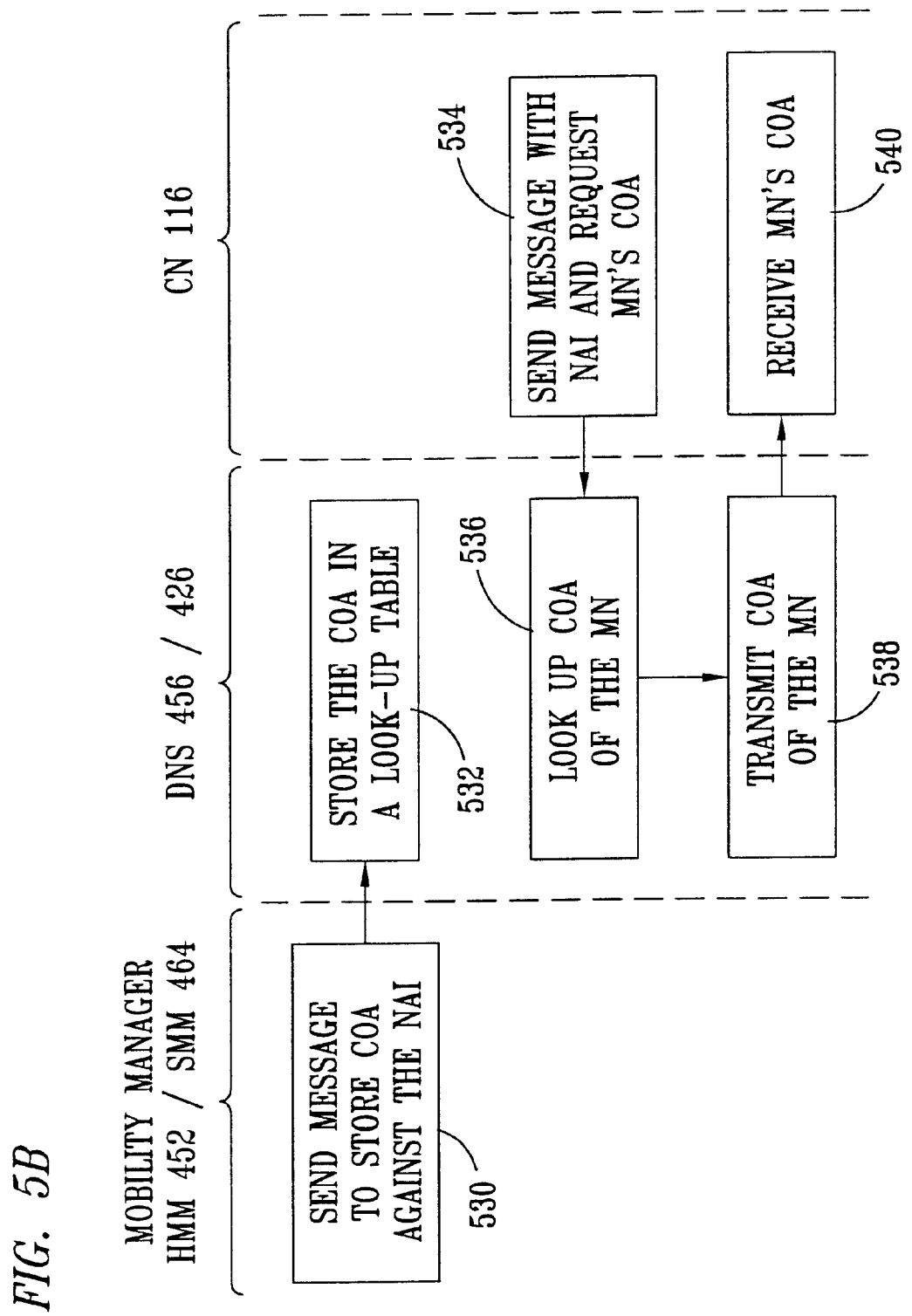

FIG. 5B is a flow that depicts an operation of the DNS that stores the COA of the MN. Accordingly, in step 530, the HMM and/or SMM sends a message to DNS 456 and/or DNS 426 store the MN 112's COA against the user 114's NAI. In step 532, the NSF DNS 456 and/or LSF DNS 426 stores the MN 112's COA against the user 114's NAI. In step 534, the CN 116 sends a message with the user 114's NAI to the NSF DNS 456 and/or LSF DNS 426 requesting the COA of the MN 112. In step 536, the NSF DNS 456 and/or LSF DNS 426 look up the MN 112's COA. In step 538, the NSF DNS 456 and/or LSF DNS 426 transmits the COA of the MN 112 to the CN 116. And finally, in step 540, the CN 116 receives the COA of the MN 112.

FIG. 5C is a flow that depicts an operation of the DNS 426 that stores the NAI of the user 114 against the reference of the DNS 456. Accordingly, in step 550, the HMM 452 sends a message to NSF DNS 456 to store the COA of the MN 112 against the NAI of the user 114. In step 552, the NSF DNS 456 stores the COA of MN 112 against the NAI of the user 114 in a look-up table. In step 553, the HMM 452 sends a message to SMM 464 to initiate storing the reference of the DNS 456 aginst the NAI of the user 114. In step 554, the SMM 464 sends a message to LSF DNS 426 to store the reference of the NSF DNS 456 against the NAI of the user 114. In step 556, the LSF DNS 426 stores the reference of the NSF DNS 456 against the NAI of the user 114 in a lookup table. In step 558, the CN 116 sends a message with the user 114's NAI to the LSF DNS 426 requesting the COA of the MN 112. In step 560, the LSF DNS 426 looks up the reference of the NSF DNS 456 and sends a message to NSF DNS 456 with the NAI of the user 114 requesting the COA of the MN 112. In step 562, the NSF DNS 456 transmits the COA of the MN 112 to the LSF DNS 426. In step 564, the LSF DNS 426 receives the COA of the MN 112 and then the LSF DNS 426 transmits the COA of the MN 112 to the CN 116. In step 566, the CN 116 receives the COA of the MN 112.

Figure 5D:
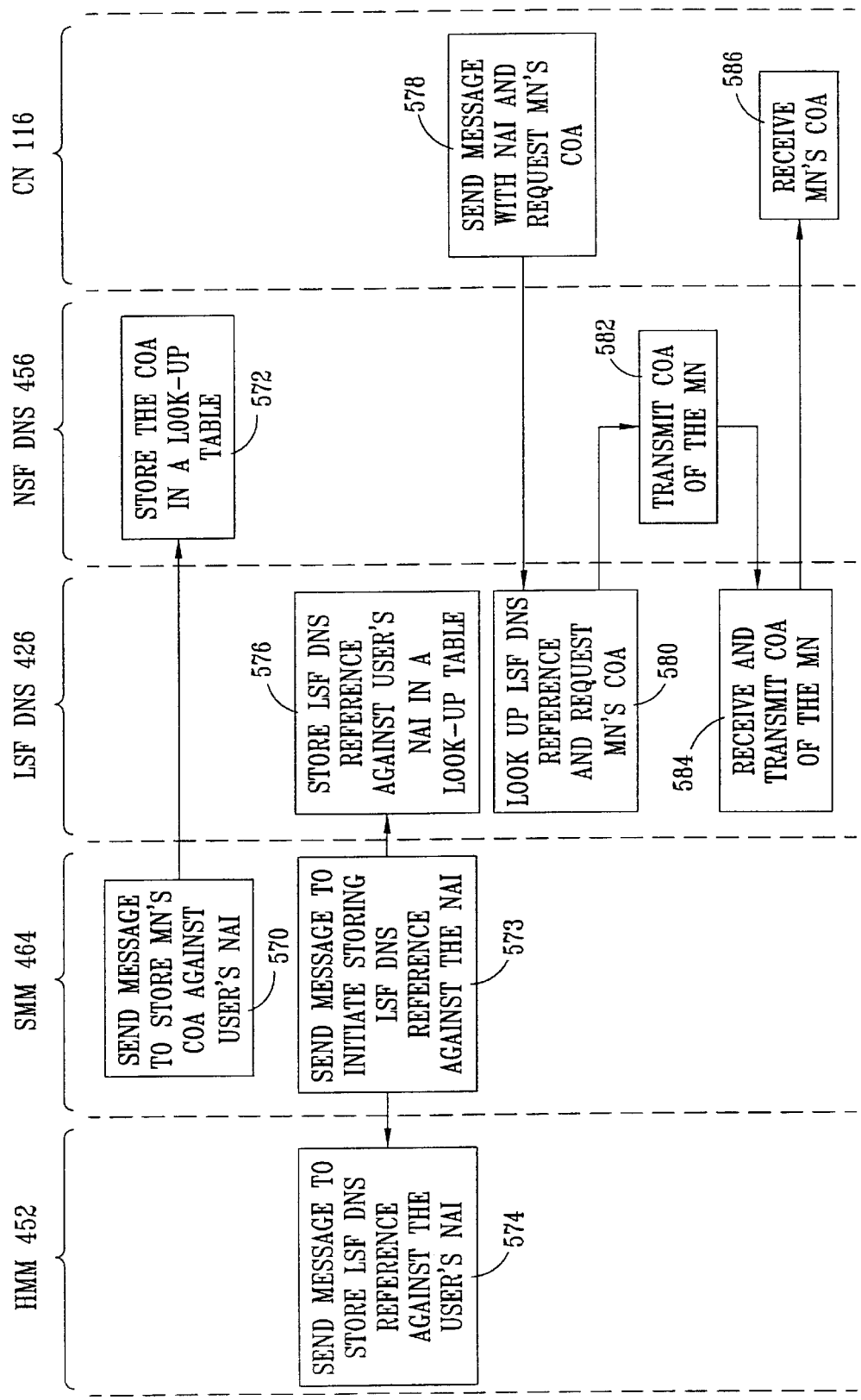

FIG. 5D is a flow that depicts an operation of the NSF DNS 456 that stores the NAI of the user 114 against the reference of the LSF DNS 426. Accordingly, in step 570, the SMM 464 sends a message to LSF DNS 426 to store the COA of the MN 112 against the NAI of the user 114. In step 572, the NSF DNS 426 stores the COA of MN 112 against the NAI of the user 114 in a look-up table. In step 573, the SMM 464 sends a message to HMM 452 to initiate storing the reference of the LSF DNS 426 aginst the NAI of the user 114. In step 574, the HMM 452 sends a message to NSF DNS 456 to store the reference of the LSF DNS 426 against the NAI of the user 114. In step 576, the NSF DNS 456 stores the reference of the LSF DNS 426 against the NAI of the user 114 in a look-up table. In step 578, the CN 116 sends a message with the user 114's NAI to the NSF DNS 456 requesting the COA of the MN 112. In step 580, the NSF DNS 456 looks up the reference of the LSF DNS 426 and sends a message to LSF DNS 426 with the NAI of the user 114 requesting the COA of the MN 112. In step 582, the LSF DNS 426 transmits the COA of the MN 112 to the NSF DNS 456. In step 584, the NSF DNS 456 receives the COA of the MN 112 and then the NSF DNS 456 transmits the COA of the MN 112 to the CN 116. In step 586, the CN 116 receives the COA of the MN 112.

2.1.2.4 Unified and Local Directory Services

Each NSF 104 and each integrated LSF/NSF 202 includes a Unified Directory Service (UDS) subsystem, and each LSF includes a Local Directory Service (LDS) subsystem. Referring to FIGS. 4A and 4B, each UDS subsystem is based on a Client-Server architecture and comprises a UDS server 460, a UDS database 461, and a number of UDS clients, such as the mobility manager 452, the billing component 402, the policy server 404, the server farm 406, the service manager 408, the desktop manager 410, and the AAA function 450 interconnected via the bus 400. Each LDS subsystem is also based on a Client-Server architecture and comprises an LDS server 430, an LDS database 431, and a number of LDS clients, such as the policy server 412, the AAA function 462, the mobility manager 464, the server farm and local services 414, the OA&M component 418, and the billing component 431 interconnected via the bus 435.

The UDS subsystem and the LDS subsystem serve similar functions, though at different levels of breadth. For example, a UDS subsystem for a particular network service provider (e.g., ATT™, GTE™, AOL™) represented by the NSF 104 or a integrated LSF/NSF 202, maintains information in databases (discussed below) for all users 112 of mobile and fixed nodes and for all networks who subscribe to services provided by, or who provide services to, the particular network service provider. Each respective LDS subsystem maintains information in databases (discussed below) only for users 112 of mobile and fixed nodes and for networks who are connected via RANs or xANs 110 to a respective LSF 106. As discussed further below, the information maintained in the UDS and LDS databases 431 and 461 includes, for example, user profiles ("unified" in the sense that they are independent of the xAN 110 serving the user 112), user policies, network usage, network policies, security policies, and information related to availability of services and their location.

Figure 6:
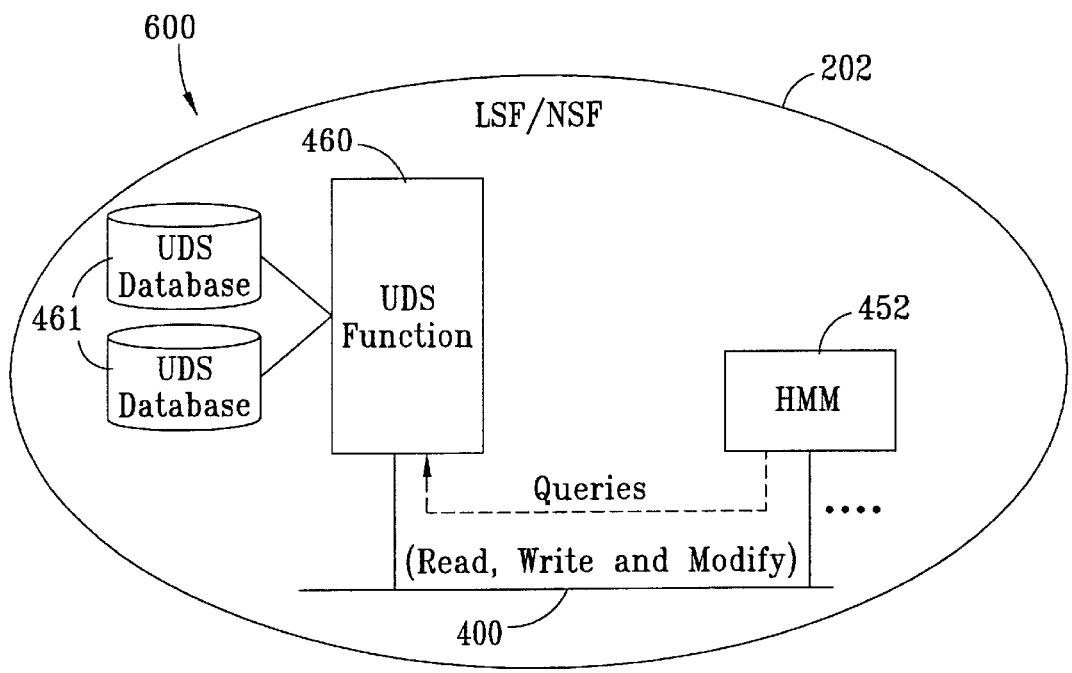
FIG. 6 shows directory services embodying features of the present invention.

Because the functionality of the UDS subsystem and the LDS subsystem are substantially similar, that functionality will be described representatively herein with respect primarily to the UDS subsystem, and more specifically, with respect to the UDS subsystem of the integrated LSF/NSF 202, as representative of the NSF 104 and LSF 106 as well. Accordingly, FIG. 6 depicts an integrated LSF/NSF 202 as comprising a UDS subsystem having a UDS server 460, and two UDS databases 461 connected to the UDS server 460. It is understood that, while only two databases 461 are shown, one or more such databases may be connected to the UDS server 460.

UDS client software is installed in each LSF/NSF 202 component, and each LSF/NSF Server or Manager interfaces with the UDS server 460 through the UDS client. Details of the operation of the UDS server are thereby hidden from the respective NSF/LSF Server or Manager hosting the UDS Client. For example, an LSF/NSF component may utilize a Lightweight Directory Access Protocol (LDAP) Client which would hide the details of Client/Server protocol from the UDS Client.

The UDS Server 460 is associated with the LSF/NSF 202 for enforcing a common information model for NSF components that access the UDS subsystem 460. The common information model is a schema for each Directory Information Tree (DIT), discussed further below with respect to FIG. 6D. The schema identifies object classes, such as "ipmUser", and attributes that may comprise a directory entry into the UDS database 461. The schema also lists attributes that an entry with an object class of "ipmuser" must have (e.g., a common name) and those attributes that an entry of object class "ipmUser" may, but is not required to, have (e.g. naiUser). The attributes are discussed in greater detail below with respect to FIGS. 6E–6L. The UDS Server 460 incorporates UDS clients that interface to UDS databases 461 where data is physically stored.

The one or more UDS Databases 461 are utilized to physically store information. The interface between the UDS Server 460 and a given UDS database 461 may be proprietary or standards-based. The physical organization of the data is hidden from the NSF 104 components that interface with the UDS subsystem.

The term "schema" is used herein to describe a type of data that may be included in the UDS subsystem. The schema includes object classes and attributes that may be used to meet most UDS server 461 requirements. An object class defines a collection of attributes that may be used to define an entry, and provides a convenient way for a UDS client to retrieve a subset of data entries during a search operation to provide for a particular service. Object classes generally define a set of required and optional attributes. Attributes contain information about a specific descriptive aspect of an entry, and each attribute consists of an attribute type and value, as are discussed in greater detail below with respect to FIGS. 6E–6L.

Figure 6A:
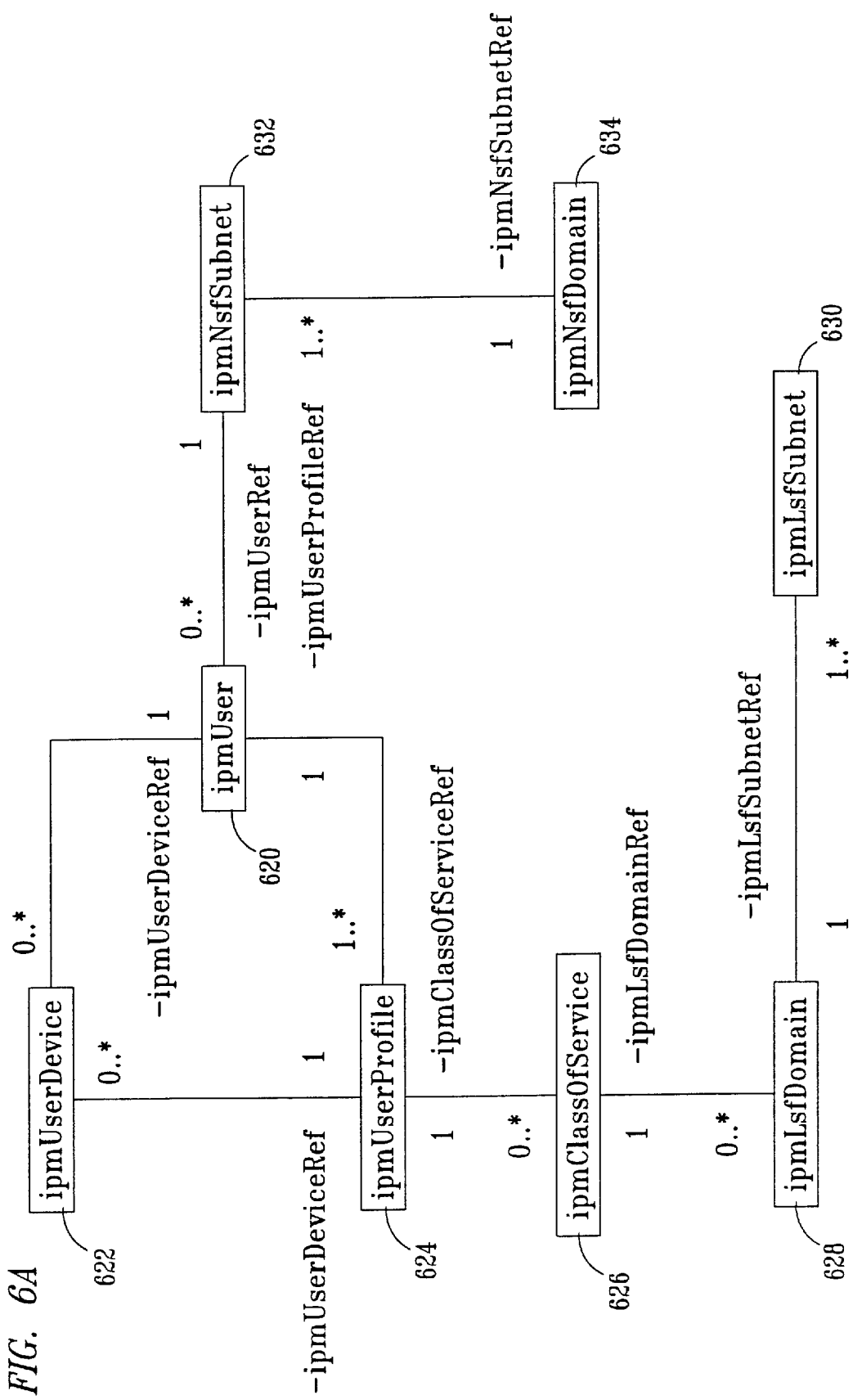
FIG. 6A is a schema relationship diagram which specifies a preferred relationship between object classes utilized by UDS and LDS subsystems.

FIG. 6A is a schema relationship diagram which specifies a preferred relationship between object classes utilized by the UDS subsystem (as well as the LDS subsystem) in accordance with the present invention. As shown, the UDS subsystem includes eight object classes, namely, an ipmUser object class 620, an ipmUserDevice object class 622, an ipmUserProfile object class 624, an ipmClassOfService object class 626, an ipmLsfDomain object class 628, an ipnLsfSubnet object class 630, an ipmNsfSubnet object class 632, and an ipmLsfSubnet object class 634, described in further detail below.

The schema relationship diagram of FIG. 6A is depicted utilizing conventional database drawing techniques that are considered to be well-known in the art. Accordingly, the number "1" indicates one object class, "1 . . . *" indicates one or more object classes, and "0 . . . *" indicates zero or more object classes. For example, the ipmUser object class 620 may be related to zero or one or more ipmUserDevice object classes 622, and the ipmUserDevice object classes 622 must be related to one or more ipmUser object classes 620. The attributes of each object class are described below.

Figure 6B:
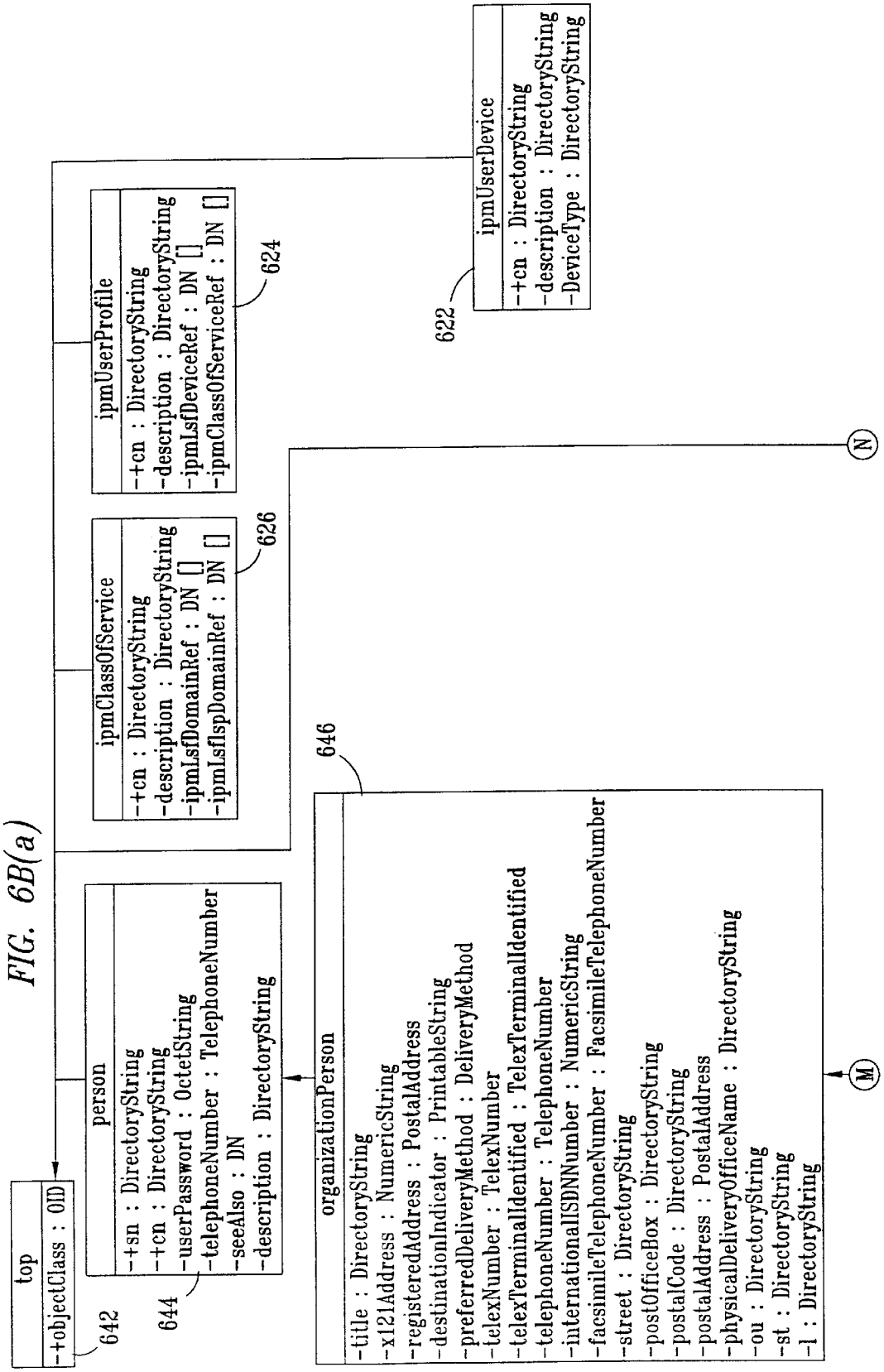
FIGS. 6B and 6C depict class inheritance trees which specify a preferred hierarchy of object classes shown in FIG. 6A.
Figure 6B:
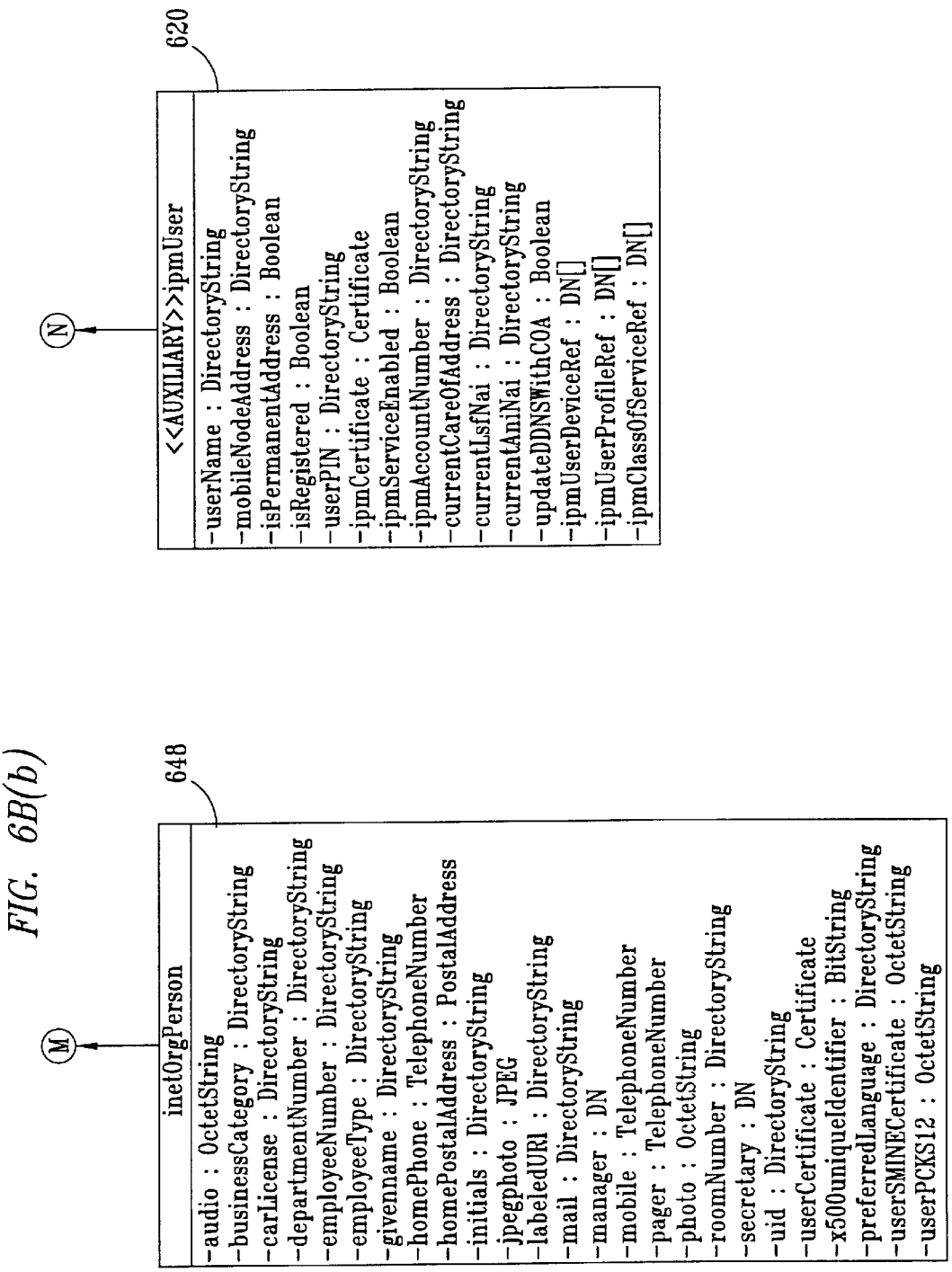

FIG. 6B depicts a class inheritance tree which specifies a preferred hierarchy of the object classes 620, 622, 624, and 626 described above with respect to FIG. 6A, and identifies preferred attributes associated with each object class. Notably, the ipmUser object class 620 is an auxiliary object class, indicating that it is common to all sub-trees. Also depicted are a group 640 of four object classes well-known in the prior art, namely, a top object class 642, a person object class 644, an organizationperson class 646, and an inetOrgPerson object class 648. Because the object classes 642, 64, 646, and 648 contained within the group 640 are considered to be well-known they will not be discussed in further detail herein. The object class 620 may inherit, either singly or in any combination, from any of the prior art classes 642, 644, 646, or 648.

Figure 6C:
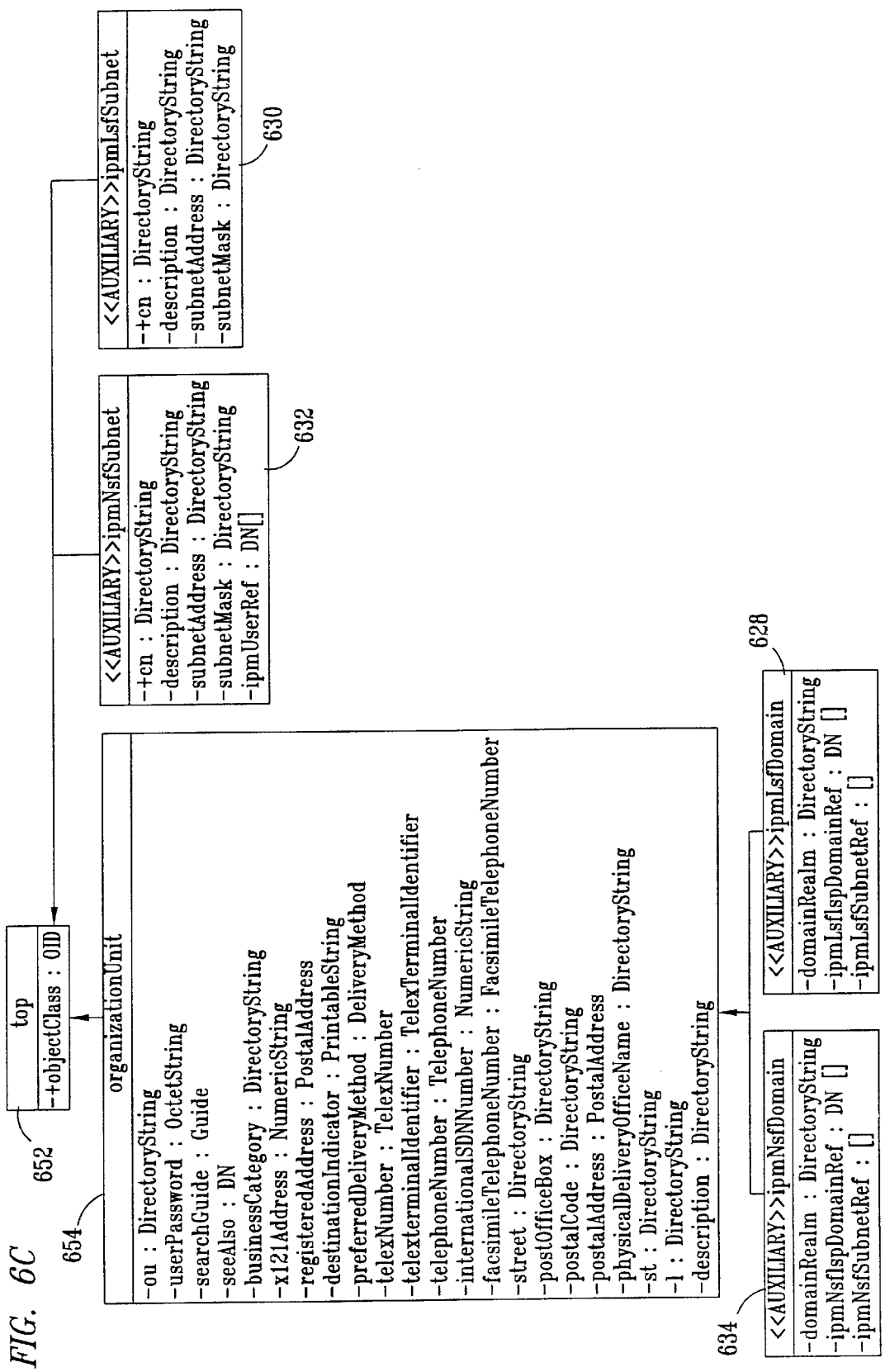

FIG. 6C depicts a class inheritance tree which specifies a preferred hierarchy of the object classes 628, 630, 632, and 634 described above with respect to FIG. 6A, and identifies preferred attributes associated with each object class. Notably, the object classes 628, 630, 632, and 634 are auxiliary object classes, indicating that they are common to all sub-trees. Also depicted are a group 650 of two object classes well-known in the prior art, namely, a top object class 652 and an organizationUnit object class 654. Because the object classes 652 and 654 contained within the group 650 are considered to be well-known, they will not be discussed in further detail herein. The object classes 628, 630, 632, and 634 may be inherit, either singly or any in any combination thereof, from either of the prior art classes 652 and 654.

FIG. 6D depicts a preferred Directory Information Tree (DIT) which shows how sub-directories are organized in the UDS and LDS for storing the object classes 620, 622, 624, 626, 628, 630, 632, 634, and 636 discussed above with respect to FIGS. 6A, 6B, and 6C. Accordingly, all object classes 620, 622, 624, 626, 628, 630, 632, 634, and 636 for all users 114 are organized under suitable sub-directories organized under a main IPM management organizational directory 660a. Specifically, the object classes 634 (IPM NSF Domain) and 628 (IPM LSF Domain) for all users 114 are stored under respective sub-directories 634a and 628a, which are organized under the directory 660a. The object classes 632 (IPM NSF Subnet), 620 (IPM User), 622 (IPM User Device), 624 (IPM User Profile), and 626 (IPM Class of Service) for all users 114 are stored under respective sub-directories 632a, 620a, 622a, 624a, and 626a, which are organized under the sub-directory 634a. The object class 630 (IPM LSF Subnet) for all users 114 is stored under a sub-directory 630a, which is organized under the sub-directory 634a.

FIGS. 6E, 6F, 6G, 6H, 6I, 6J, 6K, and 6L are tables which exemplify attributes preferably associated with each of the object classes 620, 622, 624, 626, 628, 630, 632, 634, and 636, respectively, discussed above with respect to FIGS. 6A, 6B, 6C, and 6D. Each attribute is defined in the schema as having a given "syntax" (e.g., DirectoryString) and, as indicating whether a respective attribute may only have a single value, or rather may be multi-valued (e.g., an "ipmUser" may have a "userEmail" attribute that has several values for multiple e-mail addresses). Matching Rules are associated with the attribute so that the directory understands how to establish such relationships as "equality" when comparing the values of the attribute from different entries. For example, the matching rule "caseIgnoreString" ignores the case of the characters when comparing strings.

The information stored in the UDS database 461 thus includes objects in a network infrastructure, which objects preferably comprise unified user profiles, server locations, applications, hubs, routers, network usage policies, security policies, and information related to availability of services and their location, and the like. The UDS subsystem thus provides structure to complex and heterogeneous networks by enabling access to, and management of, networks, such as home networks 302, visited networks 304, backbone networks 306, xANs 110, and the like. It is noted that the UDS subsystem 602 is preferably based on X.500, an International Telecommunications Union (ITU) standard for directories used in telecommunications.

The UDS subsystem also provides an interface to the UDS databases 461. Clients of the UDS subsystem preferably access the information contained in the UDS databases 461 via a standard access protocol such as Directory Access Protocol (DAP) or Lightweight DAP (LDAP).

The UDS database 461 schema, the type of UDS database 461, and storage techniques used by the UDS database 461 are preferably transparent to clients of the UDS database 461. The UDS subsystem receives information requests from clients, and retrieves the requested information from the UDS databases 461. The interface between the UDS server 460 and the databases 461 may be proprietary or based on standards. The UDS server 460 formats information retrieved from the UDS databases 461, and then sends the formatted information back to the UDS client in an appropriate response message, discussed further below.

FIG. 6M is a schematic diagram exemplifying how the UDS database 461 may interface with other components. The UDS database 461 includes a memory 461a configured for storing attributes 461b defining the behavior of a user 114, and for storing services 461c that the user 114 subscribes to. A single interface 461d, preferably an LDAP interface, is provided for provisioning the attributes 461b and services 461c into the UDS database memory 461a. The UDS database 461 further includes one or more interface 461e, preferably LDAP interfaces, configured for enabling the UDS database 461 to interface with other components of a local NSF 104. The UDS database 461 additionally includes one or more interfaces 461e, preferably LDAP interfaces, configured for connecting to xANS 110, exemplified as GSM, an IP Network, and DSL, of other network service providers.

As discussed in further detail below, the UDS database 461 is operable for providing to the local NSF 104 or other service providers via the interfaces 461e and 461f and the xANS 110 user profile information selectively drawn from the attributes 461b for services 461c to which a user subscribers.

By the use of the UDS subsystem 602 described herein, a common schema is provided between any number of services, thereby enabling common subscriber management and portability of applicable service data across data types. For example, User Authentication, DNS entries, and QoS may be made common across DSL and UMTS data environments.

2.1.2.5 Secure Messaging Gateway

The Secure Messaging Gateways (SMGs) 454 and 466 (FIG. 4B) serve both as routers and as firewalls that protect a network by monitoring and filtering incoming and outgoing traffic based on policies defined by administrators of a network, such as the home network 302, the visited network 304, the backbone network 306, the xANs 110, or the like. The SMGs 454 and 466 are located at the edge of the network and protect, for example, an internal network (e.g., the Intranet) from a public network (e.g., the Internet). The SMGs 454 and 466 preferably implement IPSec to provide secure (e.g., encrypted) communication links between networks.

The term "firewall" customarily refers to a collection of hardware, software, and policy that is placed between a private network (e.g., LSF/NSF), and an external network (e.g., the Internet). Packet filters and application gateways, either individually or in combination, normally constitute a firewall. Various firewall configurations may be set up based on the degree of security required and policies defined.

2.1.3 Network Types

The IPM Architecture, such as designated by the reference numeral 100 in FIG. 1, will, in accordance with the present invention, support a number of different types of networks. For example, the IPM Architecture 100 will support a Private Network also referred to as an Intranet, which is defined as a network that is protected from a public network, such as the Internet 108 (FIG. 1), by an SMG 454 and 466, or the like, that enforces access restrictions via a predefined set of policies.

A private network may use IP addresses, sometimes referred to as public addresses or public IP addresses, which are routable on the public Internet 108. Therefore hosts on the public Internet 108 are able to "directly" address hosts on a private network. An example of this type of network may be a Small Office or Home Office (SOHO).

Alternatively, a private network may use IP addresses, sometimes referred to as private addresses or private IP addresses, which are not routable on the public Internet. Hosts on the Internet may not then be able to "directly" address hosts on a private network. The private network can support some type of predefined access setup, e.g. SOCKS (RFC 1928) and tunneling, e.g., Layer 2 Tunneling Protocol (L2TP), IP tunneling, or the like, for sending data into the private network. The private networks may also use Network Address Translators (NATs) so their hosts may establish connections to hosts on the public Internet.

The IPM Architecture of the present invention is preferably configured to also support LSF control plane messaging to a private network's NSF.

The IPM Architecture of the present invention is preferably configured to also support Non-Private Networks, defined to be a network that does not restrict access into its network. Hence, all hosts in such a network have routable public Internet IP addresses.

The IPM Architecture of the present invention is preferably configured to also support LSF control plane messaging to the non-private network's NSF.

The IPM Architecture of the present invention is preferably configured to also support LSFs and NSFs that are non-private networks. Even though an LSF/NSF does not restrict access into the LSF/NSF, they provide a mechanism to allow encrypted data between itself and other networks.

The IPM Architecture of the present invention is preferably configured to also support LSFs and NSFs that are private networks with routable IP addresses. The LSF/NSF provides a mechanism to allow encrypted data between itself and other networks. The LSF/NSF also supports connectivity to enterprises, such as a SOHO, that do not support encrypted data services.

The IPM Architecture of the present invention is preferably configured to also support NSFs that are private networks and have private addresses that are not routable by the general Internet. The most common scenario for this is when a roaming user wants to perform a service at his home private network. Before a user's service can be established, the user's application must transverse the home network's security messaging gateway.

Given the flexibility of the types of networks supported by the mobility architecture framework of the present invention, users roaming within the LSFs are able to connect to a number of different types of home NSF types, such as, for example, private network ISPs that support L2TP, private network ISPs that support IP tunneling, non-private network ISPs, a company's private (or non-private) network, and the like.

The IPM Architecture of the present invention is preferably configured to also support Layer 3 tunneling mechanisms between LSFs and NSFs.

2.2 Frameworks

The present invention defines a number of different frameworks for handling various aspects of the IPM Architecture, which frameworks are responsible either directly or indirectly for providing mobility in the core network. The frameworks, discussed below in greater detail, include (1) a User Identity and Network Route Addressing Framework, (2) a Security Framework, (3) an Authentication, Authorization, and Accounting (AAA) Framework, (4) a Mobility Manager Framework, and (5) a Service Mobility Framework.

2.2.1 User Identity and Network Route Addressing Framework

In accordance with the IPM Architecture of the present invention, the linkage between the users 114 and their devices, such as MN 112, is separated by assigning a unique identity to each user, and by assigning a unique identity to each device. This unique identity of these devices owned by the user 114 is linked to the NAI of the user 114 so that the identity of any of these devices can be linked to the user 114. Furthermore, the unique identity of the device is of the form of NAI which includes attritbutes of both the device and the user. Some examples these unique identities based on NAI are, johndoe.mobilephone@anyserviceprovider.com and johndoe.pager@anyserviceprovider.com.

2.2.1.1 User Identity

A number of standardization methods for uniquely identifying users have been proposed, each with its own advantages and disadvantages. All proposals, though, require that the globally unique user identity must be resident in a "home database" that is accessible by all.

Because the network of the present invention is an IP-based network modeled on the Internet, the user name space must be consistent with what already exists within the Internet. Current Internet naming is based on domain names.

Accordingly, the IPM Architecture of the present invention supports unique identifiers as specified in the Internet RFC 2486, entitled "The Network Access Identifier" by B. Aboba; July 1998. The network access identifier (NAI) defined in this document is based on Internet domain names. The format of the identifiers is "user realm" and may be, for example, "John.Doe@ISPxyz". The NAI may be used to identify users and to identify devices, such as routers. The NAI is not an e-mail address; however, in the most limited sense, an NAI may be a user's actual e-mail address.

When a user 112 accesses an LSF 106, the MN 114 sends the user's NAI in the system access message. The NAI is used to access the user's profile in a UDS database 461 or LDS database 431 and to help perform other functions of the LSF 106.

There are a number of ways a user 114/MN 112 is able to supply an NAI. The NAI may be on the user's User Identity Module (SIM) card (similar to the SIM card used in GSM), configured in the MN 112, or may have to be input by users 114 when they want to access the LSF 106.

2.2.1.2 Network Route Addressing

Since the IPM Architecture is designed to support IP-based networks, network addressing is based on the Internet Protocol (IP). The IPM Architecture described herein is configured to support both IP version 4 (IPv4) and IP version 6 (IPv6) and is, generally, independent of the IP version. For the sake of illustration, however, routing within the IPM Architecture of the present invention will be described with respect to IPv4.

An MN 112 used by a user 114 will terminate (i.e., receive) IP datagrams destined to the user's application that is executing at a CN. To do this, the MN 112 must have an IP address. The IPM Architecture, such as depicted by the reference numeral 100 in FIG. 1, supports two mechanisms for MNs 112 to acquire an IP address. First, an MN 112 may acquire a permanent IP address that is configured at or on the MN 112. Alternatively, an MN 112 may acquire an IP address that the IPM Architecture allocates dynamically. It should be noted that, the expression "MN allocated IP address" is used herein to refer to an MN IP address independent of how the MN actually acquired the IP address.

In accordance with the present invention, at least five IP address allocation scenarios may be used either to allocate a permanent IP address that is configured at or on the MN 112, or to dynamically allocate an IP address by the IPM Architecture. In a first scenario, an MN 112 owned by a user 114 is provided with a permanent IP address associated with the user's home network 104B, depicted in FIG. 3. In a second scenario, a user desires to use an MN 112 which is not his/her own MN 112, and which MN 112 has a permanent IP address that is associated with a current point of attachment (associated with a visited LSF 106). In a third scenario, the user 114 desires to use an MN 112 which is not his/her MN 112, and which MN 112 has a permanent IP address that is not associated with his/her home network or the current point of attachment (associated with the visited LSF 106). In a fourth scenario, the MN 112 owned by the user 114 does not have a permanent IP address and, hence, when the user roams with his/her MN 112, the IPM Architecture will dynamically allocate an. IP address. In a fifth scenario, similar to the fourth scenario, the device the user desires to use is an MN 112 which is not his/her MN 112 and which MN 112 does not have a permanent IP address, thereby resulting in a dynamic allocation of an IP address by a network as the user 114 roams with the MN 112 through the network, as discussed above with respect to FIG. 5.

The IPM Architecture of the present invention enables an MN 112 to use either direct routing or a phenomena known as "triangle routing." Triangle routing is defined to have a data path that always passes through an anchor point between the MN and a host (e.g., a CN) somewhere in the IPM Architecture. The anchor point stays fixed throughout the entire data session irrespective of the MN's movement.

In the network of the present invention, the anchor point for the triangle route may be established at either a user's home NSF 104 or at a visited LSF 106, depending on how the user's roaming address is allocated.

If the visited LSF 106 is configured to allocate an MN IP Address, the anchor point will be in the visited LSF 106, referred to herein as an anchor LSF 106. This would result from MN allocated IP address of the LSF 106 being updated in the user's home DDNS 456. An advantage of the anchor LSF 106 allocating the IP address is that, as discussed below, a CN may send datagrams directly to the MN 112 via an MN allocated IP address that is topologically correct with the anchor LSF 106. However, there are several issues that must be addressed before a CN may send datagrams directly to the MN 112 via an LSF topologically correct MN allocated IP address.

First, as the user 114 roams and registers in new LSFs, each LSF's MN allocated IP address will replace a previous MN allocated IP address in the user's home DDNS 456. This may result in a window through which the CN may acquire a wrong IP address.

Second, since a CN's local DDNS 426 may cache the previous IP address, the CN applications will not be able to communicate with the user's application 414 or 424. This may be overcome by setting the Time To Live (TTL) contained within the record of the home DDNS 456 to zero, indicating that the CN's DDNS should not cache the IP address. When this is done, consideration must be given to the additional capacity/performance that is incurred on the network and the home's DDNS 456 since other DDNSs 456/426 of other NSF and/or LSF networks will not be caching the additional records.

Third, when a user 114 initiates a TCP/IP application with a CN on the Internet, the TCP/IP application of the node on the Internet is given the current IP address of the MN 112, which is the IP address allocated by the anchor LSF 106. When the user 114 roams with the MN 112 from the anchor LSF 106 to one or more other LSFs, the Internet node's application data will still be routed to the anchor LSF which will then forward the datagrams through as many LSFs as the user has transversed, incurring more routing hops that datagrams must transverse.

Fourth, the preceding issue of incurring additional routing hops is resolved when the user 114's session datagrams are finally terminated, at which time the anchor LSF and any other LSFs in the routing determine when they may "clean up," e.g., return the MN's IP address to the DHCP 468, remove routing information from the memory, and de-allocate all the resources used by the previous session.

If the visited MN's home NSF 104, rather than the visited LSF 106, is responsible for allocating the MN IP Address, the anchor point will be in the home NSF 104. The advantages of the NSF 104 allocating the IP address are that CNs will always have a correct MN IP. The disadvantage is that a triangle route is created with the user's home NSF 104 serving as the anchor. To alleviate this issue, the IPM Architecture of the present invention provides a mechanism to inform CNs of the LSF's/MN's COA so it can send (tunnel) datagrams directly to the MN 112 of the user 114 and avoid a triangle route. This is discussed in further detail below with respect to the Mobility Manager Framework.

If a CN does not have software to support tunneling of datagrams, the IPM Architecture of the present invention supports policies defined at the user's home NSF 106 that allow for defining where the MN IP Address is allocated. For example, such a policy may provide for the home NSF 104 to permit an LSF 106 to allocate MN IP Addresses or, if the home NSF 104 wants to "hide" the location of the roaming user 114, then the home NSF may allocate the MN's IP address. However, the home NSF 104 would preferably allocate the MN's IP address.

The IPM Architecture of the present invention also supports a policy at the NSF 104 that permits triangle routing. Such policy may be set when the NSF wants to hide the location of a user 114 from CNs.

2.2.1.3 Routing Area (RA)

Figure 7:
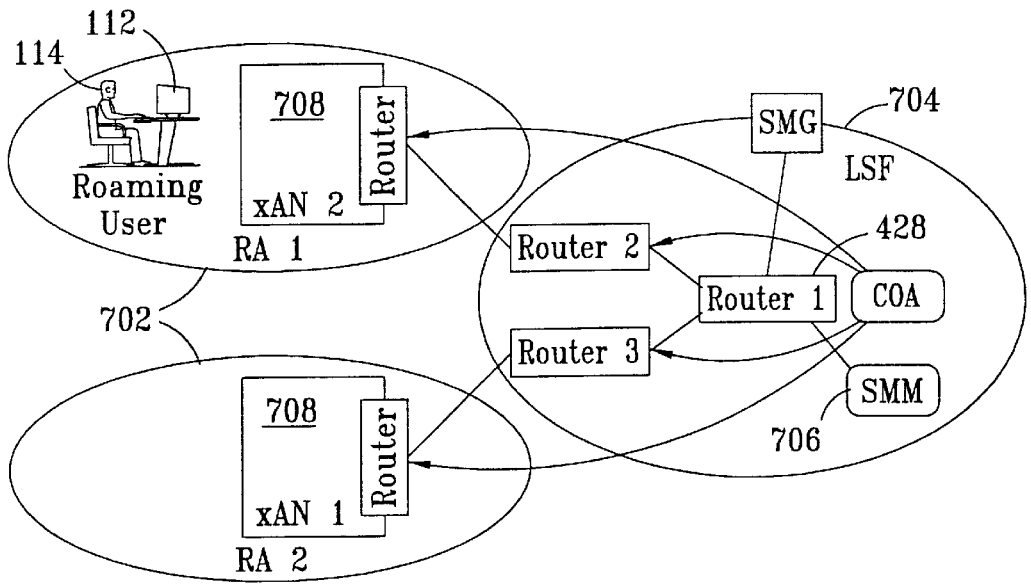
FIG. 7 shows routing areas within an LSF embodying features of the present invention.

FIG. 7 shows Routing Areas (RAs) 702 within the same LSF 704 served by a single SMM 706. The RA 702 is the sub-network point of attachment at the edge of the xAN 708. The format of an RA is a Network Access Identifier (NAI) as defined in RFC 2486. Each xAN 708 is configured to map the NAI to a set of partitions provisioned for the NAI. There may be more than one RA served by a single SMM 706.

2.2.2 Security Framework

Security is applicable to the control plane, data plane, and management plane of the IPM Architecture. Within the architecture, security is preferably provided to control plane messages, including registration messages, authentication messages, location update messages, and the like. Depending on the application and the policies defined, security is preferably provided at different levels in the data plane.

There are a number of security alternatives that are used within conventional wireless and wireline networks. The IPM Architecture of the present invention defines a security framework that consolidates all the alternatives into one framework, as discussed further below. The Internet Engineering Task Force (IETF) security work group has defined a security architecture referred to as IPSec, discussed in further detail in an Internet Draft entitled "Security Architecture for the Internet Protocol", by Steve Kent and Randall Atkinson, July 1998, and has defined the associated protocols and cryptographic algorithms to support it.

IPSec affords at least five services. First, a security service referred to as Access Control prevents unauthorized use of a resource. A second service, referred to as Connectionless Integrity, detects modification of an individual datagram, without regard to the ordering of the datagram in a stream of traffic. Third, a security service referred to as Data Origin Authentication, verifies the identity of a claimed source of data. Fourth, a security service referred to as Replay Protection prevents data from being intercepted and/or for intercepted data to be used at a subsequent time to gain access. Fifth, a security service, referred to as Confidentiality, protects data from unauthorized disclosure. The foregoing five services are considered to be well-known in the art and, therefore, will not be described in further detail herein , except insofar as necessary to describe the present invention.

Two protocols have been specified to provide the foregoing five IPSec services. First, a preferred protocol is referred to as Authentication Header (AH) described by R. Atkinson, in an article entitled "IP Authentication Header", RFC 1826, August 1995. Second, an alternative protocol is Encapsulated Security Payload (ESP) described in an article entitled "IP Encapsulating Security Payload" by R. Atkinson, RFC 1827, August 1995. In the architecture framework of the present invention, IPSec is the preferred security architecture because. IPSec provides interoperable, high quality, cryptographically based security for IPV4 and IPV6 at the IP layer. Furthermore, IPSec may be used in a many ways to implement VPNs, tunneling, security, and firewall transversals. IPSec is preferably used within the control plane and data plane of the security framework.

2.2.2.1 Network Security Associations

Figure 8:
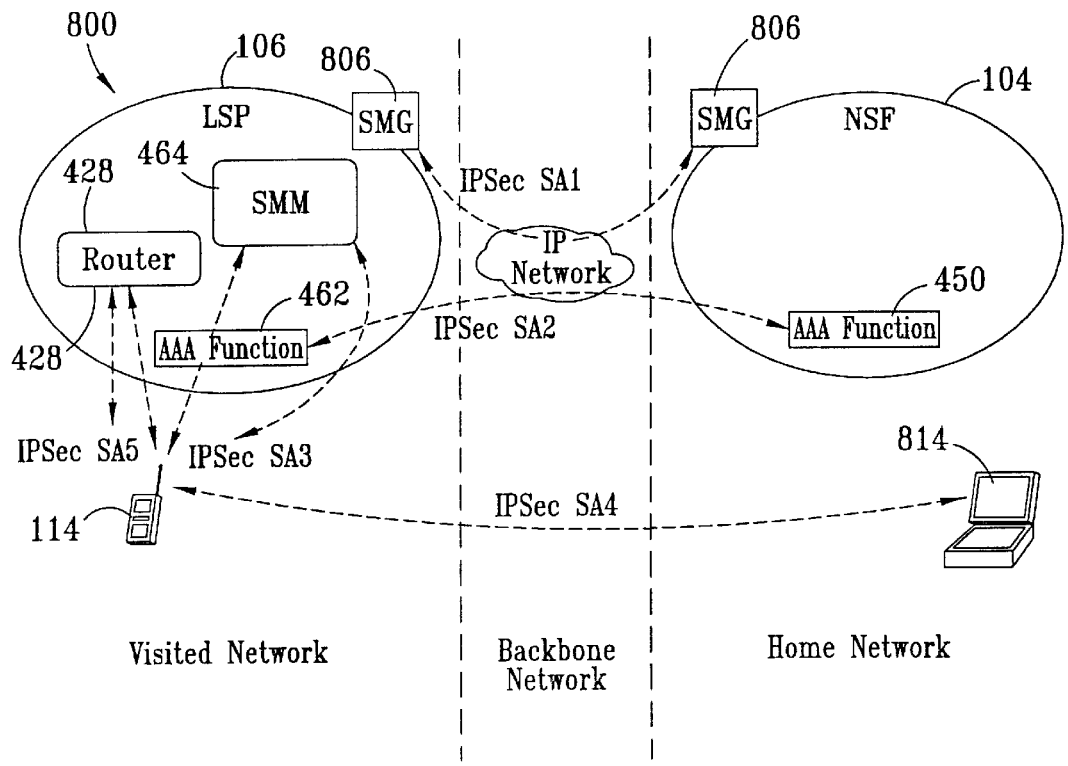
FIG. 8 shows a security framework embodying features of the present invention.

FIG. 8 depicts network security associations within an IPM Architecture 800 of the present invention, comprising an LSF network 106, an NSF network 104, and security messaging gateways (SMGs) 806, and wherein a user is roaming with an MN 114 in a visited LSF 106. As discussed below, at least five Security Associations (SA) may exist in the context of the IPM Architecture 800.

First, an SA may exist as an IPSec SA between SMGs of (1) LSFs and (2) LSFs and NSFs, as exemplified in FIG. 8 by an IPSec SA1. For example, an IPSec SA1 is shown connected between the SMGs 806 and protects all data that flows between the networks 104 and 106. An SA between SMGs is always in tunnel mode and uses ESP (RFC 2406). As shown in FIG. 8, the LSF network 106 is the network a user MN 112 is currently visiting. The NSF network 104 is the home network for the user 114. The IPSec SA1 between the SMGs 806 of the two networks 104 and 106 is preferably set up on a permanent basis, as per a roaming agreement established between the two networks. While FIG. 8 only shows the IPSec SA1 as between the LSF 106 and the NSF 104, the IPSec SA1 may also exist between multiple LSFs 106.

Second, an SA may exist between AAA function functions of two networks. Even though there is security between the LSF 106 and the NSF 104 via the SMGs 806, the respective AAA functions 462 and 450 have their own SAs, depicted in FIG. 2 as IPSec SA2. The IPSec SA2 is setup for end-to-end AH authentication to allow for verifying the networks 106 and 104. However, IPSec SA2 may also employ ESP to provide for data integrity. The IPSec SA2 is preferably set up on a permanent basis, as per a roaming agreement established between the two networks 104 and 106.

Third, an IPSec SA3 may be established between the MN 114 and the SMM 464 in the LSF 106. The IPSec SA3 allows for encrypting data via ESP. The IPSec SA3 is preferred if the access to the network LSF 106 is unsecured (e.g., wireless without encryption or cable modem).

Fourth, depending on security policies defined, an IPSec SA4 may be established between the MN 112 and a CN 116, preferably in the data plane. The IPSec SA4 between the MN 112 and the CN 116 that the MN is communicating with protects the traffic between the two entities. It should be noted, though, that the existence or non-existence of the IPSec SA4 is transparent to the IPM Architecture.

Fifth, depending on the security environment at the LSF 106, the MN 112 may establish an IPSec SA5 with an edge router 816 of the visited LSF network 106 for securing its data path. The IPSec SA5 will ensure secure data transfer between the MN 112 and the edge of the LSF network 106 being accessed.

The NSFs 106 preferably have service roaming agreements between one another and hence have security associations established between the SMGs of their respective NSFs and LSFs. For example, in FIG. 9, where IPSec SAs are designated schematically by dashed lines with arrows, the NSF 104 may have an SA with the LSFs of the integrated LSF/NSF 202, and the LSF/NSF 202 may have SAs with LSFs 106 of the NSF 104. The SAs are preferably initially pre-configured when the SLA is established or, alternatively, the SAs may be initially dynamically established via Internet Security Associations and Key Management Protocol (ISAKMP). SAs may also be established between LSFs 106 in order to manage inter-system handoffs in a secure fashion.

SAs of the type described herein are more fully disclosed and discussed in co-pending U.S. patent application Ser. No. 09/595,551, entitled "SECURITY FRAMEWORK FOR IP MOBILITY SYSTEMS USING VARIABLE BASED SECURITY ASSOCIATIONS AND BROKER REDIRECTION", filed Jun. 16, 2000 on behalf of Basavaraj B. Patil, et al, (Attorney Docket No. 10726RRUS02U) which is hereby incorporated in its entirety by reference.

2.2.2.2 Security Between a Network's LSF(S) and NSF

Figure 9:
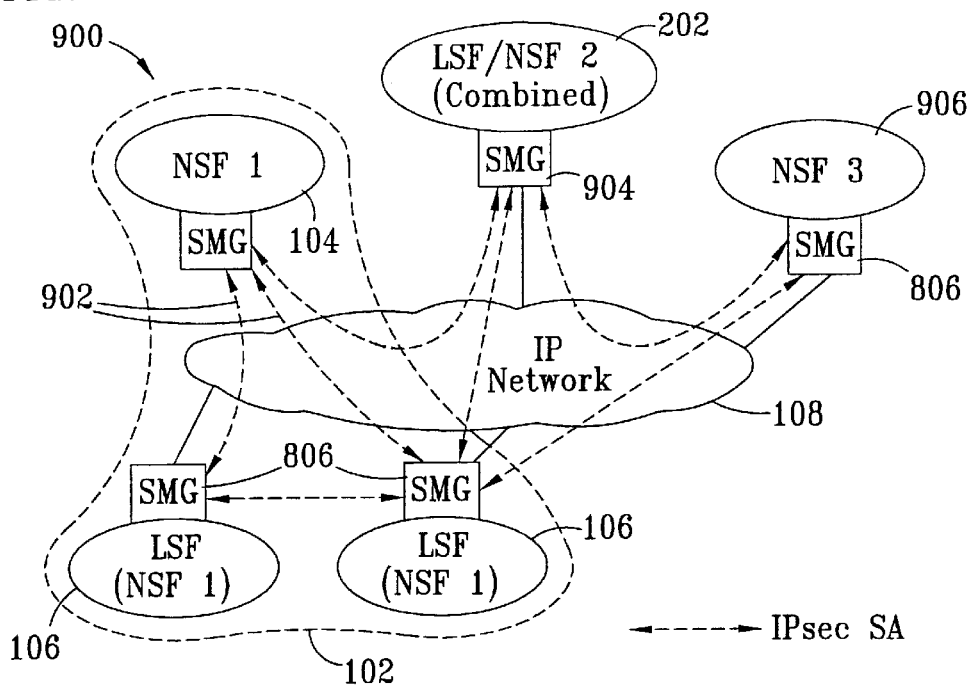
FIG. 9 shows security associations (SAs) between LSFs and NSFs embodying features of the present invention.

A home network 102 may comprise a number of LSFs 106 associated with an NSF 104. Each LSF 106 and NSF 104 may be treated as a private subnet that is protected by an SMG. The LSFs 106 have an SA in place between their SMGs and the NSF's SMG. In FIG. 9, this is shown by the SAs 902 between NSF 104 and the LSFs 106 shown in dashed outline 102. The NSF 104 combined with the LSFs 106 shown in dashed outline 102 may constitute a home network, or a virtual private network (VPN).

An integrated network 202 also has LSF and NSF functions combined, i.e., the components are physically located together. In such a scenario, the LSF/NSF network 202 has an SMG 904 that protects its network from the IP Network 108.

An NSF, such as the NSF 906, may not control any LSFs 106. In such case, users 114 of the NSF 906 will always be in other systems when it roams.

2.2.2.3 Security in the Data Plane

Figure 10:
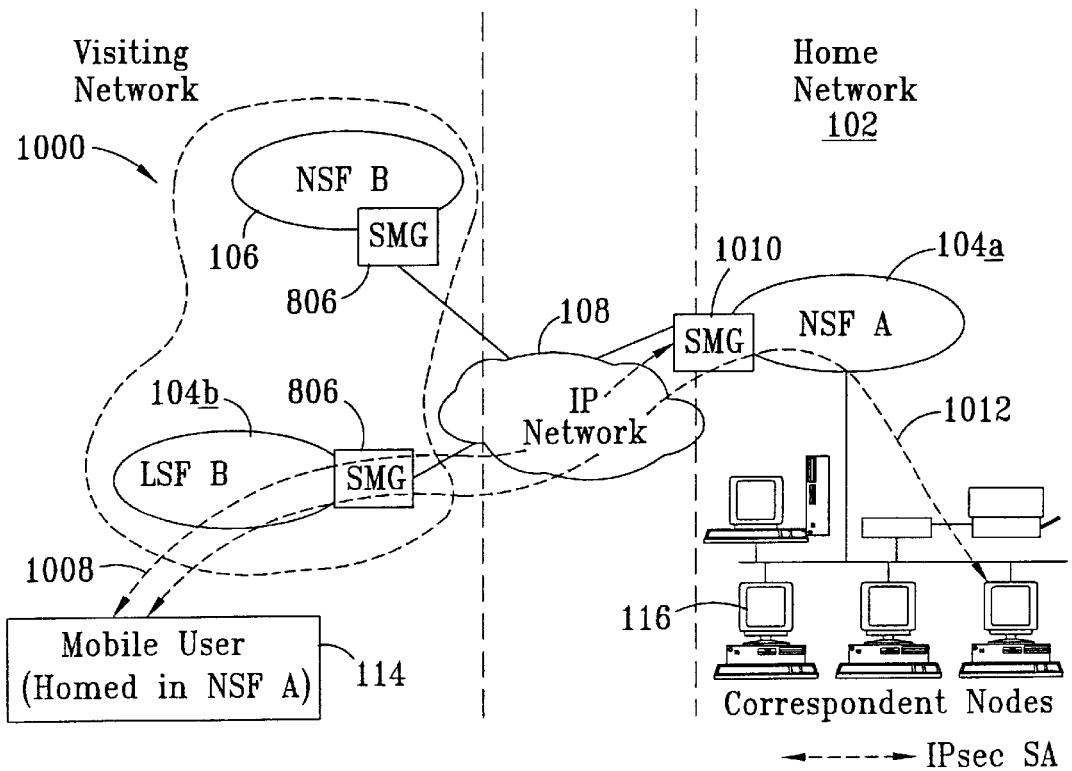
FIG. 10 shows Mobile Node (MN) and Correspondent Node Security embodying features of the present invention.

FIG. 10 shows IPM architecture 1000, having a user 114 roaming in an LSF 106b and homed in a private network 102 NSF 104a. The user 114 wishes to establish a session with a Correspondent Node (CN) 116 within his/her home NSF 104a. To establish the session, the user 114 establishes an IPSec SA 1008, designated schematically by dashed lines with arrows, with the home NSF 104a to which an SMG 1010 has access. Such IPSec SA 1008 permits the SMG 1010 to validate IPSec AH datagrams sent by the user 114

MN 112 to the home network 102. The SA 1008 is preferably pre-configured at the MN 112 and the home NSF 104a to allow the user 114 to roam. If a roaming user 114 wants to contact CNs 1004 in other private networks, each of the private networks must have an SA established with the user 114 to permit the user to traverse the network's SMG.

If end-to-end security (e.g., encryption) between the MN user 114 and another user (not shown) were mandated based on decisions established by the home networks 102 of respective users 114, then the MN user 114 would establish an IPSec SA 1012 with the CN 116. Such an IPSec SA 1012 may be dynamically established at the time of session connection via ISAKMP, or the SA may be pre-configured. It should be noted, however, that the existence or non-existence of such IPSec SA 1012 is transparent to the IPM architecture framework 1000.

2.2.2.3.1 Protection of MN Location

Security policies associated with an MN 112 may warrant a home NSF 104 to not disclose the MN's current network point of attachment to CNs. In such cases, CNs may send datagrams destined to the MN 112 through the user's home network 102. The home network 102 is responsible for tunneling the datagrams to the LSF 106 currently serving the MN 112.

2.2.3 Authentication, Authorization, and Accounting (AAA) Framework

Figure 11:
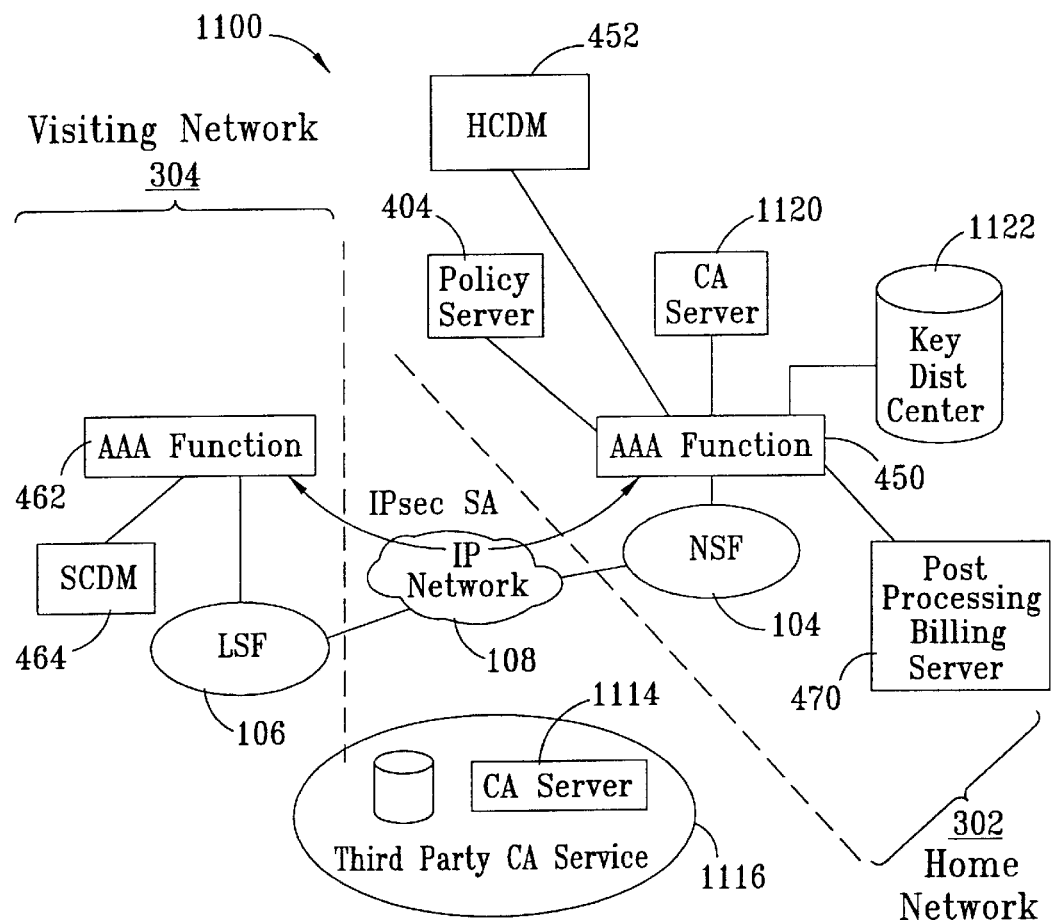
FIG. 11 shows an AAA framework embodying features of the present invention.

FIG. 11 illustrates an IPM Architecture framework 1100 that utilizes an AAA protocol for performing authentication, authorization, and accounting operations. An AAA protocol provides a common messaging scheme, defined by standards, used between networks. The IPM architecture framework 1100 includes a visited network 304 and a home network 302, and is based on requirements established by the AAA Business Operations Framework (BOF) that exists within the Internet Engineering Task Force (IETF). The AAA protocol is extensible so that it may define other functions and provide solutions to different problem domains. In the architecture framework 1100 of the present invention, a Diameter-based AAA with extensions for IP mobility is preferred, though another AAA protocol such as Radius may also be used. Both Diameter and Radius are considered to be well-known in the art and, therefore, will not be discussed in further detail herein, except insofar as necessary to describe the present invention.

AAA services are accessed through AAA functions 450 and 462 which, while not providing the function of Authentication, Authorization or Accounting, do provide an interface to the appropriate servers that implement AAA functions. The AAA functions 450 and 462 provide a standard means for addressing AAA messages sent between NSFs and LSFs, respectively, and, to that end, are located at the NSF 104 and LSF 106 shown in FIG. 11.

The AAA function 462 at the LSF 106, using the Network Access Identifier (NAI) received from an MN, is responsible for determining the NSF 104 that is home to a user 114 and for forwarding AAA messages to that user's home NSF 104.

The AAA function 450 at the NSF 104 presents an integrated AAA interface (through a single IP address) to the rest of the IP Network 108 and is configured for forwarding AAA messages to the appropriate function within the NSF 104 (FIGS. 4A, 4B, 4E, and 4F) responsible for a particular function. This allows an operator-specific internal architecture of an NSF 104 to be hidden from other NSFs and LSFs and provides a homogeneous interface for the IPM Architecture.

A mobility extension to the AAA protocol enables mobility manager components, e.g., the SMM 464 in the LSF 106 and the HMM 452 in the NSF 104, to communicate with each other. The AAA functions 450 and 462 provide a secure means of exchanging mobility related control messages. The SMM 464 and HMM 452 interface to respective AAA functions 462 and 450 via the mobility extension for their communication. Security between AAA functions 450 and 462 is based on IPSec.

2.2.3.1 Authentication

Figure 4E:
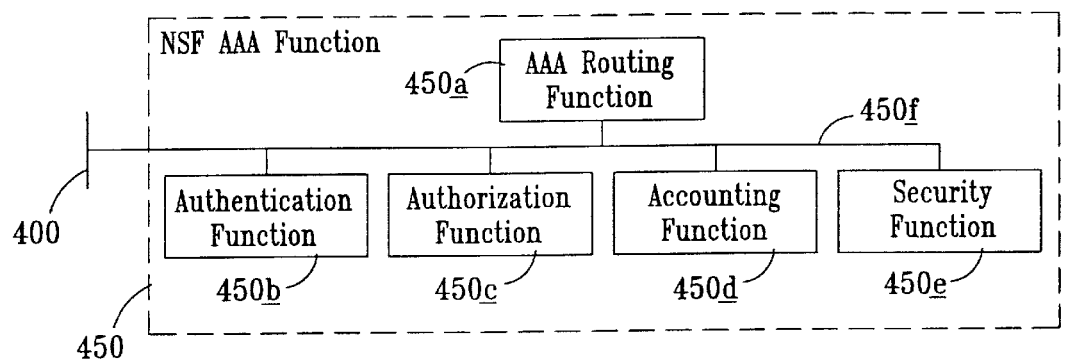
FIGS. 4E and 4F show the component functions of NSF and LSF AAA functions, respectively.
Figure 4F:
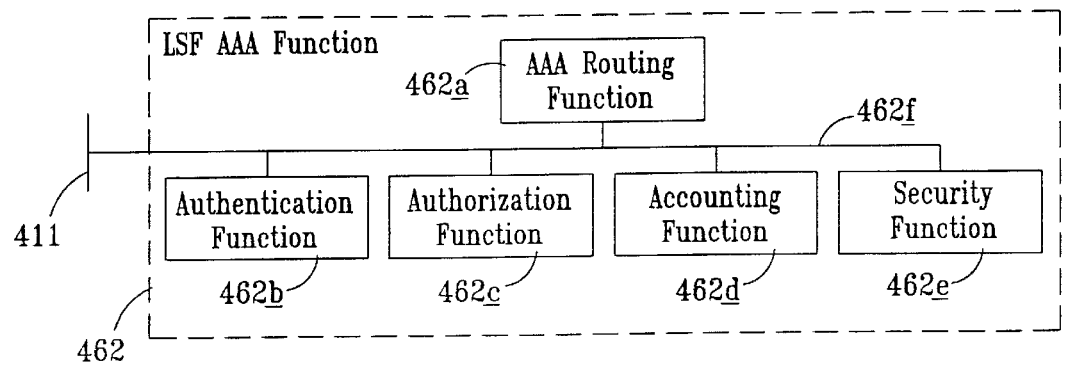

Authentication in the context of the present invention exemplified in the IPM Architecture AAA framework 1100 refers to authentication of an MN 112 and its user 114 by the authentication functions 450b and 462b (FIGS. 4E and 4F). Authentication of a user 114 is a process of validating the identity of the user 114, and includes a combination of certificate authority (CA) 1116, a key management system, and digital signature verification services. The authentication functions 450b and 462b interface with respective AAA functions 450 and 462 and validate authentication requests by MN users 114 as they access a network from either the home network 302 or the foreign (visiting) network 304.

Conventional networks support two types of authentication methods, namely, strong authentication and weak authentication. Strong authentication is preferred in the present invention for use by the authentication functions 450b and 462b, and makes use of symmetric and asymmetric public key cryptography techniques. Examples of strong authentication include the use of digital signatures, public key cryptography using x.509 certificates, and the like. Weak authentication includes systems that use password-based protection mechanisms. The core network 101 (FIG. 1) preferably supports multiple types of authentication mechanisms.

The AAA authentication functions 450a and 462a are front-ends or relays that securely carry authentication parameters of a user 114 from the LSF 106 of the visited network 304 to the home network 302 where the user 114 may be authenticated. The authentication function 450b supports existing authentication protocols, such as PAP, CHAP, EAP, and the like. These functions may be provided by a RADIUS server, by an x.509 based CA, by an Authentication function in a wireless network, or the like. If the Authentication function 450b uses x.509 certificates, then a Certificate Authority (CA) 1114 may be a third party CA 1116. The NSF 104 may also have it's own CA 1114 in order to authenticate certificates.

As a result of advances made in cryptography, as well as for security reasons, digital signatures and x.509 certificates for authentication are preferred in the present invention.

2.2.3.2 Authorization

Authorization is a process performed by the authorization functions 450c and 462c for determining which services and resources a user 114 is allowed to use. It is based on policies defined for the user and for the requested resource or service. Authorization may occur during authentication, or as a separate process. An authorization function 450c or 462c may consult the policy server 404 or 412, respectively, that contains a user 114's profile, including services that the user has subscribed to.

2.2.3.3 Accounting

The accounting aspect of AAA is performed by the accounting functions 450d and 462d to transport accounting records generated for the user 114 in a visited system, such as the visited network 304. An accounting entity in the xAN 110/LSF 106 generates records that contain such information for each MN 112 user 114 served by a network 302 or 304. The AAA function 450d or 462d is used as a front-end or relay to securely carry the accounting records from the visited network 304 to the accounting function 450d in the user's NSF 104 or, alternatively, to an accounting function in the accounting service bureau 470 (FIG. 4B), if the bureau 470 supports an AAA accounting protocol.

The accounting functions 450d and 462d are back-end servers that store the network usage records of MN users 114. The AAA function 450 in the NSF 104 interfaces with the accounting function 450d to transfer accounting records generated by the LSFs 106 and/or the NSF 104. The accounting messages defined for AAA may carry the actual records or may provide a means to initiate the transfer of records in bulk. Since accounting records are the source of revenue to service providers (i.e., owners of an NSF 104 and/or LSF 106), security must be provided between the links that are involved in the transfer of accounting records.

An Accounting function not shown may also be located on the Internet, and be hosted by the Accounting Service Bureau 470 (FIG. 4B). In such a scenario the AAA Accounting function 450d in the NSF 104 would interface with the Accounting function in the service bureau 470. A security association (SA) may be established between such entities to protect data.

The Accounting functions 450d and 462d may in turn interface with billing servers 402 or 432, respectively, in an hierarchical manner.

2.2.3.4 Mobility

The mobility manager components SMM 464 and the HMM 452 of the IPM Architecture framework 1100 use the AAA protocol for its control plane messaging. The AAA protocol preferably includes support for mobility control messages. The mobility manager components SMM 464 and HMM 452 of the respective LSF 106 and NSF 104 interface to the AAA functions 462 and 450 in their respective domains.

2.2.3.5 AAA Functions Locations in the Network

Figure 12:
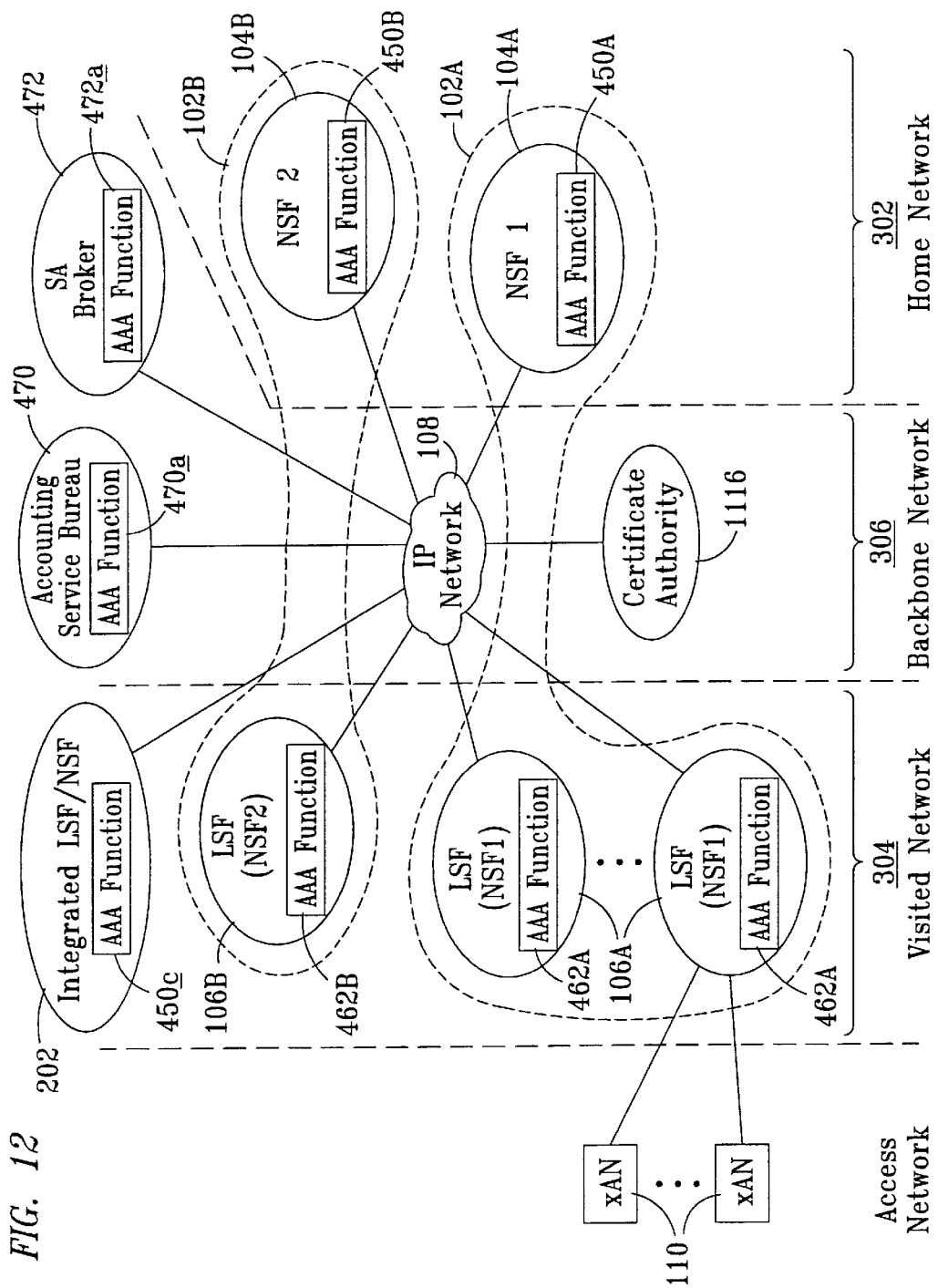
FIG. 12 shows AAA function locations in a network embodying features of the present invention.

FIG. 12 shows various configurations of AAA functions in an IPM Architecture framework 1200 embodying features of the present invention. The framework 1200 includes the IP Network 108 through which are connected NSFs 104A and 104B, and respective LSFs 106A and 106B, the integrated LSF/NSF 202, the Accounting Service Bureau 470, the Security Agreement Broker 472, and the CA 1116. The NSFs 104A and 104B include respective AAA functions 450A and 450B, and the LSFs 106A and 106B include respective AAA functions 462A and 462B. The NSF 104A and LSFs 106A constitute a network 102A, and the NSF 104B and LSF 106B constitute a network 102B. The Accounting Service Bureau 470, and the Security Agreement Broker 472 include respective AAA functions 470a and 472a. A number of xANs 110 are shown connected to an LSF 110, and may be similarly connected to any of the LSFs 106A or 106B, or to the integrated LSF/NSF 202.

When an entity of the LSF 106A, 106B or 202, such as the AAA function 462 or the mobility manager SMM 464, performs an AAA function, that entity generates an AAA message and sends it to a "local" AAA function. The "local" AAA function is defined with respect to FIG. 12 as the AAA function 462A, 462B, or 450C located at the LSF 106A, 106B, or 202, respectively, of the visited network 304, or the AAA function 450A or 450B located at the NSF 104A or 104B, respectively, of the home network 302, to which an MN 112 interfaces. The local AAA function is responsible for routing the AAA message to the MN user 114's home AAA function, such as the AAA function 450A or 450B, or, alternatively, for accounting, it may be routed to the AAA function 470a in the accounting service bureau 470. The type of routing of AAA messages described herein is more fully disclosed and discussed in co-pending U.S. patent application Ser. No. 09/551,811 and now pending, entitled "Apparatus and Method for Routing AAA Messages Between Domains of a Network", filed on behalf of Haseeb Akhtar, et al, on Apr. 18, 2000 which is hereby incorporated in its entirety by reference.

The "local" AAA function thus determines where to send an AAA message. The "local" AAA function uses the domain portion of the user's NAI to identify the home network 302 of the user 114. If a service agreement (SA) is established between a respective NSF 102A or NSF 102B of the home network 302 and a respective LSF 106A or 106B or the LSF/NSF 202 of the visited network 304, the AAA message. is forwarded to the home AAA function 104A or 104B of the user 114. If there is no roaming agreement (i.e., no SA) between the networks, the visited network 304 may, depending on its policy 412, forward the AAA message to the AAA function 470a of the service bureau 470.

The accounting service bureau 470 is an organization that has established service level agreements (SLAs) with other network service providers (i.e., owners of NSFs) and/or other service bureaus (such as 472). The SLAs permit MNs 112 to roam between NSF and LSF networks that have not directly entered into SLAs with each other. In a global roaming scenario it may not be possible for an NSF 104 to enter into SLAs with every other NSF in the world. Therefore, having entered into an SLA with a Service Agreement Broker 472 may increase the scope of roaming that a user 112 of an MN 114 may enjoy through its NSF 104.

It may be desirable to locate the "local" AAA function, that would otherwise be located at a respective LSF, at a visited system's NSF 104A or 104B when the service provider of the respective NSF owns a number of LSFs to avoid incurring the cost of an AAA function 462 in every LSF. However, depending on where the NSF 104 is located, e.g if the location of the NSF necessitates that a message from the LSF to the NSF traverse a public IP-based network such as the Internet, the service provider will need to determine whether to provide secure links, such as an IPSec link, between the AAA function 462 located at the NSF 104, and LSF 106 components, such as the SMM 464. Alternatively, security between an LSF and NSF may be provided by an AAA protocol configured to only forward AAA messages to the NSF 104A or 104B, which then performs a domain lookup to forward the AAA messages to the user's home NSF 104A or 104B. In still another alternative, a service provider of an LSF 106A or 106B may use the AAA function 472a of the Broker 472 as its "local" AAA function.

2.2.3.6 Security in the AAA Framework

Figure 13:
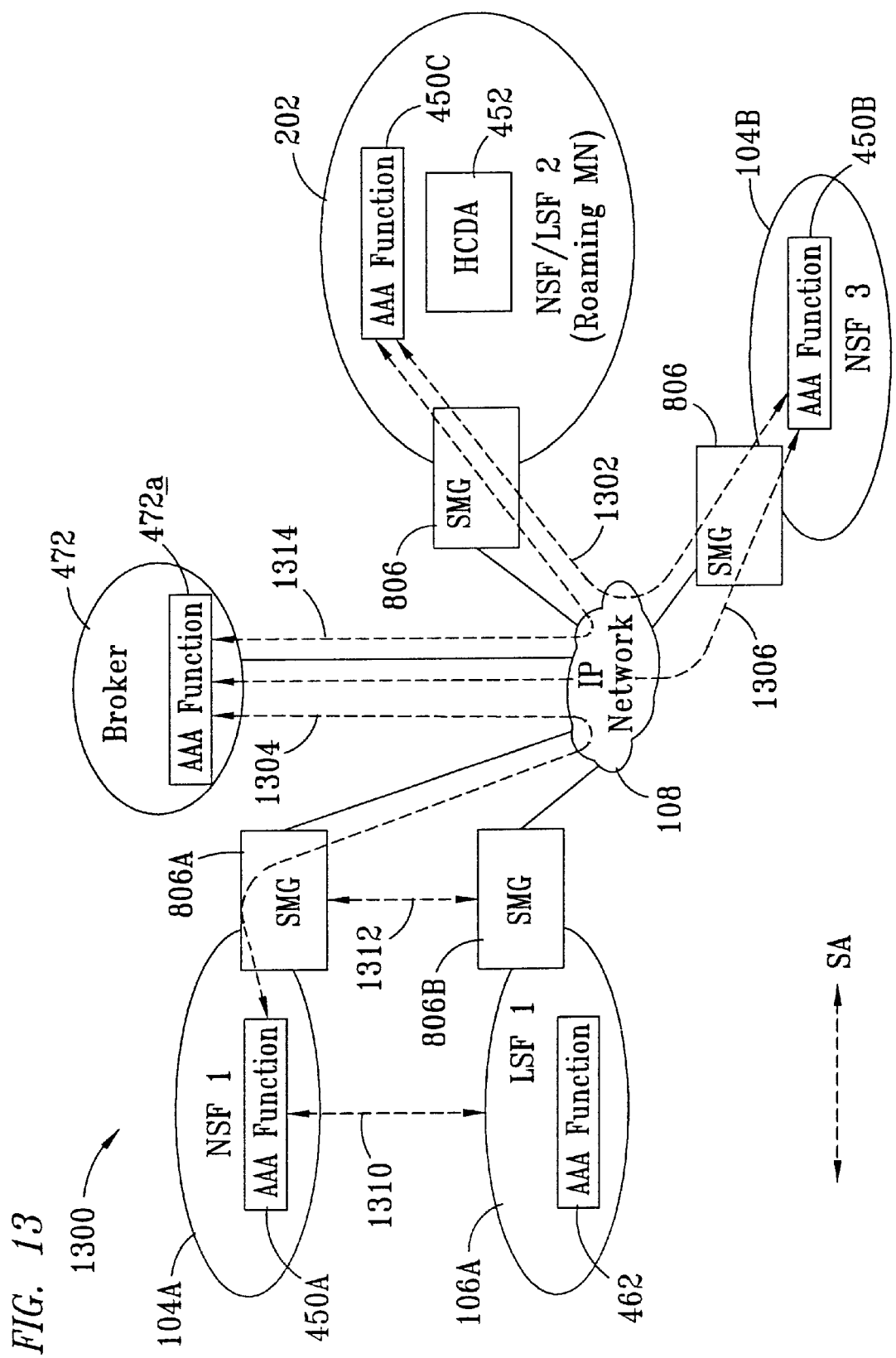
FIG. 13 shows security for AAA functions embodying features of the present invention.

FIG. 13 exemplifies security associations (SAs) that may be provided on a one-to-one basis between AAA functions in an IPM Architecture framework 1300 embodying feature of the present invention. SAs are represented in FIG. 13 as dashed lines with arrows on each end of the line. For example, FIG. 13 depicts an SA 1302 between an AAA function 450C of an NSF 202 and an AAA function 450B in an NSF 104B. SAs are setup for end-to-end authentication using IPSec's AH to allow for verifying a network's authenticity. However, an SA may also employ ESP to enhance data integrity. An SA is preferably set up on a permanent basis, in accordance with a roaming agreement, e.g., an SLA, established between the two networks.

In FIG. 13, a number of different types of NSFs are depicted: an NSF 104A having separate LSFs 106A, an NSF 202 having an integrated LSF, and an NSF 104B having no access networks.

The SA 1302 between the NSF 202 AAA function 450C and the NSF 104B AAA function 450B enables users of the NSF 104B to roam into the NSF 202 network. When users of the NSF 104B roam into LSF 106A, however, the NSF 104A is not able to identify the user's domain (i.e., home NSF) because the NSF 104A does not have an SLA established with the NSF 104B. However, an SLA and an IPSec SA 1304 are established between the NSF 104A and the Service Agreement Broker 472, thereby creating a trust relationship therebetween. Hence, the NSF 104A may relay AAA messages to the AAA function 472*a* of the Broker 472.

An SLA and an SA 1306 are also established between the Broker 472 and the NSF 104B. Therefore, the broker 472 is able to forward the AAA message received from the NSF 104A to the NSF 104B. Because of the SLAs between the NSFs 104A and 104B and the broker 472, the broker 472 is able to forward all requests between the NSF 104A and the NSF 104B.

The broker 472 may remove itself from being the "middle man" for forwarding requests, by using ISAKMP to negotiate the creation of an SA (not shown) between the AAA function 450A of the NSF 104*a* and the AAA function 450B of the NSF 104B. Once the SA is established, the NSF 104A and the NSF 104B may communicate directly to each other.

Also shown in FIG. 13 are an SA 1310 between the LSF 106A and the NSF 104A, an SA 1312 between the SMGs 806A and 806B, and an SA 1314 between the AAA function 450C and the AAA function 472*a*.

2.2.4 Mobility Manager Framework

As mentioned above, the IPM Architecture of the present invention also includes a mobility manager framework. The mobility manager framework supports nomadic roaming users and roaming MN users who roam into wireline networks and wireless networks.

The term "nomadic users" is used herein to refer to users who, when they move from a first location to a second location, physically disconnect from a first point-of-attachment at the first location, and then physically re-connect at a second point-of-attachment at the second location. Nomadic users normally connect to wireline access networks, e.g., LAN connections and dialup connections.

In contrast to the term "nomadic users", the term "MN users" is used herein to refer to users who do not need to disconnect from a point-of-attachment when they roam. MN users normally connect to wireless access networks, e.g., NAC, GSM, and the like.

Conventionally, wireline networks and wireless networks each have their own unique infrastructures to achieve their respective user mobility. According to C. Perkins, editor of "IP Mobility Support", RFC 2002, October 1996, wireline networks use mobile IP to support user mobility, and the wireless networks use either NAC or GSM/UMTS standards. In contrast to conventional networks, the mobility manager framework of the present invention insures that there is seamless user mobility between wireline networks and wireless networks.

As discussed in further detail below, the mobility manager framework (including for example the SMM 464 and HMM 452) supports a number of functions, including, such as, for example, protocol interfaces between network components (e.g., as shown in FIGS. 4A and 4B), unique identification of users, user security, network security, user location tracking, user packet data service activation to one or more service providers from the same device, user packet data service deactivation, user/MN context management, inter system (inter LSF) handoffs, intra system (intra LSF) handoffs between two xRANs, unified directory service that contains user profiles, roaming MN address resolution, IP router configurations, and mobility interface to the wireline networks.

2.2.4.1 Protocol Interfaces Between Network Components

Figure 14:
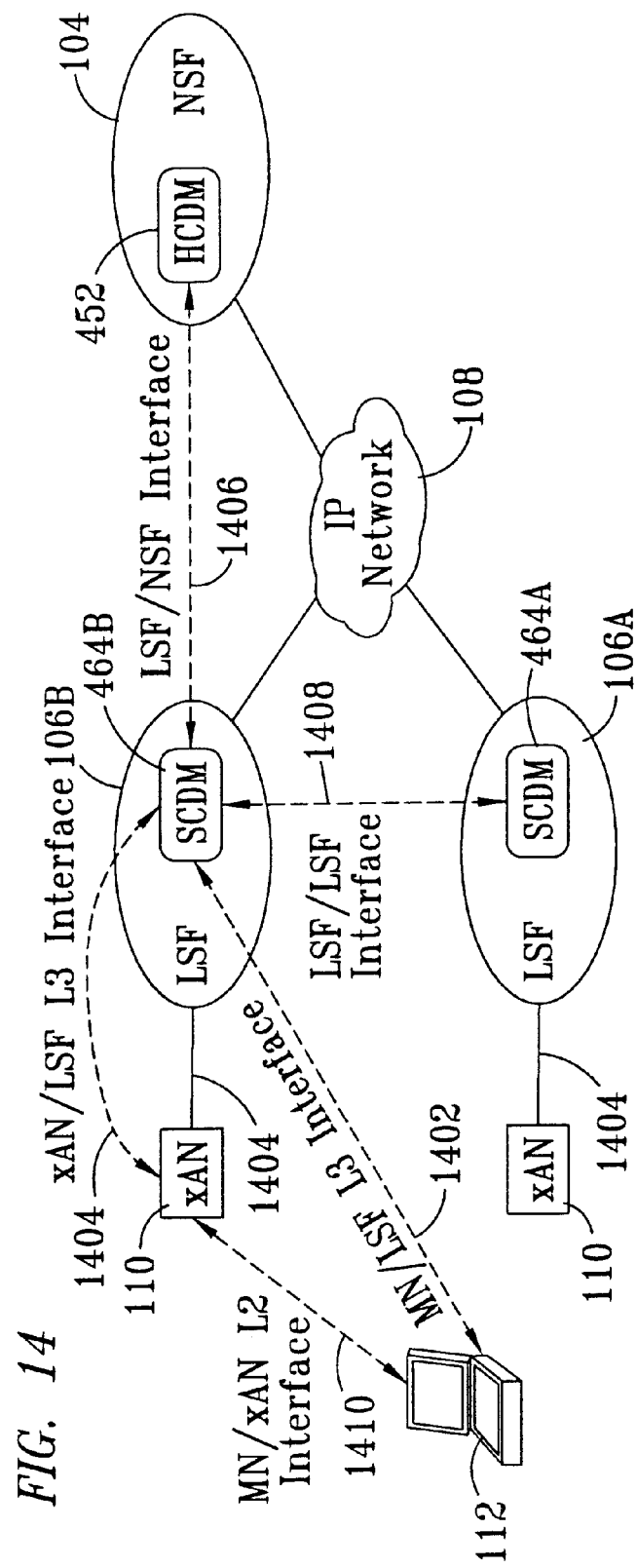
FIG. 14 shows interfaces embodying features of the present invention.

As users 114 roam between heterogeneous access LSF and NSF networks, the access media used by the user 114 is very specific to the access type, e.g., GSM has air interface characteristics, dialup connections have wireline dialup characteristics, and the like. As a consequence of the different characteristics, each of the access networks has its own access protocol. However, to seamlessly integrate different access networks, the protocols needed between several interfaces are defined so that user mobility may be supported throughout the network. FIG. 14 depicts an IPM Architecture network 1400 having four of these interfaces between which protocols are defined.

First, in accordance with the present invention, a protocol is defined for a interface between the MN 112 and an LSF 106B, depicted in FIG. 14 as an MN/LSF interface 1402. The protocol that defines the interface 1402 is a Layer 3 protocol that enables users 114 to request access to the network 1400 through the LSF 106A and to obtain IPM services. With respect to the interface 1402, the network 1400 uses a mobile IP protocol as a base protocol with a number of enhancements to support functionality of the IPM, as discussed in further detail below with respect to FIGS. 21–63.

Second, in accordance with the present invention, a protocol is defined for a interface between the xAN and LSF, depicted in FIG. 14 as an xAN/LSF interface 1404. The protocol that defines the xAN/LSF interface 1404 is a Layer 3 protocol that translates xAN-LSF messages into MN-LSF messages so that an MN may communicate with an LSF using IPM messages, and a user 114 may thereby roam within a LSF and between LSFS. The xAN/LSF interface 1404 is described in further detail below with respect to FIGS. 20A–63.

Third, in accordance with the present invention, a protocol is defined for an interface between LSFs and NSFs, depicted in FIG. 14 as an LSF/NSF Interface 1406. The protocol that defines the interface 1406 provides information for user location tracking and for providing user profile information between the SMMs 464A and 464B and the user's HMM 452.

Fourth, in accordance with the present invention, a protocol is defined for an interface between LSFs 106A and 106B, depicted in FIG. 14 as an LSF/LSF Interface 1408. The protocol that defines this interface provides information for coordinating seamless mobility between two LSFs. The LSF/LSF Interface 1406 is described in further detail below with respect to FIGS. 21–63.

It is noted that a conventional interface is defined between the MN 112 and an xAN 110, depicted in FIG. 14 as an MN/xAN interface 1410. The interface 1410 is defined by a Layer 2 protocol and uses any interface, such as, for example, NAC, GSM, DSL, IEEE 802.3, IEEE 802.11, and the like.

In light of the foregoing, the present invention enables an MN 112 to communicate with an LSF 106 at the Layer 2 level via the MN/xAN interface 1410 and the xAN/LSF interface 1404, and at the Layer 3 level via the MN/LSF interface 1402.

Two alternatives exist for defining the protocols for the LSF/NSF interface 1406 and the LSF/LSF 1408 interfaces described above. A preferred alternative is to extend the AAA protocol to support the required mobility functions SMM 464 and HMM 452. A second alternative is to define a protocol that is independent of the AAA protocol.

The mobility framework of the present invention extends the AAA protocol to include an SMM 464 and an HMM 452, for at least two reasons: first, the AAA protocol (preferably based on Diameter) is an extensible protocol that already includes many basic AAA functions and, second, the SMM 464 and an HMM 452 may take advantage of the AAA function's security associations.

2.2.4.2 User and Network Mobility Security

Figure 15:
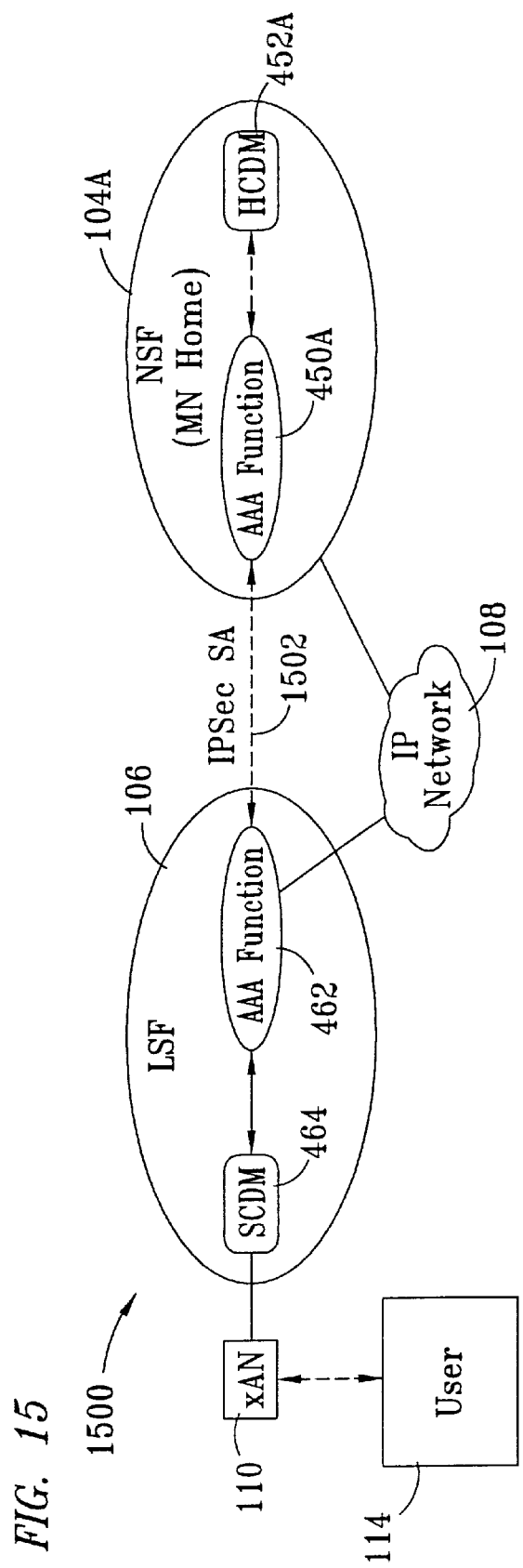
FIG. 15 shows a mobility Security Association (SA) between LSF and Home NSF AAA functions embodying features of the present invention.

FIG. 15 shows a network 1500 having an LSF 106 being accessed by a roaming user 114. Prior to being accessed, the LSF 106 must determine whether the user 114 is a valid user. To make such a determination, two levels of security must preferably be established. First, the user 114 and a home NSF 104A should establish an IPSec SA 1502 that is used to authenticate the user 114. Second, the LSF 106 and the NSF 104A must have an IPSec SA 1502 that is used to validate whether the LSF 106 and NSF 104A have a service level agreement (SLA) established between them.

The SA 1502 established between the user 114 and the home NSF 104A may support one of a number of different types of authentication algorithms: preferably, digital certificates or, alternatively, symmetric keys, asymmetric keys, or the like. Hence, when a user accesses an LSF 106, the MN 112 will need to send the user's digital signature and the NAI to the xAN. The LSF sends this information to the home NSF so that the home NSF can authenticate the user. The home NSF uses the NAI to access the user's profile in a directory service and initiate the user's authentication.

Alternatively, the LSF 106 may determine whether the user 114 is a valid user by requesting that the home NSF 104A of the user 114 send to the LSF 106 authentication information, such as, for example, the user's private key, so that the LSF 106 may authenticate the user 114. In still another alternative, the integrated LSF/NSF 202 may support the concept of a unique authentication challenge (similar to the CHAP unique challenge).

The SA 1502 between the LSF 106 and the NSF 104A is established when the LSF and NSF execute their SLAs. The SA 1502 is based on IPSec. FIG. 15 thus depicts an option for a mobility SA between a serving LSF 106 and the MN User's home NSF 104A when the LSF 106 has an AAA function 462.

Figure 16:
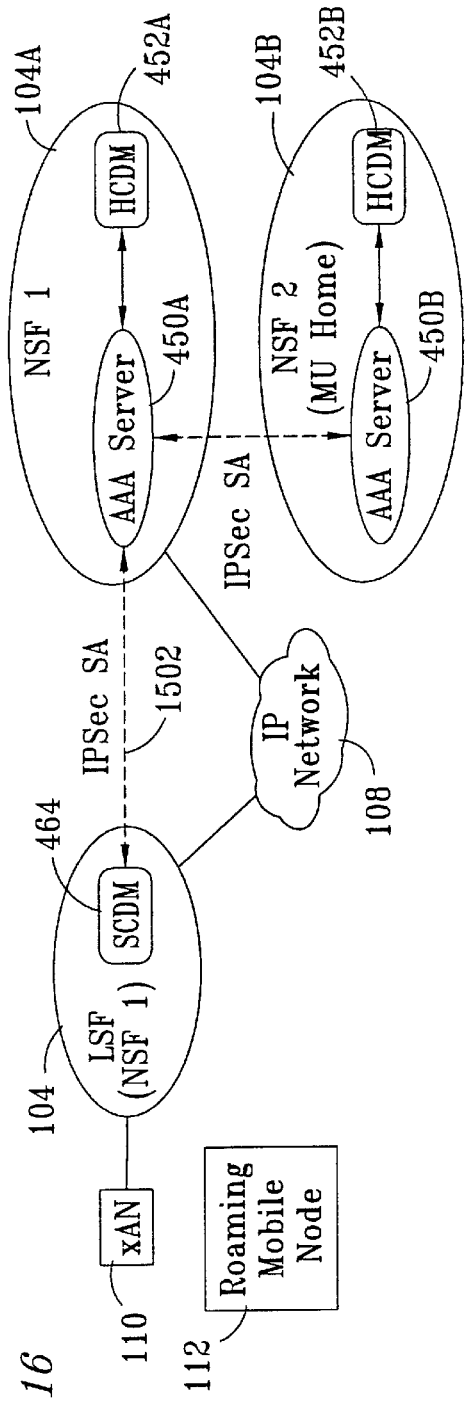
FIG. 16 shows mobility SA between NSFs embodying features of the present invention.

FIG. 16 is similar to FIG. 15, but for the addition of an NSF 104B which is designated as the home NSF of the user 114, and an IPSec SA 1602 established between the AAA function 450A and the AAA function 450B. The AAA function 450B is then utilized by an LSF 106 to authenticate the user 114.

If the user 114 is accessing his/her home LSF 106 in an integrated LSF/NSF, such as the LSF/NSF 202 described above with respect to FIG. 2, there may be no need to establish an SA between the LSF 106 and. NSF 104. However, the service provider of the respective integrated LSF/NSF may desire security within its own "closed" network. This may be achieved by establishing SAs between the multiple AAA functions within the closed network.

2.2.4.3 User Location Tracking

The expression "user location tracking" as used herein refers to the functions and data required to reliably discern where an MN is physically located at any time. There are two basic functions involved in user location tracking. First, a user's MN 112 must determine that a user 114 has moved to a different subnet (e.g., an IP network) and inform the network of such. Second, MNs 112 that are executing one or more applications must be tracked as they move (i.e., handoff) between different subnets.

As a user 114 roams within an access network (xAN 110), his/her MN 112 determines whether it has changed its subnet point-of-attachment (as defined in RFC 2002). If the MN's subnet point-of-attachment has changed, then the MN 112 informs the network.

When a user 114 first accesses a system (e.g., an LSF) via an xAN 110, the user's MN 112 sends a Registration message to the LSF's SMM 464 via the MN/LSF interface. The SMM has several functions it must perform, such as, for example, it must allocate a Care Of Address (COA, discussed further below with respect to MN Addresses), maintain local information pertaining to the MN, and the like.

The SMM 464 will use the LSF/NSF Interface, such as the LSF/NSF interface 1406 (FIG. 14), which is based on the AAA protocol, to authenticate and register the user 114 with its home NSF 104. The home NSF 104 uses information in the Registration message to update the user's location in the UDS 460.

The LSF 106 supports the ability to restrict user 114 access within certain IP subnets. With the advent of global deployment of networks, there may be reasons for restricting users (or particular network domains) from accessing certain IP administrative domains. The ability to restrict user 114 access within certain IP subnets is a user authorization function that is configured and enforced at the LSFs by policy.

Finally, the LSF SMM 464 supports mobility between serving LSFs 106 via an LSF/LSF Interface. One of the functions the SMM 464 insures is that there is no loss of data during a transition (i.e., a handoff). LSFs 106 may also chare the same security associations between the MN and the LSF (e.g., SA3 and SA5, as depicted in FIG. 8).

2.2.4.4 Registration Establishes a Packet Data Session

The term "architecture" as used herein supports the concept of a user 114 establishing a packet data session (i.e., an IP packet data session) with multiple home networks (NSFs 104) from the user's current device, which is the same concept as found in GPRS and IMT2000. However, since each home network is a unique network, the user 114 will need to send a unique and separate registration request to each network, and each request will contain a unique NAI associated with the network to which the user desires to establish the packet data session.

In accordance with the IPM Architecture of the present invention, a packet data session is preferably established when an MN 112 sends a Registration Request. The Registration Request may be sent in two scenarios: first, when the user initially powers on the MN and, second, when a user wants to establish another packet data session with another home network (service provider, e.g., a second or third home network).

The user 114 may have one provider for access (e.g. ATT, AOL, or the like). This necessitates that the user have two "subscriptions," one to use (and be authenticated on) the access system, and another to use (and be authenticated on) the data services.

In accordance with the architecture of the present invention, it is not necessary for a user 114 to have a subscription with an access provider if the access provider is not providing the user's services. The actual service provider (i.e., the user's home network) only needs to perform the user's authentication, because the access provider (e.g., an LSF and/or an NSF) will preferably have established an SLA with the user's home NSF 104, which provides the necessary trust relationship between the networks. If a user is not paying his bills, the home NSF is responsible for refusing access for the user.

2.2.4.5 De-registration of a Packet Data Session

Occasionally, a user will need to explicitly terminate a packet data session. This may be achieved conventionally by hanging up a phone to a dial-up ISP, or by terminating a wireless data call. It may not always be so simple in future networks. For example, where a user has multiple packet data sessions, he/she may want to terminate only one of them. Also, there may be some shared fixed device that several users may use. For example, a first user may "slide" a User Identity Module (SIM) card in the device and "perform" his data session to some ISP. When that user is done, the packet data session is terminated so another user may use the device. The IPM Architecture of the present invention supports de-registration by sending a Registration Request with an indication that the user wants to terminate his/her packet data session.

2.2.4.6 Mobile Node Addresses

To route datagrams to a roaming user's MN 112, an IP address must be allocated to the MN 112 that the user is currently using to send and receive datagrams. This address is stored in the home DDNS server 456 where it is available to anyone, such as a correspondent node (CN) that wishes to establish an application session with the user 114.

There are at least two alternative methods for assigning an IP address to an MN 112, henceforth referred to as the MN's allocated IP address. First, the MN's allocated IP address may be assigned when the MN is configured, wherein the allocated IP address is permanent and the MN always has the same IP address. Second, if the MN does not have a configured IP address, an IP address may be dynamically allocated (i.e., auto-configuration is executed) to the MN when the MN accesses an LSF 106 for the first time. In this scenario there are two options for dynamically allocating the IP address: (1) allocation by the visited LSF, and (2) allocation by the user's home NSF. In accordance with the present invention, it is preferable that IP address be assigned by the user's home NSF so that the IP address is topologically associated with the user's home NSF.

When a CN (anywhere on the Internet) wants to establish an application session with a roaming user, the CN will acquire the user's allocated IP address via a DDNS request to the user's home NSF. Since the allocated IP address is associated with the user's home NSF, the Internet will route the data to the home NSF. For the home NSF to send the datagrams to the user, the serving LSF allocates an IP address, called a care-of address (COA), which may be used to tunnel datagrams from the user's home NSF to the LSF router associated with the COA. The LSF router de-tunnels the packet and forwards it to the user. This creates the infamous "triangle routing," which is not an optimal path for data to transverse.

To help alleviate "triangle routing," the user's MN COA is given to the CN. In accordance with the present invention, there are at least two scenarios for giving the user's MN COA to the CN. First, when the home NSF receives data destined for a roaming user, the home NSF sends a message to the CN to update the CN with the user's COA. The NSF supports a policy that indicates that the NSF should hide or not hide the MN user's network location from the CN. If the policy is set for "do not hide," the NSF will send the COA to the CN; otherwise, the NSF will not send the MN's COA to the CN.

Second, the CN is given the COA in a DDNS response when the CN application requested the user's allocated IP address. This mechanism provides a more expeditious session setup between the CN and the MN user, and alleviates triangle routing. A policy at the NSF may dictate the need for sending the COA to the CN. However, prior to selecting this second option, there are number of issues that should be considered, which issues are exactly the same issues as discussed above with respect to Network Route Addressing for the case where the LSF allocates the MN's IP address.

With the addressing foundation established, the techniques will be applied to the five address allocation scenarios described above with respect to Network Route Addressing.

First, the device (e.g., MN 112) owned by the user 114 has a permanent IP address associated with his home network NSF. The MN will use the permanent IP address to terminate MN datagrams. And the LSF's COA is used to tunnel datagrams to the LSF.

Second, the device the user is about to use is not his/her device and the device has a permanent IP address that is associated with the current point of attachment (associated with the visited LSF). The NSF will then allocate an IP address for the MN to be used by the MN to terminate datagrams, and the LSF COA is used to tunnel datagrams to the LSF.

Third, the device the user is about to use is not his/her device and the device has a permanent IP address that is not associated with his/her home network or the current point of attachment (associated with the visited LSF). The NSF will allocate an IP address for the MN to be used by the MN to terminate datagrams and the LSF COA is used to tunnel datagrams to the LSF.

Fourth, the device owned by the user does not have a permanent IP address, hence, when the user roams with this device, the network will dynamically allocate an IP address. The NSF will allocate an IP address for the MN to be used by the MN to terminate datagrams and the LSF COA is used to tunnel datagrams to the LSF.

Fifth, the device the user is about to use is not his/her device, and the device does not have a permanent IP address, hence, when the user roams with this device, the network will dynamically allocate an IP address. The NSF will allocate an IP address for the MN to be used by the MN to terminate datagrams, and the LSF COA is used to tunnel datagrams to the LSF.

In each of the above address allocation scenarios, if the user's home network is a private network that supports non-routable IP addresses, the LSF must allocate a co-located COA (as defined in RFC 2002) for the MN. This allows the home network to tunnel datagrams directly to the MN instead of tunneling datagrams to the LSF. Allocating a co-located COA to the MN is necessary since there may be another user who is roaming in the same network that has an MN with the same allocated IP address from a network that supports routable IP addresses. Allocating a co-located COA to the MN eliminates two MNs having the same IP address.

2.2.4.7 Updating Correspondent Nodes with COA'S

To alleviate triangle routing at the user's home network, the COA that represents the MN's current point of attachment is sent to the CN. When the home NSF receives data destined for a roaming user, the home NSF sends a message to the CN to update the CN with the user's COA. Alternatively, when an MN re-registers, the registration will include a CN IP address for each application with which the user is currently in session. In an alternative to the home NSF updating the CN, if the MN is given the COA (during registration), it may send the COA update directly to the CNs. However, this latter method may require increased airwave bandwidth.

When the CN receives the COA update, the CN must update its routing table to trigger the appropriate tunneling.

For the CN to insure that the COA it receives is valid, the user's NSF (or MN) should have a security association (SA) established with the CN or the CN's network to insure the validity of the COA updates.

The list of CNs included in the registration message may be prioritized based on some criteria, e.g., application Quality of Service (QoS).

2.2.4.8 IP Router Configurations

There are a number of IP router configurations that may be supported by an LSF of the present invention, several of which configurations are described in greater detail below. Router configurations should preferably support a single COA tunnel point into the LSF, i.e., a single router at the "top" of a hierarchy that provides the COA and tunneling. This minimizes the updating of a COA to a user's home network and the CNs the user is in correspondence with.

2.2.4.8.1 Single IP Router in LSF

Figure 17:
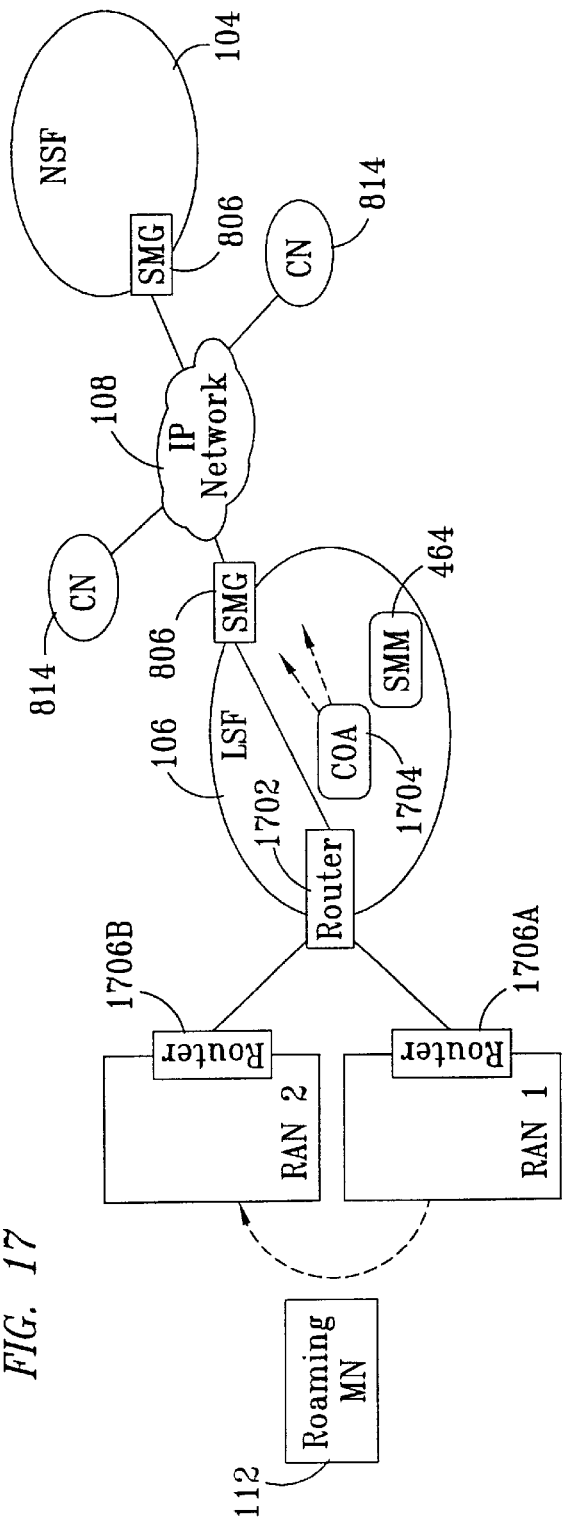
FIG. 17 shows a single IP router in an LSF embodying features of the present invention.

Since a CN and/or home NSF requires a COA to deliver datagrams to a roaming user, it is preferable to have an LSF assign a single COA to a MN as a user roams within the LSF. In accordance with the present invention, and as depicted in FIG. 17, this is achieved by configuring a single router 1702 in an LSF 106 that has a COA 1704 for all MNs 112 roaming in an LSF 106 between, for example, two routers 1706A and 1706B which interface via Radio Access Networks (RANs) with the MN 112. It is noted that all routers shown in FIGS. 17–19 may include the ANI and/or the ITS functions.

2.2.4.8.2 Multiple IP Routers in the LSF

In some LSFs, it may be necessary to equip an LSF with more than one router to, for example, increase router capacity. As exemplified in FIG. 18, each xAN 110A and 110B preferably has a router 1706A and 1706B, respectively, that is considered to be at the edge of the xAN 110 and LSF 106.

Figure 18:
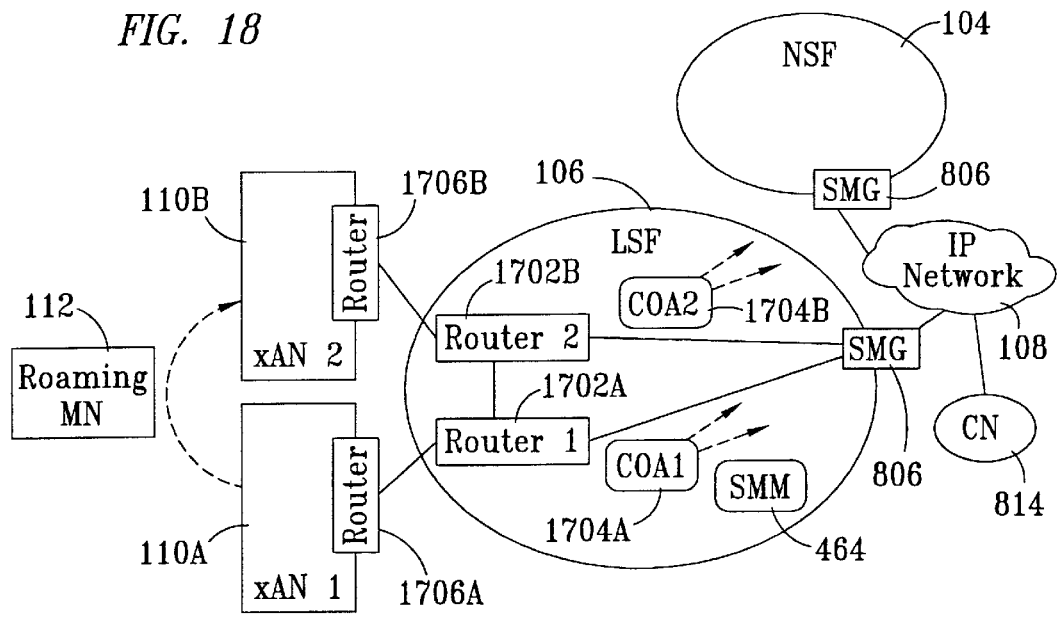
FIG. 18 shows multiple IP routers in an LSF embodying features of the present invention.

In the configuration exemplified in FIG. 18, the LSF 106 supports two COAs 1704A and 1704B, one for each router 1702A and 1702B, respectively, for serving the xAN 110A and xAN 110B, respectively. It should be noted with respect to the configuration shown that the CN 116 and/or home NSF 104 must be updated with the respective MN's new COA 1704A and 1704B when the MN 112 moves between xANs 110A and 110B attached to different routers 1706A and 1706B.

2.2.4.8.3 Hierarchical Mobility Router

Figure 19:
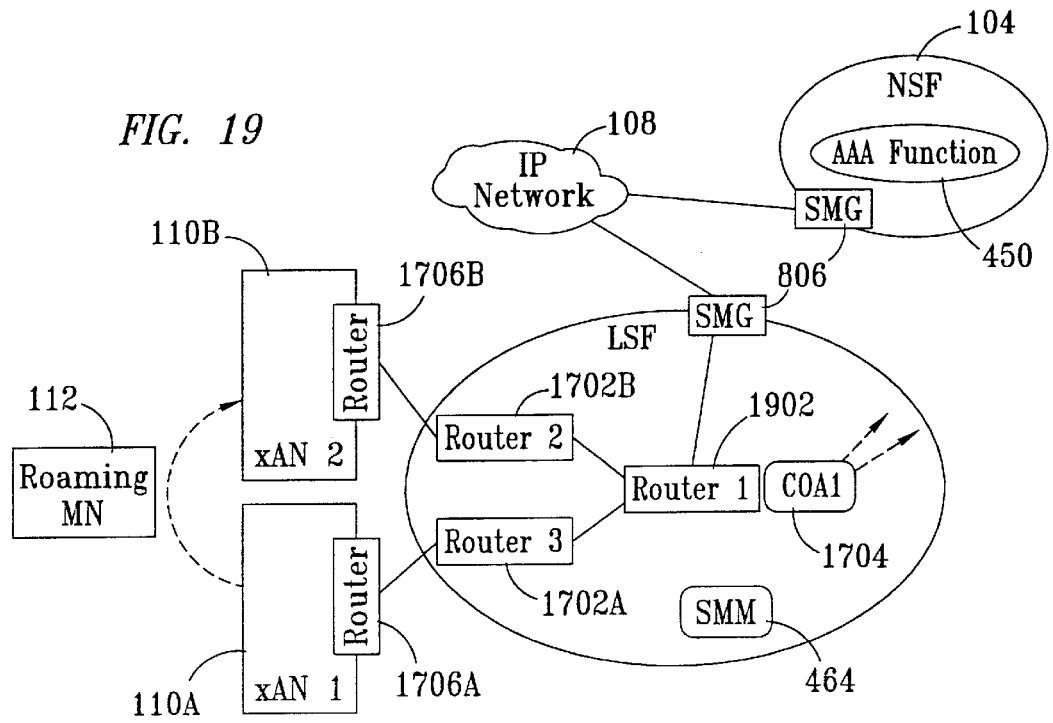
FIG. 19 shows a hierarchical mobility router embodying features of the present invention.

To alleviate the burden of supporting more than one COA at an LSF, the LSF may support a hierarchical router configuration. FIG. 19 exemplifies such an hierarchical router configuration, wherein the MNs 112 may all be associated with a single COA 1704, which is the COA of a single router 1902 connected to the two routers 1702A and 1702B in the LSF 106.

2.2.4.9 Implementation Scenarios

The IPM Architecture framework of the present invention provides flexibility in deploying an SMM 464 within an LSF 106. When deploying SMMs, however, there are a number of issues to consider. For example, in general, an ITS function may be implemented in the router since it on the data plane. An ANI/SMM may be deployed in the router or in different computing machines depending on the size and capacity of the LSF. An SMM 464 may be deployed on a standalone server, without other IPM components. The SMM 464 may also be deployed on a server, with other IPM components, such as the AAA function 462. The SMM 464 may also be deployed on a router. Additionally, there may be more than one SMM 464 in an LSF 106.

The choice of deployment turns on the type of IP router configuration being used and the LSF performance desired. For example, in a single IP router configured in an LSF, such as depicted in FIG. 17, it may be preferable for the SMM 464 to be positioned on the router 1702, instead of on a standalone server. This type of deployment looks similar to the IWF/PDSN data model in $2^{nd}$ and $2.5^{nd}$ generation cellular system. As the network grows and there is a need for more routers at the xAN/LSF interface, this could evolve into the Hierarchical Mobility Router configuration depicted in FIG. 19.

The xAN and LSF may be configured such that there are multiple routers at the LSF and xAN, and the SMM 464 is on a server in the LSF 106, as depicted in FIGS. 18 and 19. A service provider may desire to assign a unique COA to each of these routers, as in FIG. 18 relating to multiple IP routers in an LSF. The MN is informed of which COA to use via the xAN/LSF interface. This information is then relayed to the SMM through a Registration Request message between the MN and the SMM. This scenario also allows the service provider to balance the IP datagram load across these routers, e.g., they may assign different routing areas to each router (if the xAN supports this functionality).

2.2.4.10 Mobile Node Components

Figure 20:
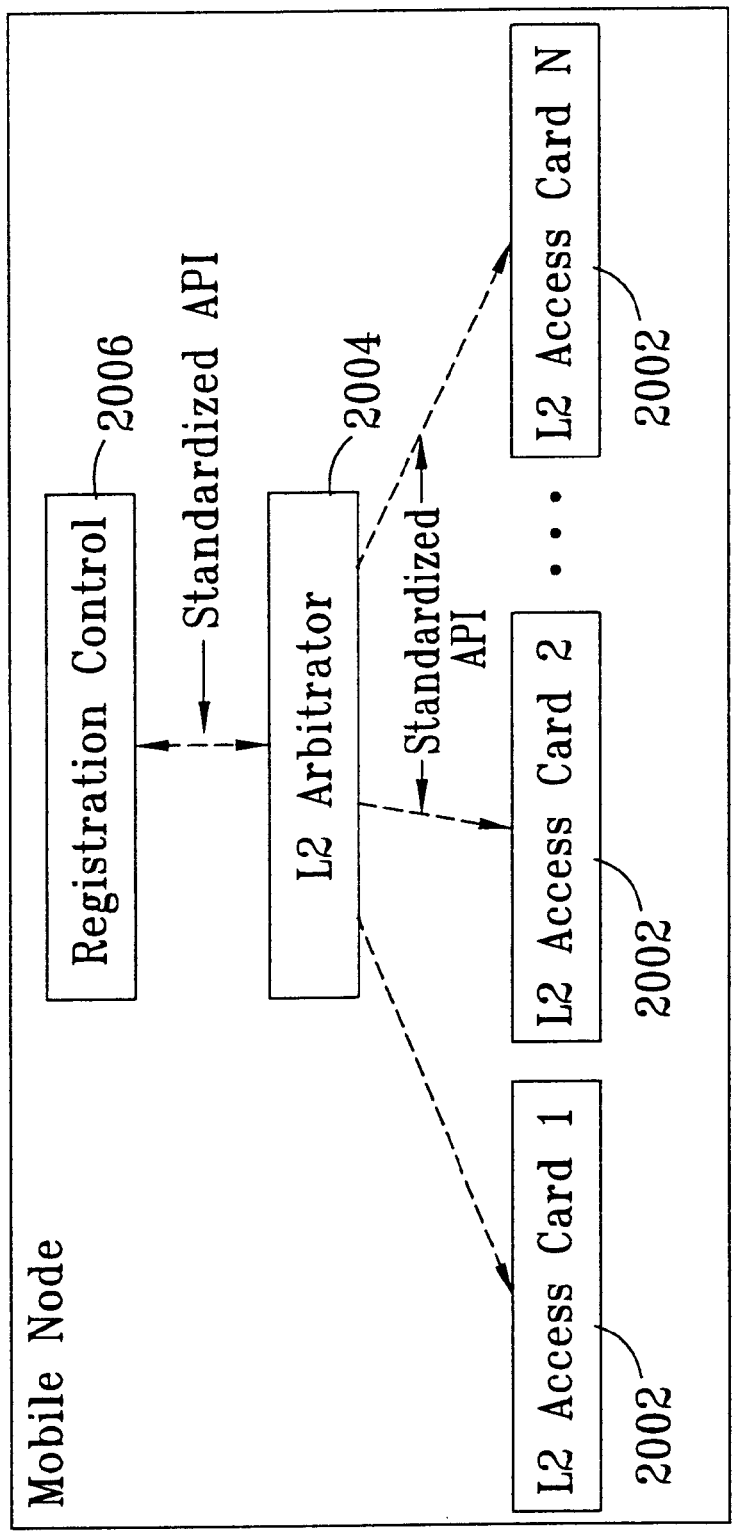
FIG. 20 shows MN Components embodying features of the present invention.

To support seamless roaming between heterogeneous networks, the MN 112 must support an architecture that is different from architectures conventionally used in diverse data technologies. FIG. 20 provides an overview of components needed by the MN 112 to support seamless roaming. As discussed further below, the components include Layer 2 access cards 2002, a Layer 2 access arbitrator 2004, and a registration control 2006. Components needed by the MN 112 to support seamless roaming of the type described herein are still more fully disclosed and discussion in co-pending U.S. patent application Ser. No. 09/631,251, now pending entitled "Method and System for Switching Between Two Network Access Technologies Without Interrupting Interractive Active Network Applications", filed on behalf of Donald Wurch et al, on Aug. 2, 2000 (Attorney Reference No. 10740RR) which is hereby incorporated in its entirety by reference.

2.2.4.10.1 Layer 2 Access Cards

Each Layer 2 (L2) access card 2002 supports a specific wireless access protocol, e.g., L2 access card 1 may support CDMA+, L2 access card 2 may support TDMA+, and L2 access card N may be an Ethernet card. The "+" sign appended to CDMA and TDMA indicates that those wireless access protocols need to develop further to work in the IPM Architecture.

The wireless access cards 2002 perform functions similar to those performed in 2G and 3G systems. For example, the wireless access cards 2002 may be used to monitor the Broadcast Channel (BCCH) associated with its access protocol. The wireless access cards 2002 may also be used in handoffs with a Radio Access Network (RAN), discussed further below.

The wireless access cards 2002 may also perform Layer 2 access requests, similar to a conventional registration, but the cards 2002 are not user-oriented and does not go beyond the access network (xAN 110). Layer 2 access informs the access network that the MN 112 is on its system. In a channelized RAN this would, logically, put the MN 112 in a standby/dormant mode.

In accordance with the present invention, the L2 access cards 2002 may also pass information to the Layer 2 Arbitrator 2004 via a standardized interface. This information may be LSF system information obtained in the BCCH and/or information generated by the Layer 2 access card, e.g., Received Signal Strength Indication (RSSI) values.

2.2.4.10.2 Layer 2 Arbitrator and Registration Control

There are a number of functions performed by the Layer 2 (L2) Arbitrator 2004. For example, the L2 Arbitrator 2004 may be used to obtain information from each L2 Access Card 2002 that will allow the Arbitrator to determine which access is the best. When the L2 Arbitrator 2004 selects a new L2 Access Card 2002, the Arbitrator may be used to update a routing table with the appropriate L2 interface driver. The L2 Arbitrator 2004 may be used to coordinate L2 Access Card 2002 changes with the Registration Control Object 2006. The L2 Arbitrator 2004 may also be used to obtain information from current L2 access, and to inform the Registration Control Object 2006 that it is still on the same subnet point-of-attachment (i.e., it basically generates an agent advertisement or its equivalent).

Use of the L2 Arbitrator 2004 is exemplified as follows. The L2 Arbitrator 2004 receives information from each of the L2 Access Cards 2002 through a standardized API. With the information, the Arbitrator 2004 decides which access is best. When the Arbitrator 2004 decides that a new Access Card 2002 should be used, the Arbitrator 2004 informs the Registration Control Object 2006 so it may perform the appropriate functions, e.g., send the old LSF 106 a Registration that indicates movement. After the Registration Control Object 2006 performs its functions, the Arbitrator 2004 updates the routing table with the new L2 access driver. The Arbitrator 2004 will next receive information from the new Access Card 2002 indicating the current point of attachment which it would pass on to the Registration Control Object 2006.

2.2.4.11 Any(X) Access Networks

The any(x) Access Network (xAN), also referred to herein as xAN 110, is configured for providing Layer 2 access for devices used by MN users. From a mobility perspective, the functions of the xAN include providing LSF system access parameters to the MN via a BCCH, e.g., SMM IP address, an LSF NAI, and the like. Further functions of the xAN include micro mobility (i.e., MN handoffs within the xAN). Still further functions of the xAN include providing the LSF with a handoff indication when the MN is handed off to a different system (e.g., a different LSF or xAN).

The IPM architecture framework of the present invention supports traditional channelized xANs, e.g., RAN TDMA and CDMA, where a dedicated radio resource is used to generate BCCH messages. The MN's Layer 2 Access Card relays the information that is provided in the BCCH to help other components in the MN provide user mobility.

It is anticipated that future xANs will not be channelized. They will be designed to be a broadband access medium similar to 802.11 wireless LANs. It is also expected that there will still be some type of BCCH, similar to the 802.11 beacon which may be used to facilitate handoffs between xANs. Such developments are supported by the IPM architecture framework of the present invention.

It should be noted that Ethernet Layer 2 is a broadband access medium that does not have a BCCH. Since the Ethernet Layer 2 architecture is based on Mobile IP (MIP), MNs attached to an Ethernet access use an agent advertisement to acquire system information. This provides an alternative to the future broadband (non-channelized) xANs. It is not necessary that they have system information in their BCCHs. They can rely on agent advertisements (or whatever agent advertisements may evolve to).

The following specifies a preferred messaging interface between the xAN, also referred to herein as the xAN 110, and the LSF 106 components as defined above with respect to the IPM Architecture Framework of the present invention.

2.2.4.11.1 IP Mobility Messages

IPM Messages consist of existing Mobile IP (MIP) messages, as defined in RFC 2002, MIP messages with changes, and completely new messages. In addition, the IPM Architecture of the present invention makes use of existing MIP extension(s) and defines new extensions. All of the extensions may be used with any IPM message. IPM messages uses the same port (number 434) as Mobile IP. IPM Messages are built to insure interoperability and compatibility with existing implementations of MIP.

MIP-based IPM messages are relevant to the xAN-LSF interface include, for example, Registration Request messages, Registration Reply messages, Prepare for System Change messages, and System Change messages.

New IPM messages that are relevant to the xAN-LSF interface include, for example, Activate Packet Service messages, Activate Packet Service Ack messages, Add L2 IP Association messages, Buffer Data messages, Buffer Data Ack messages, Cleanup messages, Cleanup Ack messages, Correspondent Node List messages, Correspondent Node List Ack messages, Forward Data messages, Forward Data Ack messages, Handoff Required messages, and Handoff Required Ack messages.

Figure 14A:
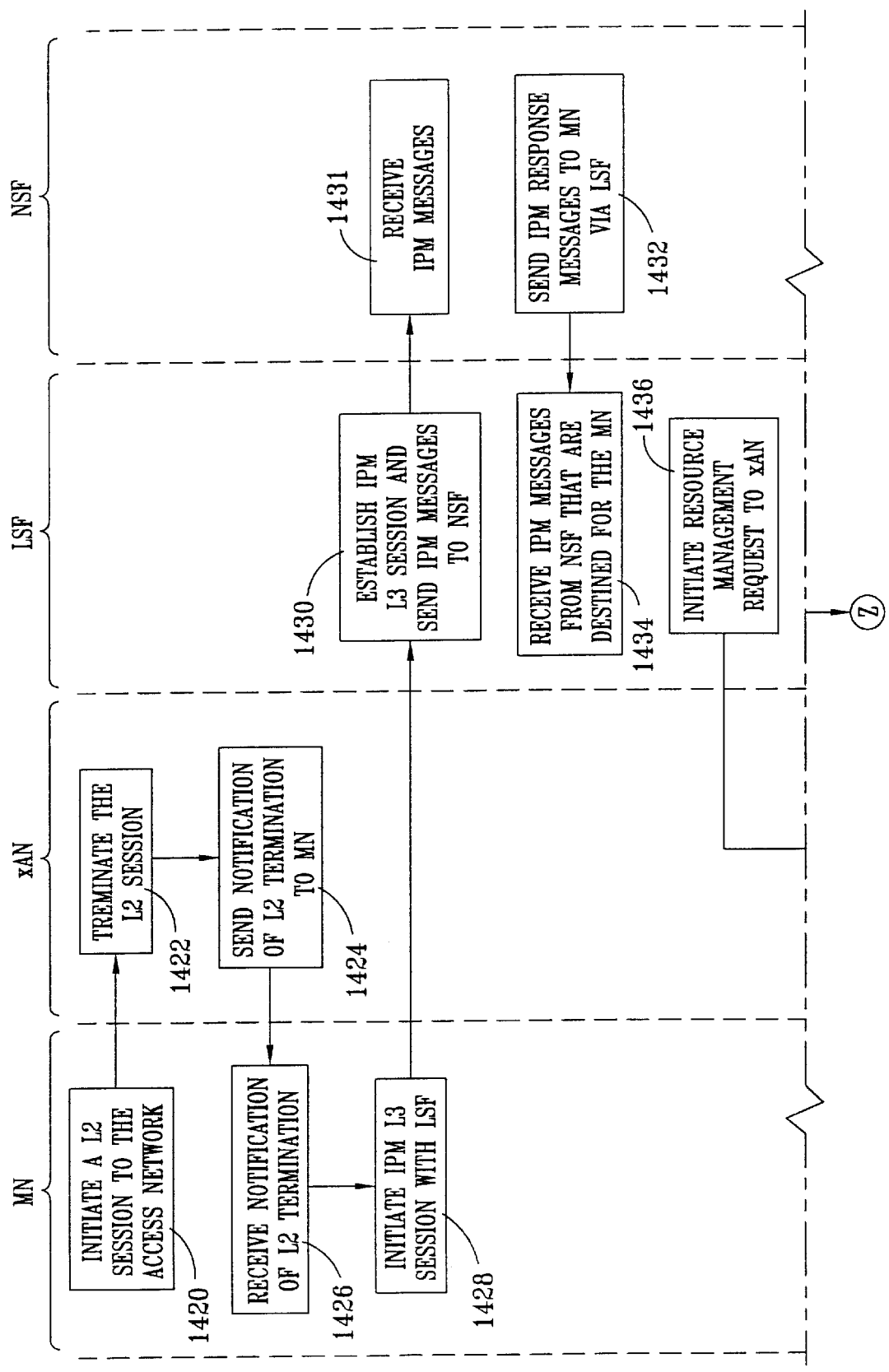
FIGS. 14A and 14B depicts the embodying features of the interface between an xAN and an LSF.
Figure 14B:
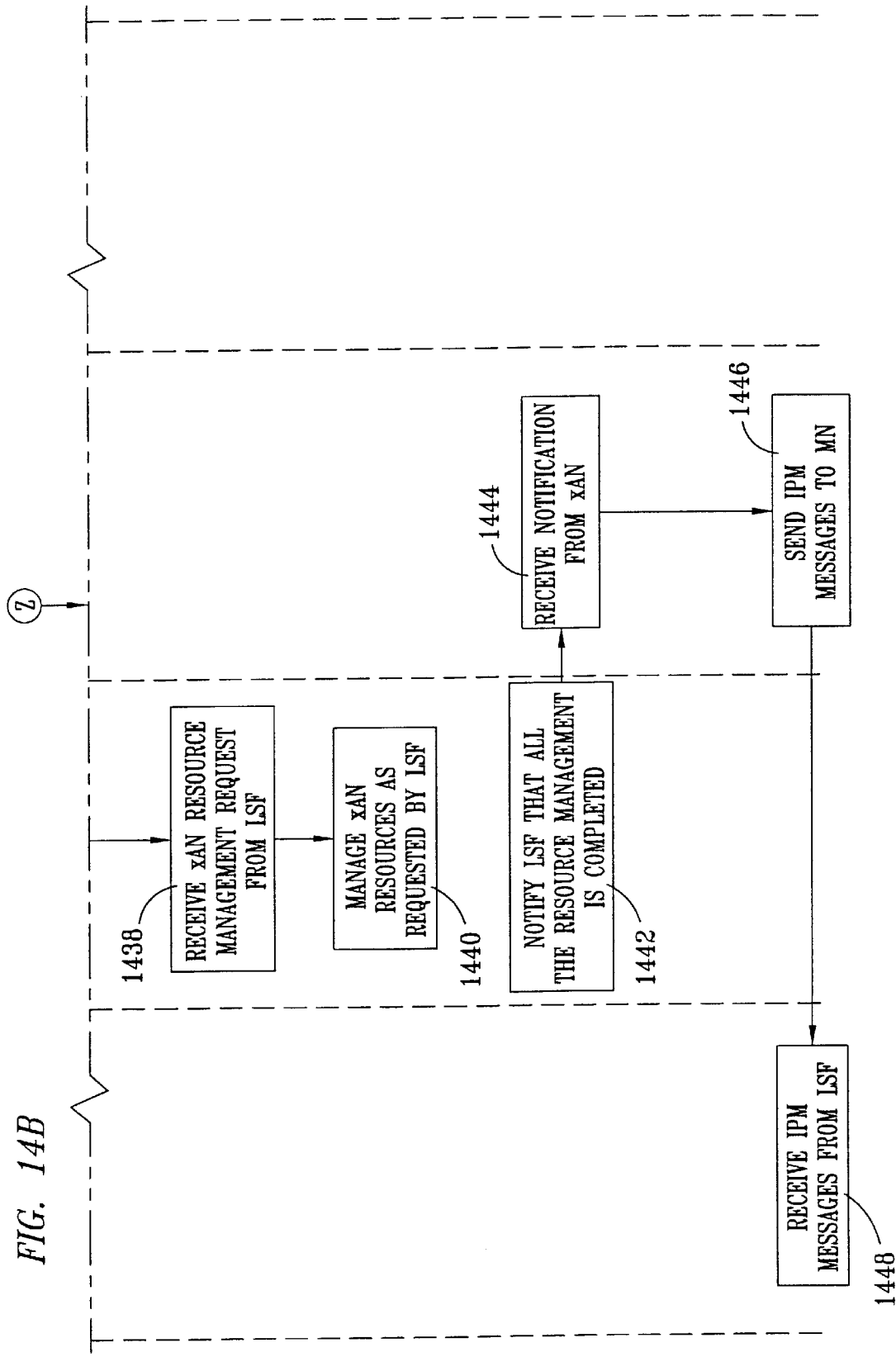

FIG. 14A and 14B depict an interface between a xAN 110 and a LSF 106 embodying features of the present invention. Accordingly, in step 1420, a MN 112 of a user 114 initiates a L2 session to a xAN 110. In step 1422, the xAN 110 terminates the L2 session that was initiated by the MN 112. In step 1424, the xAN 110 sends a notification of L2 termination to the MN 112. In step 1426, the MN 112 receives the notification of termination of L2 session from the xAN 110. In step 1428, the MN 112 initiates an IPM L3 session with the LSF 106. In step 1430, the LSF 106 establishes an IPM L3 session and sends IPM messages to NSF 104. In step 1431, the NSF 104 receives IPM messages from the LSF 106. In step 1432, the NSF 104 sends IPM response messages to MN 112 via LSF 106. In step 1434, LSF 106 receives IPM messages from NSF that are destined for the MN 112.

In step 1436, the LSF 106 initiates resource management request to xAN 110. This resource management task includes a function for mapping between L2 and L3, a function for allocating routing resources for buffering and forwarding data packets, a function for initiating a inter-LSF or intra-LSF handoff of data sessions and a function for reclaiming any unused routing resources. These functions are described in further detail below.

In step 1438, the xAN 110 receives a resource management request from LSF 106. In step 1440, the xAN 110 manage its resources as requested by the LSF 106. In step 1442, the xAN 110 notifies the LSF 106 that it has completed the task of resource management. In step 1444, the LSF 106 receives a notification that the xAN 110 has managed the resources requested by LSF 106. In step 1446, the LSF 106 sends the IPM messages to the MN 112. In step 1448, the MN 112 receives the IPM messages from the LSF 106.

Figure 20A:
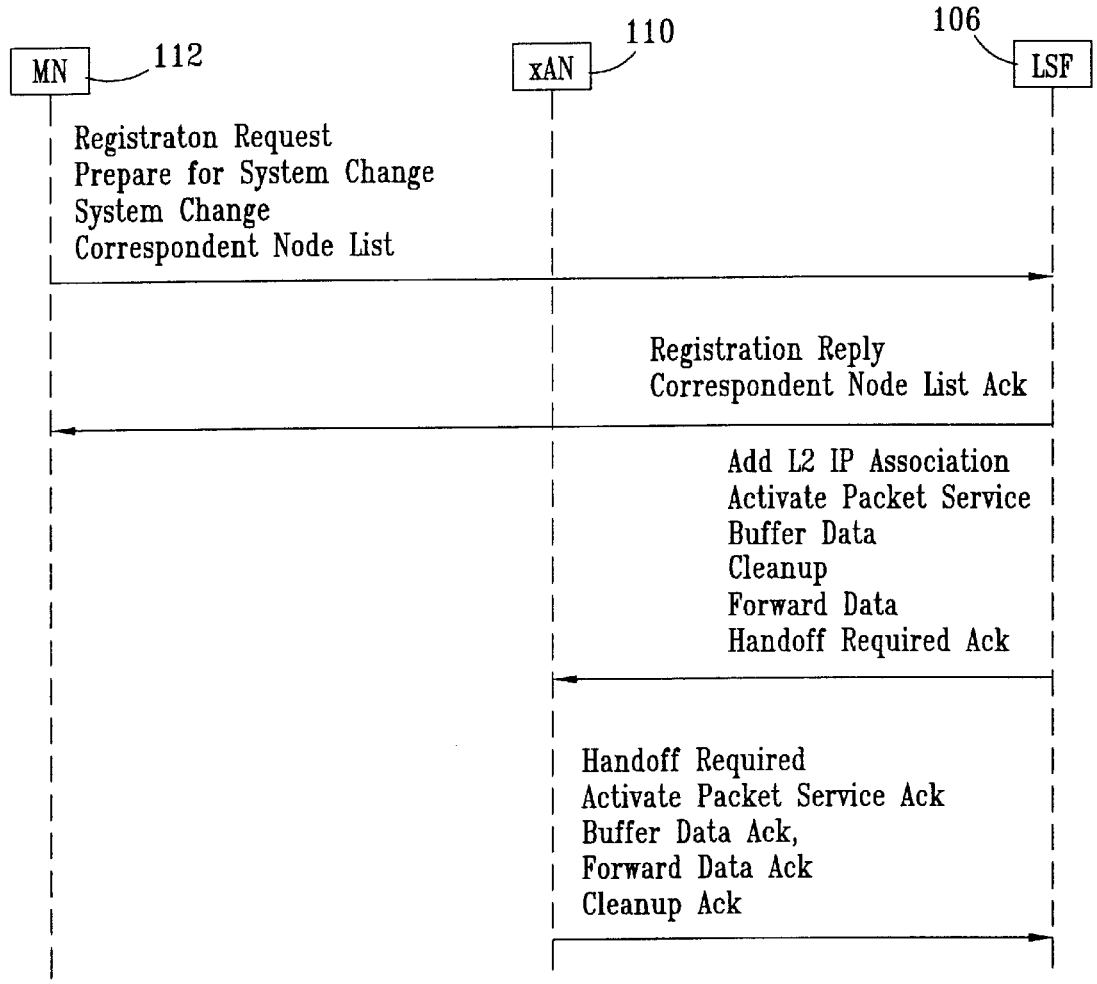
FIG. 20A shows origination and destination points of IPM messages.

FIG. 20A shows origination and destination points of the IPM messages. As shown, the MN 112 originates a message exchange by sending to the LSF 106 at least one of a Registration Request message, a Prepare for System Change message, a System Change message, and a Correspondent Node List. In response, the LSF 106 may send one of a Registration Reply message, and a Correspondent Node List Ack message.

The LSF 106 may also send to the xAN, 110 at least one of an Add L2 IP Association message, an Activate Packet Service message, a Buffer Data message, a Forward Data message, and a Cleanup message. In response to a message from the LSF 106, the xAN 110 may send a suitable one of an Activate Packet Service message, a Buffer Data Ack message, a Forward Data Ack message, and a Cleanup Ack message.

The xAN 110 may also send a Handoff Required message to the LSF 106, in response to which the LSF may respond with a Handoff Required Ack message.

Figure 20B:
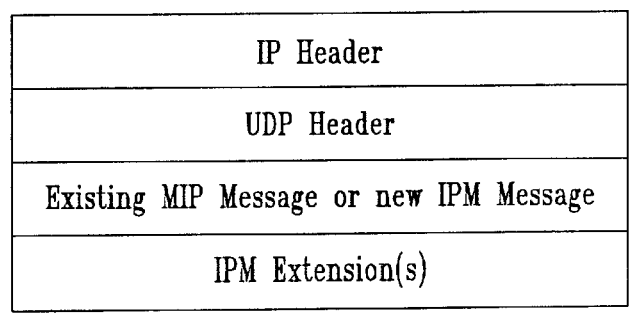
FIG. 20B shows a general format for an IPM message.

FIG. 20B shows a general format for an IPM message 20B02. As discussed further below, the message 20B02 includes an IP Header field 20B04, a UDP field 20B06, a message field 20B08 for carrying an existing MIP message or a new IPM message, and an IPM extension(s) field 20B08.

As discussed in further detail below, the IPM extension(s) field 20B08 may comprise a base MIP extension such as an NAI extension, or may comprise a new IPM extension in accordance with the present invention, such as an Authentication extension, a Call Information extension, a CN List extension, a LSF NAI extension, a Routing Area extension, an MN Layer 2 extension, or a Terminal Information extension.

FIG. 20C shows a preferred general format for general MIP extensions, such as described below with respect to FIGS. 20D–20K. The MIP extension depicted by FIG. 20C comprises a type field, a length field, and a data field. The type field defines the extension type. The length field represents the length of data in bytes, which may range from 0 to 255 bytes. The data field contains the data of the extension.

FIG. 20D shows the message format of an Authentication Information Extension, which is used to pass a user's Digital Signature.

FIG. 20E shows the message format of a Call Information Extension, which is used to pass a user's call related information.

FIG. 20F shows the message format of a CN List Extension, which is used to distribute Correspondent Nodes associated with the MN.

FIG. 20G shows the message format of an LSF NAI Extension, which is used during handoff scenarios.

FIG. 20H shows the message format of an MN's L2 address extension, which identifies the inherent Layer 2 (L2) address, such as IMSI, MAC, and the like, of the mobile device's technology. The L2 Address is required to identify an MN that does not have any IP address assigned to it. It is expected that in such cases the xAN would keep a mapping between the L2 and IP addresses of the MN.

FIG. 20I shows the NAI extension, which identifies the user and home domain of the user. It is of type user@realm as defined in RFC 2486.

FIG. 20J shows an IPM Routing Area Extension, which identifies the Routing Area (RA) that the MN is being served in. The format of a routing area is an NAI as defined in RFC 2486.

FIG. 20K shows a Terminal Information Extension, which is used to identify terminal (e.g., the MN 112) capabilities, such as whether the terminal is SIP capable, H.323 capable, and the like).

FIG. 20L shows the message format of a Registration Request message, which is based upon the MIP message as specified in RFC 2002. Notably, the Registration Request message includes a number of mandatory IPM extensions, such as NAI extensions, an Authentication extension, a Routing Area extension, and an MN Layer 2 extension. The Registration Request message may optionally also include a Terminal Information extension.

FIG. 20M shows the message format for a Registration Reply message, which is based upon the MIP message as specified in RFC 2002. Notably, the Registration Request Reply message includes at least two mandatory IPM extensions, including NAI extensions and an MN Layer 2 extension.

FIG. 20N shows the message format for a Prepare for System Change message, which is based on the MIP Registration Request message as specified in RFC 2002. Notably, the Prepare for System Change message includes a number of mandatory IPM extensions, such as NAI extensions, a Routing Area extension, and an LSF NAI extension. The Prepare for System Change message may optionally also include an Authentication extension and a Terminal Information extension.

FIG. 20O shows the message format for a System Change message, which is based on the MIP Registration Request message as specified in RFC 2002. Notably, the System Change message includes a number of mandatory IPM extensions, such as NAI extensions, a Routing Area extension, and an LSF NAI extension, an Authentication extension, and an MN Layer 2 extension. The System Change message may optionally also include a Terminal Information extension.

FIG. 20P shows a preferred general format for IPM messages, such as described below with respect to FIGS. 20Q–20AC. The IPM message depicted by FIG. 20P comprises a type field, a length field, and a data field. The type field defines the extension type. The length field represents the length of data in bytes, which may range from 0 to 255 bytes. The data field contains the data of the extension.

FIG. 20Q shows the message format for an Activate Packet Service message, which is used to prepare the target xAN for allocating resources. Notably, the Activate Packet Service message includes at least two mandatory IPM extensions, including a Call Information extension and an MN Layer 2 extension.

FIG. 20R shows the message format for an Activate Packet Service Ack message, which is a reply to Activate Packet Service message. Notably, the Activate Packet Service Ack message includes at least one mandatory IPM extensions, namely, an MN Layer 2 extension.

FIG. 20S shows a message format for an Add L2 IP Association message, which is used to notify the xAN of the User's IP Address and the MN's Layer 2 address. It is sent to the edge router at the xAN (as indicated by the RA). Notably, the Add L2 IP Association message includes at least two mandatory IPM extensions, including NAI extensions and an MN Layer 2 extension.

FIG. 20T shows the format for a Buffer Data message, which is used to request that the xAN buffer data that is destined to a particular user.

FIG. 20U shows the format for a Buffer Data Ack message, which is used reply to Buffer Data message. Notably, the Result Code may be set either to one to indicate that a buffer is not allocated, or to zero to indicate that the buffer is allocated to buffer data packets during handoffs.

FIG. 20V shows the format for a Cleanup message, which is sent to the xAN at de-registration for freeing up resources.

FIG. 20W shows the format for a Cleanup Ack, which is sent in reply to the Cleanup message;

FIG. 20X shows the format for a Correspondent Node List message, which contains a list of CNs that are contemporaneously in session with the user. Notably, the Correspondent Node List message includes at least two mandatory IPM extensions, including NAI extensions and a CN List extension.

FIG. 20Y shows the format for a Correspondent Node List Ack message, which is sent in reply to a Correspondent Node List message.

FIG. 20Z shows the format for a Forward Data message, which is used to start forwarding buffered data from an old (previous) LSF to a new COA.

FIG. 20AA shows the format for a Forward Data Ack, which is sent in reply to a Forward Data message.

FIG. 20AB shows the format for a Handoff Required message, which is used to notify an old (previous) LSF about handoff requirement. Notably, the Handoff Required message includes at least one mandatory IPM extension, namely, an MN Layer 2 extension.

FIG. 20AC shows the format for a Handoff Required Ack, which is sent in reply to a Handoff message. Notably, the Handoff Required Ack message includes at least one mandatory IPM extension, namely, an MN Layer 2 extension.

2.2.4.11.2 QoS and Policy Enforcement

The local directory server (LDS) 430 and database 431 at the LSF 106 is the repository for mobile user's home policy rules.

The QoS and Policy Server 412 that have an LDAP interface can retrieve an MN user's home policy rules from the LDS 430 and database 431. The enforcement of these policies is part of xAN implementation.

One way of implementing an LDAP client-server interface is specified in RFC 1823 and in "Unified Directory Service MLD Phase II" by Mark O'Brien of Nortel Networks.

2.2.4.11.3 Simple IP Support

A driving factor for Simple IP (i.e., wireline IP) is the requirement that MNs that do not support MIP may be able to access LSFs and the IP network for Internet service and/or for private network service.

Application nodes, i.e., CNs without MIP, accessing the serving system in the Simple IP mode are assigned addresses dynamically by an LSF 106, which plays the role of an access manager.

The xAN/LSF interface as defined below retains IPM messaging between the xAN and LSF and encapsulates Access Request/Reject/Accept messaging.

IPM includes at least two new extensions to be defined for Simple IP, namely, an Access Request extension and an Access Accept/Reject extension, discussed further below with respect to FIGS. 20AD and 20AE.

FIG. 20AD shows the format for an Access Request extension for encapsulating Access Request messages as specified in RFC 2138.

FIG. 20AE shows the format for an Access Accept/Reject extension for encapsulating an Access Accept/Reject message as specified in RFC 2138.

IPM also defines two new message types for Simple IP. One is a new type for IPM registration message and the second is a new type of registration reply, as discussed further below with respect to FIGS. 20AF and 20AG.

FIG. 20AF shows the format for a Simple IPM Registration Request message, which is based upon the MIP message as specified in RFC 2002. Notably, the Simple IPM Registration Request message includes a number of mandatory IPM extensions, such as NAI extensions, a Routing Area extension, a CN (without MIP) Layer 2 extension, and an Access Request extension. The Simple IPM Registration Request message may optionally also include an Authentication extension and a Terminal Information extension.

FIG. 20AG shows the format for a Simple IP Registration Reply message, which is based upon the MIP message as specified in RFC 2002. Notably, the Simple IPM Registration Request message includes a number of mandatory IPM extensions, such as NAI extensions, an MN Layer 2 extension, and an Access Accept/Reject extension.

3. Interfaces Between Framework Modules

There are a number of different scenarios by which the components of the IPM architecture framework of the present invention may interface with each other and by which messages may flow between components. These scenarios are enumerated as follows:

1. MN and xAN
2. MN and LSF
3. xAN and the LSF
4. Mobility manager functions between the LSF and NSF
5. Mobility manager functions between LSFs
6. Mobility manager function and DDNS
7. Mobility manager function and DHCP
8. Mobility manager function and policy server
9. AAA function and the mobility manager servers
10. AAA function and the Authentication servers
11. AAA function and the policy server
12. AAA function and the accounting function
13. Accounting functions and billing systems
14. DDNS and DHCS
15. NSF and MNs
16. Directory Service Interface
17. Security messaging gateways and policy servers This document has described, to varying levels of detail, the functionality of each of these interfaces. The remainder of this chapter will provide a consolidated list of interface requirements for several of the items on the above list and a set of message flows for registration, routing area update, and inter system handoff scenarios.

The interface requirements and message flows depict how user mobility is achieved in the "final" vision of the architecture, where the basic fundamental requirements are:

All service providers will provide data services for their users. Therefore, it is not necessary for the user to have a subscription with a specific wireless network provider just to gain access to the wireless networks.

A user's home network must create SLAs with all networks, LSFs and Service Brokers, it wants it users to roam in.

IPSec AH and/or ESP are used for all security associations

The AAA protocol is used for all LSF to LSF and LSF to NSF mobility functions.

For private network access, all tunneling is layer 3 tunneling (IP tunneling). There will be no layer 2 tunneling, e.g., L2TP.

There is no triangle routing unless there is a NSF "hide the user" policy. Therefore, an LSF will maintain COAs for its network.

3.1 Roaming Message Flows

In operation, the present invention is adaptable to message flows for a number of different mobility scenarios, which scenarios may be categorized into at least three groups. A first group includes user registrations. A second group includes users roaming to new routing areas where there are no applications running (i.e., where no data is being transferred). A third group includes users roaming to new routing areas where there are applications running (e.g., handoffs).

The message flows for each scenario makes a number of different assumptions. For example, it is assumed that there is at least one router at the edge of an xAN/LSF interface, and that an IP router is considered to be part of the xAN.

It is further assumed that all messages sent between system components include fields (i.e., parameters). However, the number of fields that may be included in a message are not limited by the fields described herein, and there may be a greater number of fields.

It is still further assumed that an AAA function located in an LSF has full functionality, i.e., it has knowledge of SLAs in place between itself and the NSFs, and it provides a mechanism for determining where a user's home AAA function is. It is also assumed that SAs have all been pre-established.

It is still further assumed that the xAN's BCCHs are broadcasting the IP address of an SMM, unless otherwise indicated.

It is still further assumed that xANs are channelized xANs, such as TDMA, unless otherwise indicated.

It is still further assumed that, in handoff scenarios for channelized xANs, the xAN is responsible for buffering datagrams that are destined for the MN. In unchannelized xANs, the router at the xAN/LSF will be responsible for buffering.

3.1.1 Initial Registration MN Configured with a Routable IP Address

Figure 21:
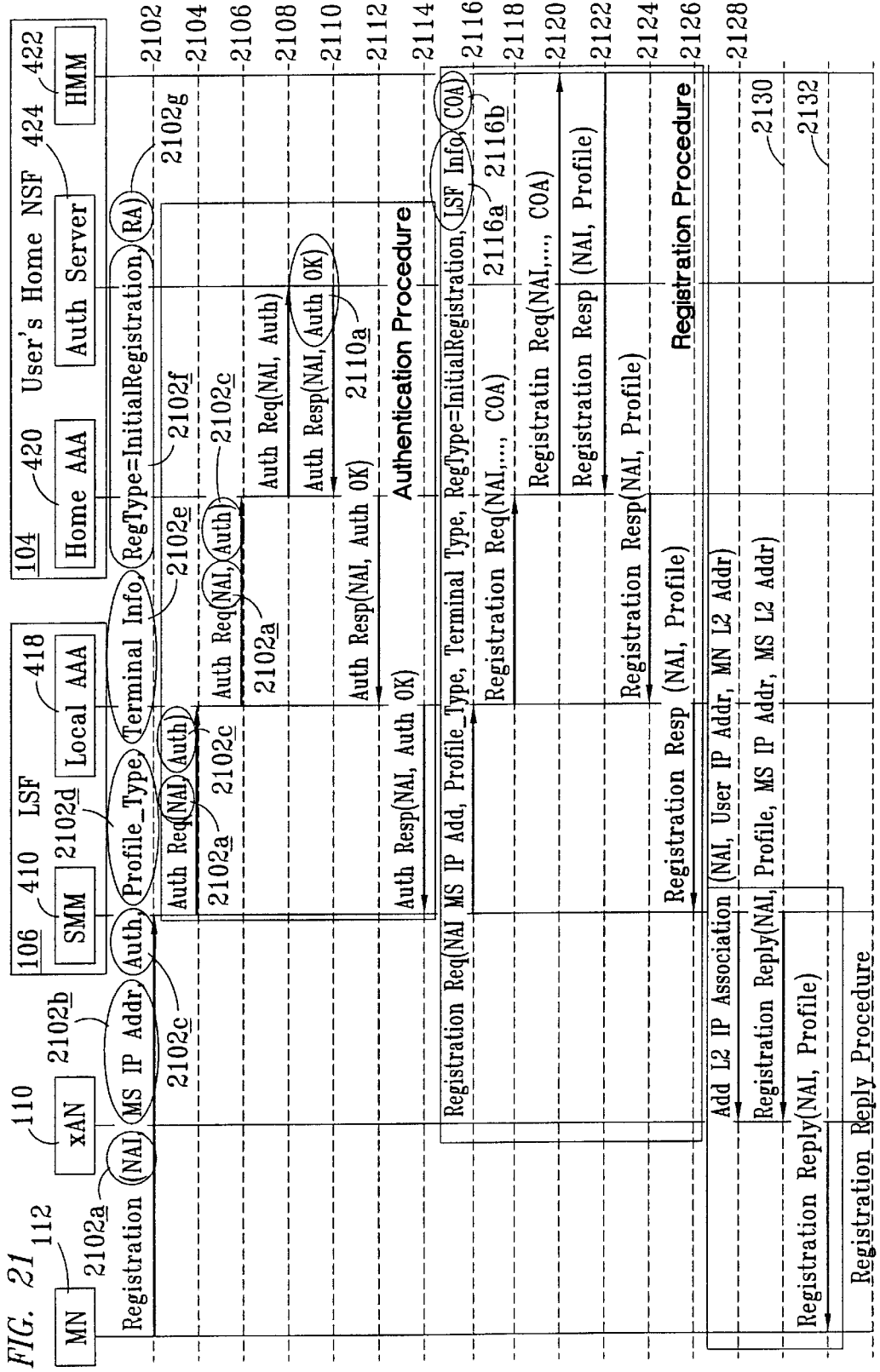
FIG. 21 is an event sequence diagram showing the flow of events for an Initial Registration, wherein a MN has a publicly routable IP Address.

FIG. 21 is a message flow event sequence diagram which represents a user MN 112 establishing a packet data session (i.e., logging in) with his/her home network 104. The MN 112 is configured with a permanent IP address that is associated with the user's home network 104. The home network 104 is configured with routable IP addresses.

The message flow sequence shown in FIG. 21 is applicable to at least two scenarios: first, when the MN 112 is initially powered-on and, second, when a user 114 wants to connect the MN 112 to another service provider, e.g., a second or third service provider.

The concept of "always on, always ready to receive/send data" is used herein to refer to an MN 112 configured to establish a connection with its home network service provider 104 when the MN 112 is powered-on.

When the user wants to connect to another service provider, e.g., a second or third service provider, the user will initiate the connection by accessing a user interface (not shown), by pushing a pre-configured button (not shown) on the MN 112, or the like, to thereby cause the MN 112 to send a Registration Request to the user's home network 104. Completion of the registration process results in a packet data session being established between the user, via the LSF 106, and the user's home NSF 104.

Referring to FIG. 21, in an event 2102, after the user 114 powers-on the MN 112 (or initiates another service provider connection request), the MN 112 sends a Registration message to the xAN 110 of the user's home network 104. The Registration message is sent to the IP address (i.e., the IP address of the SMM 464B) that was contained in the BCCH. The Registration message includes a number of parameters (i.e., fields) 2102a–2102g. An NAI 2102a indicates the user who wants to establish the data session. An IP Addr parameter 2102b is the configured permanent IP address of the MN 112, if the MN has a configured IP address. An Auth parameter 2102c is the user's authentication parameter, i.e., the user's digital signature. A Profile Type parameter 2102d indicates the profile that the user wants to use. The profile may indicate the type of services the user has, the type of access into the network, and the like. A Terminal Info parameter 2102e contains information about capabilities of the terminal, such as whether support is provided for L2 addresses, SIP, H.323, and the like. A RegType parameter 2102f indicates the type of registration being performed. An RA parameter indicates the name (NAI) of the current subnet point of attachment.

In event 2104, the SMM 464B creates an AAA Authentication Request, comprising the NAI parameter 2102a and Auth parameter 2102c, and forwards the Authentication Request to the LSF 106 local AAA function 462.

In event 2106, the local AAA function 462 uses the domain portion of the user's NAI to determine the home NSF 104 of the user 114. A lookup is performed to determine the IP address of the user's home AAA function 450 and the type of security association (SA) established between the LSF 106 and the NSF 104. IPSec authentication (AH) is preferably used for security. The local AAA function 462 will then send the Authentication Request to the user's home AAA function 450. Before the packet is sent, an IPSec authentication (AH) is preferably performed on the message.

In event 2108, the user's home AAA function 450 receives the Authentication Request. The AAA function will first validate the IPSec AH, and then perform a lookup to determine which server it should forward the message to. The user's home AAA function 450 then forwards the Authentication Request to the authentication server 450b.

In event 2110, the authentication server 450b authenticates the user 114. The authentication server 450b may perform a number of functions, all depending on the type of authentication. Digital signatures are preferably used, so that the authentication server 450b would have received the user's digital signature. In the present case, the authentication server 450b would acquire the user's public key in a directory, which it would use to authenticate the user. In this case, the user 114 has been authenticated. The authentication server 450b then generates an Authentication Response message that includes the user's NAI and a Flag 2110a that indicates the authentication passed. The authentication server 450b then sends the Authentication Response to its home AAA function 462.

NOTE: It may be possible for the authentication server 450b to send information to the LSF 106 that will permit the LSF 106 to authenticate the user 114 while the user roams in the LSF. However, the LSF 106 must be able to support the authentication mechanism required by the user 114.

In event 2112, the home AAA function 462 will generate an IPSec AH and send the IPSec AH to the local AAA function 462 serving the user 114.

In event 2114, the local AAA function 462 validates the IPSec AH and passes it to the SMM 464B. The events 2104–2114 constitute the Authentication Procedure of FIG. 21.

In event 2116, the SMM 464B establishes a packet data session with the user's home NSF 104. This is achieved by sending the home NSF 104 a registration request. At least two parameters 2116a and 2116b, not included in the Registration Request of the event 2102, are added to the Request. First, an LSF Info parameter 2116a is added which will contain information about the LSF 106 and user mobility. Second, a COA parameter 2116b is added which includes an IP address that is used by the home NSF 104 router and correspondent nodes to tunnel datagrams to the MN 112 and LSF 106. The LSF Info parameter 2116a also includes an indication of the type of COA, i.e., whether the COA is a router COA or an MN co-located COA.

In event 2118, the local AAA function 462 uses the domain portion of the user's NAI to determine the home system 106 of the user 114. A lookup is performed to determine the IP address of the user's home AAA function 462 and the type of security association (SA) established between the LSF 106 and NSF 104. The local AAA function 462 will then send the Registration Request message to the user's home AAA function 450. Before the Registration Request message is sent, an IPSec authentication (AH) is preferably performed on the message.

In event 2120, the user's home AAA function 450 receives the Registration Request message. The AAA function 450 first validates the IPSec AH, and then performs a lookup function to determine which server the message should be forwarded to. Since the message is a Registration Request, the home AAA function 450 forwards the message to the HMM 452B.

In event 2122, the HMM 452B performs at least three functions. First, the HMM 452B updates the local directory with the LSF 106 and mobility info. Second, the HMM 452B sends a route update message to the local router so that it can update the MN's IP address and COA. Third, the HMM 452B creates a Registration Reply message that includes the user's NAI and the user's profile. The profile will contain, at a minimum, the maximum bandwidth to be allocated to the user 114. The HMM 452B then sends the Registration Reply to its home AAA function 450.

In event 2124, the home AAA function 450 will create an IPSec AH message and send it to the local AAA function 462 serving the user 114.

In event 2126, the local AAA function 462 validates the IPSec AH message and passes it to the SMM 464B. The events 2116–2126 constitute the Registration Procedure of FIG. 21.

In event 2128, the SMM 464B informs the xAN 110 of the User's NAI, the User's IP address and the MN's layer 2 address. The xAN 110 uses this information to route information to the MN 112.

In event 2130, the SMM 464B updates its local directory with the appropriate info. It also updates the policy database with the user's maximum bandwidth allowed. The SMM 464B may create an encryption key to be used by the user's MN 112 for over-the-air encryption. The SMM 464B sends a Registration Reply to the xAN/LSF 106 router.

In event 2132, the mobility agent at the xAN/LSF router must update the router's routing table to include the IP address of the MN 112. The xAN 110 must be informed of the "binding" between the MN's IP Address and the MN's L2 Address. The xAN 110 then sends the registration reply to the MN 112. In event 2126, the local AAA function 462 validates the IPSec AH message and passes it to the SMM 464B. The events 2128–2132 constitute the Registration Reply Procedure of FIG. 21.

3.1.2 Initial Registration, MN Configured with a Non-routable IP Address

Figure 22:
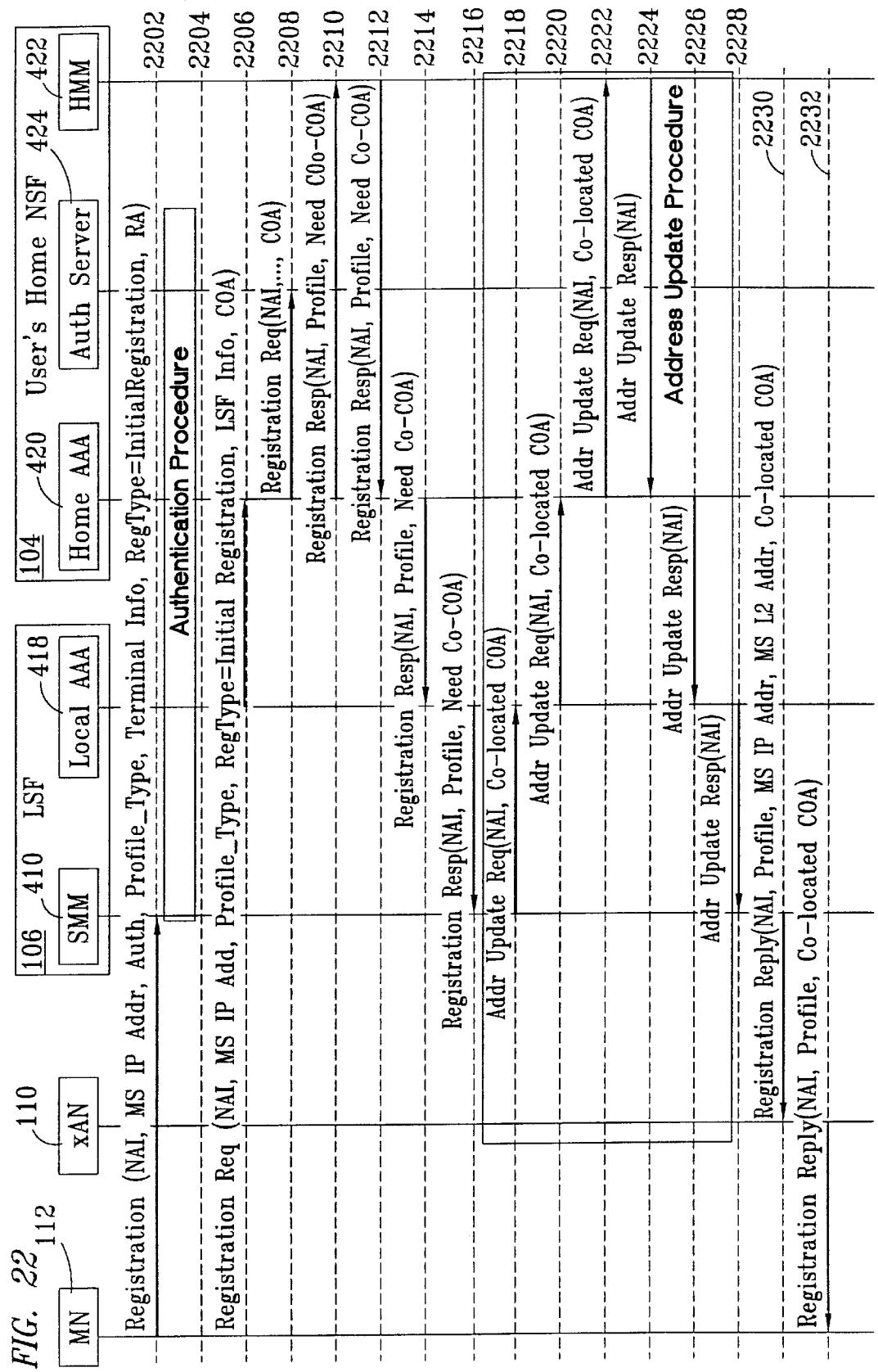
FIG. 22 is an event sequence diagram showing the flow of events for a Initial Registration, wherein an MN has a publicly non-Routable IP Address.

FIG. 22 is an message flow event sequence diagram showing the flow of messages for a user connecting to his/her home network 104, wherein the MN 112 and the user's home network 104 are configured with non-routable IP addresses. FIG. 22 is similar to FIG. 21 but for the MN 112 being provided with a co-located COA, i.e., an IP address that may be used with nodes on the Internet to tunnel datagrams directly to the MN 112.

The message flow depicted by FIG. 22 is applicable to at least two scenarios: first, when the MN 112 is initially powered-on and, second, when a user 114 wants to connect to another service provider, such as a second or third service provider.

In event 2202, the user has powered on the MN 112 (or initiated another service provider connection request). The MN 112 is configured to send a registration message to the user's home network. The registration message is sent to the IP address (which is the IP address of the SMM) that was contained in the BCCH. The parameters are the same as described above with respect to FIG. 21.

Event 2204 represents an authentication procedure which similar to the authentication procedure described above with respect to events 2104–2114 of FIG. 21, and will therefore not be described in further detail herein.

In event 2206, the SMM now needs to establish the packet data session with the user's home network 104. This is achieved by sending the home network 104 a Registration Request. Two additional parameters are added to the registration message, namely, an LSF Info parameter 2206a and a COA parameter 2206b. The LSF Info parameter 2206a includes information about the LSF and user mobility. The COA parameter 2206b contains the IP address that is used by the home network router and correspondent nodes to tunnel datagrams to the MN 112 and LSF 106. There is an indication of the type of COA (not co-located).

In event 2208, the local AAA function uses the domain portion of the user's NAI to determine the home system of the user. A lookup is performed to determine the IP address of the user's home AAA function and the type of security association (SA) established between the LSF and NSF. The local AAA function will then send the message to the user's home AAA function. Before the packet is sent, an IPSec authentication (AH) is performed on the message.

In event 2210, the user's home AAA function receives the message. The AAA function will first validate the IPSec AH. It then performs a lookup to see what server it should forward the message to. Since this is a registration request, it forwards the message to the HMM.

In event 2212, the HMM 452B performs at least two functions. First, the HMM 452B updates the local directory with the LSF 106 and mobility information. Second, the HMM 452B realizes that the COA is not an MN co-located COA which is necessary for MN's that are associated with private networks with non-routable IP addresses. The HMM 452B then creates a Registration Reply message that includes the user's NAI, the user's profile, and an indication that an MN co-located COA must be allocated. The HMM 452B then sends the registration reply to its home AAA function 450 and a request for a co-located IP address. The HMM 452B then sends the Registration Reply to its home AAA function 450.

In event 2214, the AAA function 450 generates an IPSec AH message and sends it to the local AAA function 462 serving the user 114.

In event 2216, the local AAA function 462 validates the IPSec AH and forwards the IPSec AH message to the SMM 464B.

In event 2218, the SMM 464B updates its local directory with the appropriate information. The SMM 464B also updates the policy database with the user's maximum bandwidth allowed. The SMM 464B is configured to then allocate a co-located IP address for the MN 112. A request is made to the DHCP _____ to allocate the address. The SMM 464B creates an Address Update Request message with the MN co-located COA to send to the HMM 452B. The Address Update Request message is then forwarded to the local AAA function 462.

In event 2220, the local AAA function 462 uses the domain portion of the user's NAI to determine the home NSF 104 of the user 114. A lookup is performed to determine the IP address of the user's home AAA function 450 and the type of security association (SA) established between the LSF 106 and the NSF 104. An IPSec authentication (AH) is then performed on the message. The local AAA function 462 then sends the Address Update Request message to the user's home AAA function 450.

In event 2222, the user's home AAA 450 server receives the Address Update Request message. The AAA function 450 will first validate the IPSec AH. It then performs a lookup to see what server it should forward the Address Update Request message to. Since the message is an Address Update Request, it forwards the message to the HMM 452B.

In event 2224, the HMM 452B will perform at least two additional functions. Send a route update message to the local router so it can update the MN's IP address and MN 112 co-located COA. The HMM 452B then creates an Address Update Response message that includes the user's NAI. The HMM function 452 then sends the Address Update Response message to its home AAA function 450.

In event 2226, the home AAA function 450 will create an IPSec AH and send the Address Update Response message to the local AAA function 462 serving the user 114.

In event 2228, the local AAA function 462 validates the IPSec AH and passes the message on to the SMM 464B.

In event 2230, the SMM 464B will update its local directory with the appropriate information. The SMM 464B may create an encryption key to be used by the user's MN 112. The SMM 464B will send a Registration Reply to a mobility agent on the xAN 110/LSF 106 router.

In event 2232, the mobility agent at the xAN 110/LSF 106 router updates the router's routing table to include the MN's IP address. The xAN 110 is notified of the "binding" between the MN's IP Address and the MN's L2 Address. The mobility agent then sends the Registration Reply to the MN 112.

3.1.3 Initial Registration in the Case Where the MN Does Not Have an IP Address

Figure 23:
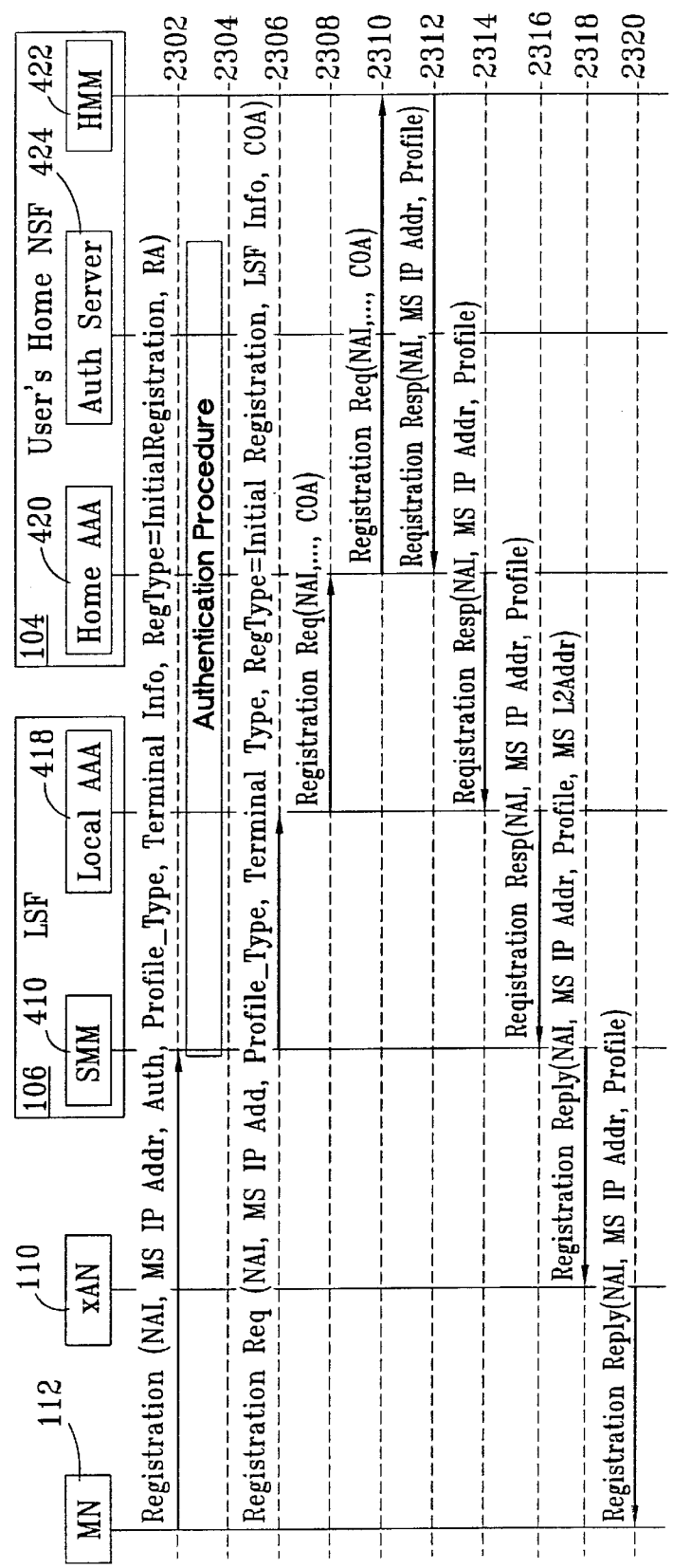
FIG. 23 is an event sequence diagram showing the flow of events for a Initial Registration, wherein an MN has no IP address.

FIG. 23 is a message flow event sequence diagram showing the flow of messages for a user connecting to his/her home network, wherein the MN and the user's home network are configured with non-routable IP addresses. FIG. 21 is similar to FIG. 23 but for the MN is not configured with an IP address. The home network is, however, configured with routable IP addresses and will allocate a routable IP address to the MN.

This flow also applies to two scenarios: 1) when the MN is initially powered-on and, second, when a user wants to connect to another service provider, such as a second or third service provider.

In event 2302, the user has powered on the MN (or initiated another service provider connection request). The MN is configured to send a registration message to the user's home network. The registration message is sent to the IP address (which is the IP address of the SMM) that was contained in the BCCH. The parameters are the same as defined in section 3.1.1. NOTE: the MN IP Address should be set to zero (0.0.0.0).

In event 2304, the authentication procedure is performed. See section 3.1.1 for details.

In event 2306, the SMM now needs to establish the packet data session with the user's home network. This is achieved by sending the home network a registration request. The registration message contains two additional parameters. First, the LSF Info will contain information about the LSF and user mobility. Second, the COA is the IP address that is used by the home network router and correspondent nodes to tunnel datagrams to the MN/LSF. There is also an indication of the type of COA (not co-located).

In event 2308, he local AAA function uses the domain portion of the user's NAI to determine the home system of the user. A lookup is performed to determine the IP address of the user's home AAA function and the type of security association (SA) established between the LSF and NSF. The local AAA function will then send the message to the user's home AAA function. Before the packet is sent, an IPSec authentication (AH) is performed on the message.

In event 2310, the user's home AAA function receives the message. The AAA function will first validate the IPSec AH. It then performs a lookup to see what server it should forward the message to. Since this is a registration request, it forwards the message to the HMM.

In event 2312, the HMM updates the local directory with the LSF and mobility info. Additionally, since the MN does not have a permanent IP address, the HMM will also allocate an IP address via DHCP for the MN. The MN IP address is dynamically updated in the home network's DDNS.

Furthermore, the HMM sends a route update message to the local router to update the MN's IP address and COA.

Moreover, the HMM creates a registration reply message that includes the user's NAI, the user's profile, and the newly created MN IP address.

After these functions are completed, the HMM sends the registration reply to its home AAA function.

In event 2314, the AAA function will create an IPSec AH and send the message to the local AAA function serving the user.

In event 2316, the local AAA function validates the IPSec AH and passes the message on to the SMM.

In event 2318, the SMM updates its local directory with the appropriate information. It will also update the policy database with the user's maximum bandwidth allowed. The SMM realizes that the MN does not have an IP address. The SMM will send a registration reply to a mobility agent on the xAN/LSF router. The SMM will include the MN's layer 2 address in the reply. The xAN will use the layer 2 address to send the registration reply.

In event 2320, the mobility agent at the xAN/LSF router must update the router's routing table to include the MN's IP address. The xAN must be told of the "binding" between the MN's IP Address and the MN's L2 Address. The mobility agent "updates" the datagram's destination address to be a broadcast address sends the registration reply to the xAN software and includes the MN's L2 address so the xAN can route it to the MN. NOTE: If the xAN is an Ethernet access point, the broadcast message will be sent to all MNs on the link.

3.1.4 Initial Registration, Hierarchical Routers

Figure 24:
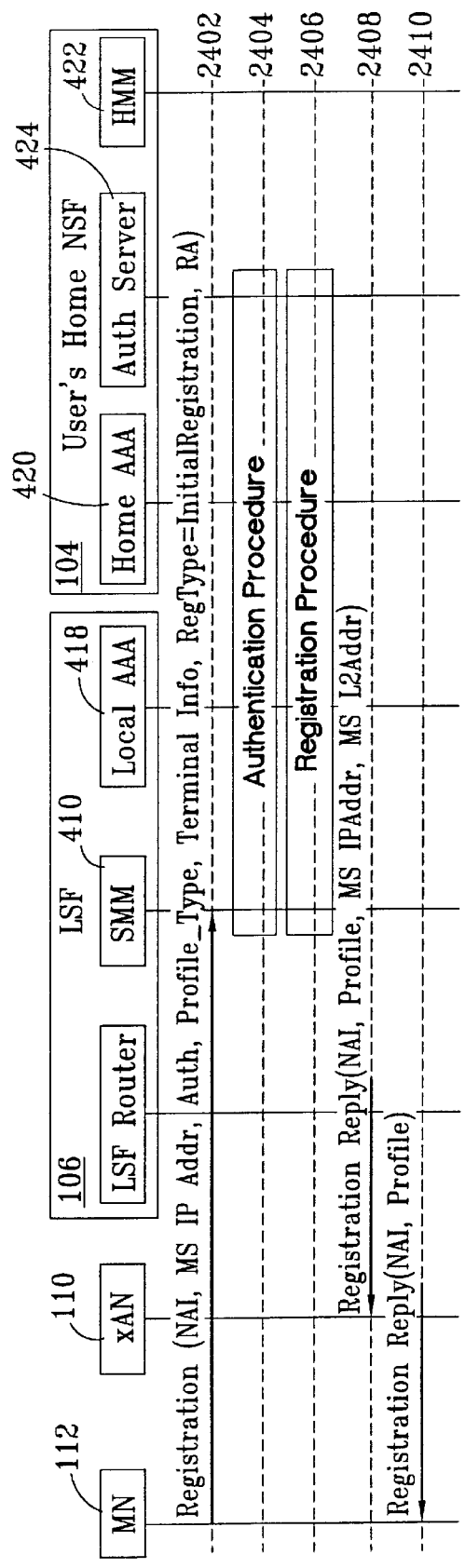
FIG. 24 is an event sequence diagram showing the flow of events for an Initial Registration using hierarchical routers.

FIG. 24 is a message flow event sequence diagram showing the flow of messages for a user connecting to its home network where the home network is configured with routable IP addresses. FIG. 21 is similar to FIG. 24 but for the hierarchy of routers in the LSF/xAN. Particularly, the xAN has a router at edge of the xAN/LSF interface and there is another router, called the LSF router, which has a COA that is used to tunnel datagrams to.

In event 2402, the user has powered on the MN (or initiated another service provider connection request). The MN is configured to send a registration message to the user's home network. The registration message is sent to the IP address (which is the IP address of the SMM) that was contained in the BCCH. The parameters are the same as defined in section 3.1.1.

In event 2404, the authentication procedure is performed. See section 3.1.1 for details.

In event 2406, the registration procedure is performed. See section 3.1.1 for details. NOTE: The COA sent in the registration message is the COA of the LSF router.

In event 2408, the SMM will update its local directory with the appropriate information. The SMM will send a registration reply to a mobility agent on the xAN/LSF router.

In event 2410, the mobility agent at the xAN/LSF router must update the router's routing table to include the MN's IP address. When this occurs, some routing protocol, such as RIP, will update the local network with routing information so datagrams can be delivered to the xAN router, such as when the LSF router will receive a route update and will know how to forward de-tunneled datagrams. The xAN must be told of the "binding" between the MN's IP Address and the MN's L2 Address. The mobility agent then sends the registration reply to the MN.

3.1.5 MN Moves to a New Routing Area, New LSF

When a user roams between LSFs, the user changes subnet points-of-attachments, therefore, the user changes Routing Areas. The LSF requires notification of the RA changes to re-authenticate the user to avoid fraudulent users. In an IP centric network, it is advisable to always have the LSF authenticate the user. Additionally, the user may have access restrictions within the new RA, or a different IP router may need to provide tunneling services, via a new COA, to the MN while it is in the new RA, both of which require notification of the LSF.

In this architecture, before the MN moves to the new LSF, it will send a registration request message to old LSF that indicates the MN is about to move to the new LSF. This triggers the old LSF to start queuing MN datagrams.

Figure 25A:
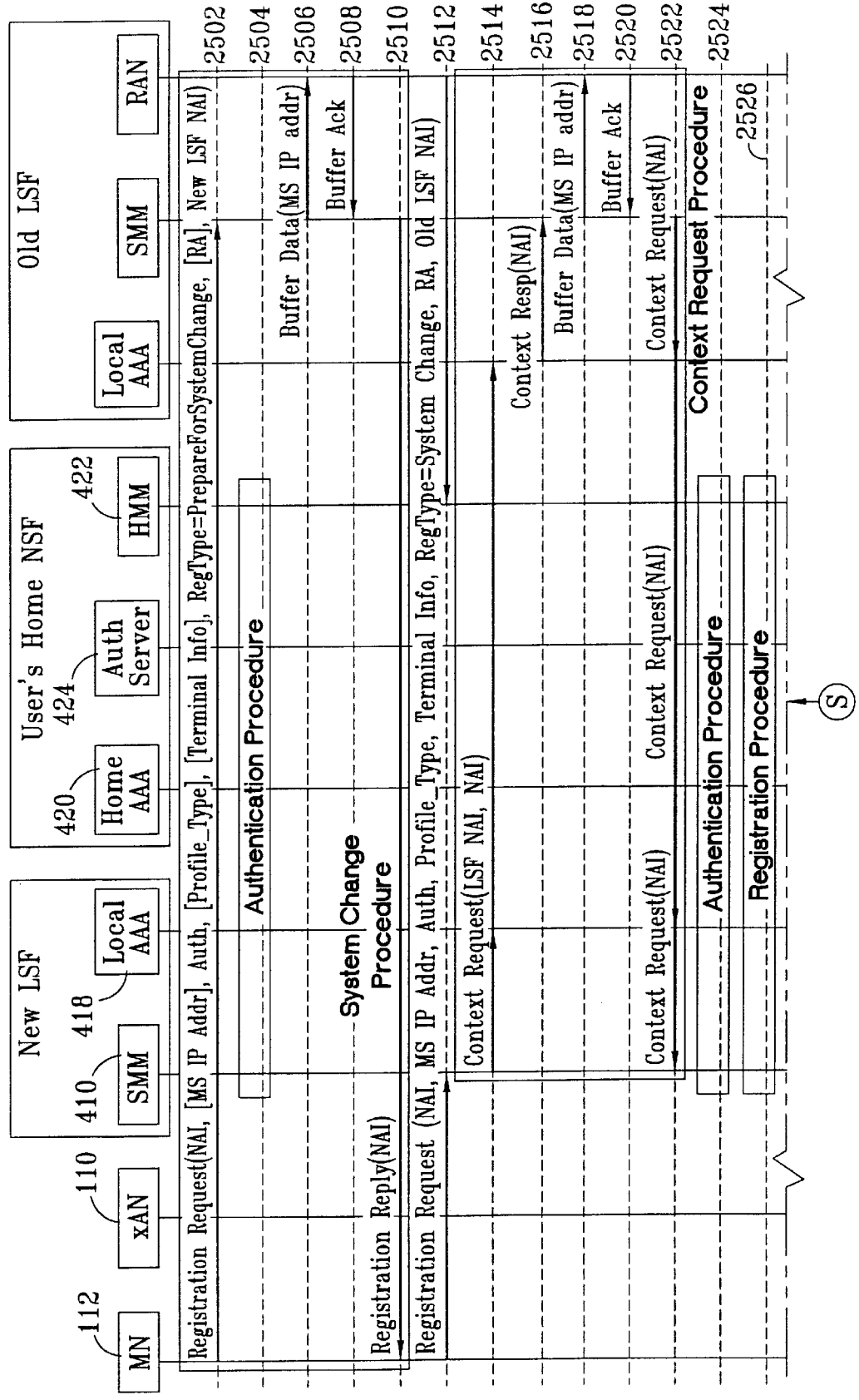
FIG. 25 is an event sequence diagram showing the flow of events for an MN moving to new LSF
Figure 25B:
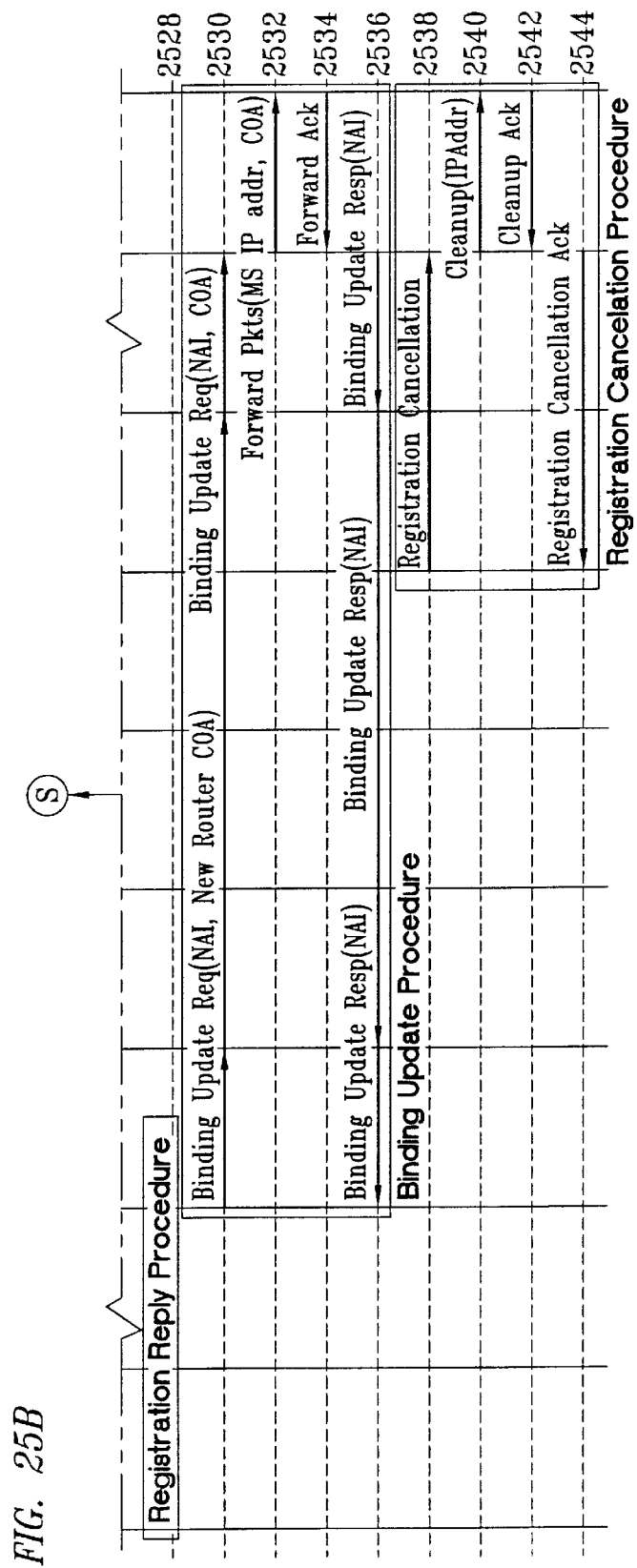

FIG. 25 is a message flow event sequence diagram showing the flow of messages for a user roaming between LSFs. This mechanism is used whenever the user is changing RAs.

This type of movement indication would be most beneficial in access networks that do not depend on paging the MN. In other types of access networks, the messaging overhead incurred by sending the LSF an indication of a user/MN moving may not be as beneficial because the number of MN's that will actually receive data during this process should be very small. Moreover, in RANs that are channelized, the LSF is still going to page the MN.

When the registration process is invoked, it may be necessary to perform registration for multiple users, all of who may be registered with their respective ISPs. The preferred method of registration occurs when the MN sends a registration message for each NAI that is in an active packet data session.

Registration may also occur when the MN sends a single registration message that includes all the NAIs and their associated parameters. A single registration message could result in a large message transmitted over the air, prone to transmission errors and, hence, requiring retransmissions of long messages.

Furthermore, the MN can register by sending a single registration message for only one of the NAIs e.g. the one associated with the first active data session. If the LSF has a policy to authenticate users, the LSF will request authentication for the single NAI. This may be a little risky since the authentication mechanism may be a weak authentication, such as a login ID and password, which is more prone to fraud (this is subject to the architecture supporting legacy authentication mechanisms).

Furthermore still, the MN can register by sending a single registration message that does not include any NAIs. The LSF could have a policy that initiates a unique challenge for each NAI associated with the MN (NAIs should be associated with the MN's L2 Addr). If it is assumed that the LSF will always want the MN's NAI authenticated, however, the unique challenge scenario applied to each NAI produces more messaging as compared to first registration procedure described above.

Figure 35:
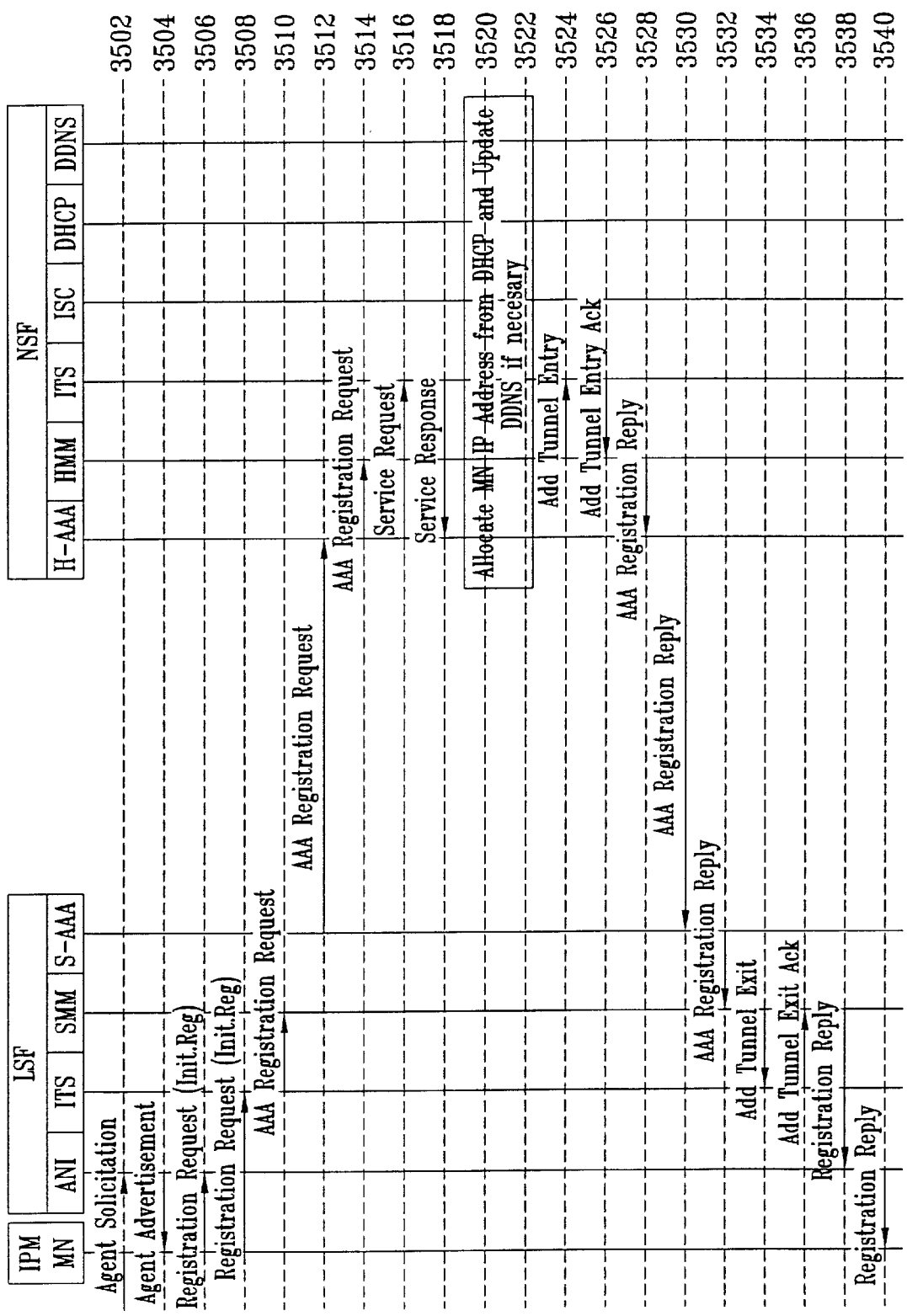
FIG. 35 is an event sequence diagram showing the flow of events when an IPM MN registers from an IPM LSF.

FIG. 35 is a message flow event sequence diagram showing the flow of messages for a MN moving from a first routing area on a first LSF to a second routing area on a second LSF.

The initial procedure involves the System Change Procedure, as indicated by events 2502–10. The first event 2502, the MN detects it will move to a new system (new LSF) and informs the current system (old xAN/LSF) of the impending move by sending a registration message to the "old" system (LSF) with a registration type of "Prepare for System Change". The "old" system will have its router (xAN) start queuing datagrams for the MN. The parameters are the same as defined in section 3.1.1. The parameters in [brackets] are optional.

In event 2504, the authentication procedure is performed, if necessary. See section 3.1.1 for details. The authentication procedure may not be necessary if the MN and the LSF have established keys to be used for over the air encryption.

In event 2506, the SMM informs the mobility agent on the old router to start buffering datagrams destined to the user's MN.

To complete the System Change Procedure, acknowledgements are sent by the router, event 2508, and the SMM, event 2510.

In event 2512, the MN has determined it has crossed over a LSF boundary (via a new system ID). The MN sends a registration message to the IP address (which is the IP address of the SMM) that is contained in the BCCH. The MN will send a registration request message for each active packet data session it has. In this scenario, there is only one active packet data session. The message includes the old LSF's system ID.

The SMM detects that the registration type is "System Change" and that the message includes the Old LSF ID. As a result, the SMM initiates the Contect Request Procedure, as indicated by events 2514–22, to request MN information from the old LSF and have the old LSF start buffering datagrams destined to the MN. This is achieved by sending the old LSF a context request message via the local AAA function, event 2514. The SMM will put the old LSF's NAI in the message so the local AAA function can route the message (to simplify this, the SMM may pass the IP address of the old LSF; this is an implementation detail.

If there is more than one active packet data session for the MN, the MN will send a registration request message for each active packet data session it has. This will incur multiple context requests being issued by the new LSF, but sending a single context request that includes the MN's L2 Addr to the old LSF can optimize it.

The context response includes MN information for all active packet data sessions. Hence, the new LSF will not have to send a context request message for each registration message.

The local AAA function uses the domain portion of the old LSF's NAI to determine the LSF's system. A lookup is performed to determine the IP address of LSF's AAA function and the type of security association (SA) established between the old LSF and new LSF. The local AAA function will then send the message to the LSF's AAA function. Before the packet is sent, an IPSec authentication (AH) is performed on the message.

In event 2516, he old LSF's AAA function receives the message. The AAA function will first validate the IPSec AH. It then performs a lookup to determine to which server it should forward the message. Since this is a context request, it forwards the message to the SMM.

In event 2518, the SMM informs the mobility agent on the old router to start buffering datagrams destined to the user's MN. The buffer data request can have multiple MN IP addresses. Additionally, if the SMM had previously initiated a buffer request, such as during the System Change Procedure, the SMM does not have to reissue the request here.

In event 2520, the router mobility agent updates the local router to start queuing datagrams destined to the MN and then sends an ack message back to the SMM.

In event 2522, the SMM creates a context response message with the MN's IP address(es) and sends it back to the new LSF SMM, in addition to performing normal AAA server functions. It is not necessary to send the user's profile since it will be retrieved during the registration procedure described below.

In event 2524, the Authentication Procedure is performed. See section 3.1.1 for details.

In event 2526, the Registration Procedure is performed. See section 3.1.1 for details.

In event 2528, the Registration Reply Procedure is performed. See section 3.1.1 for details.

In the Binding Update Procedure, indicated by events 2530–36, updates the MN's binding to include the new LSF before the binding to the old LSF is canceled.

In event 2530, the new LSF's SMM creates a Binding Update request message that includes the user's NAI and the COA of the router that the MN's datagrams need to be tunneled to and sends it to the old LSF's SMM, in addition to performing all normal AAA server functions. This request will allow the old LSF to start forwarding the MN's datagrams.

In event 2532, the old LSF's SMM sends a Forward Packets message to the mobility agent on the LSF/xAN router to request that the router start forwarding datagrams to the new router's COA.

In event 2534, the mobility agent acknowledges the forward packets request.

In event 2536, the SMM creates a Binding Update response message with the user's NAI and sends it to the new LSF's SMM, in addition to performing normal AAA server functions.

After the Binding Update Procedure is completed, the Registration Cancellation procedure, indicated by events 2538–44, cancels the registration of the MN to the old LSF.

In event 2538, after the user's home NSF performed the registration, it sends the old LSF a registration cancellation message, in addition to performing normal AAA server functions. The reason for sending the registration cancellation is that there is a window where the home NSF may have sent a CN a binding update that had the old LSF's COA. The home NSF must now update the CN with the new COA and then perform the registration cancellation procedure. This will insure that the old LSF will not stop forwarding datagrams to the MN prematurely. The registration procedure is being performed in parallel to the Binding Update procedure, which was initiated by the new LSF in event 2528. Also, it is not necessary for the NSF to have a retry counter associated with the registration cancellation request.

In event 2540, the old LSF's SMM initiates the cleanup after the Binding Update and the registration cancellation has completed. In event 2542, the router's mobility agent acks the message, and the old LSF acks the registration cancellation reques in event. All the normal AAA server functions are performed.

3.1.6 MN Moves to a New RA, New xAN, Same LSF

Figure 26:
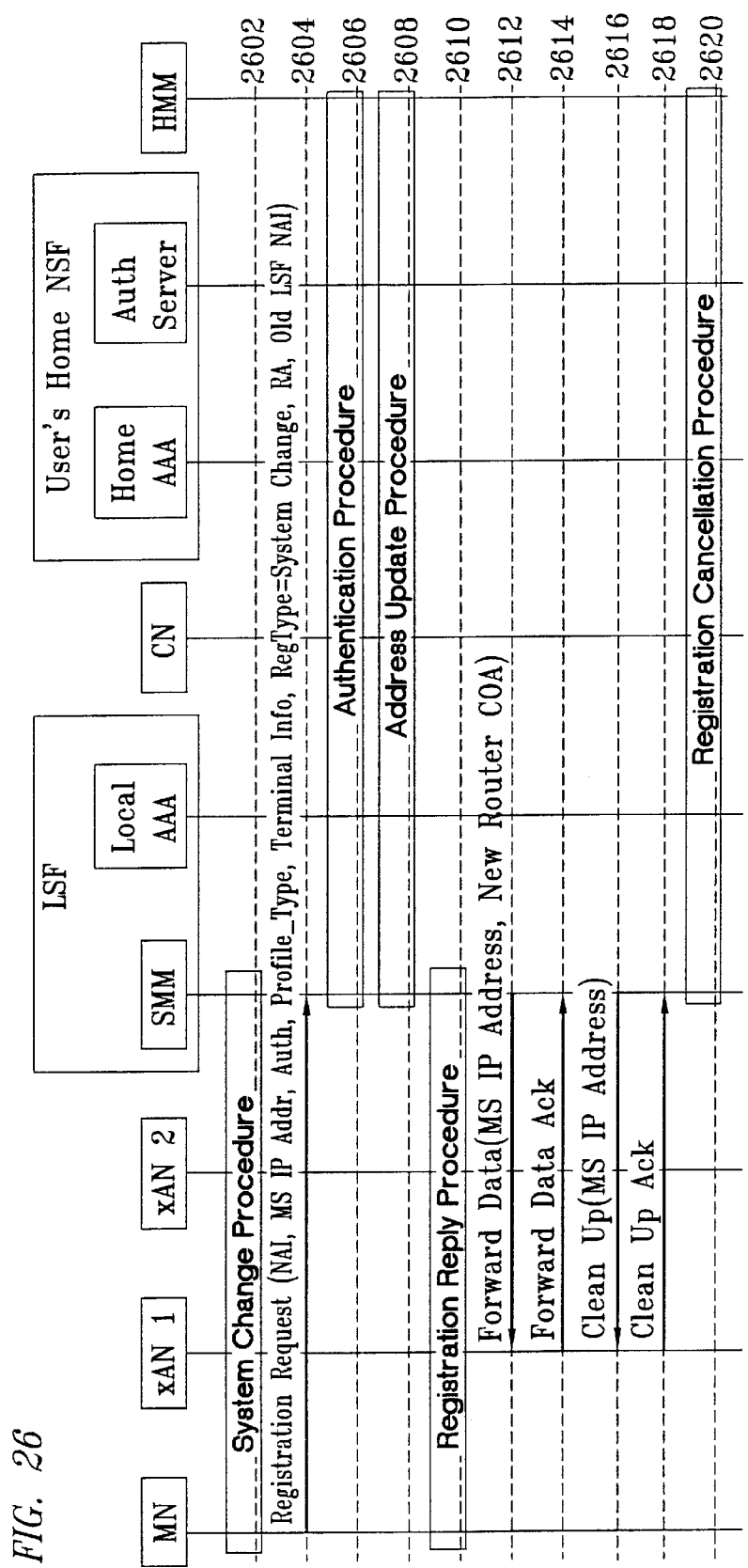
FIG. 26 is an event sequence diagram showing the flow of events for an MN moving to a new RA, new xAN, same LSF.

FIG. 26 is a message flow event sequence diagram showing the flow of messages for a user roaming between xANs within the same LSF. The registration request message sent through the old xAN indicates movement to another system (xAN) and triggers the LSF to start queuing MN datagrams at the old xAN.

In event 2602, the System Update procedure is performed. See section 3.1.1 for details.

In event 2604, the MN determines a xAN boundary has been crossed via a new system ID. The MN sends a registration message to the IP address, which is the IP address of the SMM, contained in the BCCH or Agent Advertisement. The MN sends a registration request message for each active packet data session. In this scenario, there is only one active packet data session. The message includes the old LSF's system ID.

In event 2606, the Authentication procedure is performed. See section 3.1.1 for details.

In event 2608, the Address Update procedure is performed. See section 3.1.1 for details.

In event 2610, the Registration Reply procedure is performed. See section 3.1.1 for details.

In event 2612, the LSF's SMM sends a Forward Packets message to the mobility agent on the old xAN router to request that the router start forwarding datagrams to the new router's COA. These datagrams will be tunneled to the new router's COA.

In event 2614, the mobility agent informs the xAN/router to start forwarding packets and acks the Forward Data request.

In event 2616, the Registration Cancellation procedure is performed. See section 3.1.1 for details.

3.1.7 MN Moves to a New Routing Area, Same xAN/LSF, New COA

Figure 27:
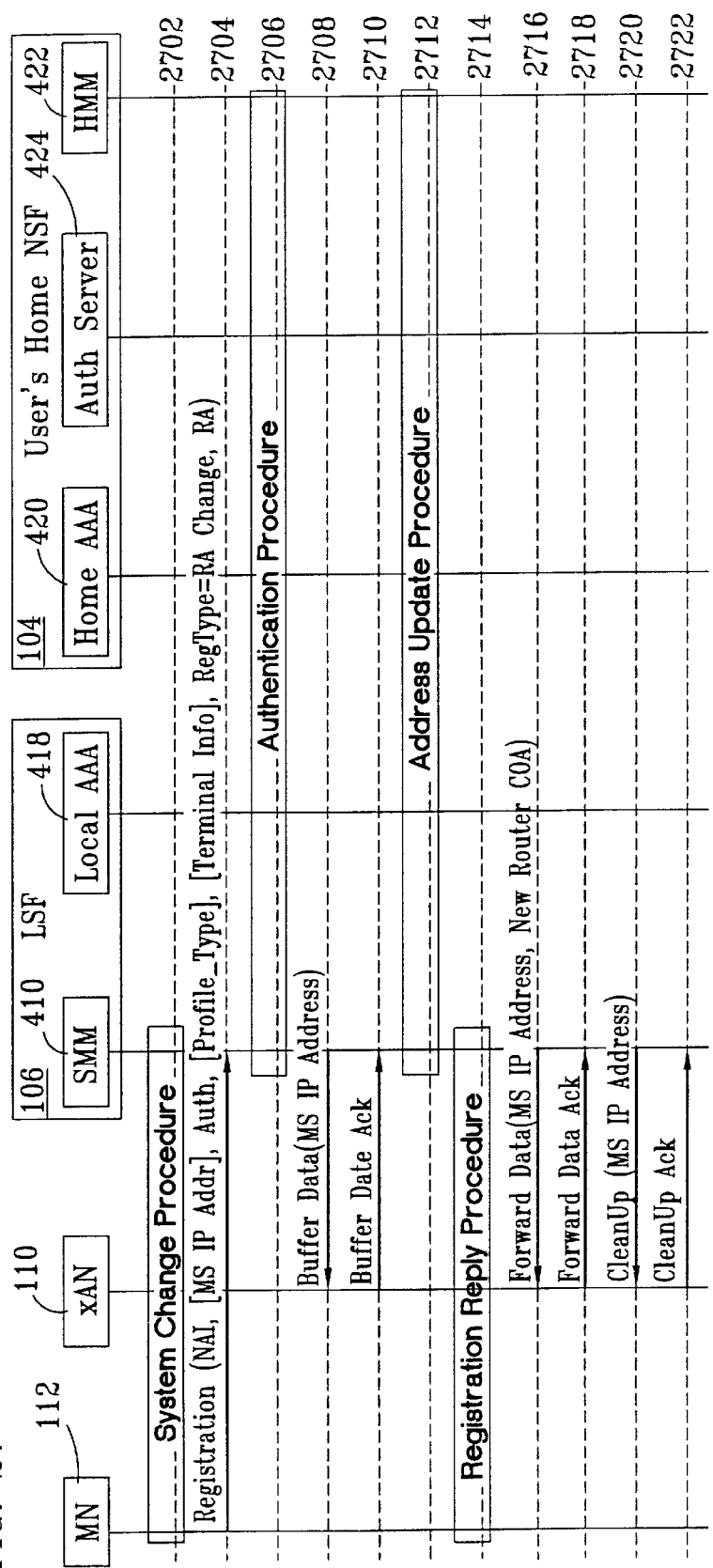
FIG. 27 is an event sequence diagram showing the flow of events for an MN moving to a new RA, same xAN/LSF, new COA.

FIG. 27 is a message flow event sequence diagram showing the flow of messages for a user roaming between RAs within the same xAN/LSF. At the xAN/LSF boundary, however, there are multiple routers and, hence, multiple routing areas each having their own COA. When the user roams in a new RA, the associated COA must be updated at the user's home network.

Alternatively, instead of allocating a new COA and updating the COA at the user's home network, the original router may be updated with information on how to route MN datagrams to the new router(s). Since the present invention tries to avoid such configurations, it is preferred to update the COAs.

In event 2702, the System Change Procedure is performed. See section 3.1.5 for details.

In event 2704, the MN has determined it has crossed over a routing area boundary. The MN sends a registration message for each active packet data session. In this scenario, there is only one active packet data session. The parameters are the same as defined in section 3.1.1, brackets indicating optional parameters.

In event 2706, the Authentication Procedure is performed. See section 3.1.1 for details.

In event 2708, the SMM informs the mobility agent on the old router to start buffering datagrams destined to the user's MN. The SMM, however, will not issue the buffer data request if it was performed during the System Change Procedure.

In event 2710, the router mobility agent acknowledges the message.

In event 2712, the Address Update Procedure is performed. See section 3.1.2 for details.

In event 2714, the Registration Reply Procedure is performed. See section 3.1.1 for details.

In event 2716, the SMM informs the mobility agent on the old router to start forwarding datagrams destined to the user's MN. These datagrams will be tunneled to the new router's COA.

In event 2718, the router mobility agent acknowledges the message.

In event 2720, the SMM informs the mobility agent on the old router to have the xAN clean up its resources.

In event 2722, the router mobility agent acknowledges the message.

3.1.8 MN Moves to a New Routing Area, Same xAN/LSF, Same COA

Figure 28:
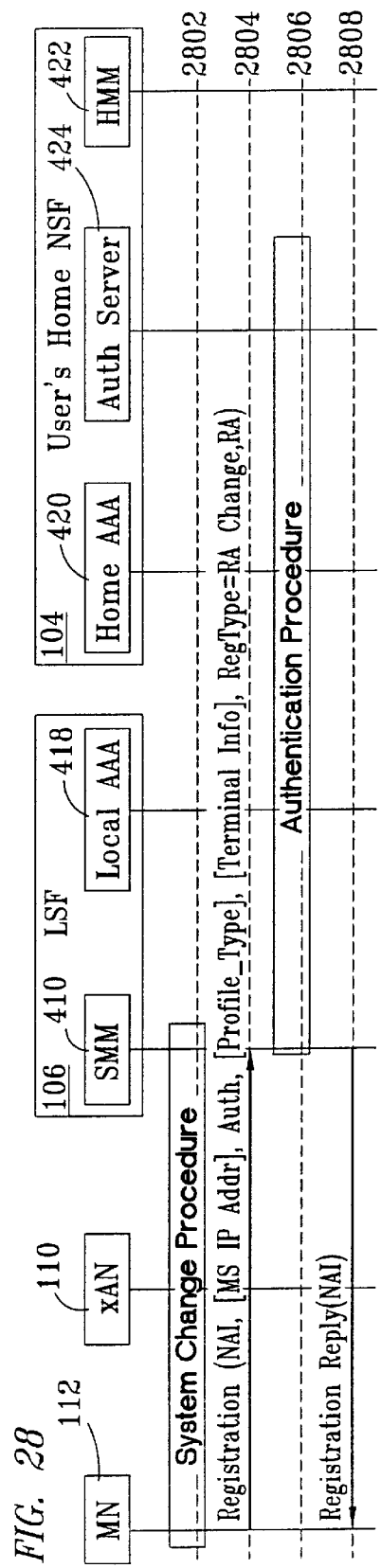
FIG. 28 is an event sequence diagram showing the flow of events for an MN moving to a new RA, same xAN/LSF, same COA.

FIG. 28 is a message flow event sequence diagram showing the flow of messages for a user roaming to a new routing area where the MN's COA does not change. It should be noted that the MN does not know that the COA will not change. During the system change procedure, however, the SMM will know and will not have to buffer datagrams destined to the MN.

In event 2802, the System Change Procedure is performed. See section 3.1.5 for details.

In event 2804, the MN has determined it has moved to a new routing area. The MN sends a registration message for each active packet data session. In this scenario, there is only one active packet data session. The parameters are the same as defined in section 3.1.1. The parameters in [brackets] are optional.

In event 2806, the Authentication Procedure is performed. See section 3.1.1 for details.

In event 2808, if the user was authenticated, the SMM updates its local directory with the new RA and send a registration reply to the MN. Since a new COA was not allocated for the user, there are no other functions that the SMM needs to perform.

3.1.9 MN Moves Back to the User's Home Network, Combined LSF/NSF

Figure 29:
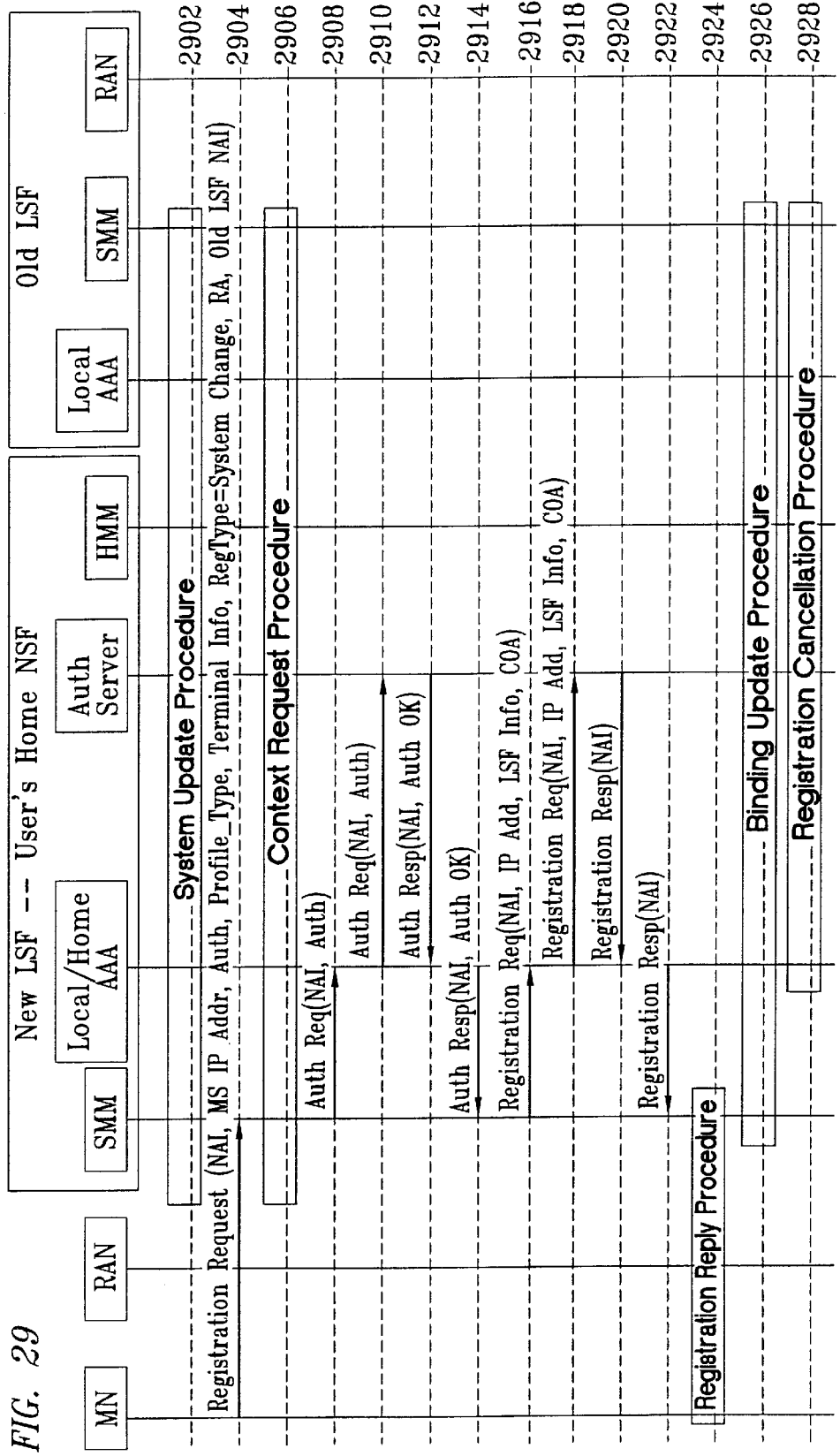
FIG. 29 is an event sequence diagram showing the flow of events for an MN moving to a Home Network.

FIG. 29 is a message flow event sequence diagram showing the flow of messages for a user roaming back into his/her home network, wherein the network is a combined LSF/NSF and the home subnet is accessed over some radio interface (RAN), not over an Ethernet connection. The combined LSF/NSF may be on the same subnet.

In event 2902, the System Change Procedure is performed. See section 3.1.5 for details.

In event 2904, the MN determines it has crossed over a LSF boundary via a new system ID. The MN sends a registration message to the IP address, which is the IP address of the SMM, contained in the BCCH. The MN will send a registration request message for each active packet data session. In this scenario, there is only one active packet data session. The message includes the old LSF's system ID.

In event 2906, the Context Request Procedure is performed. See section 3.1.5 for details.

In event 2908, the SMM creates an AAA Authentication Request and forwards it to the LSF's local AAA function. If the SMM and the Auth center are on the same subnet, or the same server, it is not necessary to have the Authentication Request go through the AAA function.

In event 2910, the local AAA function uses the domain portion of the user's NAI to determine the home system of the user. A lookup is performed to determine the IP address of the user's home AAA function and the type of security association (SA) established between the LSF and NSF. The AAA function realizes it is its own network, so it forwards the message directly to the authentication server.

In event 2912, the authentication server authenticates the user. The authentication server then sends an authentication response to its home AAA function.

In event 2914, the AAA function realizes it is its own network, so it forwards the message directly to the SMM.

In event 2916, the SMM creates a registration request message and forwards it to the LSF's local AAA function. If the SMM and the HMM are on the same subnet or the same server, it is not necessary to have the Authentication Request go through a AAA function In event 2918, the local AAA function uses the domain portion of the user's NAI to determine the home system of the user. A lookup is performed to determine the IP address of the user's home AAA function and the type of security association (SA) established between the LSF and NSF. The AAA function realizes it is its own network, so it forwards the message directly to the Authentication Server.

In event 2920, the HMM updates the local directory with the LSF and mobility information. Additionally, the HMM sends a route update message to the local router to can update the MN's IP address, which is the MN's IP address in this scenario. Moreover, the HMM creates a registration reply message that includes the user's NAI and sends the registration reply to its AAA function.

In event 2922, the AAA function realizes it is its own network, so it forwards the message directly to the SMM.

In event 2924, the Registration Reply Procedure is performed. See section 3.1.1 for details.

In event 2926, the Binding Update Procedure is performed. See section 3.1.5 for details.

In event 2928, the Registration Cancellation Procedure is performed. See section 3.1.5 for details.

3.1.10 MN Moves to a New RA, New LSF, No Movement Indication

Figure 30:
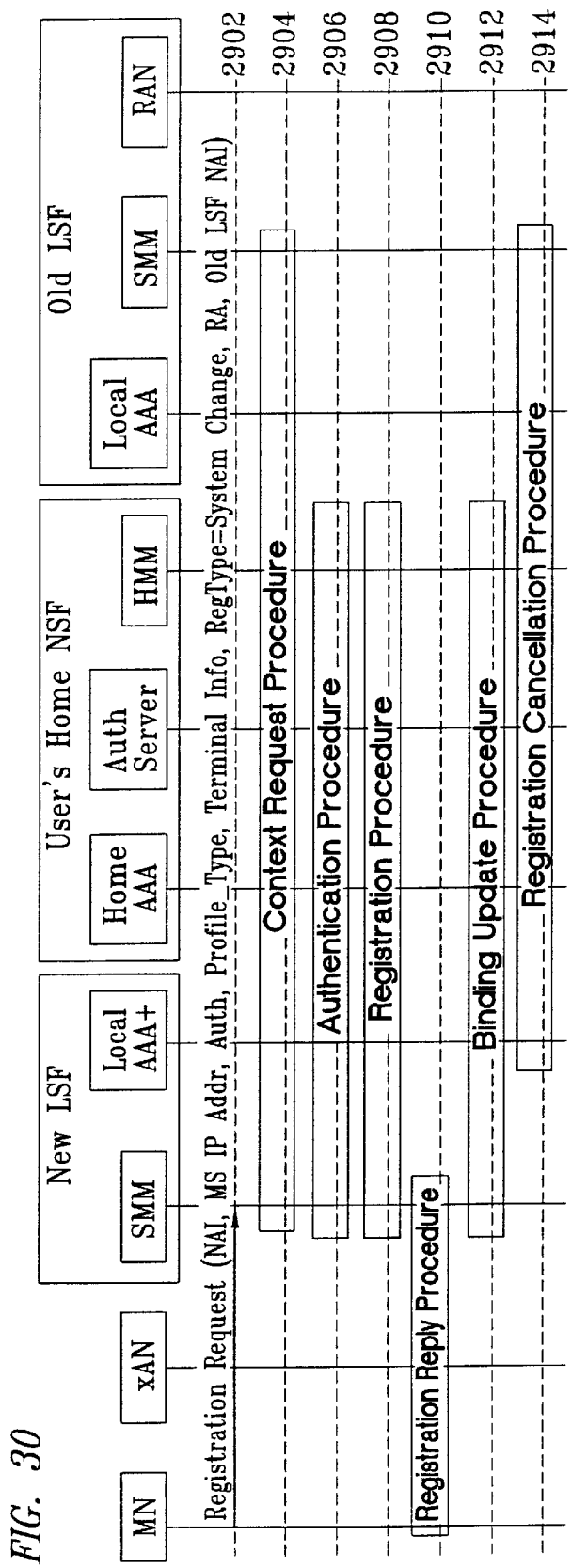
FIG. 30 is an event sequence diagram showing the flow of events for an MN moving to a new RA, new LSF, no movement indication.

FIG. 30 is a message flow event sequence diagram showing the flow of messages for a user roaming between LSFs wherein the MN does not send a registration request message to the old LSF that indicates the MN is about to move. FIG. 30 is similar to FIG. 25 but for during the MN's transition to the new LSF, there is a window where the old LSF may lose datagrams destined to the MN while the MN was accessing the new LSF. This event sequence helps to minimize this window by having the new LSF request the old LSF to start queuing datagrams for the MN. The size of the window may vary since the old LSF may be in the process of paging the MN and, hence, already queuing the datagrams.

In event 3002, the MN has determined it has crossed over a LSF boundary (via a new system ID). The MN will send a registration message for each active packet data session. In this scenario, there is only one active packet data session.

In event 3004, the Context Request Procedure is performed. See section 3.1.5 for details.

In event 3006, the Authentication Procedure is performed. See section 3.1.1 for details.

In event 3008, the Registration Procedure is performed. See section 3.1.1 for details.

In event 3010, the Registration Reply Procedure is performed. See section 3.1.1 for details.

In event 3012, the Binding Update Procedure is performed. See section 3.1.5 for details.

In event 3014, the Registration Cancellation Procedure is performed. See section 3.1.1 for details.

3.1.11 User Packet Data Session De-registration

Figure 31:
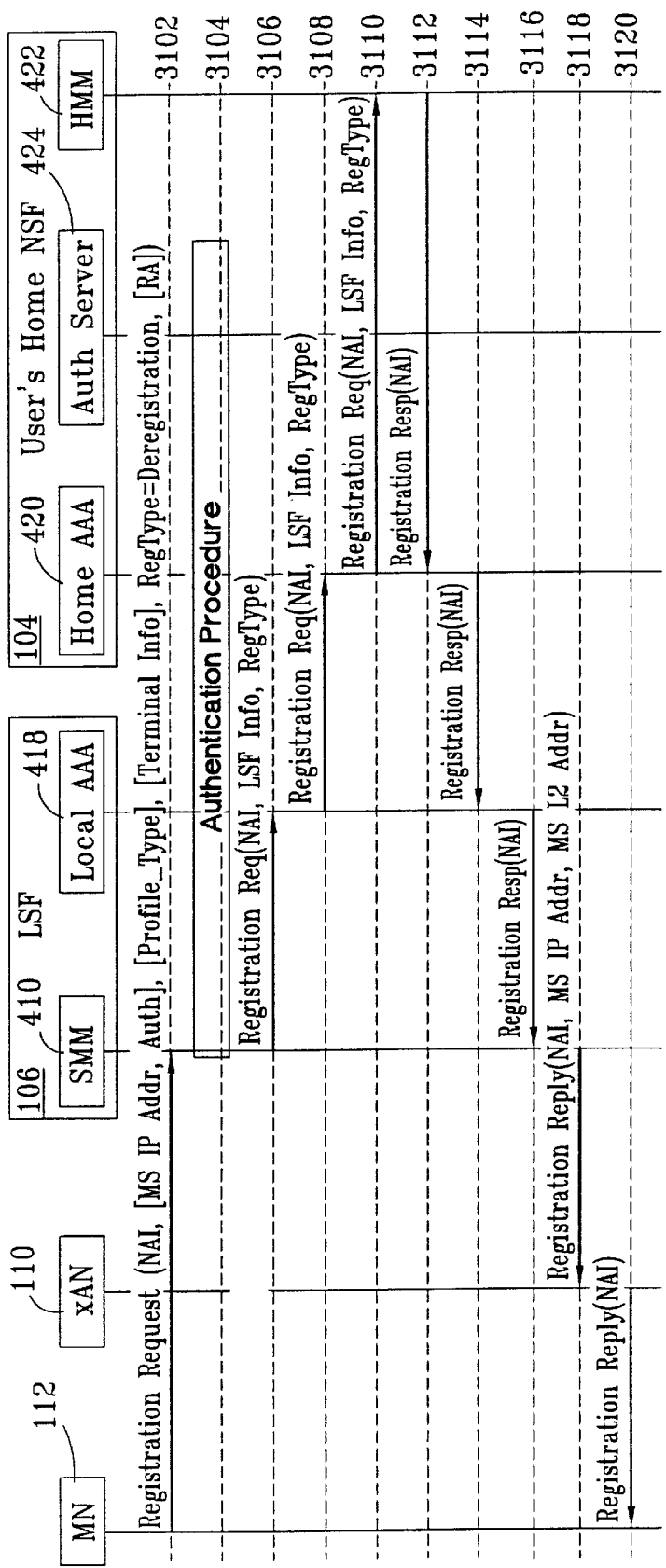
FIG. 31 is an event sequence diagram showing the flow of events for a De-registration packet data session.

FIG. 31 is a message flow event sequence diagram showing the flow of messages for a user terminating a connection to their service provider.

In event 3102, the user wants to disconnect (log off) from their service provider. Via some interface or configured button, the user selects the provider they want to disconnect from. The MN sends the de-registration message with the RegType field set to de-registration.

In event 3104, the authentication procedure is performed. See section 3.1.1 for details.

In event 3106, the SMM sends a registration request with the to the local AAA function.

In event 3108, the local AAA function uses the domain portion of the user's NAI to determine the home system of the user. A lookup is performed to determine the IP address of the user's home AAA function and the type of security association (SA) established between the LSF and NSF. The local AAA function will then send the message to the user's home AAA function. Before the packet is sent, an IPSec authentication (AH) is performed on the message.

In event 3110, the user's home AAA function receives the message. The AAA function will first validate the IPSec AH. It then performs a lookup to see what server it should forward the message to. It forwards the message to the HMM.

In event 3112, the HMM sends a route update message to the local router to remove the MN's IP address and COA from the routing table. Additionally, the HMM updates the local directory and the user's entry in the DDNS. Furthermore, if the MN's IP address was allocated via DHCP, the HMM will release the IP address. The HMM then creates a deactivate response message that includes the user's NAI and sends it to its home AAA function.

In event 3114, the AAA function will create an IPSec AH and send the message to the local AAA function serving the user.

In event 3116, the local AAA function validates the IPSec AH and passes the message on to the SMM.

In event 3118, the SMM will cleanup and send the registration reply to the mobility agent at the xAN/LSF router.

In event 3118, the mobility agent will remove the MN's IP address from the router's route table and forward the registration reply to the MN.

3.1.12 Inter System (Inter LSF) Handoff

Figure 32A:
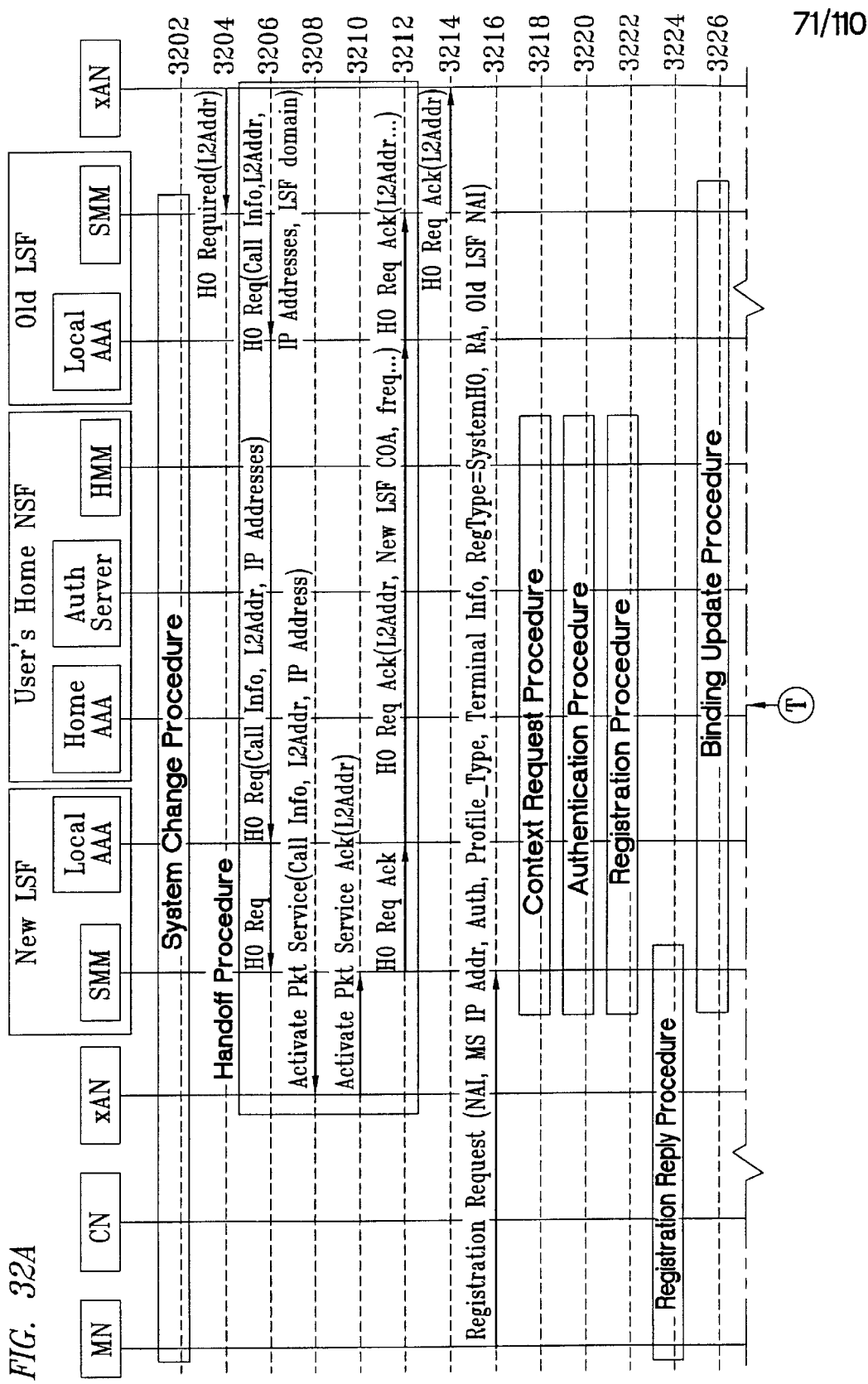
FIG. 32 is an event sequence diagram showing the flow of events for an inter system handoff.
Figure 32B:
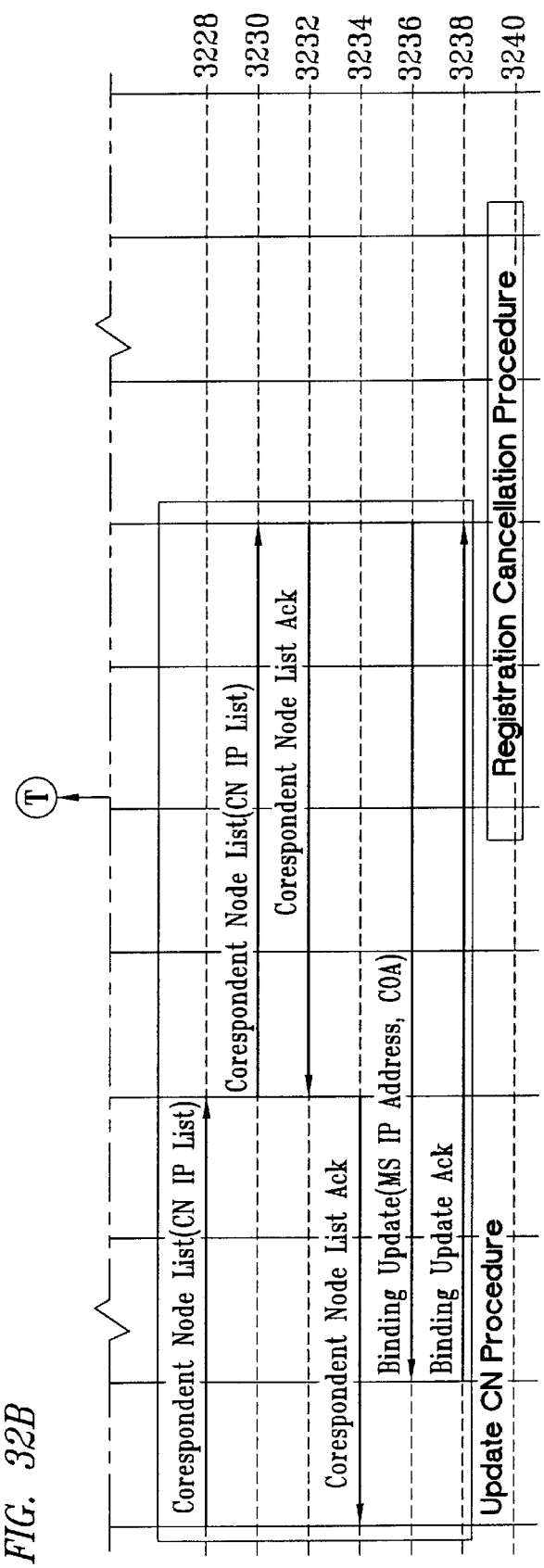

FIG. 32 is a message flow event sequence diagram showing the flow of messages for a handoff between two LSFs.

In this sequence of events, the old LSF recieves a handoff indication from the xAN to insure that the MN's datagrams are queued. The xAN must send the handoff required message in the event that the MN's registration request, with RegType set to "Prepare for System Change", is not received by the old LSF's SMM.

In order to prevent loss of data, datagrams destined to the MN are buffered.

In event 3202, the System Update Procedure is performed. See section 3.1.5 for details.

In event 3204, the xAN via the mobility agent sends the SMM a handoff required message, which indicates the target LSF for the handoff.

The Handoff Procedure, as illustrated by events 3206–12, allocates the required resources to facilitate the communication with the new LSF.

In event 3206, the SMM forwards the handoff required message to the new LSF SMM. All normal AAA functions are performed. The Call Info field includes the current active data session for the MN. The LSF domain is sent to identify the old LSF to the SMM in the new LSF. The LSF domain can be used by the new LSF's SMM for routing.

The LSF does not have to get involved with the actual handoff. The Handoff Procedure can be performed by the xANs themselves. If the xANs do perform the procedure, they are responsible for queuing the MN's datagrams.

In event 3208, the handoff required message indicates the target for the handoff. The SMM sends an activate packet service request to the xAN to allocate the appropriate resources. An activate packet service request is sent for every active session that is listed in the Call Info field.

In event 3210, the xAN allocates the appropriate resources and sends an activate packet service response back to the SMM.

In event 3212, the new SMM sends a handoff required acknowledgement to the old SMM. Normal AAA functions are performed.

In event 3214, the SMM sends a Handoff required acknowledgement message to the mobility agent on the xAN router to indicate that the handoff initialized. The handoff required message also triggers the queing of datagrams.

In event 3216, the MN retunes to the appropriate frequency. The MN realizes it has crossed over a LSF boundary via a new system ID. It also realizes that there are active application sessions, and, hence, it will set the RegType to be "SystemHO". The MN sends a registration request message for each active packet data session. In this scenario, there is only one active packet data session. The message includes the old LSF's system ID.

In event 3218, the Context Request Procedure is performed. See section 3.1.5 for details. If the LSF is responsible for performing the Handoff Procedure, this step does not have to be performed.

In event 3220, the Authentication Procedure is performed. See section 3.1.1 for details. While authentication does not need to be performed at this step, it is preferred. Alternatively, a unique challenge to authenticate the user may be performed upon handoff completion.

In event 3222, the Registration Procedure is performed. See section 3.1.1 for details.

In event 3224, the Registration Reply Procedure is performed. See section 3.1.1 for details.

In event 3226, the Binding Update Procedure is performed. See section 3.1.5 for details.

The Update CN Procedure, events 3228–38, updates the correspondence nodes with which it is MN is in communication.

In event 3228, the MN realizes that it is in a new system and has active application session; hence, it sends the SMM a list of correspondent nodes with which it is in communications. Alternatively, the home network can request the CN list from the MN after the home network was updated with the new COA.

In event 3230, the SMM forwards the message to the HMM at the MN's NSF. Normal AAA functions are performed.

In event 3232, the HMM acknowledges the correspondent node list. Normal AAA functions are performed.

In event 3232, the SMM forwards the message to the MN.

In event 3234, the HMM receives the CN list and sends binding updates that include the MN's new COA to the CNs.

In event 3236, the CNs acknowledge the binding update.

In event 3238, the Registration Cancellation Procedure is performed. See section 3.1.5 for details.

3.1.13 Inter xAN Handoff, Same LSF

Figure 33A:
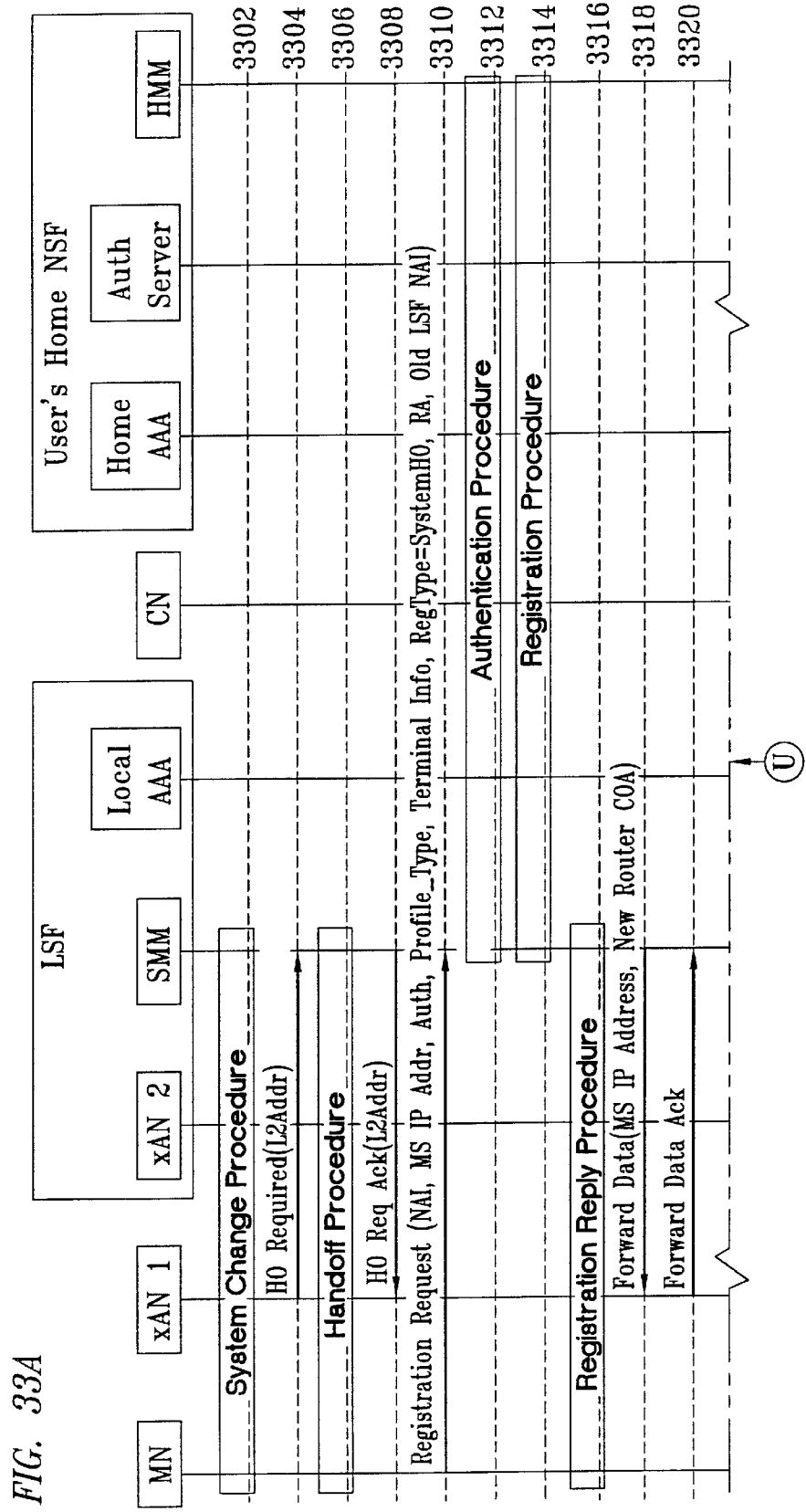
FIG. 33 is an event sequence diagram showing the flow of events for an inter xAN handoff, Same LSF.
Figure 33B:
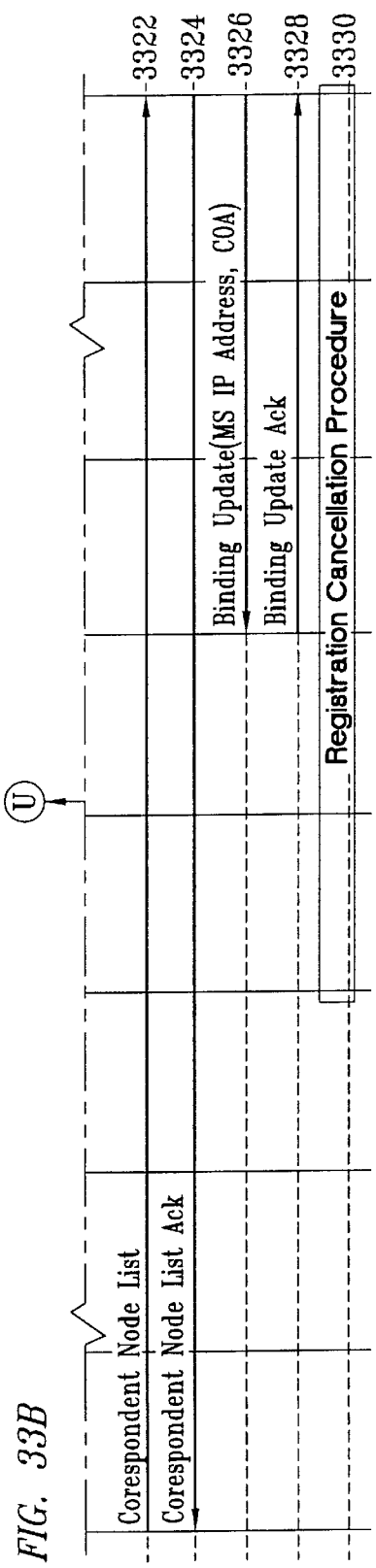

FIG. 33 is a message flow event sequence diagram showing the flow of messages for a handoff between two xANs on the same LSF.

In event 3302, the System Change Procedure is performed. See section 3.1.5 for details.

In event 3304, the xAN via the mobility agent sends the SMM a handoff required message, which indicates the target LSF for the handoff.

In event 3306, the Handoff Procedure is performed. See section 3.1.12 for details.

In event 3308, the SMM sends a Handoff required acknowledgement message to the mobility agent on the xAN router to inform the xAN that handoff is initialized. The handoff requided acknowledgement also triggers the queuing of datagrams for the MN.

In event 3310, the MN retunes to the appropriate frequency. The MN realizes it has crossed over a LSF boundary via a new system ID. Additionally, the MN realizes that there are active application sessions and sets the RegType to be "SystemHO". The MN sends a registration request message for each active packet data session. In this scenario, there is only one active packet data session. The message includes the old LSF's system ID.

In event 3312, the Authentication Procedure is performed. See section 3.1.1 for details.

In event 3314, the Registration Procedure is performed. See section 3.1.1 for details.

In event 3316, the Registration Reply Procedure is performed. See section 3.1.1 for details.

In event 3318, the old LSF's SMM sends a Forward Packets message to the mobility agent on the LSF/xAN router to request the router start forwarding datagrams to the new router's COA. These datagrams will be tunneled to the new router's COA.

In event 3320, the mobility agent informs the xAN/router to start forwarding packets.

In event 3322, the MN realizes that it is in a new system and has active application sessions; hence, it sends its home network a list of correspondent nodes with which it is in communication. Alternative the home network may request the CN list from the MN after the home network was updated with the new COA.

In event 3324, the HMM acks the correspondent node list.

In event 3326, after the HMM receives the CN list and the new COA, it will send binding updates, which include the new COA to the CNs.

In event 3328, the CNs will acknowledge the binding update.

In event 3330, the Registration Cancellation Procedure is performed. See section 3.1.5 for details.

3.1.14 Inter xAN Handoff, Same LSF, Hierarchical Routers

Figure 34:
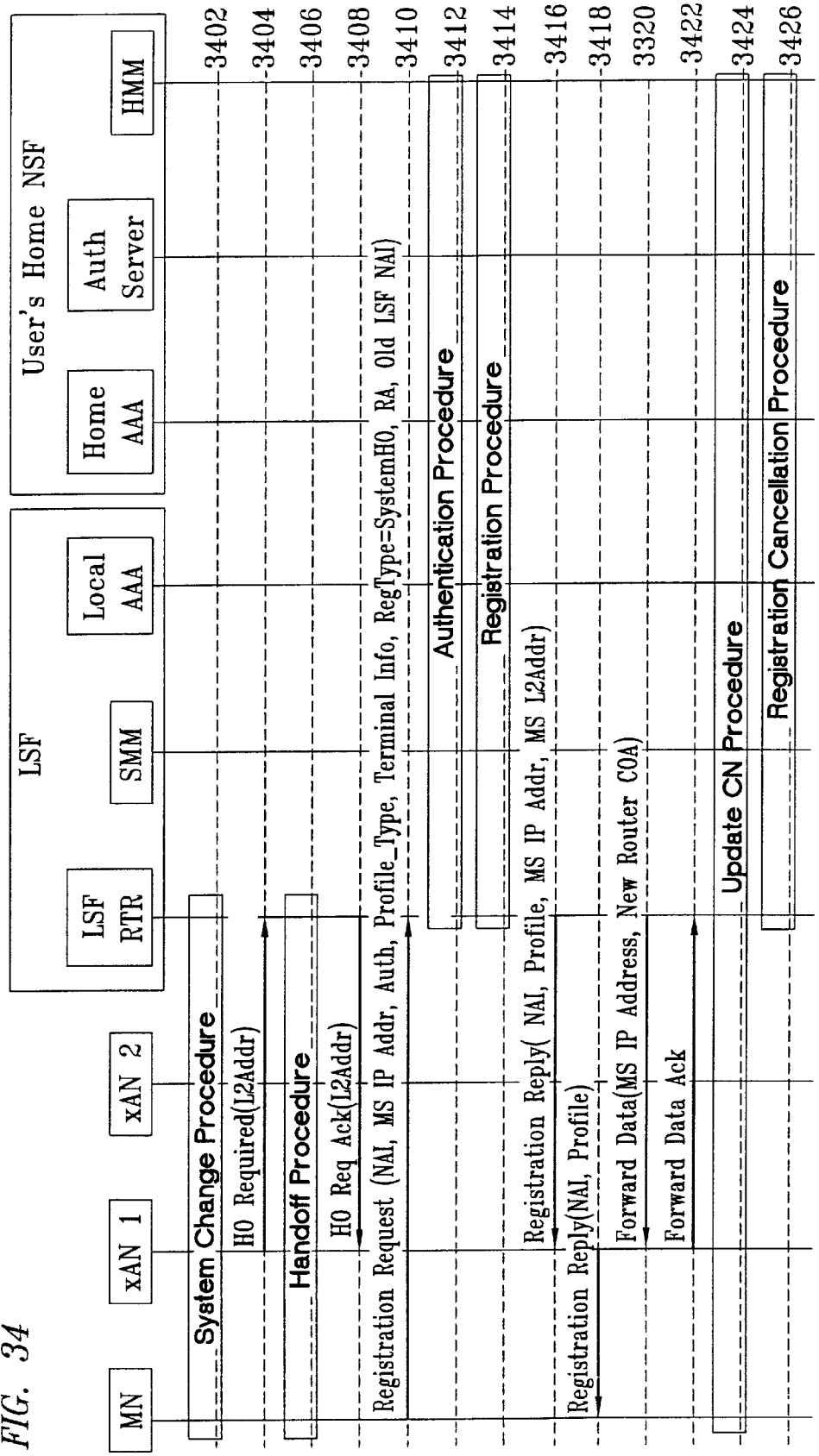
FIG. 34 is an event sequence diagram showing the flow of events for an inter xAN handoff, same LSF, hierarchical routers.

FIG. 34 is a message flow event sequence diagram showing the flow of messages for a handoff between two xANs on the same LSF. FIG. 34 is similar to FIG. 33 but for the FIG. 34 includes a hierarchy of routers in the LSF/xAN.

In event 3402, the System Change Procedure is performed. See section 3.1.5 for details.

In event 3404, the xAN via the mobility agent on the xAN router sends the SMM a handoff required message which indicates the target LSF for the handoff.

In event 3406, the Handoff Procedure is performed. See section 3.1.12 for details.

In event 3408, the SMM sends a Handoff required acknowledgement message to the mobility agent on the xAN router to indicate that handoff is initilized. Additionally, the handoff required acknowledgement triggers datagram queuing for the MN.

In event 3410, the MN retunes to the appropriate frequency. The MN realizes it has crossed over a LSF boundary via a new system ID. It also realizes that there are active application sessions, hence it will set the RegType to be "SystemHO". The MN will send a registration request message for each active packet data session. In this scenario, there is only one active packet data session. The message includes the old LSF's system ID.

In event 3412, the Authentication Procedure is performed. See section 3.1.1 for details.

In event 3414, the Registration Procedure is performed. See section 3.1.1 for details.

In event 3416, the SMM updates its local directory with the appropriate information. The SMM will send a registration reply to a mobility agent on the xAN/LSF router.

In event 3418, the mobility agent at the xAN/LSF router must update the router's routing table to include the MN's IP address. When this occurs, some routing protocol, e.g., RIP, updates the local network with routing information so datagrams can be delivered to the xAN router, i.e., the LSF router will receive a route update and will know how to forward de-tunneled datagrams. The xAN must be told of the "binding" between the MN's IP Address and the MN's L2 Address. The mobility agent then sends the registration reply to the MN.

In event 3420, the old LSF's SMM sends a Forward Packets message to the mobility agent on the LSF/xAN router to request that the router start forwarding datagrams to the new router's COA. These datagrams will be tunneled to the new router's COA.

In event 3422, the mobility agent informs the xAN/router to start forwarding packets.

In event 3424, the Update CN Procedure is performed. See section 3.1.12 for details.

In event 3426, the Registration Cancellation Procedure is performed. See section 3.1.5 for details 4. Base Protocol Specifications
4.1 Introduction
4.2 IPM Message Flows
4.2.1 IPM MN Registers From the IPM LSF Referring to FIG. 35, Agent Discovery, events 3502–3504, is the method by which a Mobile Node (MN) determines whether it is currently connected to its home network or to a foreign network, and by which a MN can detect when it has moved from one network to another. Home agents and foreign agents may advertise their availability on each link for which they provide service. A newly arrived MN can send a solicitation on the link to learn if any prospective agents are present. The Agent Discovery Process is primarily handled through Agent Solicitation and Agent Advertisement.

Agent Solicitation, event 3502, is the broadcast/multicast message sent by the IPM MN to detect a Service Provider in the event that the IPM MN has not received an Advertising Agent message. The Agent Solicitation message contains, as the source address, the Mobile IP address belonging to the interface from which this message is sent, or 0. The destination address is the configured solicitation address. In addition to a checksum value, a type value of 10 and a code value of 0 is contained in the message.

In event 3504, Agent Advertisement messages are sent periodically, either as a broadcast or multicast for the visiting IPM MN to recognize the availability of service and to keep track of their point of attachment. The message contains: a source address of the IP address belonging to the interface from which this message is sent; a destination address of the configured Advertisement Address or the IP address of a neighboring host; a type field of 9; a code field of 0; a checksum value, the number of router addresses advertised in this message; the number of 32-bit words of information per each router address (2, in the version of the protocol described here); the maximum number of seconds that the router addresses may be considered valid; the sending router's IP address(es) on the interface from which this message is sent; and the preferability of each router address as a default router address, relative to other router addresses on the same subnet. Additionally, the Agent Advertisement message contains the Mobility Agent Advertisement and ANI-NAI Extensions.

The purpose of the Registration Process, events 3506–3540, is for the IPM MN to inform the HMM of the NSF (Network Serving Function) of its current location to which data packets can be forwarded to the IPM MN. The Registration process also includes the authenticating and authorizing of the IPM MN to have access to the visited network or LSF (Local Serving Function).

In event 3506–3508, the Registration Request message is sent by the IPM MN to the SMM to register for the service. The Registration Request contains: the source IP address of the MN; the destination address of the COA within the ANI component; a type field of 0; the flags as in RFC2002; the lifetime requested by MN from the HMM or Home; the home IP address of the MN; the Home Agent's address of the MN; the Care-of-Address of the MN; and the identification, to provide replay protection. Additionally, the User-NAI Extension, L2-Address Extension (Optional), MN-Home Authentication Extension, Registration-Type Extension, Previous-SMM-NAI Extension (Optional), ANI-NAI NAI Extension (Optional), MN-SMM Authentication Extension (Optional), ANI-SMM Authentication Extension (Optional), and ANI-HMM Authentication (Optional) are used in the Registration Request. The extensions are described further in section 4.4.

In events 3510–14, the AAA-Registration-Request message is used to carry out various kinds of registrations; these registrations are encapsulated in the IPM-Registration-Type AVP. This message is used by SMM to authenticate and authorize the user.

The AAA-Registration-Request message is of the format of DIAMETER. The SMM sends the message to HMM with at least the mandatory fields of Command Code AVP of 335; User-Name AVP; Host-Name AVP; IPM-Registration-Request AVP; IPM-Registration-Request AVP; IPM-Care-of-Address AVP; and the IPM-Routing-Area-NAI AVP. The IPM-Registration-Request AVP is the AVP which carries the message received from the MN, which is encapsulated in the AVP format for the Home domain to authenticate the user. The HMM processes this message based on the Registration-Type AVP, which carries the type of registration requested.

The AVPs that can optionally be used in the Registration Request message include, and are further explained in section 4.5, Destination-NAI AVP, IPM-Client-Address AVP, Home-Agent-Address AVP, IPM-SMM-NAI AVP, IPM-Terminal-Type AVP, IPM-Profile-Type AVP, Proxy-State AVP, Timestamp AVP, Nonce AVP, and Integrity-Check-Value AVP.

In event 3516, the Service Request message is sent from the HMM to the ISC (IPM Security Center) to authenticate a user or message, generate, renew, or delete session secret keys. It also can be sent from the PPS Manager to the ISC to generate or construct the IPMC.

The Service Request message contains: a type of USER_SERVICE_REQUEST_MSG; a sub-type of 0; the length of the message payload including all the extensions; a 64-bit number used for matching User Service Request messages with User Service Reply messages, and for protecting against replay attacks of User Service Request messages; and, in phase I, this extension has the user NAI and in the future will have an index which will be used to index the user data in the UDS.

The Service Request message uses the extensions, which are explained in further detail in section 4.4, User Authentication Information Extension, Control Message Authentication Extension, Session Key Allocation Extension 0 . . . N, Session Key Lifetime Renewal Extension 0 . . . N, and Session Key Delete Extension 0 . . . N.

In event 3518, the Service Reply message is sent from the ISC (IPM Security Center) to the HMM in response to a Service Request message.

The message exchanged between the ISC and the HMM contains: a type of USER_SERVICE_REPLY_MSG; a sub-type of 0; the length of the message payload including all the extensions; a code; a 64-bit number used for matching User Service Request messages with User Service Reply messages, and for protecting against replay attacks of User Service Request messages; and a User NAI, which in phase I has the user NAI and in the future will have an index which will be used to index the user data in the UDS. The code value is defined as the following hexadecimal values:

00000001 User Authenticated successfully.
00000002 All required keys have been allocated.
00000003 Some keys have been allocated.
00000004 User Authentication failed.
00000005 Key Lifetime Renewal is completely honoured.
00000006 Key Lifetime Renewal is partially honoured.
00000007 User Account is created successfully.
00000008 User is deleted successfully.

Additionally, the following Extensions, which are described in greater detail in section 4.4, are used in the Service Response message: Control Message Authentication Extension; Session Key Allocation Extension 0 . . . N; Session Key Lifetime Renewal Extension 0 . . . N; and Session Key Delete Extension 0 . . . N.

In event 3524, the Add Tunnel Entry message is sent by the HMM to instruct the ITS to set up a tunnel entry point. The message exchanged between the HMM and the ITS contains: a code of 1; the length of the message including the header fields; and an identification used in matching requests and acknowledgements. The sender must ensure the identifier in a message is locally unique at any given time.

Additionally, the following extensions, which are explained in further detail in section 4.4, are used in the Add Tunnel Entry message: Host NAI Extension, Flag Extension, Lifetime Extension, Mobile Node IP Address Extension, User NAI Extension (Optional), and Tunnel Entry IP Address Extension.

In event 3526, the Add Tunnel Entry Acknowledgement message is sent by the ITS to acknowledge the Add Tunnel Entry message. The message exchanged between the ITS and the HMM contains: a code of 2; the length of the message including the header fields; and an identification used in matching requests and acknowledgements. The sender must ensure the identifier in a message is locally unique at any given time.

Additionally, the following extensions, which are explained in further detail in section 4.4, are used in the Add Tunnel Entry message: Host NAI Extension, Result Code Extension, Mobile Node IP Address Extension (Optional), and User NAI Extension (Optional).

In events 3528–32, the AAA Registration Reply message is the response message sent by the HMM to the SMM to indicate the result of the AAA-Registration Request message.

The AAA-Registration Reply message is of the format of DIAMETER, and contains a DIAMETER Header, a Command-Code AVP of 336, a Destination-NAI AVP, Host-Name AVP, User-Name AVP, IPM-Registration-Response-Code AVP, IPM-Client-Address AVP, and IPM-Registration-Reply AVP. The HMM sends a message to the SMM with at least the mandatory fields in response to AAA-Registration Request message. The IPM-Registration Response Code AVP indicates the success or failure of the request. The IPM Registration Reply message AVP contains the reply message built by HMM with authentication. The SMM has to use this AVP to send a reply to ANI/MN.

Additionally, the Registration Reply message can optionally use the following AVPs, which are discussed in further detail in section 4.5: IPM-Profile AVP, IPM-SMM-MN-Key AVP, IPM-HMM-NAI AVP, Proxy-State AVP, Time AVP, Nonce AVP, and Integrity-Check-Value AVP.

In event 3534, the Add Tunnel Exit message is sent by the SMM to instruct the ITS to set up a tunnel exit point. The message exchanged between the SMM and the ITS contains: a code of 3; the length of the message including the header fields; and an identification used in matching requests and acknowledgements. The sender must ensure the identifier in a message is locally unique at any given time.

Additionally, the Extensions, which are explained further in section 4.4, used in the Add Tunnel Exit message are: Host NAI Extension, Lifetime Extension, Mobile Node IP Address Extension, User NAI Extension (Optional), and Tunnel Exit IP Address Extension.

In event 3536, the Add Tunnel Exit Acknowledgement message is sent by the ITS to acknowledge the Add Tunnel Exit message. The message exchanged between the ITS and the SMM contains: a code of 4; the length of the message including the header fields; and an identification used in matching requests and acknowledgements. The sender must ensure the identifier in a message is locally unique at any given time.

Additionally, the Extensions, which are explained further in the section 4.5, used in the Add Tunnel Exit Acknowledgement message are: Host NAI Extension, Result Code Extension, Mobile Node IP Address Extension (Optional), User NAI Extension (Optional), and Tunnel Forwarding IP Address Extension.

In events 3538–40, the Registration Reply message is sent by the SMM to the IPM MN to indicate the result of the Registration Request message sent. The message exchanged between the SMM and the IPM MN contains: a type of 3; a code for all the existing MIP Response codes, this field is being extended to include IPM specific items; the Home lifetime for the registration; the IP address of the MN; the Home Agent's address of the MN; and the identification, to provide replay protection.

Additionally, the Extensions, which are explained further in section 4.4, used in the Registration Reply message are: User-NAI Extension, SMM-Key Extension (Optional), MN-Home Authentication Extension, Local Registration Lifetime Extension (Optional), SMM-NAI Extension (Optional), MN-SMM Authentication Extension (Optional), and ANI-SMM Authentication Extension (Optional).

4.2.2 IPM MN Registers from IPM NSF

Figure 36:
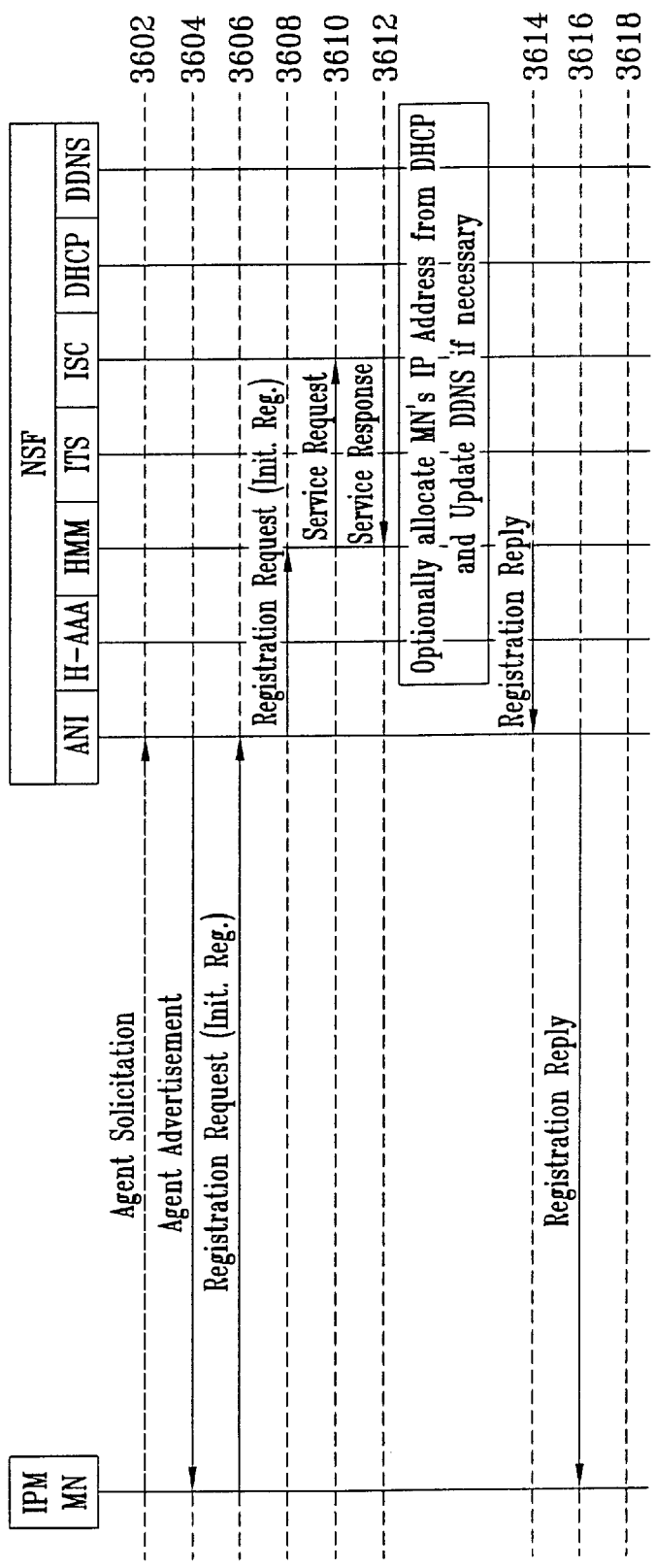
FIG. 36 is an event sequence diagram showing the flow of events when an IPM MN registers from an IPM NSF.

FIG. 36 is a message flow event sequence diagram showing the flow of messages for IPM MN register from IPM NSF.

In events 3602–3604, the Agent Discovery Process is performed. See section 4.2.1 for details.

In event 3606–3608, the Registration Request message is sent by the IPM MN to the HMM to register for the service. See section 4.2.1 for the message exchanged between the IPM MN and the HMM.

In event 3610, the Service Request message is sent. See section 4.2.1 for details.

In event 3612, the Service Response message is sent. See section 4.2.1 for details.

In event 3614–16, the Registration Reply message is sent by the HMM to the IPM MN to indicate the result of the Registration Request message sent. See section 4.2.1 for details.

4.2.3 IPM MN Disconnect Detection

FIG. 37 is a message flow event sequence diagram showing the flow of messages for IPM MN disconnect detection.

In event 3702, the Registration Request message is sent by the IPM MN to the ANI when a disconnect is detected. See section 4.2.1 for details but for MN-Home Authentication Extension (Optional).

In event 3704, the Registration Reply message is sent by the ANI to the IPM MN to indicate the result of the Registration Request message sent. See section 4.2.1 for details but for the MN-Home Authentication Extension (Optional).

4.2.4 IPM MN Re-registers from IPM LSF

FIG. 38 is a message flow event sequence diagram showing the flow of messages for IPM MN re-registers from IPM LSF.

In event 3802–3804, the Registration Request message is sent. See section 4.2.1 for details.

In event 3806–10, the AAA-Registration Request message is sent. See section 4.2.1 for details.

In event 3812, the Service Request message is sent. See section 4.2.1 for details.

In event 3814, the Service Reply message is sent. See section 4.2.1 for details.

In event 3816–20, the AAA-Registration Reply message is sent. See section 4.2.1 for details.

In event 3822–24, the Registration Reply message is sent. See section 4.2.1 for details.

4.2.5 IPM MN Re-registers from IPM NSF

Figure 39:
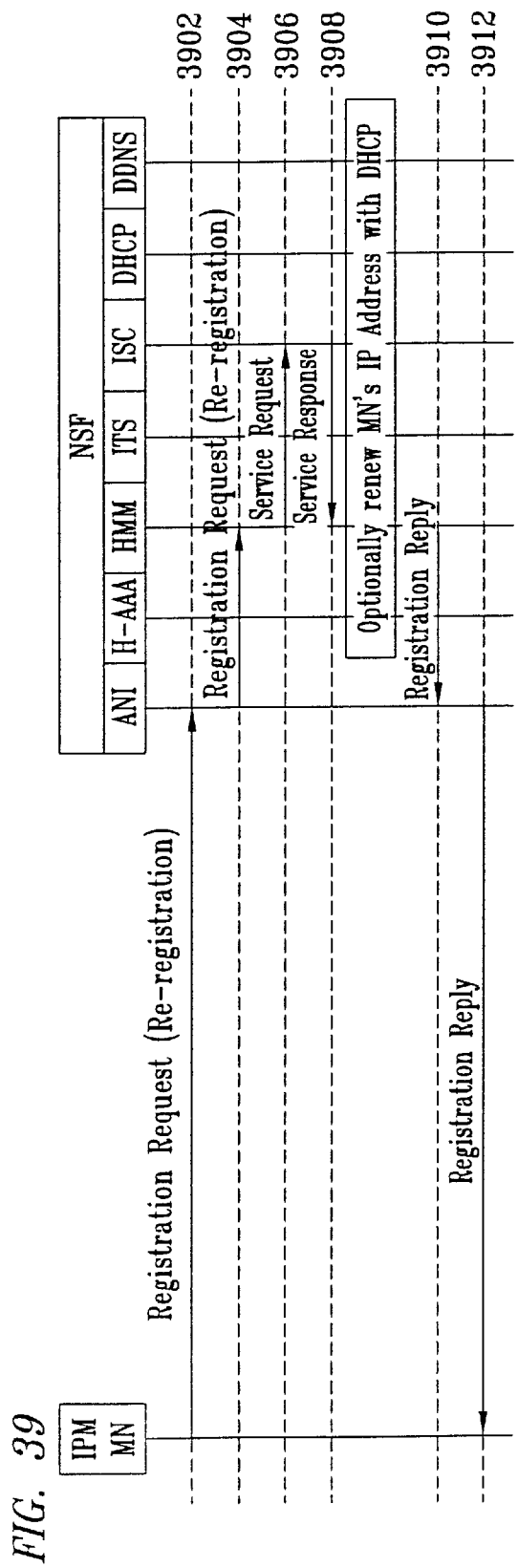
FIG. 39 is an event sequence diagram showing the flow of events for an IPM MN disconnect detection.

FIG. 39 is a message flow event sequence diagram showing the flow of messages for IPM MN re-registers from IPM NSF.

In events 3902–3904, the Registration Request message is sent. See section 4.2.1 for details.

In event 3906, the Service Request message is sent. See section 4.2.1 for details.

In event 3908, the Service Reply message is sent. See section 4.2.1 for details.

In events 3910–3912, the Registration Reply message is sent. See section 4.2.1 for details.

4.2.6 IPM MN De-registers from IPM LSF

Figure 40:
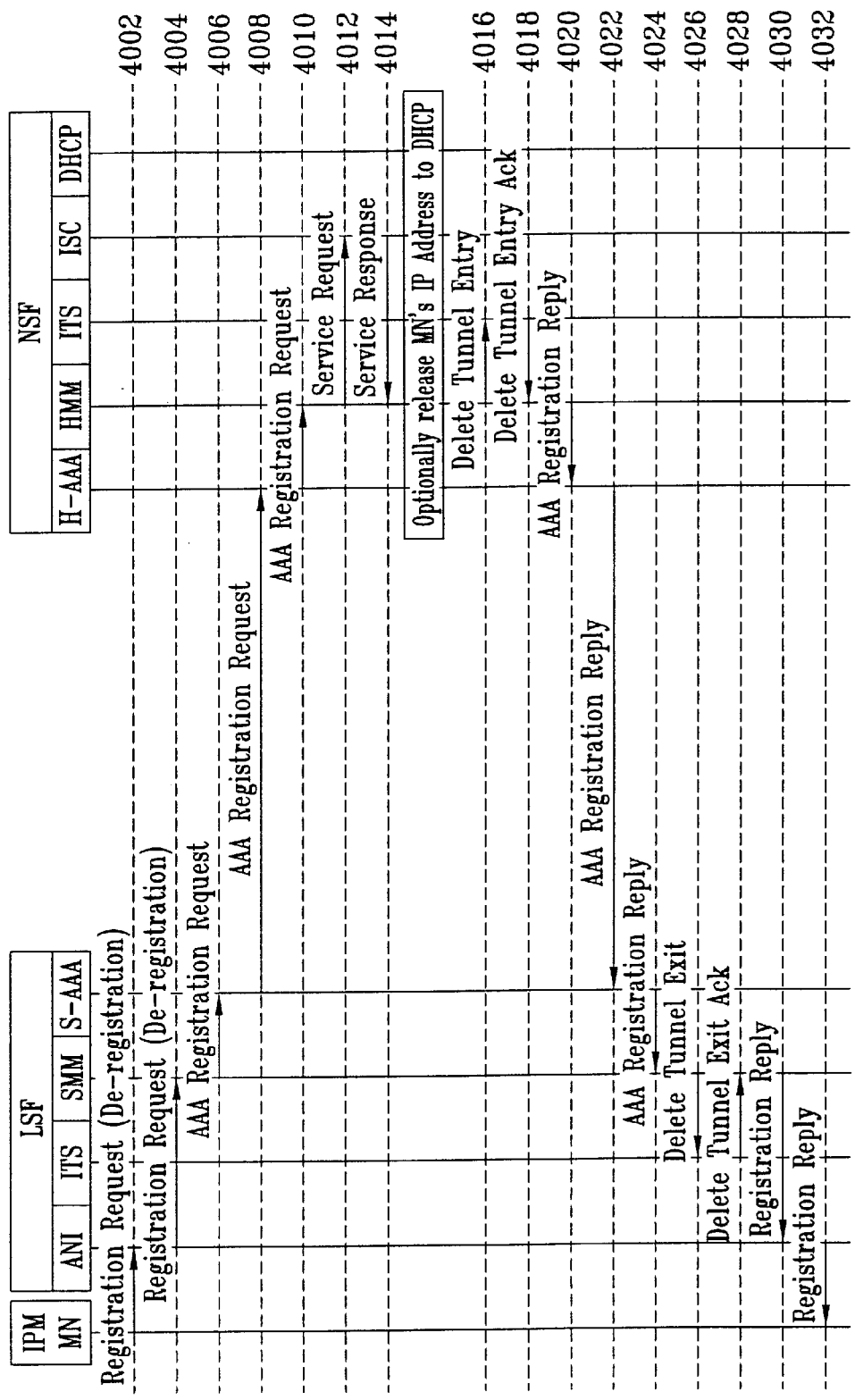
FIG. 40 is an event sequence diagram showing the flow of events when an IPM MN re-registers from an IPM LSF.

FIG. 40 is a message flow event sequence diagram showing the flow of messages for IPM MN de-registers from IPM LSF.

In events 4002–4004, the Registration Request message is sent. See section 4.2.1 for details.

In events 4006–4010, the AAA-Registration Request message is sent. See section 4.2.1 for details.

In event 4012, the Service Request message is sent. See section 4.2.1 for details.

In event 4014, the Service Reply message is sent. See section 4.2.1 for details.

In event 4016, the Delete Tunnel Entry message is sent by the HMM to instruct the ITS to delete a tunnel entry point. The message exchanged between the HMM and the ITS contains: a code of 7; a length of the message including the header fields; an identification used in matching requests and acknowledgements. The sender must ensure the identifier in a message is locally unique at any given time. Additionally, extensions, which are discussed further in section 4.4, used in the Delete Tunnel Entry message are: Host NAI Extension; Mobile Node IP Address Extension; and User NAI Extension (Optional).

In event 4018, the Delete Tunnel Entry Acknowledgement message is sent by the ITS to acknowledge the Delete Tunnel Entry message. The identification field should be used for matching with the Delete Tunnel Entry message. The message exchanged between the ITS and the HMM contains: a code of 8; a length of the message including the header fields; and an identification used in matching requests and acknowledgements. The sender must ensure the identifier in a message is locally unique at any given time. Additionally, extensions, which are discussed further in section 4.4, used in the Delete Tunnel Entry Acknowledgement message are: Host NAI Extension; Result Code Extension; Mobile Node IP Address Extension (Optional); andUser NAI Extension (Optional).

In events 4020–4024, the AAA-Registration Reply message is sent. See section 4.2.1 for details.

In event 4026, the Delete Tunnel Exit message is sent by the SMM to instruct the ITS to delete a tunnel exit point. The message exchanged between the SMM and the ITS contains: a code of 9; a length of the message including the header fields; and an identification used in matching requests and acknowledgements. The sender must ensure the identifier in a message is locally unique at any given time. Additionally, extensions, which are discussed further in section 4.4, used in the Delete Tunnel Exit message are: Host NAI Extension; Mobile Node IP Address Extension (Optional); User NAI Extension (Optional); and Tunnel Exit IP Address Extension.

In event 4028, the Delete Tunnel Exit Acknowledgement message is sent by the ITS to acknowledge the Delete Tunnel Exit message. The identification field should be used for matching with the Delete Tunnel Exit message. The message exchanged between the ITS and the SMM contains: a code of 10; the length of the message including the header fields; and an identification used in matching requests and acknowledgements. The sender must ensure the identifier in a message is locally unique at any given time. Additionally, extensions, which are discussed further in section 4.4, used in the Delete Tunnel Exit Acknowledgement message are: Host NAI Extension; Result Code Extension; Mobile Node IP Address Extension (Optional); and User NAI Extension (Optional).

In events 4030–32, the Registration Reply message is sent. See section 4.2.1 for details.

4.2.7 IPM MN De-registers from IPM NSF

Figure 41:
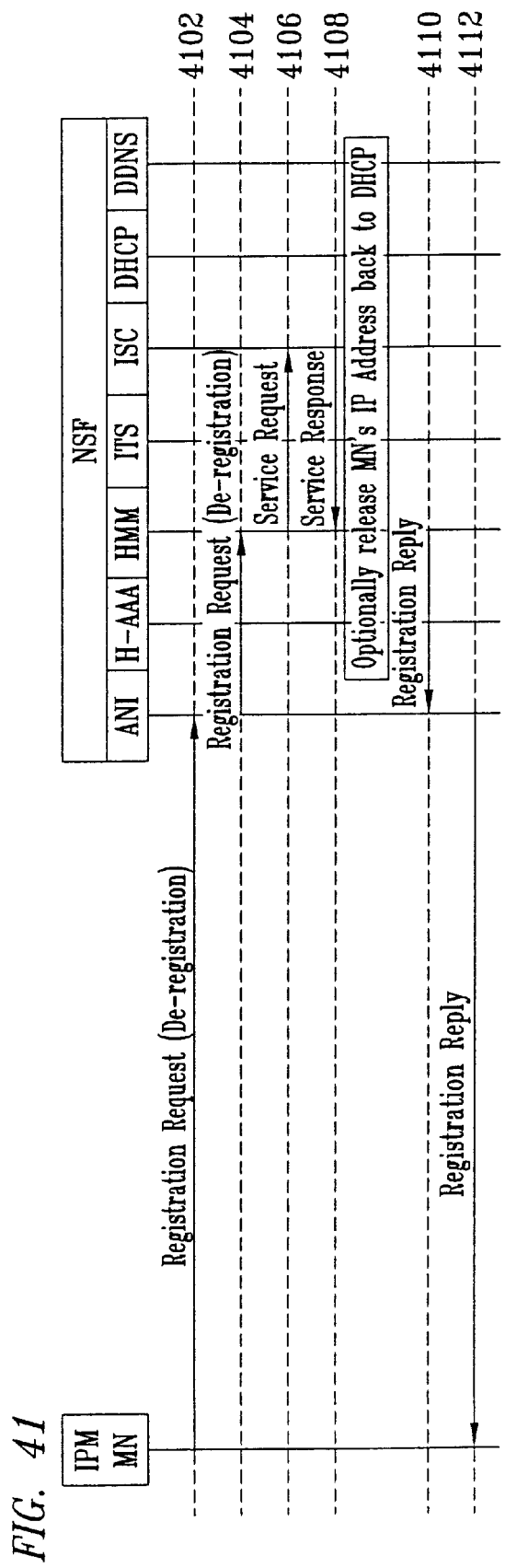
FIG. 41 is an event sequence diagram showing the flow of events when an IPM MN re-registers from an IPM NSF.

FIG. 41 is a message flow event sequence diagram showing the flow of messages for IPM MN De-registers from IPM NSF.

In events 4102–4104, the Registration Request message is sent. See section 4.2.1 for details.

In event 4106, the Service Request message is sent. See section 4.2.1 for details.

In events 4108, the Service Reply message is sent. See section 4.2.1 for details.

In events 4110–4112, the Registration Reply message is sent. See section 4.2.1 for details.

4.2.8 IPM MN Handoffs From ANI to ANI in the Same SMM (Different ITS)

Figure 42:
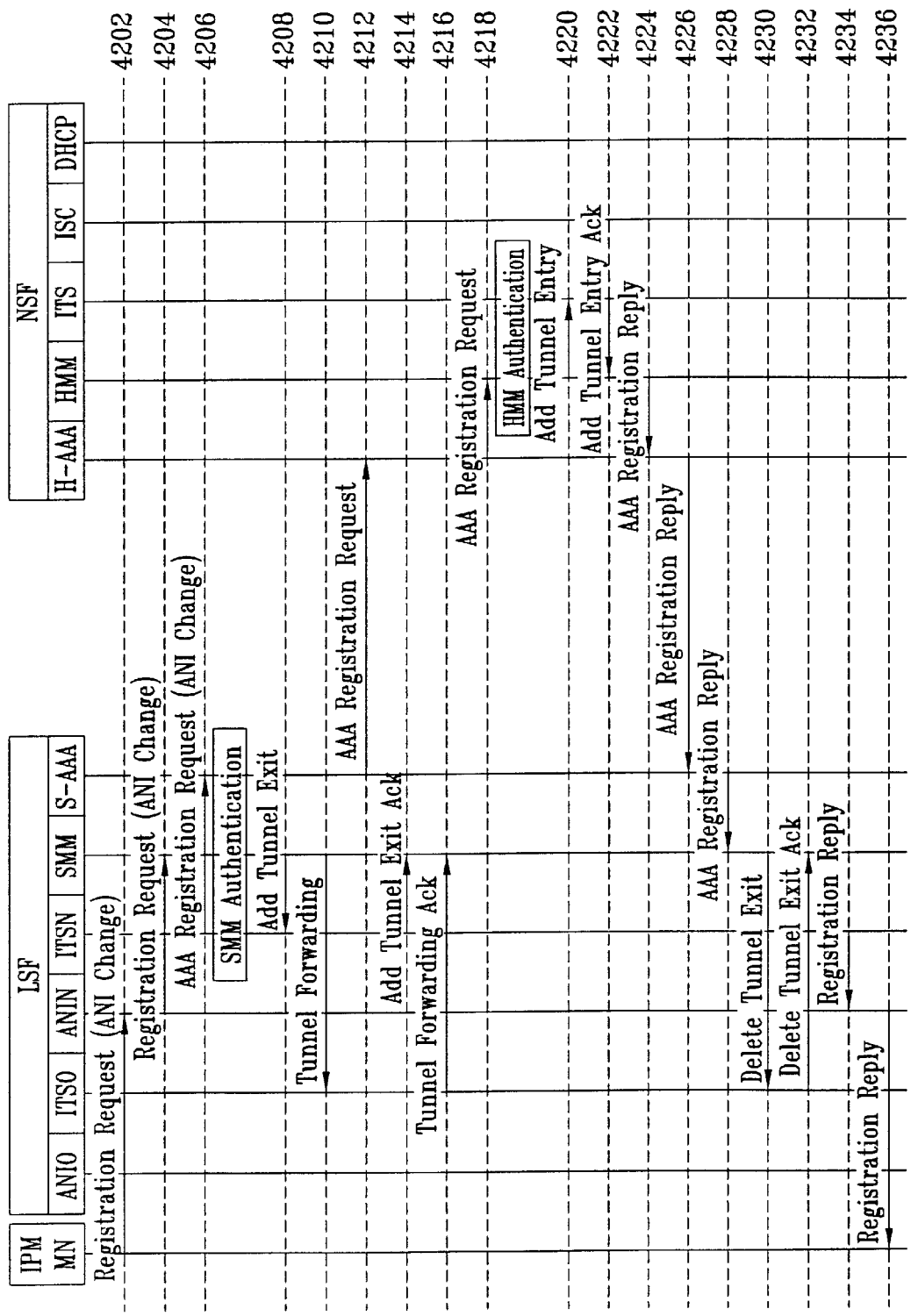
FIG. 42 is an event sequence diagram showing the flow of events when an IPM MN re-registers from an MIP FA.

FIG. 42 is a message flow event sequence diagram showing the flow of messages for IPM MN handoffs from ANI to ANI in the same SMM, different ITS.

In events 4202–4204, the Registration Request message is sent. See section 4.2.1 for details.

In events 4206, 4212, and 4218, the AAA-Registration Request message is sent. See section 4.2.1 for details.

In event 4208, the Add Tunnel Exit message is sent. See section 4.2.1 for details.

In event 4210, the Tunnel Forwarding message is sent by the SMM to instruct the ITSO to set up tunnel forwarding. The message exchanged between the SMM and the ITSO contains: a code of 5; a length of the message including the header fields; and an identification used in matching requests and acknowledgements. The sender must ensure the identifier in a message is locally unique at any given time. Additionally, extensions, which are discussed further in section 4.4, used in the Tunnel Forwarding message are: Host NAI Extension; Mobile Node IP Address Extension; User NAI Extension (Optional); Lifetime Extension; and Tunnel Exit IP Address Extension.

In event 4214, the Add Tunnel Exit Acknowledgement message is sent. See section 4.2.1 for details.

In event 4216, the Tunnel Forwarding Acknowledgement message is sent by the ITSO to acknowledge the Tunnel Forwarding message. The identification field should be used for matching with the Tunnel Forwarding message. The message exchanged between the ITSO and the SMM contains: a code of 6; a length of the message including the header fields; and an identification used in matching requests and acknowledgements. The sender must ensure the identifier in a message is locally unique at any given time. Additionally, extensions, which are discussed further in section 4.4, used in the Tunnel Forwarding Acknowledgement message are: Host NAI Extension; Mobile Node IP Address Extension; User NAI. Extension (Optional); and Result Code Extension.

In event 4220, the Add Tunnel Entry message is sent. See section 4.2.1 for details.

In event 4222, the Add Tunnel Entry Acknowledgement message is sent. See section 4.2.1 for details.

In event 4224–4228, the AAA-Registration Reply message is sent. See section 4.2.1 for details.

In event 4230, the Delete Tunnel Exit message is sent. See section 4.2.6 for details.

In event 4232, the Delete Tunnel Exit Acknowledgement message is sent. See section 4.2.6 for details.

In event 4234–36, the Registration Reply message is sent. See section 4.2.1 for details.

4.2.9 IPM MN Handoffs from ANI to ANI in the Same SMM (Same ITS)

Figure 43:
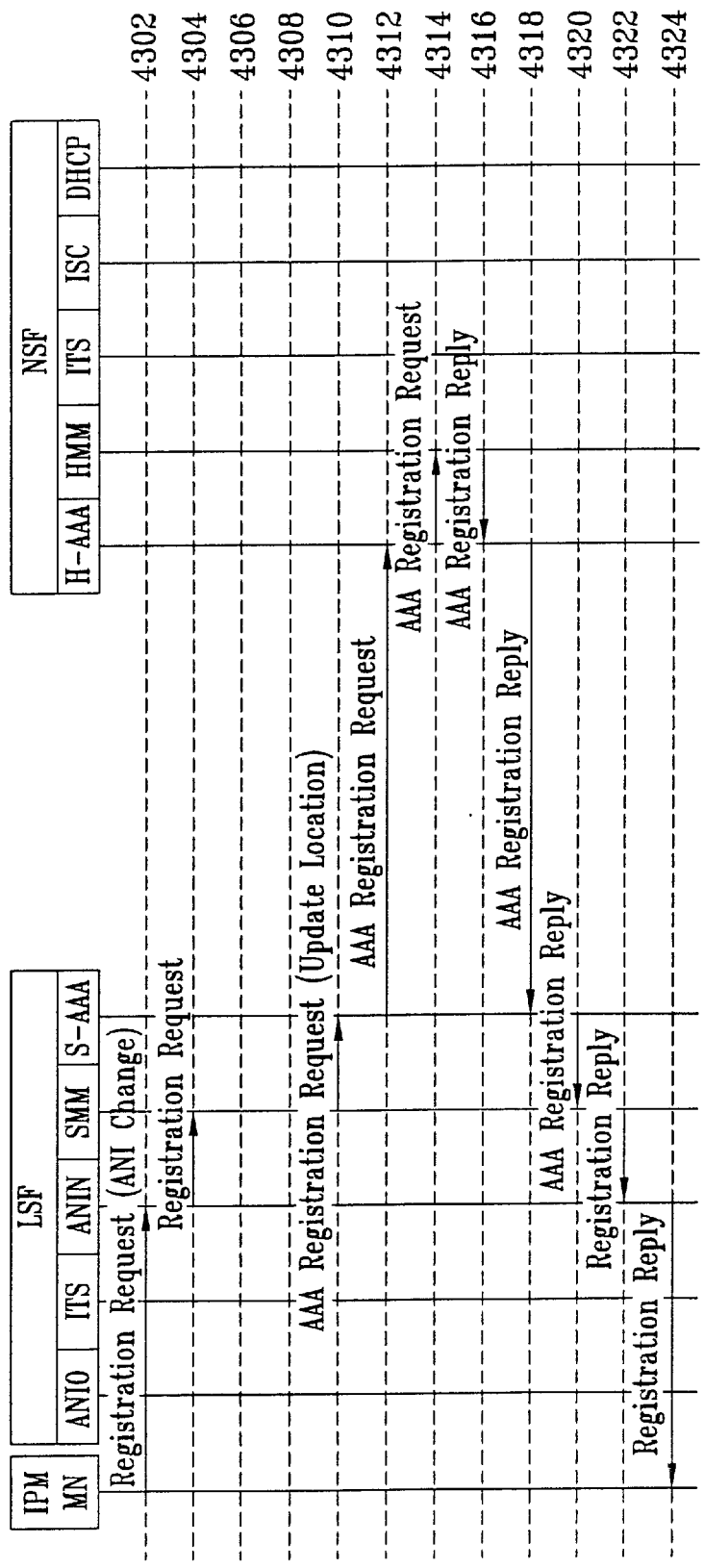
FIG. 43 is an event sequence diagram showing the flow of events when an IPM MN re-registers from an IPM LSF.

FIG. 43 is a message flow event sequence diagram showing the flow of messages for IPM MN handoffs from ANI to ANI in the same SMM, same ITS.

In event 4302–4304, the Registration Request message is sent. See section 4.2.1 for details.

In event 4310–4314, the AAA-Registration Request message is sent. See section 4.2.1 for details.

In event 4316–4320, the AAA-Registration Reply message is sent. See section 4.2.1 for details.

In event 4322–4324, the Registration Reply message is sent. See section 4.2.1 for details.

4.2.10 IPM MN Handoffs from SMM to SMM

Figure 44A:
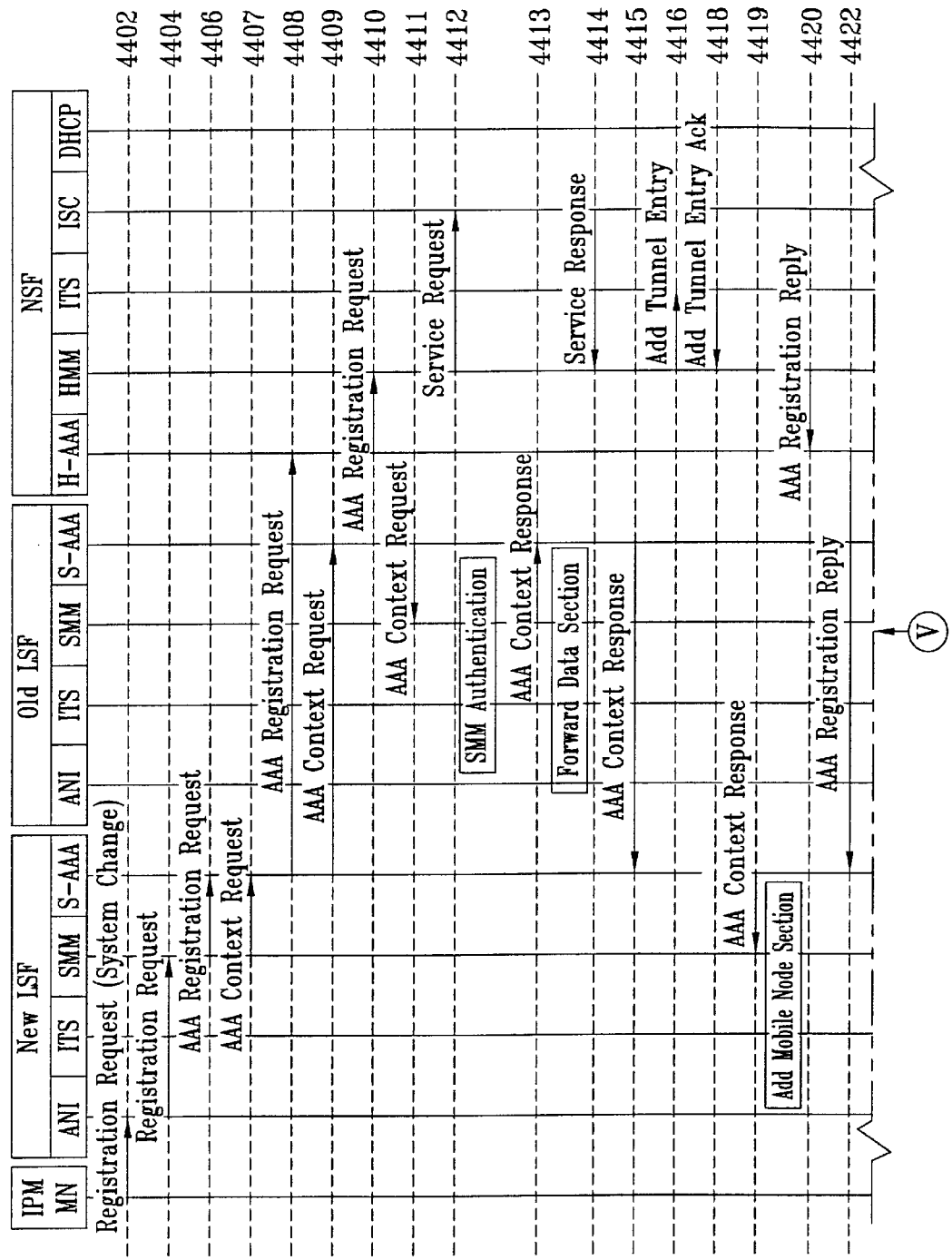
FIG. 44 is an event sequence diagram showing the flow of events when an IPM MN de-registers from an IPM LSF.
Figure 44B:
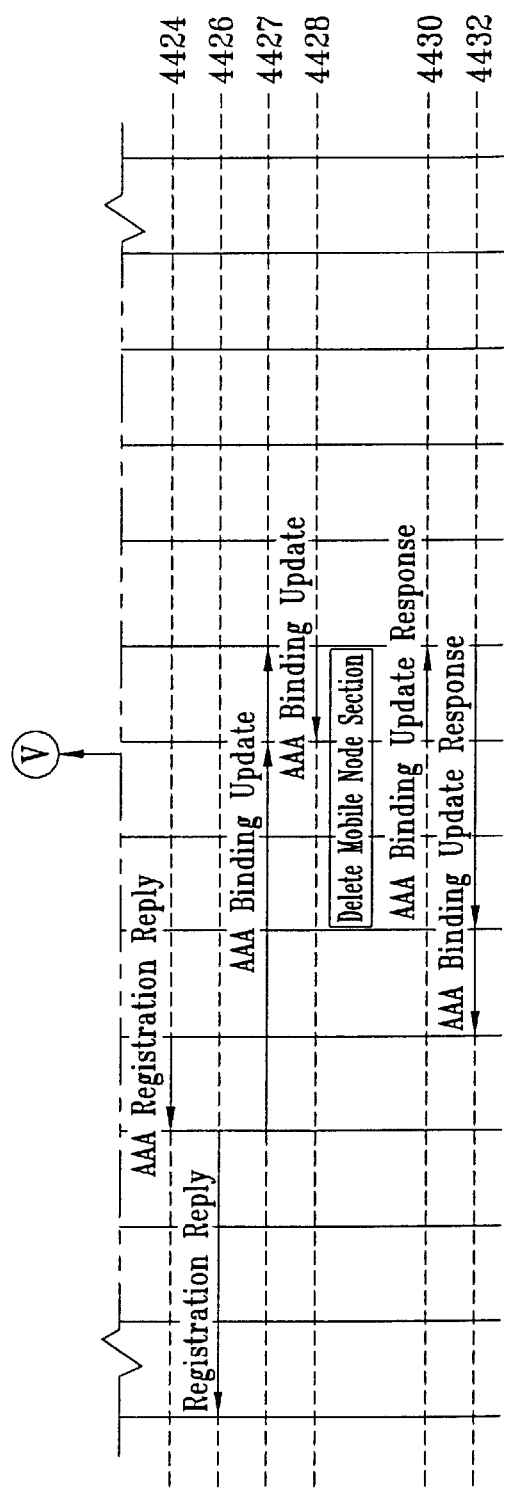

FIG. 44 is a message flow event sequence diagram showing the flow of messages for IPM MN handoffs from SMM to SMM message is sent. See section 4.2.1 for details.

In events 4402–4404, the Registration Request message is sent. See section 4.2.1 for details.

In events 4406, 4408, and 4410, the AAA-Registration Request message is sent. See section 4.2.1 for details.

In events 4407, 4409, and 4411, the AAA-Context-Request message is sent by the current SMM of the User to the previous SMM to request the Context-Data of the User's session.

The AAA-Context-Request message is of the format of DIAMETER. The current SMM of the MN sends this message to previous SMM, to request for the context of the user's data and also to request to forward the data to the current COA. The current SMM sends the IPM-Registration-Request AVP that encapsulates the incoming IPM-Registration-Request message for the previous SMM to authenticate before forwarding the data. The IPM-Context-Request-Type AVP informs the previous SMM what kind of action is requested. Additionally, AVPs, which are discussed further in section 4.5, optionally used in the AAA-Context-Request message are: IPM-Registration-Request AVP; IPM-SMM-NAI. AVP; Proxy-State AVP; Time AVP; Nonce AVP; and Integrity-Check-Value AVP.

In events 4413, 4415, and 4419, the AAA-Context-Response message is sent by previous SMM of the User to the current SMM in response to the AAA-Context-Request message. The AAA-Context-Response message is of the format of DIAMETER. The previous SMM of the MN sends this message to current SMM, to response to the AAA-Context-Request message. The successful message must have IPM-Context-Data AVP in the message. Additionally, AVPs, which are discussed further in section 4.5, optionally used in the AAA-Context-Request message are: IPM-Context-Data AVP; Proxy-State AVP; Time AVP; Nonce AVP; and Integrity-Check-Value AVP.

In event 4414, the Service Response message is sent. See section 4.2.1 for details.

In event 4416, the Add Tunnel Entry message is sent. See section 4.2.1 for details.

In event 4418, the Add Tunnel Entry Acknowledgement message is sent. See section 4.2.1 for details.

In events 4420, 4422, and 4424, the AAA-Registration Reply message is sent. See section 4.2.1 for details.

In events 4426, the Registration Reply message is sent. See section 4.2.1 for details.

In events 4427 and 4428, the AAA-Binding-Update Request message is sent by the current SMM of the User to the previous SMM to complete the hand-off of the User's session. The AAA-Binding-Update Request message is of the format of DIAMETER. The current SMM of the MN sends this message to the previous SMM, to complete the hand-off of the User's session and clean up of the resources that are allocated for the user. The message contains: a Command-Code of 341; Destination-NAI AVP; Host-Name AVP; User-Name AVP; IPM-Client-Address AVP; and IPM-Care-of-Address AVP. Additionally, AVPs, which are discussed further in section 4.5, optionally used in the AAA-Binding-Update Request message are: IPM-SMM-NAI AVP; Proxy-State AVP; Time AVP; Nonce AVP; and Integrity-Check-Value AVP.

In events 4430 and 4432, the AAA-Binding-Update Response message is sent by the previous SMM of the User to the current SMM in response to the AAA-Binding-Update Request message. The AAA-Binding-Update Response message is of the format of DIAMETER. The previous SMM of the MN sends this message to the current SMM, in response to the AAA-Binding-Update Request message. The successful message completes the hand-off of the MN from SMM to SMM. The AAABinding-Update Response message contains: Command-Code of 342; Destination-NAI AVP; Host-Name AVP; User-Name AVP; and Result-Code AVP. Additionally, AVPs, which are discussed further in section 4.5, optionally used in the AAA-Binding-Update Request message are: Proxy-State AVP; Time AVP; Nonce AVP; and Integrity-Check-Value AVP.

4.2.11 IPM MN Handoffs LSF to NSF (Home ANI)

Figure 45:
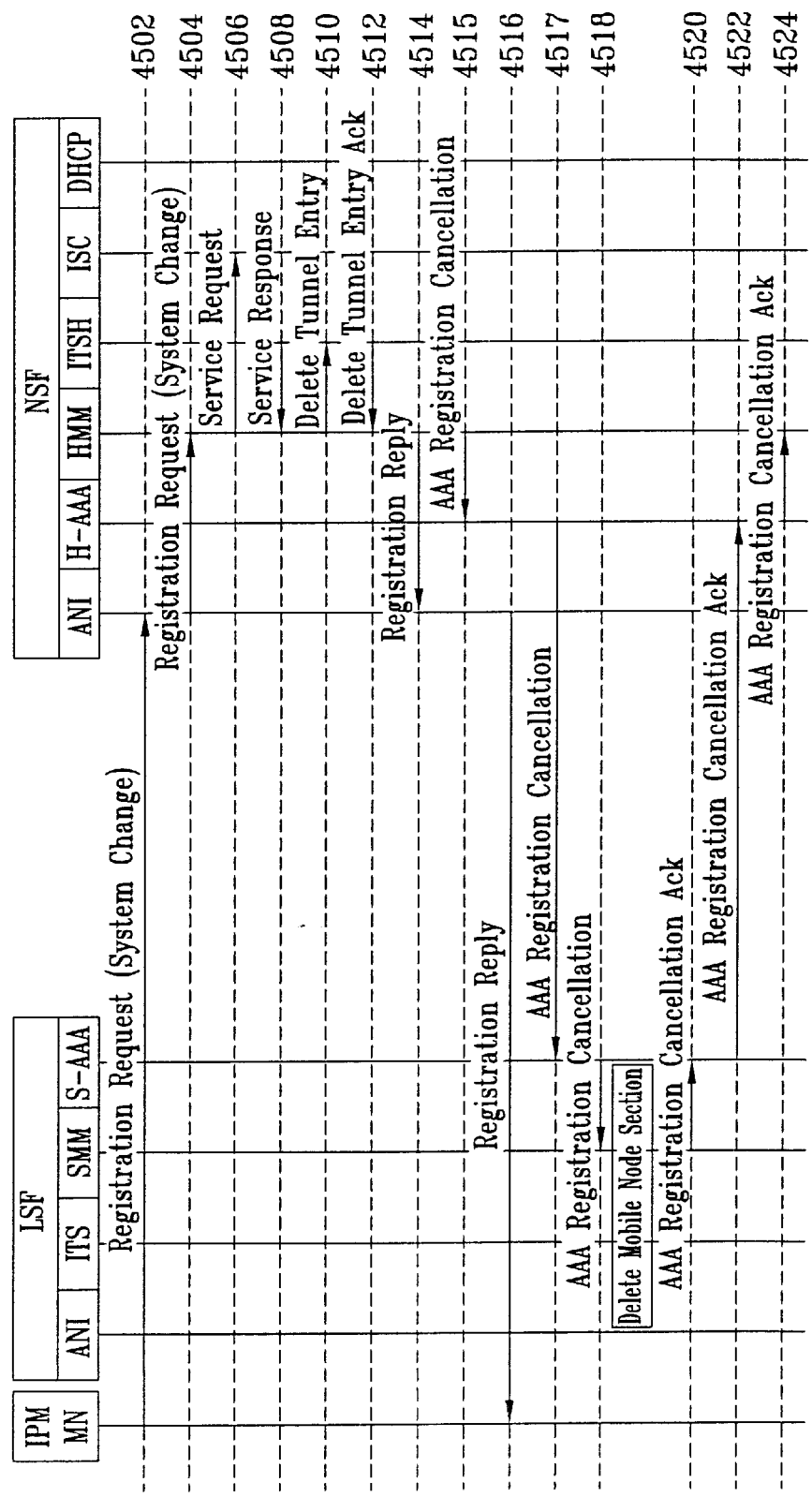
FIG. 45 is an event sequence diagram showing the flow of events when an IPM MN de-registers from an IPM NSF.

FIG. 45 is a message flow event sequence diagram showing the flow of messages for IPM MN handoffs LSF to NSF, home ANI.

In events 4502–4504, the Registration Request message is sent. See section 4.2.1 for details.

In event 4506, the Service Request message is sent. See section 4.2.1 for details.

In event 4508, the Service Reply message is sent. See section 4.2.1 for details.

In event 4510, the Delete Tunnel Entry message is sent. See section 4.2.6 for details.

In event 4512, the Delete Tunnel Entry Acknowledgement message is sent. See section 4.2.6 for details.

In events 4514 and 4516, the Registration Reply message is sent. See section 4.2.1 for details.

In events 4515, 4517, and 4518, the AAA-Registration Cancellation message is sent by the HMM to the SMM to cancel the existing User's registration at the visiting system. The AAA-Registration Cancellation message is of the format of DIAMETER. The HMM sends the message to the SMM with at least the mandatory fields to cancel the registration of the user. The IPM-Registration-Cancellation-Reason AVP indicates the reason for the cancellation of the registration. The AAA-Registration Cancellation message contains: Command-Code of 337; Destination-NAI AVP; Host-Name AVP; User-Name AVP; and IPM-Registration-Cancellation-Reason AVP. Additionally, AVPs, which are discussed further in section 4.5, optionally used in the AAA-Binding-Update Request message are: IPM-Client-Address AVP; Proxy-State AVP; Time AVP; Nonce AVP; and Integrity-Check-Value AVP.

In events 4520–24, the AAA-Registration Cancellation Acknowledgement message is sent by the SMM to acknowledge the AAA-Registration Cancellation message. The AAA-Registration Cancellation Acknowledgement message is of the format of DIAMETER. The SMM sends the message to the HMM with at least the mandatory fields. The Response-Code AVP indicates the failure or success of the AAA-Registration Cancellation message. The AAA-Registration Cancellation Acknowledgement message contains: Command-Code of 338; Destination-NAI AVP; Host-Name AVP; User-Name AVP; and Result-Code AVP. Additionally, AVPs, which are discussed further in section 4.5, optionally used in the AAA-Binding-Update Request message are: Proxy-State AVP; Time AVP; Nonce AVP; and Integrity-Check-Value AVP.

4.2.12 IPM MN Handoffs NSF (Home ANI) to LSF

Figure 46:
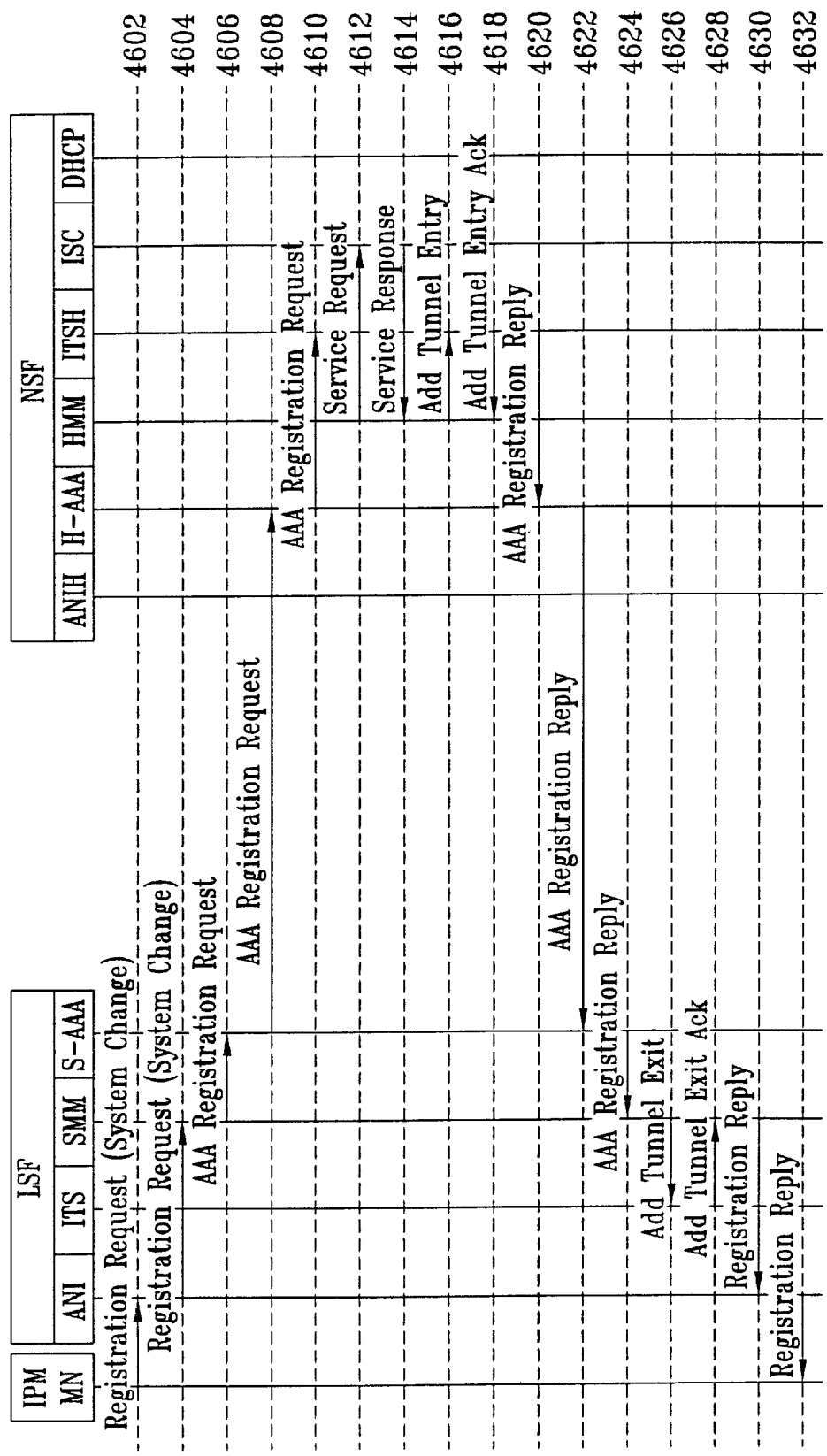
FIG. 46 is an event sequence diagram showing the flow of events when an IPM MN de-registers from an MIP FA.

FIG. 46 is a message flow event sequence diagram showing the flow of messages for IPM MN handoffs NSF, home ANI, to LSF.

In events 4602–4604, the Registration Request message is sent. See section 4.2.1 for details.

In events 4606–4610, the AAA-Registration Request message is sent. See section 4.2.1 for details.

In event 4612, the Service Request message is sent. See section 4.2.1 for details.

In event 4614, the Service Reply message is sent. See section 4.2.1 for details.

In event 4616, the Add Tunnel Entry message is sent. See section 4.2.1 for details.

In event 4618, the Add Tunnel Entry Acknowledgement message is sent. See section 4.2.1 for details.

In events 4620–24, the AAA-Registration Reply message is sent. See section 4.2.1 for details.

In event 4626, the Add Tunnel Exit message is sent. See section 4.2.1 for details.

In event 4628, the Add Tunnel Exit Acknowledgement message is sent. See section 4.2.1 for details.

In events 4630–32, the Registration Reply message is sent. See section 4.2.1 for details.

4.2.13 IPM MN Handoffs from LSF to NSF (Foreign ANI)

Figure 47:
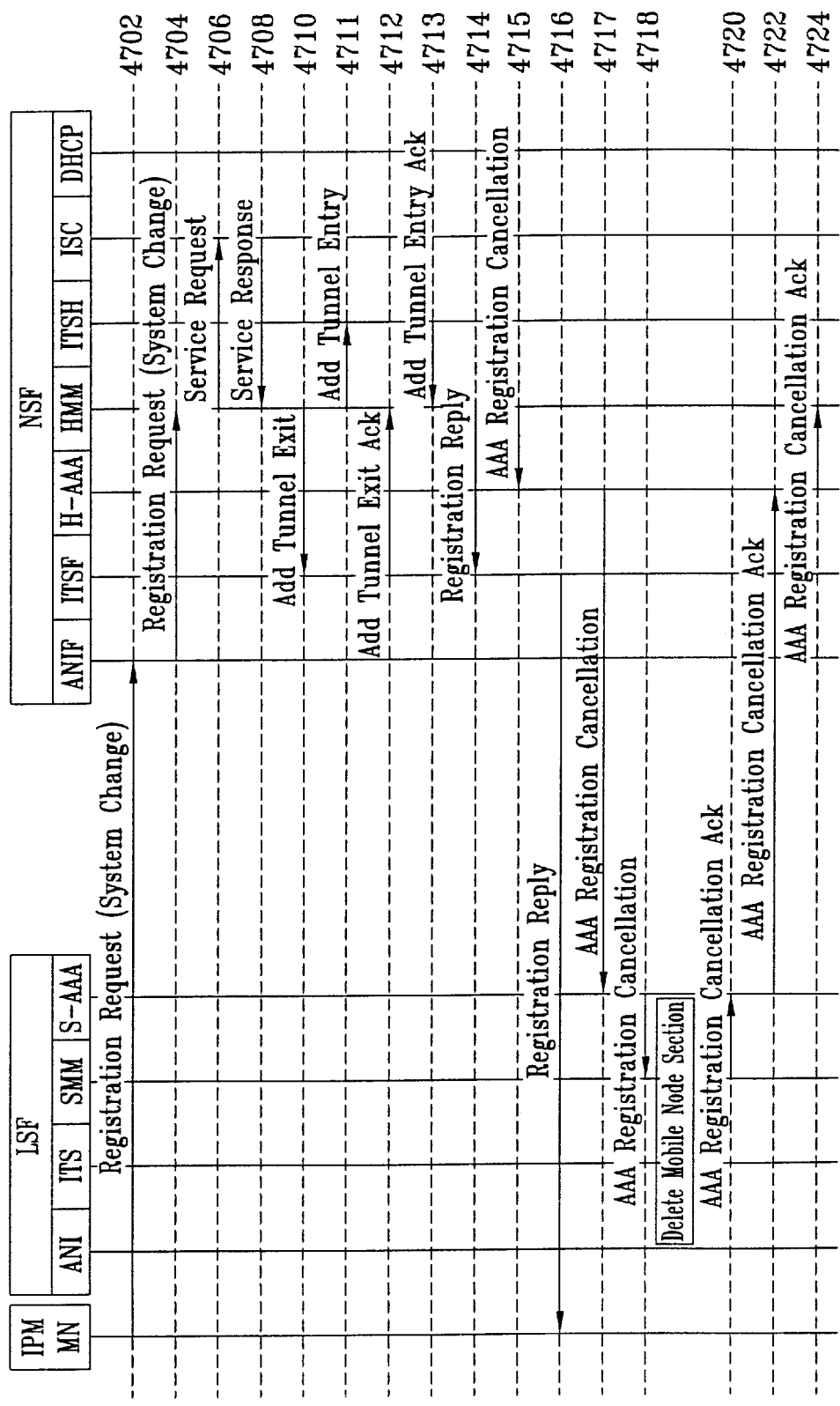
FIG. 47 is an event sequence diagram showing the flow of events when an IPM MN handoffs from ANI to ANI in the same SMM but different ITS.

FIG. 47 is a message flow event sequence diagram showing the flow of messages for IPM MN handoffs from LSF to NSF, foreign ANI.

In events 4702–4704, the Registration Request message is sent. See section 4.2.1 for details.

In event 4706, the Service Request message is sent. See section 4.2.1 for details.

In event 4708, the Service Reply message is sent. See section 4.2.1 for details.

In event 4710, the Add Tunnel Exit message is sent. See section 4.2.1 for details.

In event 4711, the Add Tunnel Entry message is sent. See section 4.2.1 for details.

In event 4712, the Add Tunnel Exit Acknowledgement message is sent. See section 4.2.1 for details.

In events 4713, the Add Tunnel Entry Acknowledgement message is sent. See section 4.2.1 for details.

In events 4714 and 4716, the Registration Reply message is sent. See section 4.2.1 for details.

In events 4715, 4717, and 4718, the AAA Registration Cancellation message is sent. See section 4.2.11 for details.

In events 4720–24, the AAA Registration Cancellation Acknowledgement message is sent. See section 4.2.11 for details.

4.2.14 IPM MN Handoffs from NSF (Foreign ANI) to LSF

Figure 48:
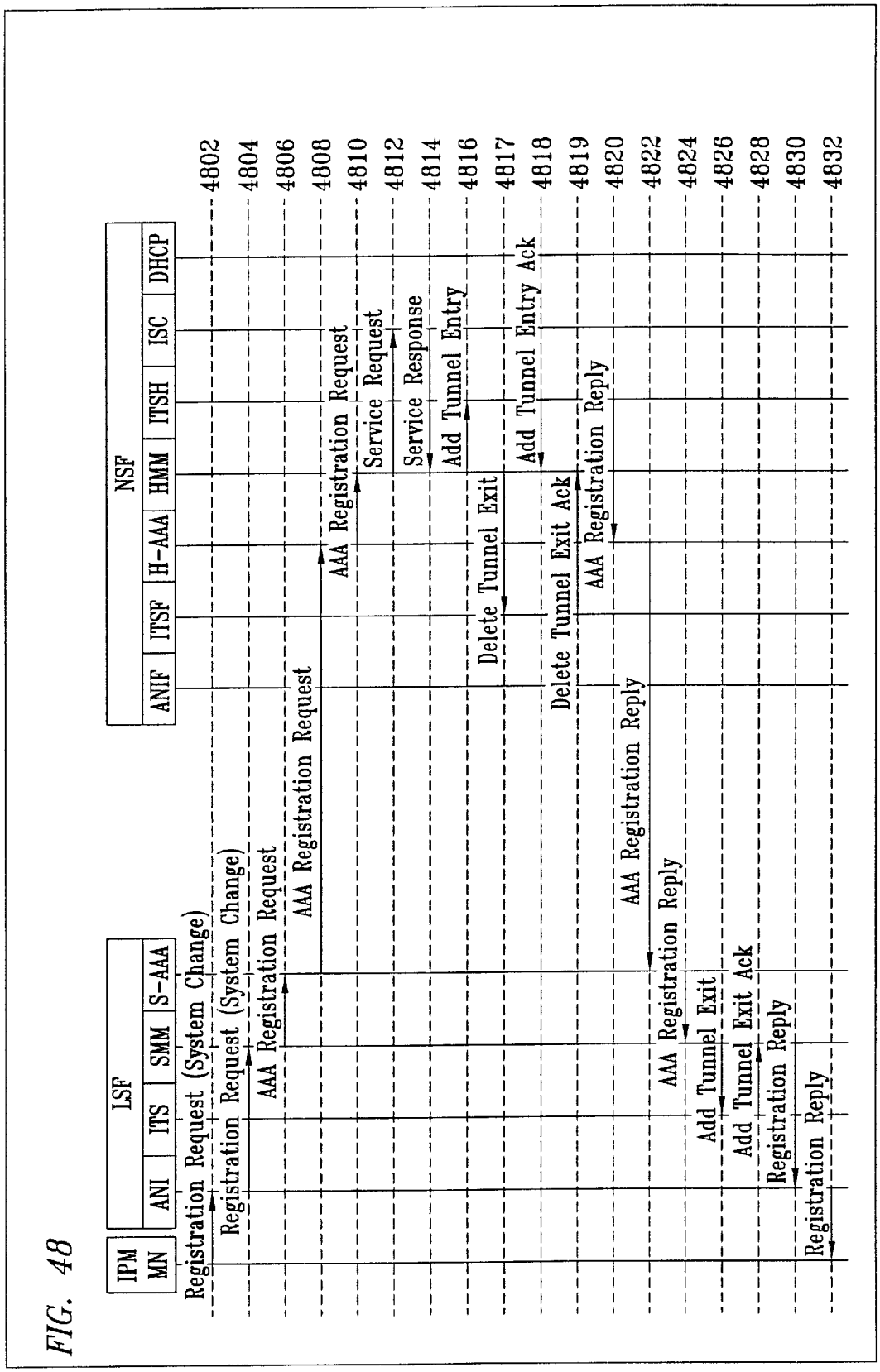
FIG. 48 is an event sequence diagram showing the flow of events when an IPM MN handoffs from ANI to ANI in the same SMM and same ITS.

FIG. 48 is a message flow event sequence diagram showing the flow of messages for IPM MN handoffs from NSF, foreign ANI, to LSF.

In events 4802–4804, the Registration Request message is sent. See section 4.2.1 for details.

In events 4806–4810, the AAA Registration Request message is sent. See section 4.2.1 for details.

In event 4812, the Service Request message is sent. See section 4.2.1 for details.

In event 4814, the Service Reply message is sent. See section 4.2.1 for details.

In event 4816, the Add Tunnel Entry message is sent. See section 4.2.1 for details.

In event 4817, the Delete Tunnel Exit message is sent. See section 4.2.6 for details.

In event 4818, the Add Tunnel Entry Acknowledgement message is sent. See section 4.2.1 for details.

In event 4819, the Delete Tunnel Exit Acknowledgement message is sent. See section 4.2.6 for details.

In events 4820–24, the AAA Registration Reply message is sent. See section 4.2.1 for details.

In event 4826, the Add Tunnel Exit message is sent. See section 4.2.1 for details.

In event 4828, the Add Tunnel Exit Acknowledgement message is sent. See section 4.2.1 for details.

In events 4830–32, the Registration Reply message is sent. See section 4.2.1 for details.

4.2.15 IPM MN Handoffs from Foreign ANI to Foreign ANI in the Same NSF

Figure 49:
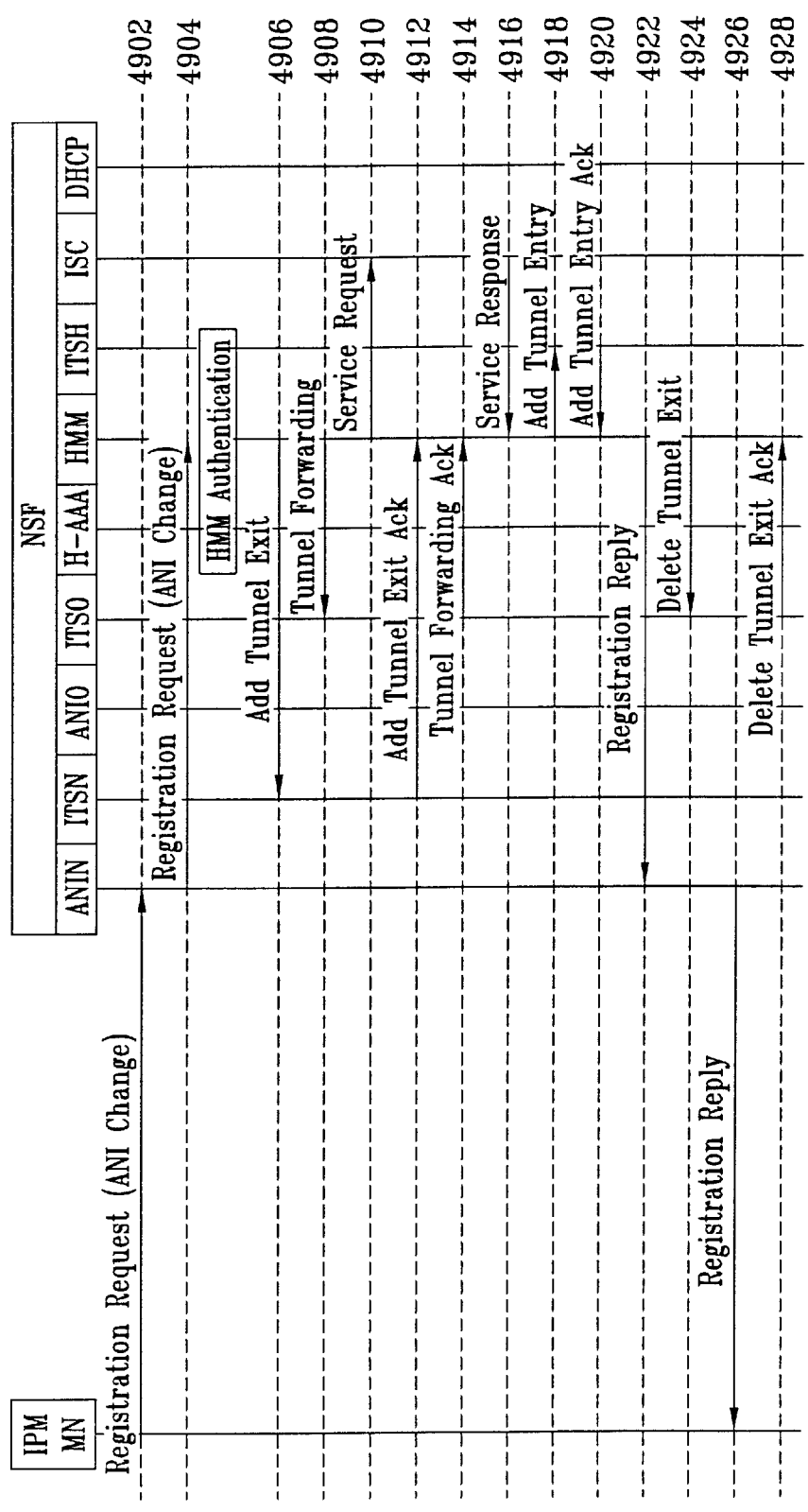
FIG. 49 is an event sequence diagram showing the flow of events when as IPM MN handoffs from SMM to SMM.

FIG. 49 is a message flow event sequence diagram showing the flow of messages for IPM MN handoffs from foreign ANI to foreign ANI in the same NSF.

In events 4902–4904, the Registration Request message is sent. See section 4.2.1 for details.

In event 4906, the Add Tunnel Exit message is sent. See section 4.2.1 for details.

In event 4908, the Tunnel Forwarding message is sent. See section 4.2.1 for details.

In event 4910, the Service Request message is sent. See section 4.2.1 for details.

In event 4912, the Add Tunnel Exit Acknowledgement message is sent. See section 4.2.1 for details.

In event 4914, the Tunnel Forwarding Acknowledgement message is sent. See section 4.2.1 for details.

In event 4916, the Service Reply message is sent. See section 4.2.1 for details.

In event 4918, the Add Tunnel Entry message is sent. See section 4.2.1 for details.

In event 4920, the Add Tunnel Entry Acknowledgement message is sent. See section 4.2.1 for details.

In events 4922 and 4926, the Registration Reply message is sent. See section 4.2.1 for details.

In event 4924, the Delete Tunnel Exit message is sent. See section 4.2.1 for details.

In event 4928, the Delete Tunnel Exit Acknowledgement message is sent. See section 4.2.1 for details.

4.2.16 IPM MN Handoffs from Home ANI to Foreign ANI in the Same NSF

Figure 50:
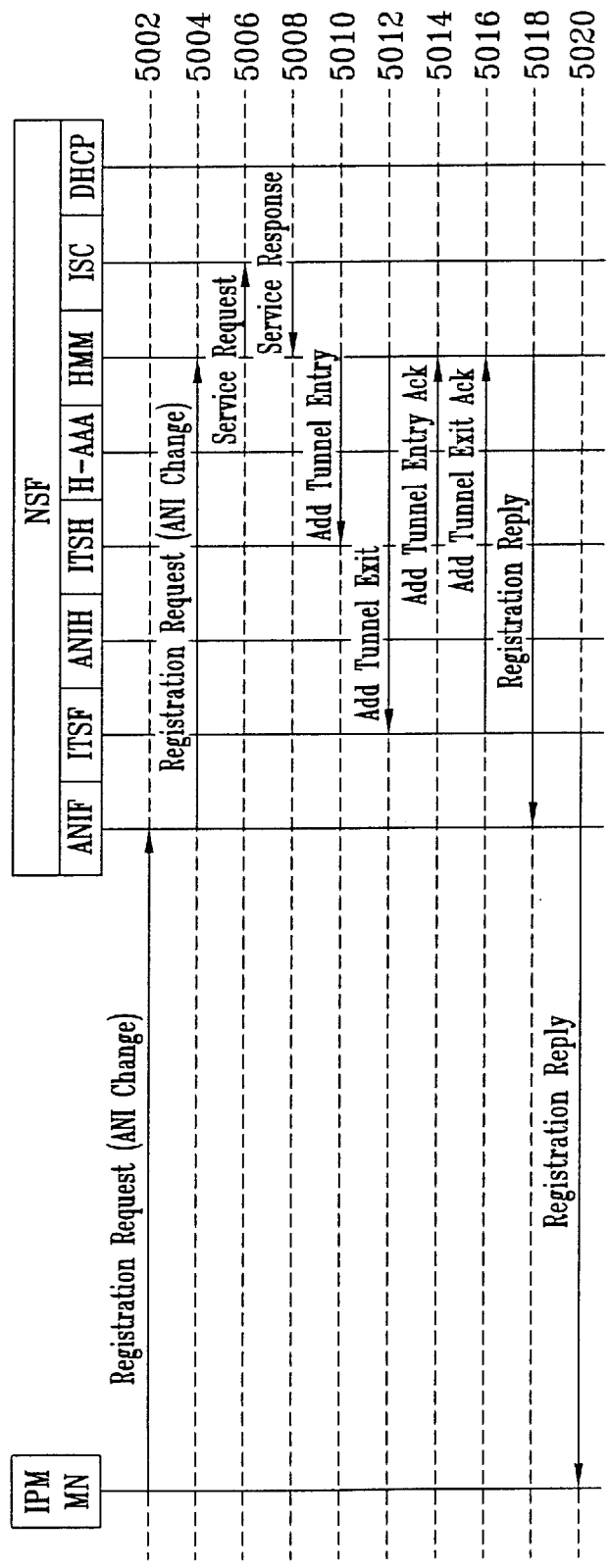
FIG. 50 is an event sequence diagram showing the flow of events when an IPM MN handoffs from LSF to NSF.

FIG. 50 is a message flow event sequence diagram showing the flow of messages for IPM MN handoffs from foreign ANI to foreign ANI in the same NSF.

In events 5002–5004, the Registration Request message is sent. See section 4.2.1 for details.

In event 5006, the Service Request message is sent. See section 4.2.1 for details.

In event 5008, the Service Reply message is sent. See section 4.2.1 for details.

In event 5010, the Add Tunnel Entry message is sent. See section 4.2.1 for details.

In event 5012, the Add Tunnel Exit message is sent. See section 4.2.1 for details.

In event 5014, the Add Tunnel Entry Acknowledgement message is sent. See section 4.2.1 for details.

In event 5016, the Add Tunnel Exit Acknowledgement message is sent. See section 4.2.1 for details.

In events 5018–5020, the Registration Reply message is sent. See section 4.2.1 for details.

4.2.17 IPM MN Handoffs from Foreign ANI to Home ANI in the Same NSF

Figure 51:
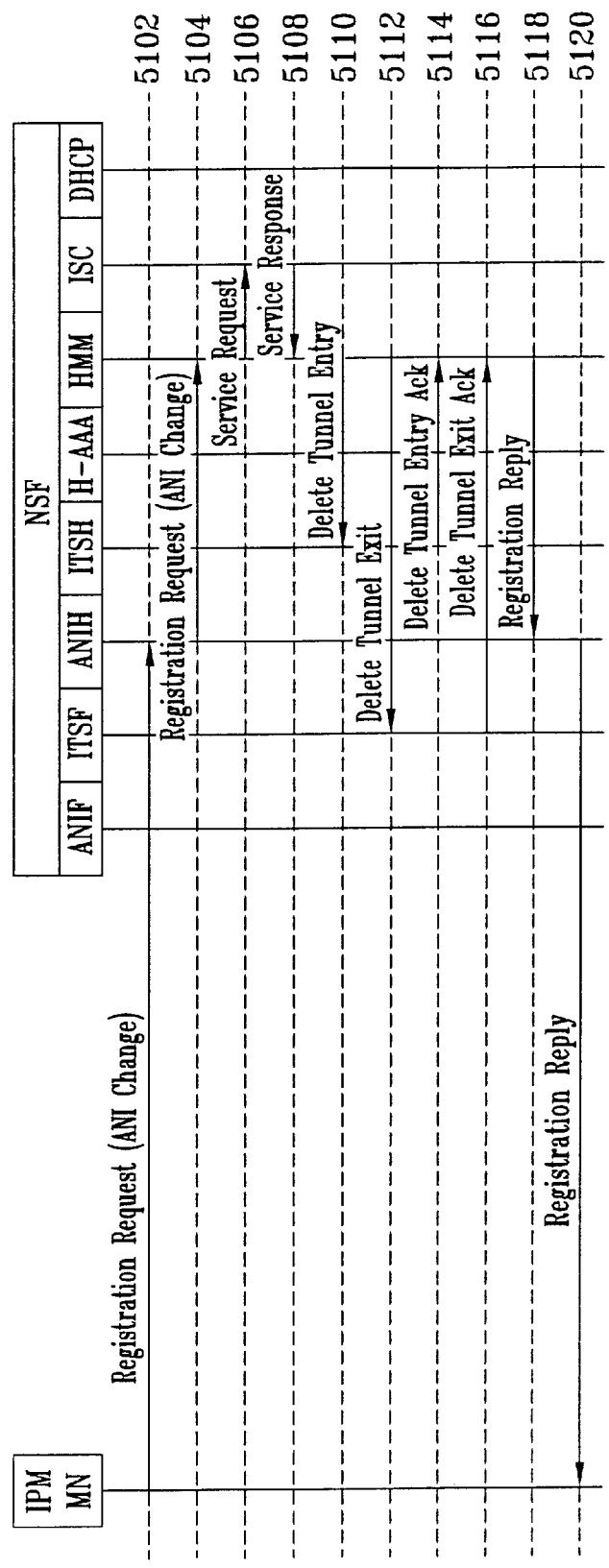
FIG. 51 is an event sequence diagram showing the flow of events when an IPM MN handoffs from NSF to LSF.

FIG. 51 is a message flow event sequence diagram showing the flow of messages for IPM MN handoffs from foreign ANI to home ANI in the same NSF.

In events 5102–5104, the Registration Request message is sent. See section 4.2.1 for details.

In event 5106, the Service Request message is sent. See section 4.2.1 for details.

In event 5108, the Service Reply message is sent. See section 4.2.1 for details.

In event 5110, the Delete Tunnel Entry message is sent. See section 4.2.6 for details.

In event 5112, the Delete Tunnel Exit message is sent. See section 4.2.6 for details.

In event 5114, the Delete Tunnel Entry Acknowledgement message is sent. See section 4.2.6 for details.

In event 5116, the Delete Tunnel Exit Acknowledgement message is sent. See section 4.2.6 for details.

In events 5118–20, the Registration Reply message is sent. See section 4.2.1 for details.

4.3 Interworking Message Flow IPM-MIP 4.3.1 IPM MN Registers from MIP FA

Figure 52:
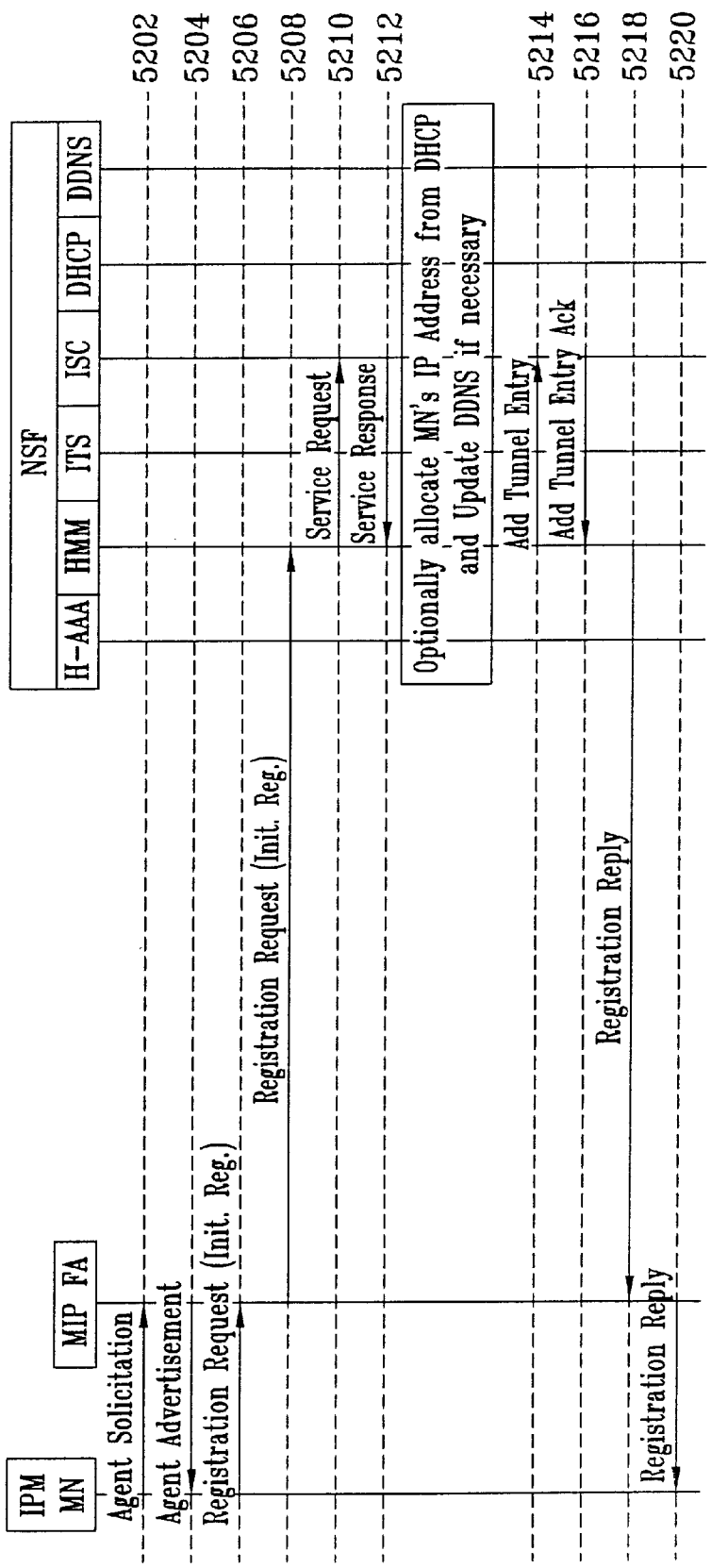
FIG. 52 is an event sequence diagram showing the flow of events of an IPM MN handoff from an IPM ANI to FA, wherein the FA does not support smooth handoffs.

FIG. 52 is a message flow event sequence diagram showing the flow of messages for IPM MN registers from MIP FA.

Agent Discovery, events 5202–5204, is the method by which a Mobile Node (MN) determines whether it is currently connected to its home network or to a foreign network, and by which a MN can detect when it has moved from one network to another. Home agents and foreign agents may advertise their availability on each link for which they provide service. A newly arrived MN can send a solicitation on the link to learn if any prospective agents are present. The Agent Discovery Process is primarily handled through Agent Solicitation and Agent Advertisement.

In event 5202, the Agent Solicitation is the broadcast/multicast message sent by the IPM MN to detect a Service Provider in the event that the IPM MN has not received an Advertising Agent message. The message exchanged between the IPM MN and the MIP FA contains: a Mobile IP address belonging to the interface from which this message is sent, or 0; the configured solicitation address as the destination address; a type of 10; a code of 0; and a checksum value.

In step 5204, the Agent Advertisement are messages sent periodically, either as a broadcast or multicast for the visiting IPM MN to recognize the availability of service and to keep track of their point of attachment. The message exchanged between the MIP FA and the IPM MN contains: an IP address belonging to the interface from which this message is sent; the configured Advertisement Address or the IP address of a neighboring host as a destination address; a type of 9; a code of 0; a checksum value; the number of router addresses advertised in this message; the number of 32-bit words of information per each router address (2, in the version of the protocol described here); the maximum number of seconds that the router addresses may be considered valid; the sending router's IP address(es) on the interface from which this message is sent; and the preferability of each router address [i] as a default router address, relative to other router addresses on the same subnet.

Additionally, the following extensions, which are explained in further detail in section 4.4, are used in the Agent Advertisement message: Mobility Agent Advertisement Extension; Prefix-Lengths Extension (Optional); and One-Byte Padding Extension (Optional).

In events 5206–5208, Registration Request message is sent by the IPM MN to the HMM to register for the service. The Registration process also includes the authenticating and authorizing of the IPM MN to have access to the visited network or FA.

The purpose of registration is for the IPM MN to inform the HMM of the NSF (Network Serving Function) of its current location to which data packets can be forwarded to the IPM MN. The Registration process also includes the authenticating and authorizing of the MIP MN to have access to the visited network or LSF (Local Serving Function).

The message exchanged between the IPM MN and the HMM contains: an IP address of the MN; the COA within the ANI component as the destination address; a type of 0; the flags as filed with RFC2002; the lifetime requested by MN from the HMM or Home; the IP address of the MN; the Home Agent's address of the MN; the Care-of-Address of the MN; and the identification, to provide replay protection.

Additionally, the following extensions, which are explained in further detail in section 4.4, are used in the Registration Request message: Mobile-Home Authentication Extension; Mobile-Foreign Authentication Extension (Optional); and Foreign-Home Authentication Extension (Optional).

In event 5210, the Service Request message is sent from the HMM to the ISC (IPM Security Center) to authenticate a user or message, generate, renew, or delete session secret keys. It also can be sent from the PPS Manager to the ISC to generate or construct the IPMC. The message exchanged between the HMM and the ISC contains: a type of USER_SERVICE_REQUEST_MSG; a sub-type of 0; a length of the message payload including all the extensions; an identification number used for matching User Service Request messages with User Service Reply messages, and for protecting against replay attacks of User Service Request messages; and a User NAI.

Additionally, the following extensions, which are explained in further detail in section 4.4, are used in the Service Request message: User Authentication Information Extension; Control Message Authentication Extension; Session Key Allocation Extension 0 . . . N; Session Key Lifetime Renewal Extension 0 . . . N; and Session Key Delete Extension 0 . . . N.

In event 5212, the Service Reply message is sent from the ISC (IPM Security Center) to the HMM in response to a Service Request message. The message exchanged between the ISC and the HMM contains: a type of USER_SERVICE_REPLY_MSG; a sub-type of 0; the length of the message payload including all the extensions; a code; an identification number used for matching User Service Request messages with User Service Reply messages, and for protecting against replay attacks of User Service Request messages; and a User NAI. The value of the code is defined as the following hexadecimal value:

00000001 User Authenticated successfully.
00000002 All required keys have been allocated.
00000003 Some keys have been allocated.
00000004 User Authentication failed.
00000005 Key Lifetime Renewal is completely honoured.
00000006 Key Lifetime Renewal is partially honoured.
00000007 User Account is created successfully.
00000008 User is deleted successfully.

Additionally, the following extensions, which are explained in further detail in section 4.4, are used in the Service Reply message: Control Message Authentication Extension; Session Key Allocation Extension 0 . . . N; Session Key Lifetime Renewal Extension 0 . . . N; and Session Key Delete Extension 0 . . . N.

In event 5214, the Add Tunnel Entry message is sent by the HMM to instruct the ITS to set up a tunnel entry point. The message exchanged between the HMM and the ITS contains: a code of 1; the length of the message including the header fields; and an identification used in matching requests and acknowledgements. The sender must ensure the identifier in a message is locally unique at any given time.

Additionally, the following extensions, which are explained in further detail in section 4.4, are used in the Add Tunnel Entry message: Host NAI Extension; Flag Extension; Lifetime Extension; Mobile Node IP Address Extension; User NAI Extension (Optional); and Tunnel Entry IP Address Extension.

In event 5216, the Add Tunnel Entry Acknowledgement message is sent by the ITS to acknowledge the Add Tunnel Entry message. The message exchanged between the ITS and the HMM contains: a code of 2; a length of the message including the header fields; and an identification used in matching requests and acknowledgements. The sender must ensure the identifier in a message is locally unique at any given time.

Additionally, the following extensions, which are explained in further detail in section 4.4, are used in the Add Tunnel Entry Acknowledgement message: Host NAI Extension; Result Code Extension; Mobile Node IP Address Extension (Optional); and User NAI Extension (Optional).

In events 5218–22, the Registration Reply message is sent by the HMM to the IPM MN to indicate the result of the Registration Request message sent. The message exchanged between the HMM and the IPM MN contains: a type of 3; the MIP Response codes; the Home lifetime for the registration; the IP address of the MN; the Home Agent's address of the MN; and the identification, to provide replay protection.

Additionally, the following extensions, which are explained in further detail in section 4.4, are used in the Registration Reply message: Mobile-Home Authentication Extension; Foreign-Home Authentication Extension (Optional); and Mobile-Foreign Authentication Extension (Optional).

4.3.2 IPM MN Re-registers from MIP FA

Figure 53:
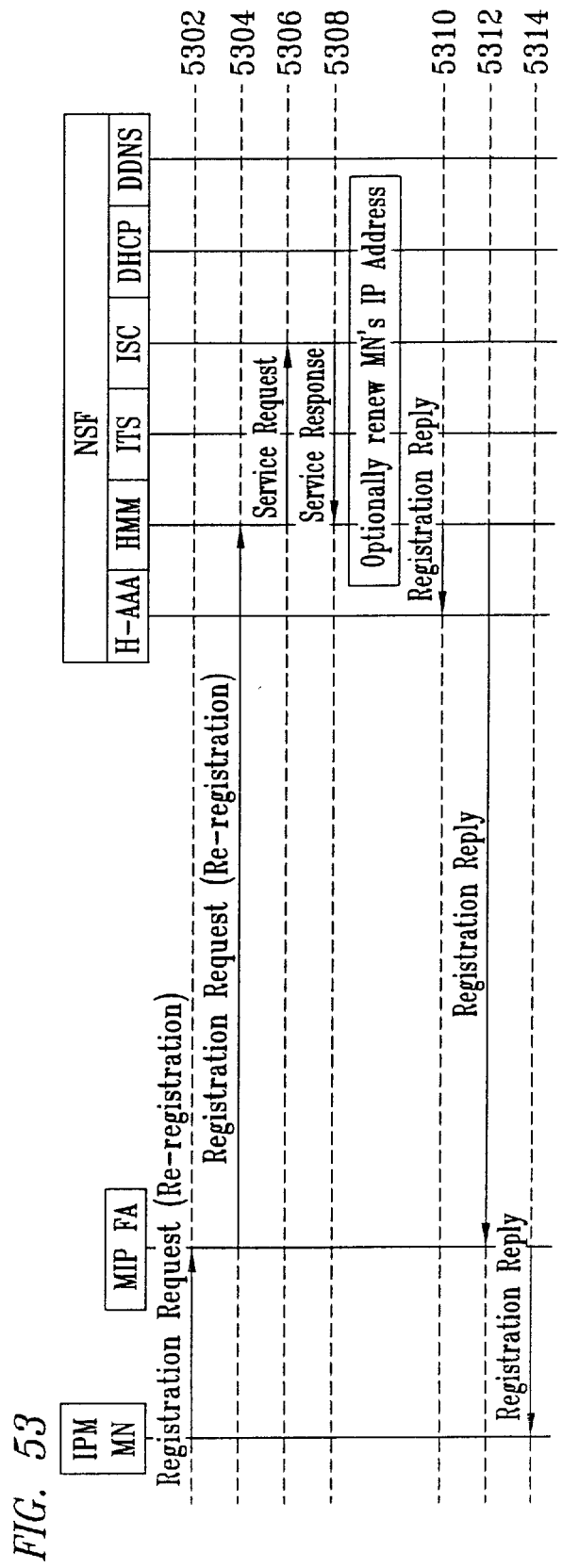
FIG. 53 is an event sequence diagram showing the flow of events of an IPM MN handoff from an FA to an IPM ANI, wherein the FA does not support smooth handoffs.

FIG. 53 is a message flow event sequence diagram showing the flow of messages for IPM MN re-registers from MIP FA.

In events 5302–5304, the Registration Request message is sent. See section 4.3.1 for details.

In event 5306, the Service Request message is sent. See section 4.3.1 for details.

In event 5308, the Service Reply message is sent. See section 4.3.1 for details.

In events 5310–14, the Registration Reply message is sent. See section 4.3.1 for details.

4.3.3 IPM MN De-registers from MIP FA

Figure 54:
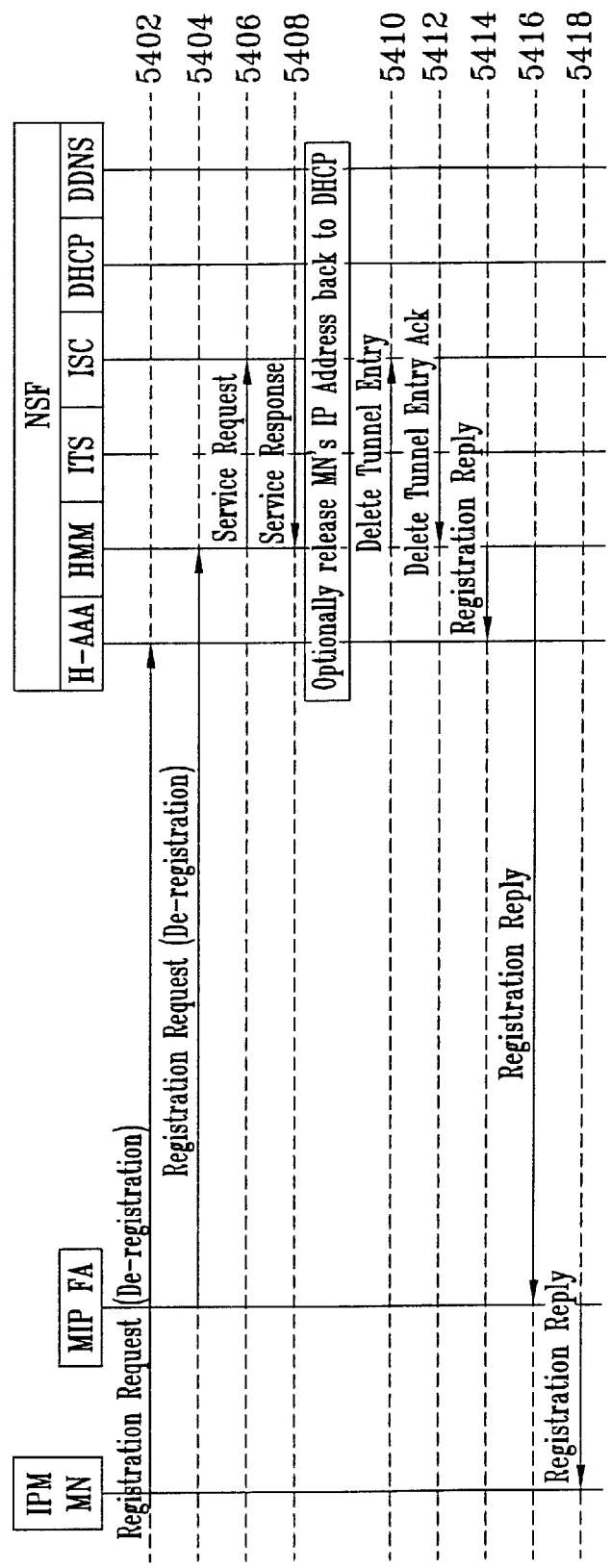
FIG. 54 is an event sequence diagram showing the flow of events of an IPM MN handoff from an IPM ANI to FA, wherein the FA does support smooth handoffs.

FIG. 54 is a message flow event sequence diagram showing the flow of messages for IPM MN de-registers from MIP FA.

In events 5402–5404, the Registration Request message is sent. See section 4.3.1 for details.

In event 5406, the Service Request message is sent. See section 4.3.1 for details.

In event 5408, the Service Reply message is sent. See section 4.3.1 for details.

In event 5410, the Delete Tunnel Entry message is sent by the HMM to instruct the ITS to delete a tunnel entry point. The message exchanged between the HMM and the ITS contains: a code of 7; the length of the message including the header fields; and an identification used in matching requests and acknowledgements. The sender must ensure the identifier in a message is locally unique at any given time.

Additionally, the following extensions, which are explained in further detail in section 4.4, are used in the Delete Tunnel Entry message: Host NAI Extension; Mobile Node IP Address Extension; and User NAI Extension (Optional).

In event 5412, the Delete Tunnel Entry Acknowledgement message is sent by the ITS to acknowledge the Delete Tunnel Entry message. The identification field should be used for matching with the Delete Tunnel Entry message. The message exchanged between the ITS and the HMM contains: a code of 8; the length of the message including the header fields; and an identification used in matching requests and acknowledgements. The sender must ensure the identifier in a message is locally unique at any given time.

Additionally, the following extensions, which are explained in further detail in section 4.4, are used in the Delete Tunnel Entry Acknowledgement message: Host NAI Extension; Result Code Extension; Mobile Node IP Address Extension (Optional); and User NAI Extension (Optional).

In events 5414–18, the Registration Reply message is sent. See section 4.3.1 for details.

4.3.4 IPM MN Handoffs from IPM ANI to FA (No Smooth Handoff)

Figure 55:
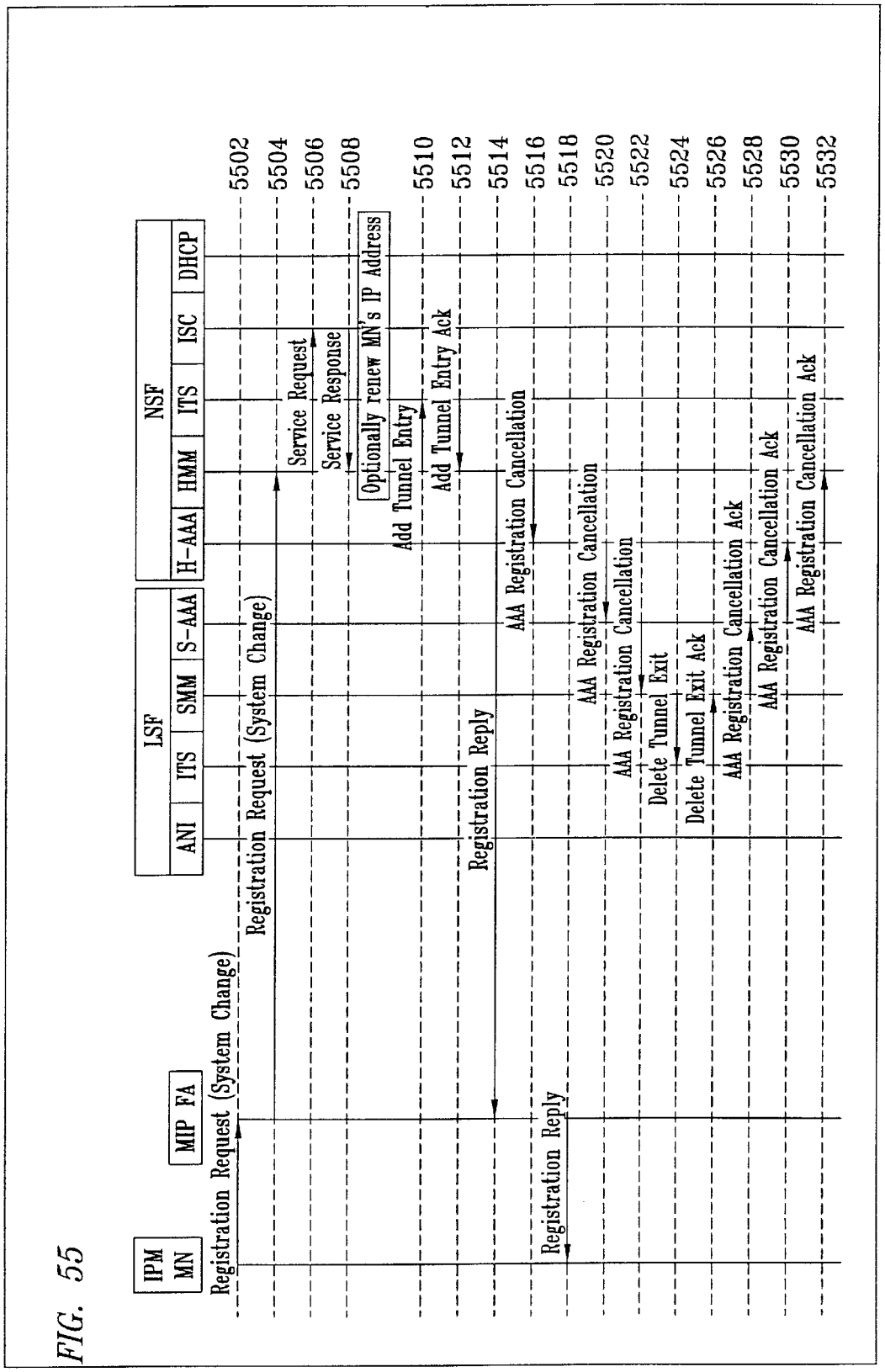
FIG. 55 is an event sequence diagram showing the flow of events of an MIP MN handoff from an IPM ANI to an FA, wherein the FA does not support smooth handoffs.

FIG. 55 is a message flow event sequence diagram showing the flow of messages for IPM MN de-registers from MIP FA.

In events 5502–5504, the Registration Request message is sent. See section 4.3.1 for details.

In event 5506, the Service Request message is sent. See section 4.3.1 for details.

In event 5508, the Service Reply message is sent. See section 4.3.1 for details.

In event 5510, the Add Tunnel Entry message is sent. See section 4.3.1 for details.

In event 5512, the Add Tunnel Entry Acknowledgement message is sent. See section 4.3.1 for details.

In events 5514 and 5418, the Registration Reply message is sent. See section 4.3.1 for details.

In events 5516, 5520, and 5522, the AAA-Registration Cancellation message is sent by the HMM to the SMM to cancel the existing User's registration at the visiting system.

The AAA-Registration Cancellation message is of the format of DIAMETER. The HMM sends the message to the SMM with at least the mandatory fields to cancel the registration of the user. The IPM-Registration-Cancellation-Reason AVP indicates the reason for the cancellation of the registration. The AAA-Registration Cancellation message contains: Command-Code AVP of 337, Destination-NAI AVP; Host-Name AVP; User-Name AVP; and IPM-Registration-Cancellation-Reason AVP.

Additionally, the AAA-Registration Cancellation message can optionally use the following AVPs, which are discussed in further detail in section 4.5: IPM-Client-Address AVP; Proxy-State AVP; Time AVP; Nonce AVP; and Integrity-Check-Value AVP.

In event 5524, the Delete Tunnel Exit message is sent by the SMM to instruct the ITS to delete a tunnel exit point. The message exchanged between the SMM and the ITS contains: a code of 9; the length of the message including the header fields; and an identification used in matching requests and acknowledgements. The sender must ensure the identifier in a message is locally unique at any given time.

Additionally, the following extensions, which are explained in further detail in section 4.4, are used in the Delete Tunnel Exit message: Host NAI Extension; Mobile Node IP Address Extension (Optional); and Tunnel Exit IP Address Extension.

In event 5526, the Delete Tunnel Exit Acknowledgement message is sent by the ITS to acknowledge the Delete Tunnel Exit message. The identification field should be used for matching with the Delete Tunnel Exit message. The message exchanged between the ITS and the SMM contains: a code of 10; the length of the message including the header fields; and an identification used in matching requests and acknowledgements. The sender must ensure the identifier in a message is locally unique at any given time.

Additionally, the following extensions, which are explained in further detail in section 4.4, are used in the Delete Tunnel Exit message: Host NAI Extension; Result Code Extension; Mobile Node IP Address Extension (Optional); and User NAI Extension (Optional).

In events 5528–32, the AAA-Registration Cancellation Acknowledgement message is sent by the SMM to the HMM in response to the AAA-Registration Cancellation message. The AAA-Registration Cancellation Acknowledgement message is of the format of DIAMETER. The SMM sends the message to the HMM with at least the mandatory fields. The Response-Code AVP indicates the failure or success of the AAA-Registration Cancellation message. The message exchanged between the SMM and the HMM contains: Command-Code AVP of 338, Destination-NAI AVP; Host-Name AVP; User-Name AVP; and Result-Code AVP.

Additionally, the AAA-Registration Cancellation Acknowledgement message can optionally use the following AVPs, which are discussed in further detail in section 4.5: Proxy-State AVP; Time AVP; Nonce AVP; and Integrity-Check-Value AVP.

4.3.5 IPM MN Handoffs from IPM ANI to FA (Smooth Handoff)

Figure 56A:
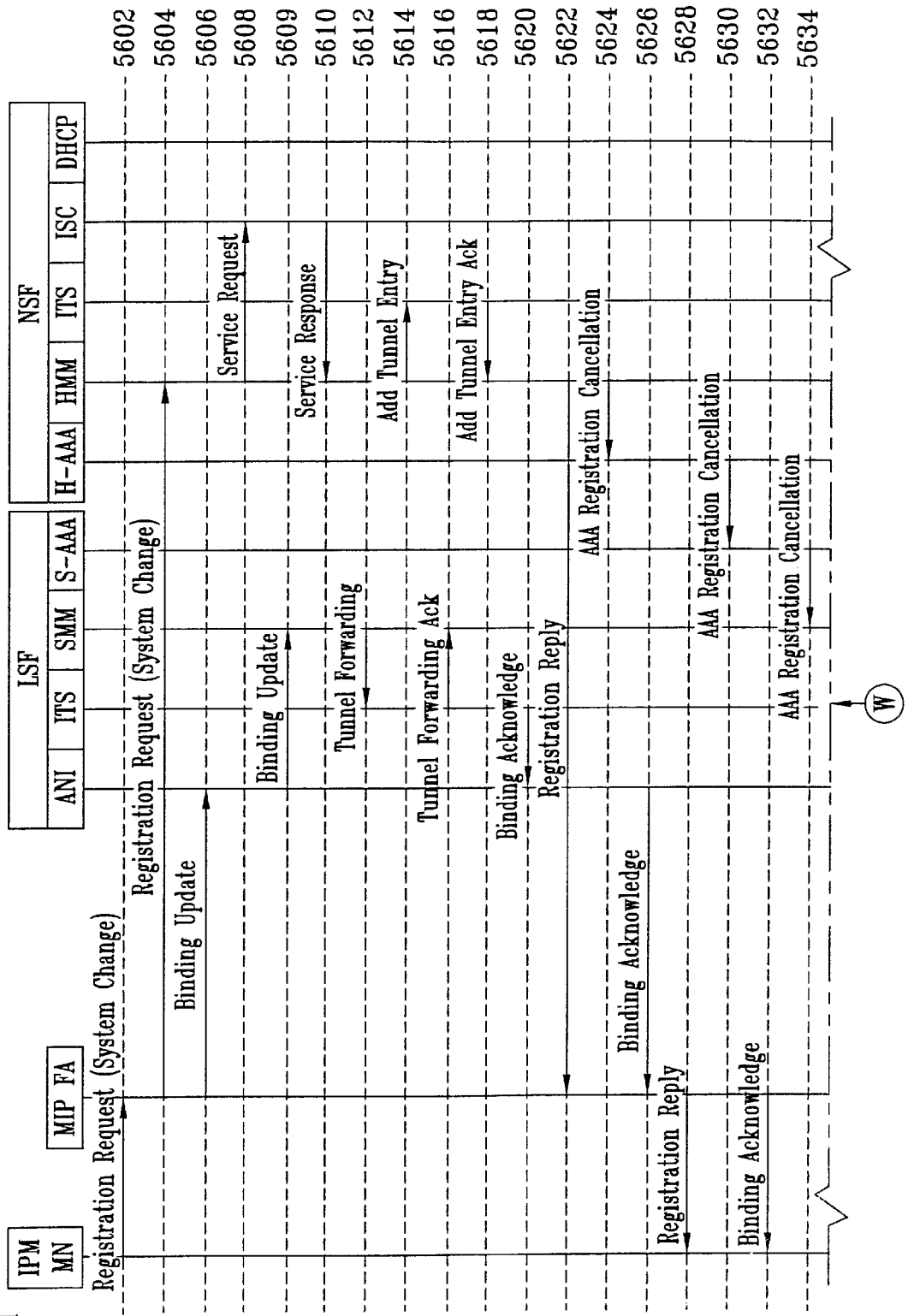
FIG. 56 is an event sequence diagram showing the flow of events of an IPM MN handoff from an FA to an IPM ANI, wherein the FA supports smooth handoffs.
Figure 56B:
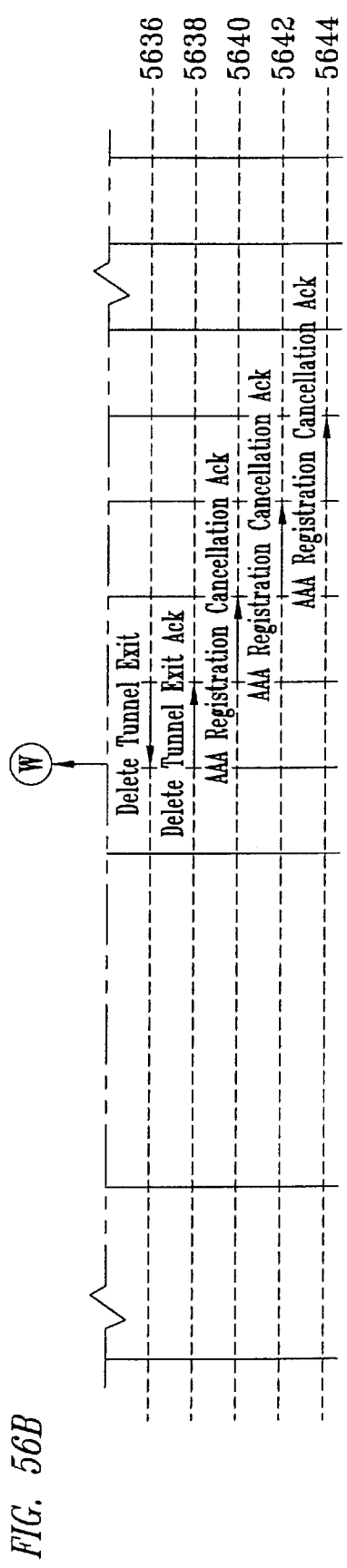

FIG. 56 is a message flow event sequence diagram showing the flow of messages for IPM MN handoffs from IPM ANI to FA, smooth handoff.

In events 5602–5604, the Registration Request message is sent. See section 4.3.1 for details.

In events 5606 and 5609, the Binding Update message is used for notification of a MN's current mobility binding. It should be sent by the MN's home agent in response to a Binding Request message, a Binding Warning message, or the reception of a Binding Warning extension to a Registration Request message. It should also be sent by a MN, or by the foreign agent with which the MN is registering, when notifying the MN's previous foreign agent that the MN has moved. The message exchanged between the MIP FA and the SMM contains: a type of 18; the 'A' (acknowledge) bit is set by the node sending the Binding Update message to request a Binding Acknowledge message be returned; the 'I' (identification present) bit is set by the node sending the Binding Update message if the identification field is present in the message; if the 'M' (minimal encapsulation) bit is set, datagrams MAY be tunneled to the MN using the minimal encapsulation protocol; if the 'G' (Generic Record Encapsulation, or GRE) bit is set, datagrams MAY be tunneled to the MN using GRE; the number of seconds remaining before the binding cache entry must be considered expired; the home address of the MN to which the Binding Update message refers; the current care-of-address of the MN (when set equal to the home address of the MN, the Binding Update message instead indicates that no binding cache entry for the MN should be created, and any existing binding cache entry and visitor list entry, in the case of a MN's previous foreign agent for the MN should be deleted); and an identification used to assist in matching requests with replies, and in protection against replay attacks.

In event 5608, the Service Request message is sent. See section 4.3.1 for details.

In event 5610, the Service Reply message is sent. See section 4.3.1 for details.

In event 5612, the Tunnel Forwarding message is sent by the SMM to instruct the ITS to set up a tunnel forwarding. The message exchanged between the SMM and the ITS contains: a code of 5; the length of the message including the header fields; and an identification used in matching requests and acknowledgements. The sender must ensure the identifier in a message is locally unique at any given time.

Additionally, the following extensions, which are explained in further detail in section 4.4, are used in the Tunnel Forwarding message: Host NAI Extension; Mobile Node IP Address Extension; User NAI Extension (Optional); Lifetime Extension; and Tunnel Exit IP Address Extension.

In event 5614, the Add Tunnel Entry message is sent. See section 4.3.1 for details.

In event 5616, the Tunnel Forwarding Acknowledgement message is sent by the ITS to acknowledge the Tunnel Forwarding message. The identification field should be used for matching with the Tunnel Forwarding message. The message exchanged between the ITS and the SMM contains: a code of 6; the length of the message including the header fields; and an identification used in matching requests and acknowledgements. The sender must ensure the identifier in a message is locally unique at any given time.

Additionally, the following extensions, which are explained in further detail in section 4.4, are used in the Tunnel Forwarding Acknowledgement message: Host NAI Extension; Mobile Node IP Address Extension; User NAI Extension (Optional); and Result Code Extension.

In event 5618, the Add Tunnel Entry Acknowledgement message is sent. See section 4.3.1 for details.

In events 5620, 5626, and 5632, the Binding Acknowledge message is used to acknowledge receipt of a Binding Update message. It SHOULD be sent by a node receiving a Binding Update message if the acknowledge (A) bit is set in the Binding Update message. The message exchanged between the SMM and the MN contains: a type of 19; the status (if the Status is nonzero, this acknowledgement is negative); a Mobile Node Home Address copied from the Binding Update message being acknowledged; and an identification.

In events 5622 and 5628, the Registration Reply message is sent. See section 4.3.1 for details.

In events 5624, 5630, and 5634, the AAA-Registration Cancellation message is sent. See section 4.3.1 for details.

In event 5636, the Delete Tunnel Exit message is sent. See section 4.3.1 for details.

In event 5638, the Delete Tunnel Exit Acknowledgement message is sent. See section 4.3.1 for details.

In events 5640–44, the AA-Registration Cancellation Acknowledgement message is sent. See section 4.3.1 for details.

4.3.6 IPM MN Handoffs from FA to IPM ANI (No Smooth Handoff)

Figure 57:
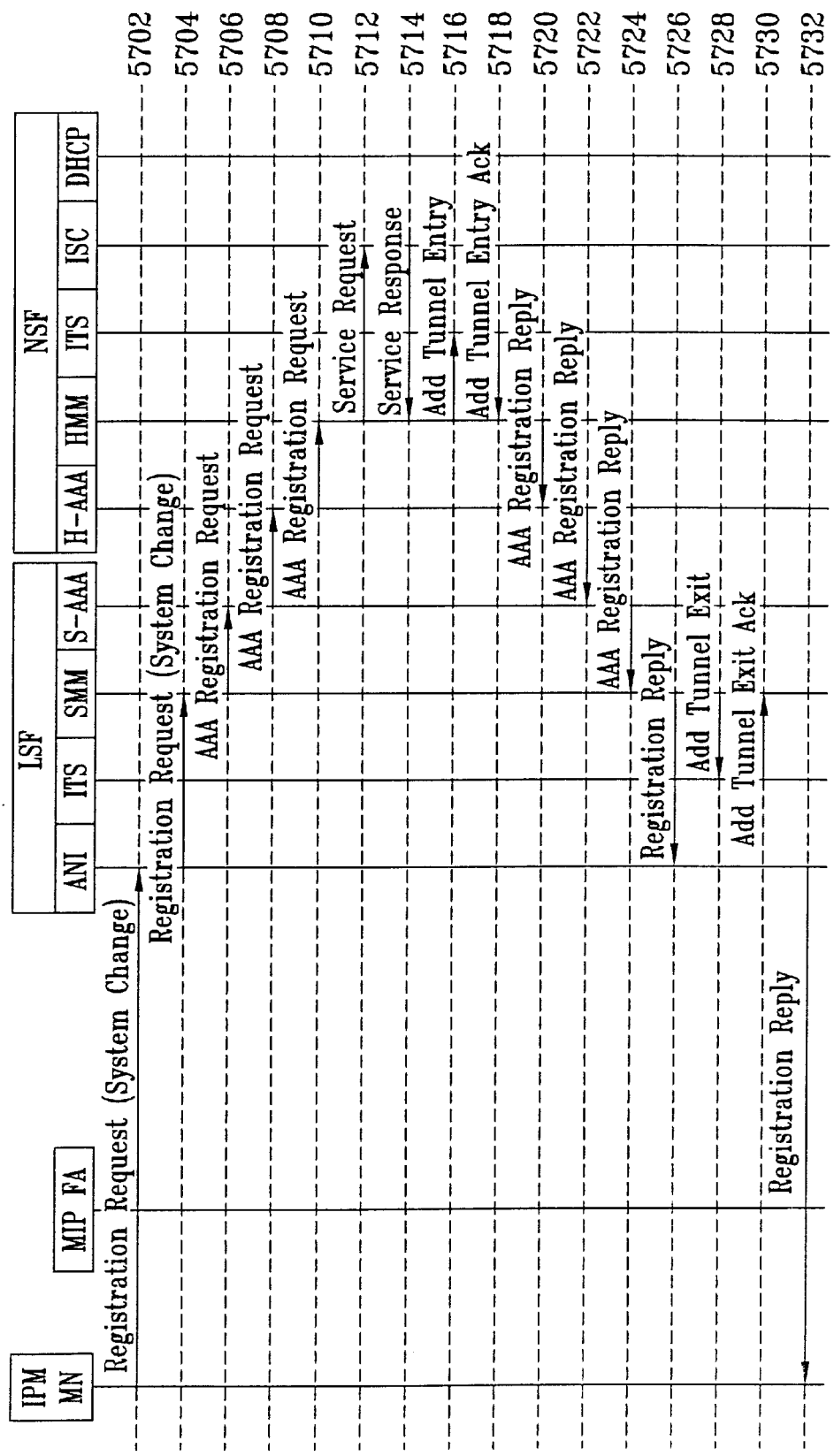
FIG. 57 is an event sequence diagram showing the flow of events of an MIP MN handoff from an FA to an IPM ANI, wherein the FA does not support smooth handoffs.

FIG. 57 is a message flow event sequence diagram showing the flow of messages for IPM MN handoffs from FA to IPM ANI, no smooth handoff.

In events 5702–5704, the Registration Request message is sent. See section 4.3.1 for details.

In events 5706–10, the AAA-Registration-Request message is used to carry out various kinds of registrations; these registrations are encapsulated in the IPM-Registration-Type AVP. This message is used by SMM to authenticate and authorize the user. The AAA-Registration-Request message is of the format of DIAMETER. The SMM sends the message to HMM with at least these mandatory fields. The IPM-Registration-Request AVP is the AVP which carries the message received from the MN, which is encapsulated in the AVP format for the Home domain to authenticate the user. The HMM processes this message based on the Registration-Type AVP, which carries the type of registration requested. The message exchanged between the SMM and the HMM contains: Command-Code AVP of 335; User-Name AVP; Host-Name AVP; IPM-Registration-Type AVP; IPM-Registration-Request AVP; IPM-Care-of-Address AVP; and IPMRouting-Area-NAI AVP.

Additionally, the AAA-Registration Cancellation Acknowledgement message can optionally use the following AVPs, which are discussed in further detail in section 4.5: Destination-NAI AVP; IPM-Client-Address AVP; Home-Agent-Address AVP; IPM-SMM-NAI AVP; IPM-Terminal-Type AVP; IPM-Profile-Type AVP; Proxy-State AVP; Timestamp AVP; Nonce AVP; and Integrity-Check-Value AVP.

In event 5712, the Service Request message is sent. See section 4.3.1 for details.

In event 5714, the Service Reply message is sent. See section 4.3.1 for details.

In event 5716, the Add Tunnel Entry message is sent. See section 4.3.1 for details.

In event 5718, the Add Tunnel Entry Acknowledgement message is sent. See section 4.3.1 for details.

In events 5720–24, the AAA Registration Reply message is sent by the HMM to the SMM to indicate the result of the AAA-Registration Request message.

The AAA-Registration Reply message is of the format of DIAMETER. The HMM sends a message to the SMM with at least the mandatory fields in response to AAA-Registration Request message. The IPM-Registration Response Code AVP indicates the success or failure of the request. The IPM Registration Reply message AVP contains the reply message built by HMM with authentication. The SMM has to use this AVP to send a reply to ANI/MN. The message exchanged between the HMM and the SMM contains: Command-Code AVP of 336; Destination-NAI AVP; Host-Name AVP; User-Name AVP; IPM-Registration-Response-Code AVP; IPM-Client-Address AVP; and IPM-Registration-Reply AVP.

Additionally, the Registration Reply message can optionally use the following AVPs, which are discussed in further detail in section 4.5: IPM-Profile AVP; IPM-SMM-MN-Key AVP; IPM-HMM-NAI AVP; Proxy-State AVP; Time AVP; Nonce AVP; and Integrity-Check-Value AVP.

In events 5726 and 5732, the Registration Reply message is sent. See section 4.3.1 for details.

In event 5728, the Add Tunnel Exit message is sent by the SMM to instruct the ITS to set up a tunnel exit point. The message exchanged between the SMM and the ITS contains: a code of 3, the length of the message including the header fields; and an indication used in matching requests and acknowledgements. The sender must ensure the identifier in a message is locally unique at any given time.

Additionally, the following extensions, which are explained in further detail in section 4.4, are used in the Add Tunnel Exit message: Host NAI Extension; Lifetime Extension; Mobile Node IP Address Extension; User NAI Extension (Optional); and Tunnel Exit IP Address Extension.

In event 5730, the Tunnel Exit Acknowledgement message is sent by the ITS to acknowledge the Add Tunnel Exit message. The message exchanged between the ITS and the SMM contains: a code of 4; the length of the message including the header fields; and an indication used in matching requests and acknowledgements. The sender must ensure the identifier in a message is locally unique at any given time.

Additionally, the following extensions, which are explained in further detail in section 4.4, are used in the Add Tunnel Exit Acknowledgement message: Host NAI Extension; Result Code Extension; Mobile Node IP Address Extension (Optional); User NAI Extension (Optional); and Tunnel Forwarding IP Address Extension.

4.3.7 IPM MN Handoffs from FA to IPM ANI (Smooth Handoff)

Figure 58:
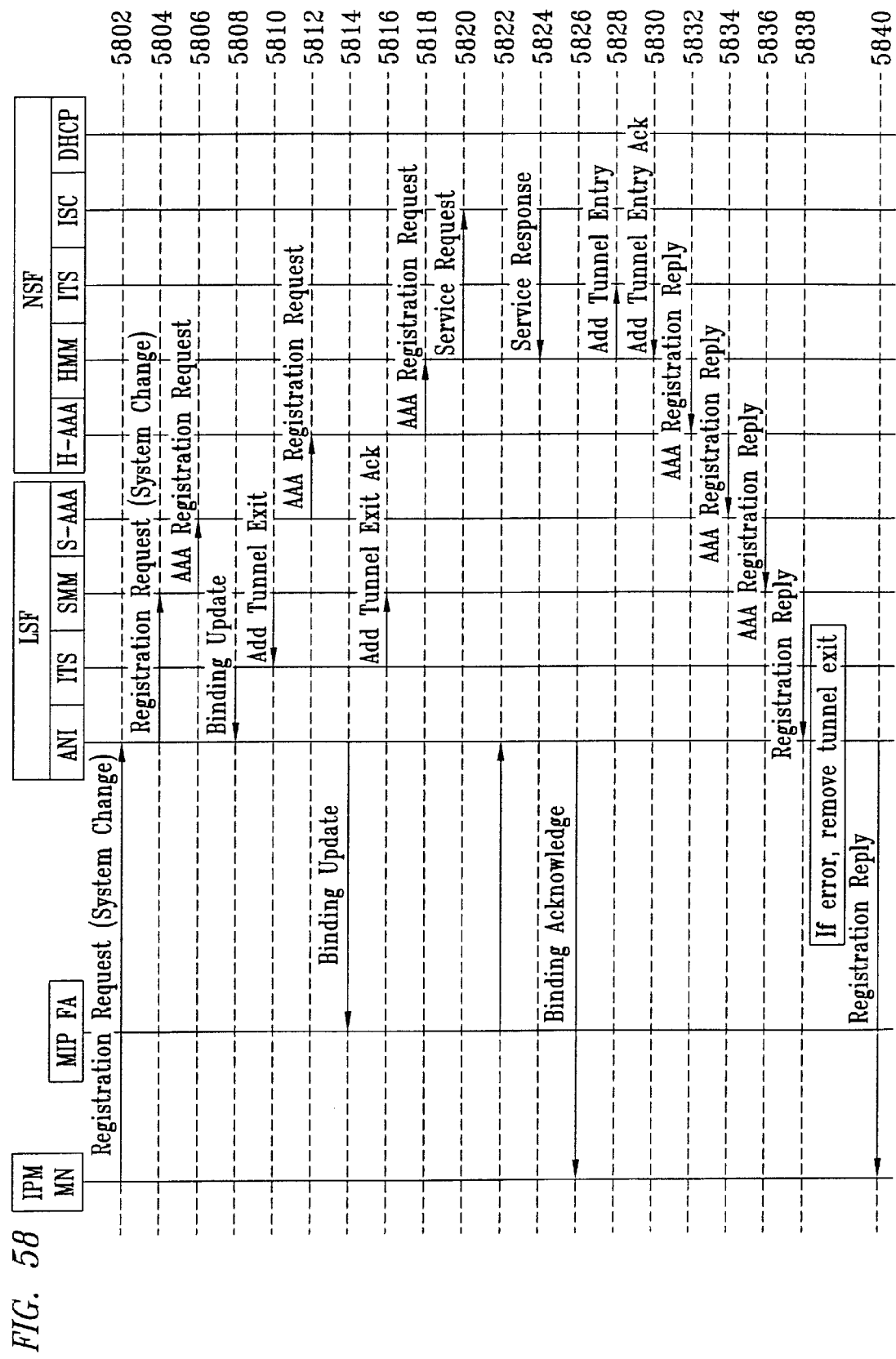
FIG. 58 is an event sequence diagram showing the flow of events of an MIP MN handoff from an IPM ANI to an FA, wherein the FA supports smooth handoffs.

FIG. 58 is a message flow event sequence diagram showing the flow of messages for IPM MN handoffs from FA to IPM ANI, smooth handoff.

In events 5802–5804, the Registration Request message is sent. See section 4.3.1 for details.

In events 5806, 5812, and 5818, the AAA-Registration Request message is sent. See section 4.3.6 for details.

In events 5808 and 5814, the Binding Update message is used for notification of a MN's current mobility binding. It should be sent by the MN's home agent in response to a Binding Request message, a Binding Warning message, or the reception of a Binding Warning extension to a Registration Request message. It should also be sent by a MN, or by the foreign agent with which the MN is registering, when notifying the MN's previous foreign agent that the MN has moved See section 4.3.5 for details.

In event 5810, the Add Tunnel Exit message is sent. See section 4.3.6 for details.

In event 5816, the Add Tunnel Exit Acknowledgement message is sent. See section 4.3.6 for details.

In event 5820, the Service Request message is sent. See section 4.3.1 for details.

In event 5822, the Binding Acknowledge message is sent. See section 4.3.5 for details.

In event 5824, the Service Reply message is sent. See section 4.3.1 for details.

In event 5828, the Add Tunnel Entry message is sent. See section 4.3.1 for details.

In event 5830, the Add Tunnel Entry Acknowledgement message is sent. See section 4.3.1 for details.

In events 5832–36, the AAA-Registration Reply message is sent. See section 4.3.6 for details.

In events 5838–40, the Registration Reply message is sent. See section 4.3.1 for details.

4.3.8 MIP MN Registers from IPM LSF

Figure 59:
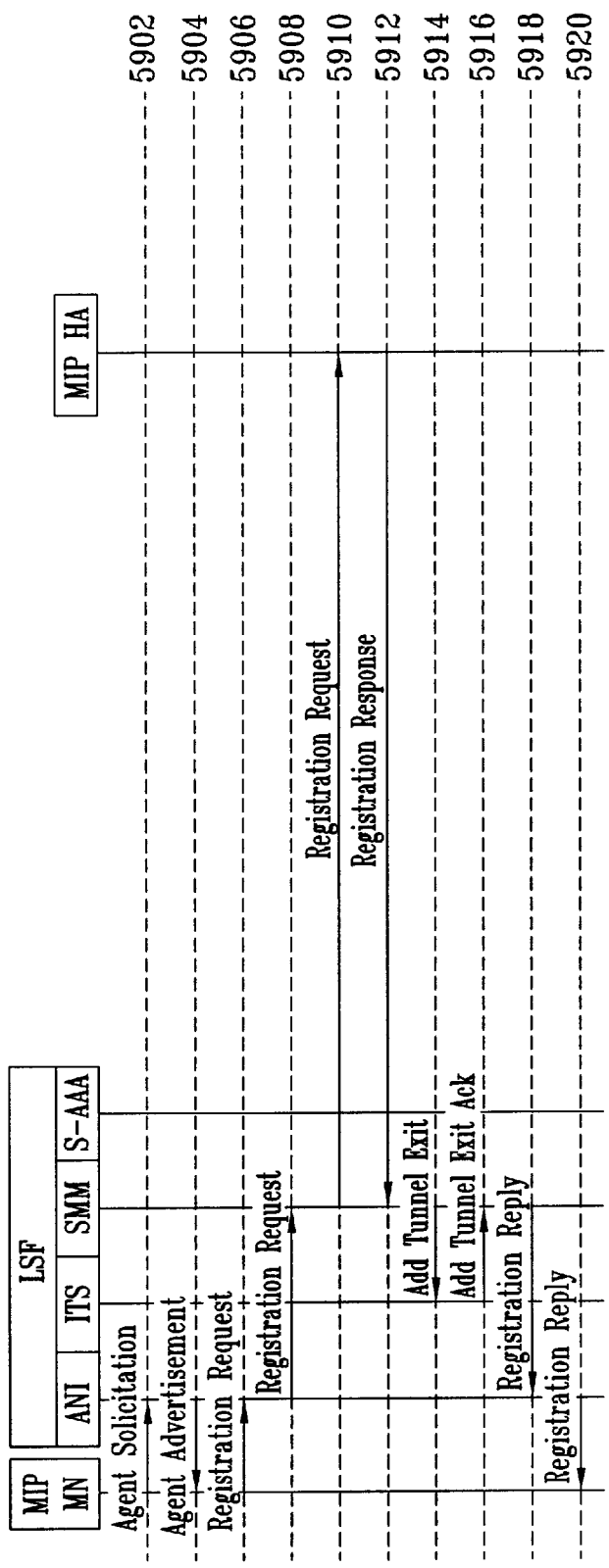
FIG. 59 is an event sequence diagram showing the flow of events of an MIP MN handoff from an NSF to an FA, wherein the FA does not support smooth handoffs.

FIG. 59 is a message flow event sequence diagram showing the flow of messages for MIP MN registers from IPM LSF.

In event 5902, the Agent Solicitation message is sent. See section 4.3.1 for details.

In event 5904, the Agent Advertisement message is sent. See section 4.3.1 for details.

In events 5906–10, the Registration Request message is sent. See section 4.3.1 for details.

In events 5912 and 5918–20, the Registration Reply message is sent. See section 4.3.1 for details.

In event 5914, the Add Tunnel Exit message is sent. See section 4.3.6 for details.

In events 5916, the Add Tunnel Exit Acknowledgement message is sent. See section 4.3.6 for details.

4.3.9 MIP MN Re-registers from IPM LSF

Figure 60:
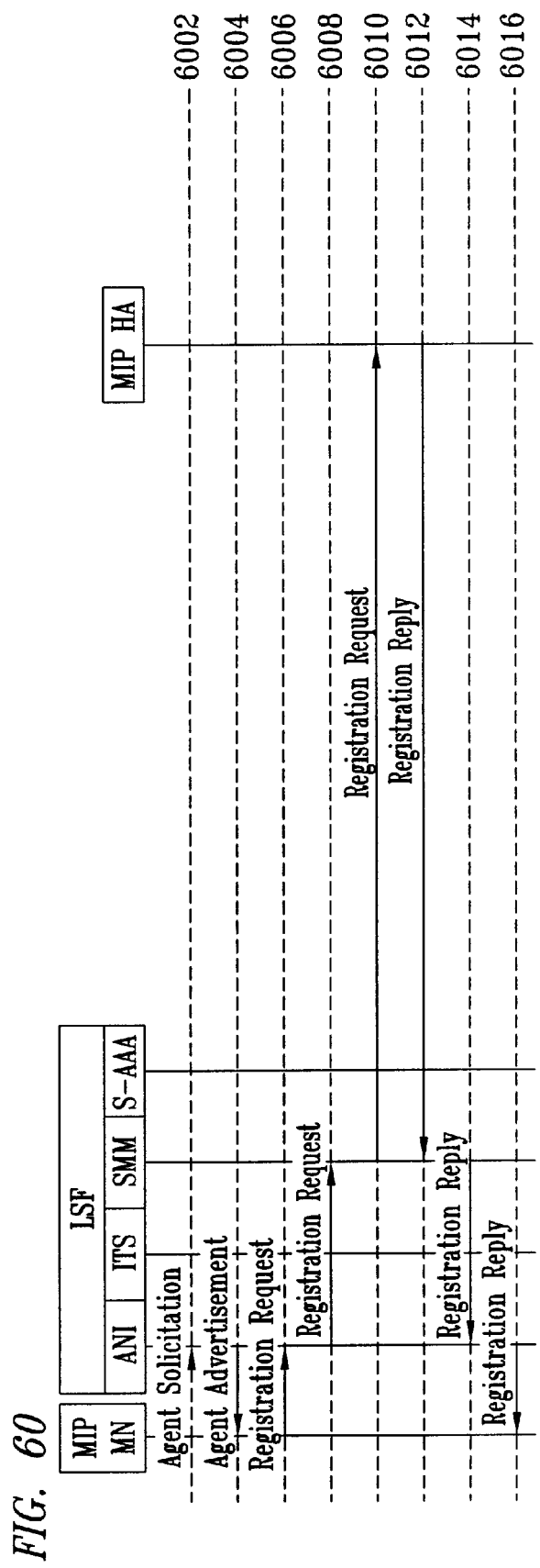
FIG. 60 is an event sequence diagram showing the flow of events of an MIP MN handoff from an FA to an IPM ANI, wherein the FA supports smooth handoffs.

FIG. 60 is a message flow event sequence diagram showing the flow of messages for MIP MN re-registers from IPM LSF.

In event 6002, the Agent Solicitation message is sent. See section 4.3.1 for details.

In event 6004, the Agent Advertisement message is sent. See section 4.3.1 for details.

In events 6006–10, the Registration Request message is sent. See section 4.3.1 for details.

In events 6012–16, the Registration Reply message is sent. See section 4.3.1 for details.

4.3.10 MIP MN Handoffs from IPM ANI to FA (No Smooth Handoff)

Figure 61:
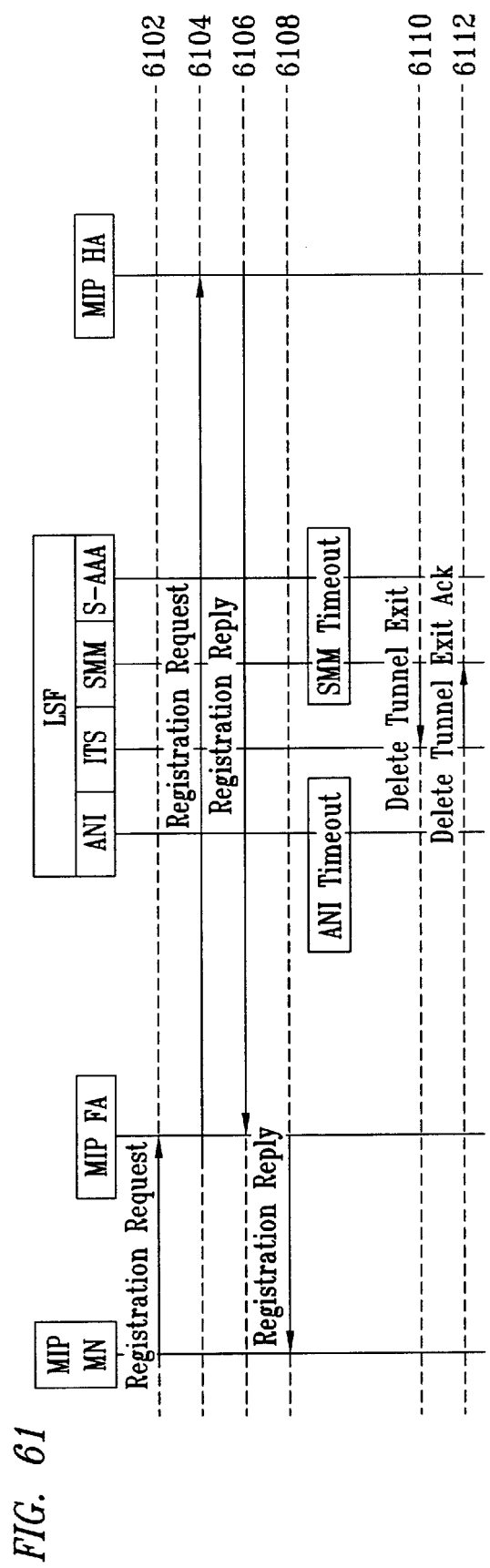
FIG. 61 is an event sequence diagram showing the flow of events of an MIP MN handoff from an FA to an NSF, wherein the FA does not support smooth handoffs.

FIG. 61 is a message flow event sequence diagram showing the flow of messages for MIP MN handoffs from IPM ANI to FA, no smooth handoff.

In events 6102–6104, the Registration Request message is sent. See section 4.3.1 for details.

In events 6106–6108, the Registration Reply message is sent. See section 4.3.1 for details.

In event 6110, the Delete Tunnel Exit message is sent. See section 4.3.4 for details.

In event 6112, the Delete Tunnel Exit Acknowledgement message is sent. See section 4.3.4 for details.

4.3.11 MIP MN Handoffs from IPM ANI to FA (Smooth Handoff)

Figure 62:
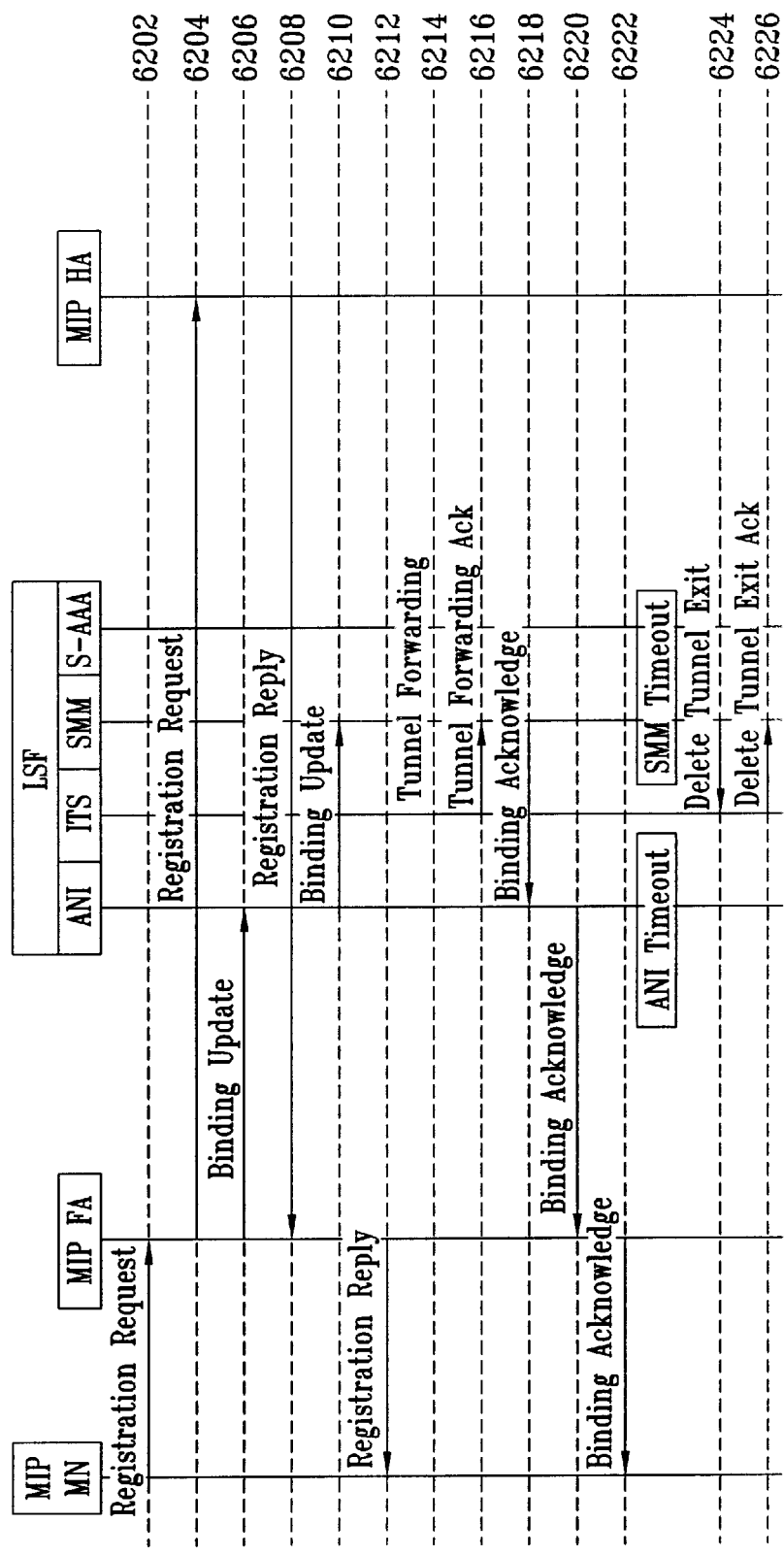
FIG. 62 is an event sequence diagram showing the flow of events of an MIP MN handoff from an NSF to an FA, wherein the FA supports smooth handoffs.

FIG. 62 is a message flow event sequence diagram showing the flow of messages for MIP MN handoffs from IPM ANI to FA, smooth handoff.

In events 6202–6204, the Registration Request message is sent. See section 4.3.1 for details.

In event 6206, the Binding Update message is sent. See section 4.3.5 for details.

In events 6208 and 6212, the Registration Reply message is sent. See section 4.3.1 for details.

In event 6214, the Tunnel Forwarding message is sent. See section 4.3.5 for details.

In event 6216, the Tunnel Forwarding Acknowledgement message is sent. See section 4.3.5 for details.

In events 6218–22, the Binding Acknowledge message is sent. See section 4.3.5 for details.

In event 6224, the Delete Tunnel Exit message is sent. See section 4.3.4 for details.

In event 6226, the Delete Tunnel Exit Acknowledgement message is sent. See section 4.3.4 for details.

4.3.12 MIP MN Handoffs from FA to IPM ANI (No Smooth Handoff)

Figure 63:
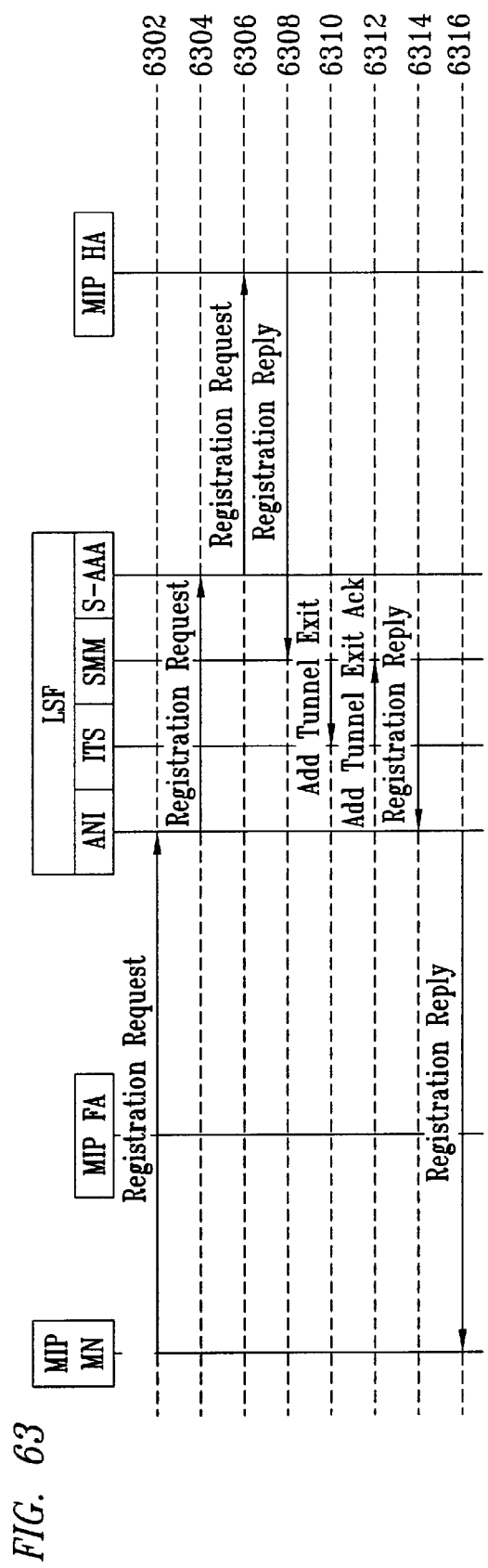
FIG. 63 is an event sequence diagram showing the flow of events of an MIP MN handoff from an FA to an NSF, wherein the FA supports smooth handoffs.

FIG. 63 is a message flow event sequence diagram showing the flow of messages for MIP MN handoffs from IPM ANI to FA, no smooth handoff.

In events 6302–6306, the Registration Request message is sent. See section 4.3.1 for details.

In events 6308 and 6314–16, the Registration Reply message is sent. See section 4.3.1 for details.

In event 6310, the Add Tunnel Exit message is sent. See section 4.3.6 for details.

In event 6312, the Add Tunnel Exit Acknowledgement message is sent. See section 4.3.6 for details.

4.3.13 MIP MN Handoffs from FA to IPM ANI (Smooth Handoff)

FIG. 64 is a message flow event sequence diagram showing the flow of messages for MIP MN handoffs from IPM ANI to FA, no smooth handoff.

In events 6402–6406, the Registration Request message is sent. See section 4.3.1 for details.

In events 6408 and 6414, the Binding Update message is sent. See section 4.3.5 for details.

In event 6410, the Add Tunnel Exit message is sent. See section 4.3.6 for details.

In events 6412, 6418, and 6422, the Registration Reply message is sent. See section 4.3.1 for details.

In event 6416, the Add Tunnel Exit Acknowledgement message is sent. See section 4.3.6 for details.

In events 6420 and 6424, the Binding Acknowledge message is sent. See section 4.3.5 for details.

4.3.14 MIP MN Handoffs from NSF to FA (No Smooth Handoff)

FIG. 65 is a message flow event sequence diagram showing the flow of messages for MIP MN handoffs from NSF to FA, no smooth handoff.

In events 6502–6504, the Registration Request message is sent. See section 4.3.1 for details.

In events 6506–6508, the Registration Reply message is sent. See section 4.3.1 for details.

In event 6510, the Delete Tunnel Exit message is sent. See section 4.3.4 for details.

In event 6512, the Delete Tunnel Exit Acknowledgement message is sent. See section 4.3.4 for details.

4.3.15 MIP MN Handoffs From NSF to FA (Smooth Handoff)

FIG. 66 is a message flow event sequence diagram showing the flow of messages for MIP MN handoffs from NSF to FA, smooth handoff.

In events 6602–6604, the Registration Request message is sent. See section 4.3.1 for details.

In events 6606 and 6610, the Binding Update message is sent. See section 4.3.5 for details.

In events 6608 and 6612, the Registration Reply message is sent. See section 4.3.1 for details.

In event 6614, the Tunnel Forwarding message is sent. See section 4.3.5 for details.

In event 6616, the Tunnel Forwarding Acknowledgement message is sent. See section 4.3.5 for details.

In events 6618–6622, the Binding Acknowledge message is sent. See section 4.3.5 for details.

In event 6624, the Delete Tunnel Exit message is sent. See section 4.3.4 for details.

In event 6626, the Delete Tunnel Exit Acknowledgement message is sent. See section 4.3.1 for details.

4.3.16 MIP MN Handoffs From FA to NSF (No Smooth Handoff)

FIG. 67 is a message flow event sequence diagram showing the flow of messages for MIP MN handoffs from FA to NSF, no smooth handoff.

In events 6702–6706, the Registration Request message is sent. See section 4.3.1 for details.

In events 6708 and 6714–16, the Registration Reply message is sent. See section 4.3.1 for details.

In event 6710, the Add Tunnel Exit message is sent. See section 4.3.6 for details.

In event 6712, the Add Tunnel Exit Acknowledgement message is sent. See section 4.3.6 for details.

4.3.17 MIP MN Handoffs From FA to NSF (Smooth Handoff)

FIG. 68 is a message flow event sequence diagram showing the flow of messages for MIP MN handoffs from FA to NSF, smooth handoff.

In events 6802–6806, the Registration Request message is sent. See section 4.3.1 for details.

In events 6808, the Binding Update message is sent. See section 4.3.5 for details.

In events 6810 and 6820, the Registration Reply message is sent. See section 4.3.1 for details.

In events 6812 and 6816, the Binding Acknowledge message is sent. See section 4.3.5 for details.

In event 6814, the Add Tunnel Exit message is sent. See section 4.3.6 for details.

In event 6818, the Add Tunnel Exit Acknowledgement message is sent. See section 4.3.6 for details.

4.4 Extensions 4.4.1 Agent Discovery Extensions 4.4.1.1 ANI-NAI Extensions

The ANI-NAI Extension is used to carry the ANI information, such as ANI's NAI (Network Access Identifier). This extension contains: a type of IPM-VENDOR-SPECIFIC-EXTENSION or 255; a length field; a sub-type of 0; and the NAI string of the ANI.

4.4.1.2 Mobility Agent Advertisement Extension

The Mobility Agent Advertisement Extension is added to the ICMP Router Advertisement message to indicate to MNs that this is an Agent Advertisement message (not an Router Advertisement message) with the specified Care-of Addresses. This extension contains: a type of 16; a length of the message including the Care-of-Addresses; the count of Agent Advertisement messages sent since the agent was initialized; the longest lifetime (measured in seconds) that this agent is willing to accept in any Registration Request message; advertised foreign agent Care-of-Addres(es) provided by this foreign agent; and indicator bits for Registration Required, Busy, Home Agent, Foreign Agent, Minimal Encapsulation, GRE Encapsulation, and Van Jackson header compression. An Agent Advertisement message MUST include at least one Care-of Address if the Foreign Agent bit is set. The length field in the extension determines the number of Care-of-Address(es) present.

4.4.1.3 One-byte Padding Extension

Some IP protocol implementations insist upon padding ICMP messages to an even number of bytes. If the ICMP length of an Agent Advertisement message is odd, this extension may be included in order to make the ICMP length even. This extension is not intended to be a general purpose extension to be included in order to word or long align the various fields of the Agent Advertisement message. An Agent Advertisement message should not include more than one One-byte Padding Extension, and if present, this extension should be the last extension in the Agent Advertisement message.

Note that unlike other extensions used in Mobile IP, the One-byte Padding Extension is encoded as a single byte, with no "Length" or "Data" field present, with a value of zero.

4.4.1.4 Prefix-Lengths Extension

The Prefix-Lengths Extension MAY follow the Mobility Agent Advertisement Extension. It is used to indicate the number of bits of network prefix that applies to each Router Address listed in the ICMP Router Advertisement portion of the Agent Advertisement message. Note that the prefix lengths given do not apply to care-of address(es) listed in the Mobility Agent Advertisement Extension.

This extension contains: a type of 19; the value (possibly zero) of the NUM Addrs field in the ICMP Router Advertisement portion of the Agent Advertisement message; and the number of leading bits that define the network number of the corresponding Router Address listed in the ICMP Router Advertisement portion of the message. The prefix length for each Router Address is encoded as a separate byte, in the order that the Router Addresses are listed in the ICMP Router Advertisement portion of the message.

4.4.2 ITS Control Extensions

All of the extensions for ITS Messages contain a code, an extension length, and data fields.

4.4.2.1 Authentication Extension

The Authentication Extension is used by the ITS to authenticate the requesting message before performing the requested action. The code value is 10 and the extension length and data fields are user dependent.

4.4.2.2 Flag Extension

The Flag Extension is used only if the message type is Add Tunnel Entry. If this Extension is missing, the application should assume that all flags are zero. The code value is 3, the extension length is 6 bytes, and the data field is a 16-bit value with the lower byte contains the flags as defined in RFC 2002 for Registration Request message.

4.4.2.3 Host NAI Extension

The Host NAI Extension is used to let the IPM Tunnel Service (ITS). server know which node a request message comes from. The ITS can maintain the request information per each requesting node so that it can clean up resources for that requesting node when necessary. (Ex. Requesting node is down abnormally). The code value is 1, the extension length is variable, and the data field contains a Host NAI string.

4.4.2.4 Lifetime Extension

The Lifetime Extension is required for Add Tunnel Entry, Add Tunnel Exit, and Tunnel Forwarding. It is required for ITS to implement the session timeout. The code value is 4, the extension length is 8 bytes and the data field is a 32-bit value.

4.4.2.5 Mobile Node IP Address Extension

The Mobile Node IP Address Extension is required for all messages except Delete all . . . messages. The code value is 5, the extension length is 8 bytes for Ipv4 and 20 bytes for Ipv6, and the data field contains the IP address of the MN.

4.4.2.6 Result Code Extension

The Result Code Extension is required for all acknowledgement messages. The code value is 9, the extension length is 6 bytes, and the data field contains the result code of the previous request message.

4.4.2.7 Tunnel Entry IP Address Extension

The Tunnel Entry IP Address Extension is required only for Add Tunnel Entry and Delete Tunnel Entry. The code value is 6, the extension length is 8 bytes for Ipv4 and 20 bytes for Ipv6, and the data field contains the IP address of the Tunnel Entry IP Address.

4.4.2.8 Tunnel Exit IP Address Extension

The Tunnel Exit IP Address Extension is required only for Add Tunnel Exit, Tunnel Forwarding, and Delete Tunnel Exit. The code value is 7, the extension length is 8 bytes for Ipv4 and 20 bytes for Ipv6, and the data field contains the IP address of the Tunnel Exit IP Address.

4.4.2.9 Tunnel Forwarding IP Address Extension

The Tunnel Forwarding IP Address Extension is only required for Tunnel Forwarding. The code value is 8, the extension length is 8 bytes for Ipv4 and 20 bytes for Ipv6, and the data field contains Contains the IP address of the Tunnel Forwarding IP Address.

4.4.2.10 User-NAI Extension

The User-NAI Extension contains the User NAI string. The code value is 2, the extension length is variable, and the data field contains the User-NAI string.

4.4.3 IPM Registration Extensions

4.4.3.1 ANI-HMM Authentication Extension

The ANI-HMM Authentication Extension is used in the Registration messages to carry the Authentication Extension between ANI and HMM. This extension contains: a type of IPM_VENDOR_SPECIFIC_EXTENSION (255); the length of the extension; a sub-type of 6; and the authenticator calculated over the entire message up to the extension header.

4.4.3.2 ANI-SMM Authentication Extension

The ANI-SMM Authentication Extension is used in the Registration messages to carry the Authentication Extension between ANI and SMM. This extension contains: a type of IPM-VENDOR-SPECIFIC-EXTENSION (255); the length of the extension; a sub-type of 5; and the authenticator calculated over the entire message up to the extension header.

4.4.3.3 L2-Address Extension

The L2-Address Extension is used in the Registration Request message to carry the MN's L2 Address. This extension contains: a type of IPM-VENDOR-SPECIFIC-EXTENSION (255); the length of the address plus the header; a sub-type of 9; the Address-Type of the MN; and the layer 2 address of the MN. The Address-Type may be 802.3 Address, 802.11 Address, IMSI, or MIN

4.4.3.4 Local Registration Lifetime Extension

The Local Registration Lifetime Extension is used to carry the lifetime of local registration. This extension contains: a type of IMP_VENDOR_SPECIFIC_EXTENSION (255); a length of 6 bytes; a sub-type of 10; and the lifetime allowed by SMM for local re-registration in seconds.

4.4.3.5 MN-Home Authentication Extension

The MN-Home Authentication Extension is used in the Registration messages to carry the Authentication Extension between the MN and Home. This extension contains: a type of IPM-VENDOR-SPECIFIC-EXTENSION (255); the length of the authenticator plus the header; a sub-type of 3; and the authenticator calculated over the entire message up to the extension header.

4.4.3.6 MN-SMM Authentication Extension

The MN-SMM Authentication Extension is used in the Registration message to carry the Authentication Extension between MN and SMM. This extension contains: a type of IPM-VENDOR-SPECIFIC-EXTENSION (255); a length of Authenticator plus the header; a sub-type of 4; and the authenticator calculated over the entire message up to the extension header.

4.4.3.7 Foreign-Home Authentication Extension

The Foreign-Home Authentication Extension MAY be included in Registration Requests and Reply messages in cases in which a mobility security association exists between the foreign agent and the home agent. This extension contains: a type of 34; a length of authenticator plus the header; the Security Parameter Index; and a variable length Authenticator.

4.4.3.8 Mobile-Foreign Authentication Extension

The Mobile-Foreign Authentication Extension MAY be included in Registration Requests and Reply message in cases in which a mobility security association exists between the mobile node and the foreign agent. This extension contains: a type of 33; a length of the Authenticator plus the header; the Security Parameter Index; and a variable length Authenticator.

4.4.3.9 Mobile-Home Authentication Extension

Exactly one Mobile-Home Authentication Extension MUST be present in all Registration Requests and Registration Reply messages, and is intended to eliminate problems, which can result from the uncontrolled propagation of remote redirects in the Internet. The location of the extension marks the end of the authenticated data. This extension contains: a type of 32; a length of the Authenticator plus the header; the Security Parameter Index; and a variable length Authenticator.

4.4.3.10 Previous-SMM-NAI Extension

The Previous-SMM-NAI Extension is used in the Registration Request message to carry the previous SMM's NAI. This extension is not applicable with Registration type of "Initial Registration". This extension contains: a type of IPM-VENDOR-SPECIFIC-EXTENSION (255); the length of the SMM-NAI string plus the header; a sub-type of 8; and the NAI string of the SMM.

4.4.3.11 4 Registration-Type Extension

The Registration-Type Extension is used in the Registration Request message to indicate what type of registration is requested. This extension contains: a type of IPM-VENDOR-SPECIFIC-EXTENSION (255); a length of 6 bytes; a sub-type of 2; and the Registration type. The Registration types include, among others, Initial Registration (0), De-Registration (1), System-Change (2), ANI-Change (3), Local Re-Registration (4), Re-Registration (5), and Clean-up (6).

4.4.3.12 SMM Key Extension

The SMM Key Extension is used to carry the shared secret key that is to be used between the SMM and MN. This extension contains: a type of IMP_VENDOR_SPECIFIC_EXTENSION (255); a length of the SMM-Key plus the header; a sub-type of 7; and the SMM-Key, which is encrypted using the MN-Home shared secret key.

4.4.3.13 SMM-NAI Extension

The SMM-NAI Extension carries the SMM-NAI in the IPM messages. This extension contains: a type of IMP_VENDOR_SPECIFIC_EXTENSION (255); the length of the SMM-NAI string plus the header; a sub-type of 0; and the NAI string of the SMM.

4.4.3.14 User-NAI Extension

The User-NAI Extension contains the User NAI string. This extension contains: a type of 131; the length of User-NAI; and the User-NAI string.

4.4.4 IPM Security Extensions

4.4.4.1 Control Message Authentication Request Extension

This extension contains: a type of IPM EXT; a sub-type of CNTL_MSG_AUTH_EXT; the length of all the attributes values; and the attribute values. If the Sub-Type is: 0, then there is no Attribute; 1 then the Data Authentication Request Attribute applies; and 2 then the Data Authentication Reply Attribute applies. The attributes are explained in further detail in section 4.6.

4.4.4.2 Control Message Authentication Reply Extension

This extension contains: a type of IPM-EXT; a sub-type of CNTRL_MSG_AUTH_EXT; the length of all the attributes values; and the attribute values. If the Sub-Type is: 0 then there is no Attribute; 1 then the Data Authentication Request Attribute applies; and 2 then the Data Authentication Reply Attribute applies. The attributes are explained in further detail in section 4.6.

4.4.4.3 Session Key Allocation Extension

The Session Key Allocation Extension is used when allocation of a secret or a public session key is required. The sub-type field value of this extension determines if it is used in the Request or Reply message. This extension contains: a type of KEY_ALLOCATION_EXT; a sub-type; the length of all the attributes values; and the Attribute values. The Sub-Type is: 1 for the Session Key Allocation Request Extension; 2 for the Session Key Allocation Reply Extension, single key allocated; and 3 for the Session Key Allocation Reply Extension, duplicate key allocated. If the Sub-Type is: 1, the Secret Key Request Data Attribute applies; 2, the Single Secret Key Reply Data Attribute applies; and 3, the Duplicate Secret Key Reply Data Attribute applies. The attributes are explained in further detail in section 4.6.

4.4.4.4 Session Key Delete Extension

The Session Key Delete Extension is used when the delete of a secret or public session key is required. This extension contains: a type of IPM_EXTENSIONS; a sub-type of SESSION_KEY_DELETE_REQUEST_EXT; a length of the extension including the Key IDs; and the Key ID assigned by the User Authentication Server.

4.4.4.5 Session Key Lifetime Renewal Extension

The Session Key Lifetime Renewal Extension is used when the renewal of a secret or public session key lifetime is required. Also, it is added to the User Service Reply message if the request is honored by the User Authentication Server. This extension contains: a type of IPM_EXTENSIONS; a sub-type of SESSION_KEY_LIFETIME_RENEWAL_EXT, a length of the extension including the Key IDs; the required new lifetime for the key; and the ID for the key to extend his lifetime.

4.4.4.6 User Authentication Information Extension

The User Authentication Information Extension can only be sent in the User Service Request message. It contains all the needed data attributes, which contain the required information about the user for the process of verification and authentication (e.g. SSN, Account Number, etc.). This extension contains: a type of USER_AUTH_INFO_EXT; a sub-type of 0; the length of all the attributes values. The Attributes used in the User Authentication Information Extension are: Account Number Data Attribute; SSN Data Attribute (Optional); User Name Data Attribute (Recommended); User Birthday Data Attribute (Recommended); User Password Data Attribute (Optional); User Address Data Attribute (Optional); User Home Phone Number Data Attribute (Optional); User Work Phone Number Data Attribute (Optional); User NAI Data Attribute (Recommended); User PIN Number Data Attribute (Optional); and Digital Signature Data Attribute (Recommended). The Attributes are discussed further in section 4.6.

4.5 AVPS

AVPs is a method of encapsulating information relevant to the DIAMETER message.

DIAMETER AVPs carry specific authentication, accounting and authorization information, security information as well as configuration details for the request and reply messages.

The AVP format is shown below and must be sent in network byte order. The AVPs contain: an AVP Code that identifies the attribute uniquely; the AVP length of this attribute including the AVP Code, AVP Length, AVP Flags, Reserved, The Tag and Vendor ID fields if present and the AVP data; AVP flags that inform the DIAMETER host how each attribute must be handled; a Vendor ID field; a Tag field to provide a means of grouping attributes in the same message which refer to the same set; and a Data field, which contains information specific to the attribute.

The AVP Flags include, among others: Reserved Bits; a mandatory bit, indicates whether support of the AVP is required; a Vendor-Specific bit, indicates whether the optional Vendor ID field is present in the AVP header; and a Tag bit, is used to group sets of AVPs together. The Data Field may be one of several types, among others. First, the data may contain a variable length of arbitrary data. Unless otherwise noted, the AVP Length field MUST be set to at least 9. Second, the data may contain a non-NULL terminated variable length string using the UTF-8 character set. Unless otherwise noted, the AVP Length field MUST be set to at least 9. Third, it may be an address as a 32 bit (Ipv4) or 128 bit (Ipv6) address, most significant octet first. The format of the address (Ipv4 or Ipv6) is determined by the length. If the attribute value is an Ipv4 address, the AVP Length field MUST be 12, otherwise the AVP Length field MUST be set to 24 for Ipv6 addresses. Fourth, it may be a 32-bit value, in network byte order. The AVP Length field MUST be set to 12. Fifth,: it may be a 64-bit value, in network byte order. The AVP Length field MUST be set to 16. Sixth, it may be indicate a time as a 32-bit unsigned value, in network byte order, and contains the seconds since 00:00:00 GMT, Jan. 1, 1900. The AVP Length field MUST be set to 12. Finally, it may be a complex data type is reserved for AVPs that includes multiple information fields, and therefore do not fit within any of the AVP types defined above. Complex AVPs must provide the data format, and the expected length of the AVP.

4.5.1 Command-Code AVP

The Command-Code AVP must be the first AVP following the DIAMETER header. A DIAMETER message must have at most one Command-Code AVP, and it is used in order to communicate the command associated with the message. The code value is 256 and the type is Integer32.

4.5.2 Destination-NAI AVP

This AVP is used to carry the NAI of the destination. The code value is 269 and the type is String.

4.5.3 Home-Agent-Address AVP

This AVP contains the MN's Home Agent Address. The code value is 334 and the type is Address.

4.5.4 Host-Name AVP

The Host-Name AVP is used to inform a DIAMETER peer of the sender's identity. All DIAMETER messages MUST include the Host-Name AVP, which contains the host name of the originator of the DIAMETER message that MUST follow the NAI naming conventions. The code value is 32 and the type is String.

4.5.5 IPM-Care-of-Address AVP

This AVP is used to carry the MN's Care-of-Address. The code value is 362 and the type is Address.

4.5.6 IPM-Client-Address AVP

This AVP is used to carry the MN's IP Address, either Static or Dynamic. The code value is 360 and the type is Address.

4.5.7 IPM-Context-Data AVP

This AVP carries the Context Data of the User at previous SMM. The complex data could contain AVP format data. The Context-Data could potentially carry the QOS information that MN was receiving at previous SMM. The code value is 373 and the type is Data.

4.5.8 IPM-Context-Request-Type AVP

This AVP carries the Context requested by the SMM. The code value is 372 and the type is Integer32. The Context-Request is: 0; 1 with IP-Forwarding; and 2 with IP-Buffering.

4.5.9 IPM-HMM-NAI AVP

This AVP is used to carry the HMM's NAI. The code value is 364 and the type is String.

4.5.10 IPM-L2-Address AVP

This AVP carries the L2-Address of IPM Client connection. The AVP carries both the types of Address and Data. The code value is 374 and the type is Data. The types of Addresses include, among others, 802.3 Address (0), 802.11 Address (1), IMSI (2), and MIN (3).

4.5.11 IPM-Profile AVP

This AVP carries the Profile of the User, who is registering. The complex data could contain AVP format data. The code value is 371 and the type is Data.

4.5.12 IPM-Profile-Type AVP

This AVP carries the user Profile requested by SMM with the IRR message. The code value is 370 and the type is Integer32. The Profile types include, among others: Partial (0)—Minimal Profile required; and Full (1)—Complete Profile of the user.

4.5.13 IPM-Registration-Cancellation-Reason AVP

This AVP carries the reason for the Registration Cancellation message being sent by MNN to SMM. The code value is 375 and the type is Integer32.

4.5.14 IPM-Registration-Reply AVP

This AVP carries IPM Registration-Reply message received from the HMM to SMM. The code value is 367 and the type is Data.

4.5.15 IPM-Registration-Request AVP

This AVP carries either complete or partial IPM-Registration Request message received from the MN. The code value is 366 and the type is Data.

4.5.16 IPM-Registration-Response-Code AVP

This AVP carries the Registration-Response-Code. The code value is 368 and the type is Integer32.

4.5.17 IPM-Registration-Type AVP

This AVP is used to carry the type of Registration. The code value is 361 and the type is Integer32. The types of Registration include, among others: Initial Registration (0); De-Registration (1); System-Change (2); ANI-Change (3); Local Re-Registration (4); Re-Registration (5); Clean-Up (6); Location-Update (7); and Admin-Initiated-Clean-Up (8).

4.5.18 IPM-Routing-Area-NAI AVP

This AVP carries the ANI's NAI, where the MN is currently registered. The code value is 365 and the type is String.

4.5.19 IPM-SMM-MN-Key AVP

This AVP carries the shared secret key between SMM and MN. This key is only valid for the session. The code value is 376 and the type is Data.

4.5.20 IPM-SMM-NAI AVP

This AVP carries the SMM's NAI. The code value is 363 and the type is String.

4.5.21 IPM-Terminal-Type AVP

This AVP carries the Terminal Type of MN. The code value is 369 and the type is Integer32. The Terminal-Types include, among others: 802.3 Type Terminal (1); 802.11 Type Terminal (1); IS91 Type Terminal (2); IS36 Type Terminal (3); IS96 Type Terminal (4); Modem (5); and Unknown Terminal (#ffffffff).

4.5.22 Integrity-Check-Value AVP

The Integrity-Check-Value AVP is used for hop-by-hop message authentication and integrity. The code value is 259 and the type is Complex.

4.5.23 Nonce AVP

The Nonce AVP MUST be present prior to the Integrity-Check-Value AVPs within a message and is used to ensure randomness within a message. The code value is 261 and the type is Data.

4.5.24 Proxy-State AVP

The Proxy-State AVP is used by proxy servers when forwarding requests and contains opaque data that is used by the proxy to further process the response. The code value is 33 and the type is Address.

4.5.25 Result-Code AVP

The Result-Code AVP indicates whether a particular request was completed successfully or whether an error occurred. The code value is 268 and the type is Complex.

4.5.26 Timestamp AVP

The Timestamp AVP is used to add replay protection to the DIAMETER protocol. This AVP MSUT appear prior to the Integrity-Check-Value AVP or any other message integrity AVP defined in separate extensions. The code value is 262 and the type is Time.

4.5.27 User-Name AVP

The User-Name AVP contains the User-Name in a format consistent with the NAI specification. All DIAMETER systems SHOULD support usernames of at least 72 octets in length. The code value is 1 and the type is String.

4.6 Attributes

Data Attribute is a payload for extensions. The format of the Data Attributes provides the flexibility for representation of many different types of information. There can be multiple Data Attributes within any extension payload. The length of Data Attributes will either be 2 octets or defined by the payload length field. Data Attributes contain: an Attr Type (AT), a unique identifier for each type of attribute; a Sub-Type, which defines the attribute sub-type; an Attribute Format (AF) that format indicates whether the data attribute follows the type Type/Value (TV) format (AF=1) or follows the Type/Length/Value (TLV) format (AF=0); the length of the attribute value; and a variable length attribute value.

4.6.1 Account Number Data Attribute

The Account Number Data Attribute defines the User's account number assigned by the ISP. The AF is 0, the AT is 1, the length is 4, and the attribute value is the Account Number Value. The sub-type values are: 0, for the default value; 1 for secret key encryption using the shared secret key between the user and its home domain; 2 for public key encryption using the user's private key; and 3 for public key encryption using the home domain public key.

4.6.2 Data Authentication Reply Attribute

The Data Authentication Reply Attribute carries the authenticator, which is the result of running the hash function on the authentication data provided in the Data Authentication Request Attribute. The AF is 0, the AT is 24, the length is variable, and the attribute value is the Authenticator Data. The sub-type values are: 0 for the default sub-type; 1 for secret key encryption using the shared secret key between the user and its home domain; 2 for public key encryption using the user's private key; and 3 for public key encryption using the home domain public key.

4.6.3 Data Authentication Request Attribute

The Data Authentication Request Attribute is used to carry the data, which needs to be authenticated by the IPM Security Center by running the hash function on this data. The AF is 0, the AT is 23, the length is variable, and the attribute value is the Authentication Data.

The Authentication Data is is the control message data, which needs to be authenticated by the IPM Security Center by running the hash function on this data.

The sub-type values are: 0 for the default sub-type; 1 for secret key encryption using the shared secret key between the user and its home domain; 2 for public key encryption using the user's private key; and 3 for public key encryption using the home domain public key.

4.6.4 Digital Signature Data Attribute

The Digital Signature Data Attribute defines the User's Digital Signature, which is created by running a hash function H (e.g. MD5) over a message fragment. This Attribute should be encrypted using the full secret key between the MN and its home domain or the private key for the MN. The AF is 0, the AT is 11, the length is variable, and the attribute value is the Digital Signature Value.

The Digital Signature Value is a sequence of bytes generated from running a hash function over all the attribute's payload for the User Authentication Information Extension.

The sub-type values are: 0 for the default sub-type; 1 for secret key encryption using the shared secret key between the user and its home domain; 2 for public key encryption using the user's private key; and 3 for public key encryption using the home domain public key.

4.6.5 Duplicate Secret Key Reply Data Attribute

The Duplicate Secret Key Reply Data Attribute carries the session key information, which is allocated by IPM Security Center. Another encrypted copy is generated and sent in conjunction with the original one. This attribute can be included in the Session Key Allocation Extension when the extension sub-type field value is 3. The AF is 0, the AT is 22, the length is variable, and the attribute value is the Key ID (the key unique identifier issued by the IPM Security Center), Key Data (the secret key generated by the IPM Security Center), and the Encrypted Duplicate Key Data (a copy from the key data encrypted by the method defined by the sub-type field).

The sub-type values are: 0 for the default sub-type; 1 for secret key encryption using the shared secret key between the user and its home domain; and 2 for public key encryption using the user's private key.

4.6.6 SSN Data Attribute

The SSN Data Attribute defines the User's SSN. The AF is 0, the AT is 2, the length is 4, and the attribute value is the SSN Value.

The Digital Signature Value is a sequence of bytes generated from running a hash function over all the attribute's payload for the User Authentication Information Extension.

The sub-type values are: 0 for the default sub-type; 1 for secret key encryption using the shared secret key between the user and its home domain; 2 for public key encryption using the user's private key; and 3 for public key encryption using the home domain public key.

4.6.7 Secret Key Request Data Attribute

The Secret Key Request Data Attribute is used to request a dynamically allocated session secret key with a specific length from the IPM Security Center. The Session Key Allocation Request Extension may have multiple Secret Key Request Data Attributes . . . The AF is 1, the AT is 20, the length is variable, and the attribute value is the Encryption Type, Key length, and a request number.

The sub-type values are: 0 for a single key to be allocated and encrypted using the Encryption type; and 1 for a single key to be allocated and duplicated, the duplicate will be encrypted by the encryption method defined by the Encryption Type field The Encryption Type values are: 0 for the default sub-type; 1 for secret key encryption using the shared secret key between the user and its home domain; and 2 for public key encryption using the user's private key.

The request number is a number that distinguishes between the different key allocation requests issued to the IPM Security Center. The issuer of the request will use the request number to match the key allocation request with the Key Allocation Reply.

4.6.8 Single Secret Key Reply Data Attribute

The Single Secret Key Reply Data Attribute carries the session key information, which is allocated by the IPM Security Center. This attribute is carried by the Session Key Allocation Extension when the extension Sub-Type value is 2. The AF is 0, the AT is 21, the length is variable, and the attribute value is the key lifetime, a Security Parameter Index, a Key ID, and the Key Data The sub-type values are: 0 for the default sub-type; 1 for secret key encryption using the shared secret key between the user and its home domain; and 2 for public key encryption using the user's private key.

The Security Parameter Index in conjunction with the generated key will be used to define a security association between two entities (e.g. MN and HMM, MN and SMM).

4.6.9 User Address Data Attribute

The User Address Data Attribute defines the User's current address. The AF is 0, the AT is 6, the length is variable, and the attribute value is the User Address Value.

The sub-type values are: 0 for the default sub-type; 1 for secret key encryption using the shared secret key between the user and its home domain; 2 for public key encryption using the user's private key; and 3 for public key encryption using the home domain public key.

The User Address Value contains the country, state, city, street, and apartment number.

4.6.10 User Birthday Data Attribute

The User Birthday Data Attribute defines the User's birthday. The AF is 0, the AT is 4, the length is variable, and the attribute value is the User Birthday Value.

The sub-type values are: 0 for the default sub-type; 1 for secret key encryption using the shared secret key between the user and its home domain; 2 for public key encryption using the user's private key; and 3 for public key encryption using the home domain public key.

The User Birthday contains the month, day, and year.

4.6.11 User Home Phone Number Data Attribute

The User Home Phone Number Data Attribute defines the User's home phone number. The AF is 0, the AT is 7, the length is variable, and the attribute value is the User Home Phone Number Value.

The sub-type values are: 0 for the default sub-type; 1 for secret key encryption using the shared secret key between the user and its home domain; 2 for public key encryption using the user's private key; and 3 for public key encryption using the home domain public key.

4.6.12 User NAI Data Attribute

The User NAI Data Attribute defines the User Network Access Identifier. The AF is 0, the AT is 9, the length is variable, and the attribute value is the User NAI Data.

The sub-type values are: 0 for the default sub-type; 1 for secret key encryption using the shared secret key between the user and its home domain; 2 for public key encryption using the user's private key; and 3 for public key encryption using the home domain public key.

The User NAI contains a string representing the User Network Access Identifier.

4.6.13 User Name Data Attribute

The User Name Data Attribute defines the User's full name. The AF is 0, the AT is 3, the length is variable, and the attribute value is the User Name Data.

The sub-type values are: 0 for the default sub-type; 1 for secret key encryption using the shared secret key between the user and its home domain; 2 for public key encryption using the user's private key; and 3 for public key encryption using the home domain public key.

The User Name Value contains the user's first, middle, and last name.

4.6.14 User Password Data Attribute

The User Password Data Attribute defines the User's password. The AF is 0, the AT is 5, the length is variable, and the attribute value is the User Password Data.

The sub-type values are: 0 for the default sub-type; 1 for secret key encryption using the shared secret key between the user and its home domain; 2 for public key encryption using the user's private key; and 3 for public key encryption using the home domain public key.

The User Password Data is a string representing the user's password.

4.6.15 User PIN Number Data Attribute

It is an integer value selected by the user to secure access to his account This Attribute may be included with User Authentication Information Extension. The AF is 0, the AT is 10, the length is variable, and the attribute value is the User PIN Number Data.

The sub-type values are: 0 for the default sub-type; 1 for secret key encryption using the shared secret key between the user and its home domain; 2 for public key encryption using the user's private key; and 3 for public key encryption using the home domain public key.

4.6.16 User Work Phone Number Data Attribute

The User Work Phone Number Data Attribute defines the User's work phone number. One or more of these Attributes may be included with the User Authentication Information Extension. The AF is 0, the AT is 8, the length is variable, and the attribute value is the User Work Phone Number Data.

The sub-type values are: 0 for the default sub-type; 1 for secret key encryption using the shared secret key between the user and its home domain; 2 for public key encryption using the user's private key; and 3 for public key encryption using the home domain public key.

The use of the present invention results in a flexible and scalable architecture that supports user mobility across heterogeneous access networks in a totally IP centric network. Furthermore, the present invention achieves these results and provides a Mobility Enabled Network using many existing and/or proposed IP technologies and philosophies (defined, e.g., by the IETF or ITU) to achieve the foregoing results. Such a network may be used for a number for purposes. For example, the network may be used to evolve existing Cellular Networks and/or become the Next Generation (NG) Network base reference; the network may be used to provide an enhanced Intranet for enterprise, that is, an Intranet that supports seamless mobility for users between subnets, access technologies, and has an integrated voice and data network; the network may be used as a product offering for Mobility Internet Service Provider (ISP) services offering; and/or the network may be used to provide "Always-On" loop access.

It is understood that the present invention may take many forms and embodiments. Accordingly, several variations may be made in the foregoing without departing from the spirit or the scope of the invention. For example, while the Internet may constitute a public domain network, the present invention may comprise an IP based network that is not necessarily part of the public Internet.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. Unified Directory Service (UDS) architecture configured for serving an IP mobility communications architecture, the UDS comprising:
   a) a Home Control and Data Manager (HCDM) connected to a Network, Service Function (NSF) bus, the HMM comprising:
      an Access Network Interface (ANI) configured for enabling the MN to discover and distinguish an IPM Network to a sub-network level, and for replying to a discovery request from an MN, wherein the IPM network is one of a Local Service Function (LSF) or a Network Service Function (NSF), and wherein the discovery request comprises at least one of an SMM IP address, an SMM NAI, support for available security protocols, and support for local HMM;
      a Home Mobility Manager (HMM) configured for receiving an IP Address allocated by a DHCP, assigning the allocated IP address to the MN, authenticating the user (AAA), and updating the UDS with a user's mobility related information; and
      an IP Mobility (IPM) Tunnel Service (ITS) for providing tunneling and de-tunneling;
   b) a UDS Function connectable to the NSF bus for storing static and dynamic information about a user and making the information available to any application that interfaces with the UDS;
   c) at least one database connected to the UDS Function via the NSF bus, the database being configured for storing an Internet Protocol Mobility (IPM) user profile comprising at least the COA of the devices used by the user, the type of devices used by the user, the status of the devices at any time, the LSF information that any device is connected to, the user's preference between the devices registered at any time.

2. The UDS of claim 1 further comprising computer program code for sending data selected from the user profile to a visited network.

3. The UDS of claim 1, wherein ITS further comprises computer program code for providing at least one of a proxy Address Resolution Protocol (ARP), a gratutitous ARP, and forwarding of data.

4. The UDS of claim 1 wherein the local HMM is a HMM function located at the LSF that provides a subset of HMM functions.

5. The UDS of claim 1, wherein the mobility related information includes at least one of the COA of an MN, the NAI of the LSF, and the GPS coordinates of the MN.

6. The UDS of claim 1, wherein the HMM further comprises at least one of:
   computer program code for managing the lease of the IP address;
   computer program code for querying the UDS to check the service validation of the user
   computer program code for interfacing with an AAA function to authenticate the user
   computer program code for retrieving user profiles, defining QoS and policy related information to be used by non-IPM components, including at least one of the QoS manager, the Policy Enforcement Point (PEP), and Policy Decision Point (PDP) of the home network or by the serving network; and
   computer program code for de-registering an MN to allow resources, including the IP Address, to be re-claimed.

7. The UDS of claim 1, wherein the HMM further comprises at least one of:
   a) computer program code for managing the lease of the IP address;
   b) computer program code for querying the UDS to check the service validation of the user
   c) computer program code for interfacing with an AAA function to authenticate the user
   d) computer program code for retrieving user profiles to be used by non-IPM components of the home network or by the serving network; and
   e) computer program code for de-registering an MN to allow resources to be re-claimed.

8. The UDS of claim 1 wherein the IPM user profile comprises a plurality of object classes including an ipmUser object class, an ipmUserProfile object class, an ipmUserDevice object class, and an ipmClassOfService object class.

9. The UDS of claim 1 wherein the IPM user profile comprises a user name, a mobile node address, a class of service, an account number, and a care of address.

10. The UDS of claim 1 wherein the UDS is a home UDS, and the NSF is a home NSF, and the home UDS further comprises an interface connectable to a visited NSF having a visited UDS configured for transmitting to the server of the home UDS a Registration Request message requesting the IPM user profile of a user subscribed to the home NSF to permit the user to access services provided by the visited NSF.

11. The UDS of claim 1 wherein the UDS is a home UDS, and the NSF is a home NSF, and the home UDS further comprises:
   a) an interface connectable to a visited NSF having a visited UDS configured for transmitting to the server of the home UDS a Registration Request message requesting the IPM user profile of a user subscribed to the home NSF to enable the user to access services provided by the visited NSF; and
   b) computer program code responsive to receipt of the Registration Request message for retrieving the user profile and transmitting the user profile in a Registration Reply message to the visited NSF.

12. The UDS of claim 1 wherein the UDS is a home UDS, and the NSF is a home NSF, and the home UDS further comprises:
   a) an interface connectable to a visited NSF having a visited UDS configured for using an Authentication, Authorization, and Accounting (AAA) protocol to transmit to the server of the home UDS a Registration Request message requesting the IPM user profile of a user subscribed to the home NSF to enable the user to access services provided by the visited NSF; and b) computer program code responsive to receipt of the Registration Request message for retrieving the user profile and using the AAA protocol to transmit the user profile in a Registration Reply message over the interface to the visited NSF.

13. The UDS of claim 1 wherein the UDS is a home UDS, and the NSF is a home NSF, and the home UDS further comprises:

a) an interface connectable to a visited NSF having a visited UDS configured for using Diamond Authentication, Authorization, and Accounting (AAA) protocol to transmit to the server of the home UDS a Registration Request message requesting the IPM user profile of a user subscribed to the home NSF to enable the user to access services provided by the visited NSF; and b) computer program code responsive to receipt of the Registration Request message for retrieving the user profile and using the Diamond AAA protocol to transmit the user profile in a Registration Reply message over the interface to the visited NSF.

* * * * *

UNITED STATES PATENT AND TRADEMARK OFFICE
CERTIFICATE OF CORRECTION

PATENT NO. : 6,769,000 B1
DATED : July 27, 2004
INVENTOR(S) : Haseeb Akhtar et al.

It is certified that error appears in the above-identified patent and that said Letters Patent is hereby corrected as shown below:

Column 89,
Line 25, delete the comma between "Network" and "Service"

Signed and Sealed this

Twenty-sixth Day of October, 2004

JON W. DUDAS
*Director of the United States Patent and Trademark Office*